US012615491B2

(12) United States Patent
Carrigan et al.

(10) Patent No.: US 12,615,491 B2
(45) Date of Patent: Apr. 28, 2026

(54) INTERFACES FOR DEVICE INTERACTIONS

(71) Applicant: Apple Inc., Cupertino, CA (US)

(72) Inventors: Taylor G. Carrigan, San Francisco, CA (US); Vincenzo O. Giuliani, Thousand Oaks, CA (US); Patrick L. Coffman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 244 days.

(21) Appl. No.: 18/237,310

(22) Filed: Aug. 23, 2023

(65) Prior Publication Data

US 2024/0080642 A1 Mar. 7, 2024

Related U.S. Application Data

(60) Provisional application No. 63/404,175, filed on Sep. 6, 2022.

(51) Int. Cl.
| | |
|---|---|
| *H04W 4/02* | (2018.01) |
| *G06F 3/04845* | (2022.01) |
| *G06F 3/04847* | (2022.01) |
| *G06F 3/16* | (2006.01) |

(52) U.S. Cl.
CPC ........ *H04W 4/023* (2013.01); *G06F 3/04845* (2013.01); *G06F 3/04847* (2013.01); *G06F 3/165* (2013.01)

(58) Field of Classification Search
CPC ................ H04W 4/023; G06F 3/04845; G06F 3/04847; G06F 3/165; G06F 3/167
See application file for complete search history.

(56) References Cited

U.S. PATENT DOCUMENTS

| | | | |
|---|---|---|---|
| 5,202,961 | A | 4/1993 | Mills et al. |
| 5,745,116 | A | 4/1998 | Pisutha-Amond |
| 5,793,366 | A | 8/1998 | Mano et al. |
| 5,958,006 | A | 9/1999 | Eggleston et al. |
| 6,016,248 | A | 1/2000 | Anzai et al. |
| 6,094,197 | A | 7/2000 | Buxton et al. |
| 6,140,987 | A | 10/2000 | Stein et al. |
| 6,323,846 | B1 | 11/2001 | Westerman et al. |
| 6,333,973 | B1 | 12/2001 | Smith et al. |
| 6,393,462 | B1 | 5/2002 | Mullen-Schultz |
| 6,504,934 | B1 | 1/2003 | Kasai et al. |
| 6,515,988 | B1 | 2/2003 | Eldridge et al. |
| 6,570,557 | B1 | 5/2003 | Westerman et al. |
| 6,650,894 | B1 | 11/2003 | Berstis et al. |
| 6,674,452 | B1 | 1/2004 | Kraft et al. |

(Continued)

FOREIGN PATENT DOCUMENTS

| | | |
|---|---|---|
| AR | 060465 A1 | 6/2008 |
| AU | 2007100826 A4 | 9/2007 |

(Continued)

OTHER PUBLICATIONS

Final Office Action received for U.S. Appl. No. 17/970,417, mailed on Sep. 18, 2024, 24 pages.

(Continued)

*Primary Examiner* — Santiago Garcia
(74) *Attorney, Agent, or Firm* — YHE Law LLP

(57) ABSTRACT

The present disclosure generally relates to managing interactions between devices. In some embodiments, methods and user interfaces for managing interactions between devices are described.

46 Claims, 26 Drawing Sheets

(56) References Cited

U.S. PATENT DOCUMENTS

| | | | |
|---|---|---|---|
| 6,677,932 B1 | 1/2004 | Westerman | |
| 6,833,848 B1 | 12/2004 | Wolff et al. | |
| 6,922,147 B1 | 7/2005 | Viksnins et al. | |
| 7,081,905 B1 | 7/2006 | Raghunath | |
| 7,343,561 B1 | 3/2008 | Stochosky et al. | |
| 7,370,244 B2 | 5/2008 | Breitling et al. | |
| 7,415,720 B2 | 8/2008 | Jung | |
| 7,454,192 B1 | 11/2008 | Zhu | |
| 7,526,728 B2 | 4/2009 | Apparao et al. | |
| 7,546,470 B2 | 6/2009 | Schultz | |
| 7,571,014 B1 | 8/2009 | Lambourne et al. | |
| 7,593,749 B2 | 9/2009 | Vallstrom et al. | |
| 7,656,393 B2 | 2/2010 | King et al. | |
| 7,730,223 B1 | 6/2010 | Bavor et al. | |
| 7,831,054 B2 | 11/2010 | Ball et al. | |
| 7,860,936 B1 | 12/2010 | Newstadt et al. | |
| 8,028,323 B2 | 9/2011 | Weel | |
| 8,042,157 B2 | 10/2011 | Bennett et al. | |
| 8,046,804 B2 | 10/2011 | Kelts | |
| 8,060,571 B2 | 11/2011 | Rao | |
| 8,060,825 B2 | 11/2011 | Chaudhri et al. | |
| 8,077,157 B2 | 12/2011 | Sengupta et al. | |
| 8,116,807 B2 | 2/2012 | Matas | |
| 8,171,137 B1 | 5/2012 | Parks et al. | |
| 8,196,043 B2 | 6/2012 | Crow et al. | |
| 8,224,894 B1 | 7/2012 | Parks et al. | |
| 8,225,191 B1 | 7/2012 | Kalman | |
| 8,234,395 B2 | 7/2012 | Millington | |
| 8,260,879 B2 | 9/2012 | Chan | |
| 8,280,539 B2 | 10/2012 | Jehan et al. | |
| 8,290,603 B1 | 10/2012 | Lambourne | |
| 8,386,563 B2 | 2/2013 | Parks et al. | |
| 8,392,259 B2 | 3/2013 | Macgillivray et al. | |
| 8,392,617 B1 | 3/2013 | Weber et al. | |
| 8,427,303 B1 | 4/2013 | Brady et al. | |
| 8,434,133 B2 | 4/2013 | Kulkarni et al. | |
| 8,458,780 B1 | 6/2013 | Takkallapally et al. | |
| 8,462,961 B1 | 6/2013 | Bywaters et al. | |
| 8,467,766 B2 | 6/2013 | Rackley et al. | |
| 8,478,363 B2 | 7/2013 | Levien et al. | |
| 8,478,816 B2 | 7/2013 | Parks et al. | |
| 8,613,070 B1 | 12/2013 | Borzycki et al. | |
| 8,624,836 B1 | 1/2014 | Miller et al. | |
| 8,682,722 B1 | 3/2014 | Des Jardins et al. | |
| 8,718,556 B2 | 5/2014 | Lee et al. | |
| 8,738,090 B2 | 5/2014 | Kanda et al. | |
| 8,769,624 B2 | 7/2014 | Cotterill | |
| 8,799,406 B1 | 8/2014 | Slonh | |
| 8,811,951 B1 | 8/2014 | Faaborg et al. | |
| 8,812,601 B2 | 8/2014 | Hsieh et al. | |
| 8,826,415 B2 | 9/2014 | Last | |
| 8,830,181 B1 | 9/2014 | Clark et al. | |
| 8,884,874 B1 | 11/2014 | Kim et al. | |
| 8,886,710 B2 | 11/2014 | Evans et al. | |
| 8,914,752 B1 | 12/2014 | Spiegel | |
| 8,914,840 B2 | 12/2014 | Reisman | |
| 9,002,322 B2 | 4/2015 | Cotterill | |
| 9,042,556 B2 | 5/2015 | Kallai et al. | |
| 9,071,945 B1 | 6/2015 | Rubin et al. | |
| 9,080,736 B1 | 7/2015 | Salzinger et al. | |
| 9,084,003 B1 | 7/2015 | Sanio et al. | |
| 9,095,779 B2 | 8/2015 | Chan et al. | |
| 9,100,944 B2 | 8/2015 | Sauhta et al. | |
| 9,112,849 B1 | 8/2015 | Werkelin Ahlin et al. | |
| 9,134,902 B2 | 9/2015 | Kang et al. | |
| 9,185,062 B1 | 11/2015 | Yang et al. | |
| 9,191,988 B2 | 11/2015 | Newham | |
| 9,202,509 B2 | 12/2015 | Kallai et al. | |
| 9,247,363 B2 | 1/2016 | Triplett et al. | |
| 9,251,787 B1 | 2/2016 | Hart et al. | |
| 9,253,631 B1 | 2/2016 | White et al. | |
| 9,269,083 B1 | 2/2016 | Jarajapu et al. | |
| 9,294,476 B1 | 3/2016 | Lurey et al. | |
| 9,294,853 B1 | 3/2016 | Dhaundiyal | |
| 9,319,782 B1 | 4/2016 | Crump et al. | |
| 9,329,831 B1 | 5/2016 | Fullerton et al. | |
| 9,374,607 B2 | 6/2016 | Bates et al. | |
| 9,400,489 B2 | 7/2016 | Kim et al. | |
| D765,118 S | 8/2016 | Bachman et al. | |
| 9,406,103 B1 | 8/2016 | Gray et al. | |
| 9,431,021 B1 | 8/2016 | Scalise et al. | |
| 9,450,812 B2 | 9/2016 | Lee et al. | |
| 9,459,786 B2 * | 10/2016 | Thakur | G06F 3/0486 |
| 9,477,208 B2 | 10/2016 | Park et al. | |
| D773,510 S | 12/2016 | Foss et al. | |
| 9,519,413 B2 | 12/2016 | Bates | |
| 9,549,323 B2 | 1/2017 | Lee et al. | |
| 9,582,178 B2 | 2/2017 | Grant et al. | |
| 9,588,661 B1 | 3/2017 | Jauhal et al. | |
| 9,628,414 B1 | 4/2017 | Umapathy et al. | |
| D789,381 S | 6/2017 | Okumura et al. | |
| 9,680,927 B2 | 6/2017 | Miller et al. | |
| 9,680,982 B2 | 6/2017 | Fiedler | |
| 9,703,369 B1 | 7/2017 | Mullen | |
| 9,710,639 B1 | 7/2017 | Saini | |
| 9,727,749 B2 | 8/2017 | Tzeng et al. | |
| 9,779,613 B2 | 10/2017 | Bates | |
| 9,794,720 B1 | 10/2017 | Kadri | |
| 9,820,323 B1 | 11/2017 | Young et al. | |
| 9,846,564 B1 | 12/2017 | Toksoz et al. | |
| 9,846,685 B2 | 12/2017 | Li | |
| 9,847,999 B2 | 12/2017 | Van Os et al. | |
| 9,898,250 B1 | 2/2018 | Williams et al. | |
| 9,922,317 B2 | 3/2018 | Bak et al. | |
| 9,954,989 B2 | 4/2018 | Zhou | |
| 9,967,401 B2 | 5/2018 | Coffman et al. | |
| 10,055,094 B2 | 8/2018 | Li et al. | |
| 10,089,607 B2 | 10/2018 | Ziat et al. | |
| 10,096,015 B2 | 10/2018 | Bak et al. | |
| 10,104,089 B2 | 10/2018 | Kim et al. | |
| 10,129,044 B2 | 11/2018 | Kangshang et al. | |
| 10,142,122 B1 | 11/2018 | Hill et al. | |
| 10,157,040 B2 | 12/2018 | Ballinger et al. | |
| 10,178,234 B2 | 1/2019 | Coffman et al. | |
| 10,182,138 B2 | 1/2019 | Motika et al. | |
| 10,198,563 B2 | 2/2019 | Wang et al. | |
| 10,200,468 B2 | 2/2019 | Leban et al. | |
| 10,225,711 B2 | 3/2019 | Parks et al. | |
| 10,237,141 B2 | 3/2019 | Sasaki et al. | |
| 10,248,779 B2 | 4/2019 | Song et al. | |
| 10,284,980 B1 | 5/2019 | Woo et al. | |
| 10,299,300 B1 | 5/2019 | Young | |
| 10,300,394 B1 | 5/2019 | Evans et al. | |
| 10,303,422 B1 | 5/2019 | Woo et al. | |
| 10,310,725 B2 | 6/2019 | Smith et al. | |
| 10,334,054 B2 | 6/2019 | Van Os et al. | |
| 10,339,769 B2 | 7/2019 | Mixter et al. | |
| 10,374,804 B2 | 8/2019 | Lee et al. | |
| 10,417,037 B2 | 9/2019 | Gruber et al. | |
| 10,436,977 B2 | 10/2019 | Bergman et al. | |
| 10,454,781 B2 | 10/2019 | Sasaki et al. | |
| 10,511,456 B2 | 12/2019 | Smith et al. | |
| 10,523,625 B1 | 12/2019 | Allen et al. | |
| 10,524,300 B2 | 12/2019 | Ueda et al. | |
| 10,585,472 B2 | 3/2020 | Tokubo et al. | |
| 10,701,067 B1 | 6/2020 | Ziraknejad et al. | |
| 10,713,699 B1 | 7/2020 | Lien et al. | |
| 10,732,819 B2 | 8/2020 | Wang et al. | |
| 10,742,645 B2 | 8/2020 | Hevizi et al. | |
| 10,742,648 B2 | 8/2020 | Magyar et al. | |
| 10,749,967 B2 | 8/2020 | Van Os et al. | |
| 10,779,085 B1 | 9/2020 | Carrigan | |
| 10,783,883 B2 | 9/2020 | Mixter et al. | |
| 10,824,299 B2 | 11/2020 | Bai | |
| 10,833,887 B2 | 11/2020 | Wu | |
| 10,924,446 B1 | 2/2021 | Paul | |
| 10,929,099 B2 | 2/2021 | Querze et al. | |
| 10,963,145 B1 | 3/2021 | Voss et al. | |
| 11,024,303 B1 | 6/2021 | Devaraj et al. | |
| 11,079,913 B1 | 8/2021 | Kim et al. | |
| 11,157,143 B2 | 10/2021 | Yang et al. | |
| 11,164,580 B2 | 11/2021 | Kraker | |
| 11,176,940 B1 | 11/2021 | Zhong et al. | |
| 11,281,711 B2 | 3/2022 | Sanders et al. | |

(56)                References Cited

U.S. PATENT DOCUMENTS

| | | | |
|---|---|---|---|
| 11,283,916 B2 | 3/2022 | Coffman et al. | |
| 11,316,709 B2 | 4/2022 | Brown et al. | |
| 11,343,370 B1 | 5/2022 | Gordon et al. | |
| 11,343,613 B2 | 5/2022 | Gordon et al. | |
| 11,431,834 B1 | 8/2022 | Gordon et al. | |
| 11,449,212 B2 * | 9/2022 | Roard | G06F 3/04842 |
| 11,463,576 B1 | 10/2022 | Gordon et al. | |
| 11,500,510 B2 * | 11/2022 | Tokuchi | G06F 3/167 |
| 11,523,166 B1 | 12/2022 | Tu et al. | |
| 11,589,184 B1 | 2/2023 | Mont-Reynaud | |
| 11,900,015 B2 * | 2/2024 | Kim | H04R 1/1041 |
| 12,014,118 B2 | 6/2024 | Gruber et al. | |
| 12,085,421 B2 | 9/2024 | Yedid et al. | |
| 12,170,883 B2 | 12/2024 | Marculescu et al. | |
| 2001/0021649 A1 | 9/2001 | Kinnunen et al. | |
| 2001/0030597 A1 | 10/2001 | Inoue et al. | |
| 2001/0031622 A1 | 10/2001 | Kivela et al. | |
| 2001/0039497 A1 | 11/2001 | Hubbard | |
| 2001/0049627 A1 | 12/2001 | Simpson | |
| 2002/0002039 A1 | 1/2002 | Qureshey et al. | |
| 2002/0015024 A1 | 2/2002 | Westerman et al. | |
| 2002/0026442 A1 | 2/2002 | Lipscomb et al. | |
| 2002/0048224 A1 | 4/2002 | Dygert et al. | |
| 2002/0057262 A1 | 5/2002 | Patrick et al. | |
| 2002/0059295 A1 | 5/2002 | Ludtke et al. | |
| 2002/0068600 A1 | 6/2002 | Chihara et al. | |
| 2002/0115478 A1 | 8/2002 | Fujisawa et al. | |
| 2002/0116276 A1 | 8/2002 | Ottley | |
| 2002/0142734 A1 | 10/2002 | Wickstead | |
| 2002/0168938 A1 | 11/2002 | Chang | |
| 2003/0028382 A1 | 2/2003 | Chambers et al. | |
| 2003/0028639 A1 | 2/2003 | Yamamoto et al. | |
| 2003/0055977 A1 | 3/2003 | Miller | |
| 2003/0076298 A1 | 4/2003 | Rosenberg | |
| 2003/0079057 A1 | 4/2003 | Ruskin et al. | |
| 2003/0081506 A1 | 5/2003 | Karhu et al. | |
| 2003/0097358 A1 | 5/2003 | Mendez et al. | |
| 2003/0097413 A1 | 5/2003 | Vishik et al. | |
| 2003/0112938 A1 | 6/2003 | Kanakubo et al. | |
| 2003/0160861 A1 | 8/2003 | Barlow et al. | |
| 2003/0182139 A1 | 9/2003 | Harris et al. | |
| 2003/0188183 A1 | 10/2003 | Lee et al. | |
| 2003/0217096 A1 | 11/2003 | McKelvie et al. | |
| 2003/0229900 A1 | 12/2003 | Reisman | |
| 2004/0019640 A1 | 1/2004 | Bartram et al. | |
| 2004/0032955 A1 | 2/2004 | Hashimoto et al. | |
| 2004/0046638 A1 | 3/2004 | Kawasaki | |
| 2004/0073432 A1 | 4/2004 | Stone | |
| 2004/0162877 A1 | 8/2004 | Van et al. | |
| 2004/0181695 A1 | 9/2004 | Walker et al. | |
| 2004/0242200 A1 | 12/2004 | Maeoka et al. | |
| 2004/0261010 A1 | 12/2004 | Matsuishi | |
| 2004/0264916 A1 | 12/2004 | Van et al. | |
| 2005/0052458 A1 | 3/2005 | Lambert | |
| 2005/0071188 A1 | 3/2005 | Thuerk | |
| 2005/0093868 A1 | 5/2005 | Hinckley | |
| 2005/0096009 A1 | 5/2005 | Ackley | |
| 2005/0097135 A1 | 5/2005 | Epperson et al. | |
| 2005/0117752 A1 | 6/2005 | Ilma et al. | |
| 2005/0120306 A1 | 6/2005 | Klassen et al. | |
| 2005/0144247 A1 | 6/2005 | Christensen et al. | |
| 2005/0144452 A1 | 6/2005 | Lynch et al. | |
| 2005/0220304 A1 | 10/2005 | Lenoir et al. | |
| 2005/0233780 A1 | 10/2005 | Jani et al. | |
| 2005/0239512 A1 | 10/2005 | Hasegawa et al. | |
| 2005/0251566 A1 | 11/2005 | Weel | |
| 2005/0278587 A1 | 12/2005 | Breitling et al. | |
| 2006/0002523 A1 | 1/2006 | Bettis et al. | |
| 2006/0019649 A1 | 1/2006 | Feinleib et al. | |
| 2006/0020637 A1 | 1/2006 | Kedem | |
| 2006/0129947 A1 | 6/2006 | Hamzy et al. | |
| 2006/0132456 A1 | 6/2006 | Anson | |
| 2006/0156239 A1 | 7/2006 | Jobs et al. | |
| 2006/0160090 A1 | 7/2006 | Macina et al. | |
| 2006/0161621 A1 | 7/2006 | Rosenberg | |
| 2006/0161870 A1 | 7/2006 | Hotelling et al. | |
| 2006/0161871 A1 | 7/2006 | Hotelling et al. | |
| 2006/0185005 A1 | 8/2006 | Graves et al. | |
| 2006/0206709 A1 | 9/2006 | Labrou et al. | |
| 2006/0210092 A1 | 9/2006 | Navid | |
| 2006/0217104 A1 | 9/2006 | Cho | |
| 2006/0224882 A1 | 10/2006 | Chin | |
| 2006/0236847 A1 | 10/2006 | Withop | |
| 2006/0250578 A1 | 11/2006 | Pohl et al. | |
| 2006/0258289 A1 | 11/2006 | Dua | |
| 2006/0271425 A1 | 11/2006 | Goodman et al. | |
| 2006/0288226 A1 | 12/2006 | Kowal | |
| 2007/0015519 A1 | 1/2007 | Casey | |
| 2007/0027682 A1 | 2/2007 | Bennett | |
| 2007/0048714 A1 | 3/2007 | Plastina et al. | |
| 2007/0073649 A1 | 3/2007 | Kikkoji et al. | |
| 2007/0113294 A1 | 5/2007 | Field et al. | |
| 2007/0115933 A1 | 5/2007 | Muhamed et al. | |
| 2007/0136778 A1 | 6/2007 | Birger et al. | |
| 2007/0143495 A1 | 6/2007 | Porat | |
| 2007/0150842 A1 | 6/2007 | Chaudhri et al. | |
| 2007/0156910 A1 | 7/2007 | Alfke et al. | |
| 2007/0157089 A1 | 7/2007 | Van Os et al. | |
| 2007/0157097 A1 | 7/2007 | Peters et al. | |
| 2007/0157103 A1 | 7/2007 | Arneson et al. | |
| 2007/0162963 A1 | 7/2007 | Penet et al. | |
| 2007/0180492 A1 | 8/2007 | Hassan et al. | |
| 2007/0186106 A1 | 8/2007 | Ting et al. | |
| 2007/0186235 A1 | 8/2007 | Jarman et al. | |
| 2007/0191008 A1 | 8/2007 | Bucher et al. | |
| 2007/0226778 A1 | 9/2007 | Pietruszka | |
| 2007/0229221 A1 | 10/2007 | Saotome | |
| 2007/0260547 A1 | 11/2007 | Little | |
| 2007/0283011 A1 | 12/2007 | Rakowski et al. | |
| 2007/0294182 A1 | 12/2007 | Hammad | |
| 2008/0010387 A1 | 1/2008 | Curtis et al. | |
| 2008/0011827 A1 | 1/2008 | Little et al. | |
| 2008/0016368 A1 | 1/2008 | Adams | |
| 2008/0016537 A1 | 1/2008 | Little et al. | |
| 2008/0017721 A1 | 1/2008 | Zehnacker | |
| 2008/0027947 A1 | 1/2008 | Pritchett et al. | |
| 2008/0034011 A1 | 2/2008 | Cisler et al. | |
| 2008/0036743 A1 | 2/2008 | Westerman et al. | |
| 2008/0040786 A1 | 2/2008 | Chang et al. | |
| 2008/0042866 A1 | 2/2008 | Morse et al. | |
| 2008/0055263 A1 | 3/2008 | Lemay et al. | |
| 2008/0057926 A1 | 3/2008 | Forstall et al. | |
| 2008/0065505 A1 | 3/2008 | Plastina et al. | |
| 2008/0081558 A1 | 4/2008 | Dunko et al. | |
| 2008/0084400 A1 | 4/2008 | Rosenberg | |
| 2008/0091717 A1 | 4/2008 | Garbow et al. | |
| 2008/0094370 A1 | 4/2008 | Ording et al. | |
| 2008/0100693 A1 | 5/2008 | Jobs et al. | |
| 2008/0114678 A1 | 5/2008 | Bennett et al. | |
| 2008/0114716 A1 | 5/2008 | Mock | |
| 2008/0114980 A1 | 5/2008 | Sridhar | |
| 2008/0122794 A1 | 5/2008 | Koiso et al. | |
| 2008/0122796 A1 | 5/2008 | Jobs et al. | |
| 2008/0126935 A1 | 5/2008 | Blomgren | |
| 2008/0134088 A1 | 6/2008 | Tse et al. | |
| 2008/0140488 A1 | 6/2008 | Oral et al. | |
| 2008/0147735 A1 | 6/2008 | Sloo | |
| 2008/0155474 A1 | 6/2008 | Duhig et al. | |
| 2008/0160974 A1 | 7/2008 | Vartiainen et al. | |
| 2008/0163127 A1 | 7/2008 | Newell et al. | |
| 2008/0168185 A1 | 7/2008 | Robbin et al. | |
| 2008/0201454 A1 | 8/2008 | Soffer | |
| 2008/0208762 A1 | 8/2008 | Arthur et al. | |
| 2008/0214163 A1 | 9/2008 | Onyon et al. | |
| 2008/0219151 A1 | 9/2008 | Ma et al. | |
| 2008/0220752 A1 | 9/2008 | Forstall et al. | |
| 2008/0229409 A1 | 9/2008 | Miller et al. | |
| 2008/0250319 A1 | 10/2008 | Lee et al. | |
| 2008/0259829 A1 | 10/2008 | Rosenblatt | |
| 2008/0273712 A1 | 11/2008 | Eichfeld et al. | |
| 2008/0273713 A1 | 11/2008 | Hartung et al. | |
| 2008/0282202 A1 | 11/2008 | Sunday | |
| 2008/0285772 A1 | 11/2008 | Haulick et al. | |
| 2008/0292074 A1 | 11/2008 | Boni et al. | |

(56) References Cited

U.S. PATENT DOCUMENTS

| | | |
|---|---|---|
| 2008/0305742 A1 | 12/2008 | Basir |
| 2008/0306997 A1 | 12/2008 | Keohane et al. |
| 2008/0307323 A1 | 12/2008 | Coffman et al. |
| 2008/0313257 A1 | 12/2008 | Allen et al. |
| 2008/0316183 A1 | 12/2008 | Westerman et al. |
| 2009/0002335 A1 | 1/2009 | Chaudhri |
| 2009/0005011 A1 | 1/2009 | Christie et al. |
| 2009/0006846 A1 | 1/2009 | Rosenblatt |
| 2009/0007188 A1 | 1/2009 | Omernick |
| 2009/0031375 A1 | 1/2009 | Sullivan et al. |
| 2009/0051649 A1 | 2/2009 | Rondel |
| 2009/0054044 A1 | 2/2009 | Ikemori et al. |
| 2009/0055377 A1 | 2/2009 | Hedge et al. |
| 2009/0060170 A1 | 3/2009 | Coughlan et al. |
| 2009/0061837 A1 | 3/2009 | Chaudhri et al. |
| 2009/0063851 A1 | 3/2009 | Nijdam |
| 2009/0066648 A1 | 3/2009 | Kerr et al. |
| 2009/0094681 A1 | 4/2009 | Sadler et al. |
| 2009/0100383 A1 | 4/2009 | Sunday et al. |
| 2009/0119754 A1 | 5/2009 | Schubert |
| 2009/0122149 A1 | 5/2009 | Ishii |
| 2009/0125571 A1 | 5/2009 | Kiilerich et al. |
| 2009/0135678 A1 | 5/2009 | Godat |
| 2009/0140960 A1 | 6/2009 | Mahowald et al. |
| 2009/0144391 A1 | 6/2009 | Jung et al. |
| 2009/0144451 A1 | 6/2009 | Cabezas et al. |
| 2009/0153289 A1 | 6/2009 | Hope et al. |
| 2009/0153466 A1 | 6/2009 | Tilley |
| 2009/0158390 A1 | 6/2009 | Guan |
| 2009/0164581 A1 | 6/2009 | Bove et al. |
| 2009/0165107 A1 | 6/2009 | Tojo et al. |
| 2009/0174680 A1* | 7/2009 | Anzures .............. G06F 1/1626 |
| | | 345/173 |
| 2009/0174763 A1 | 7/2009 | Bengtsson et al. |
| 2009/0177981 A1 | 7/2009 | Christie et al. |
| 2009/0187423 A1 | 7/2009 | Kim |
| 2009/0187981 A1 | 7/2009 | Pan et al. |
| 2009/0193514 A1 | 7/2009 | Adams et al. |
| 2009/0195497 A1 | 8/2009 | Fitzgerald et al. |
| 2009/0199130 A1 | 8/2009 | Tsern et al. |
| 2009/0199188 A1 | 8/2009 | Fujimaki |
| 2009/0228322 A1 | 9/2009 | Van et al. |
| 2009/0228938 A1 | 9/2009 | White et al. |
| 2009/0231960 A1 | 9/2009 | Hutcheson |
| 2009/0241169 A1 | 9/2009 | Dhand et al. |
| 2009/0244015 A1 | 10/2009 | Sengupta et al. |
| 2009/0248737 A1 | 10/2009 | Shukla et al. |
| 2009/0249244 A1 | 10/2009 | Robinson et al. |
| 2009/0265417 A1 | 10/2009 | Svendsen et al. |
| 2009/0271744 A1 | 10/2009 | Anders |
| 2009/0304205 A1 | 12/2009 | Hardacker et al. |
| 2009/0305732 A1 | 12/2009 | Marcellino et al. |
| 2009/0307633 A1 | 12/2009 | Haughay et al. |
| 2009/0311993 A1 | 12/2009 | Horodezky |
| 2009/0327449 A1 | 12/2009 | Silverman et al. |
| 2010/0004031 A1 | 1/2010 | Kim |
| 2010/0017474 A1 | 1/2010 | Kandekar et al. |
| 2010/0023449 A1 | 1/2010 | Skowronek et al. |
| 2010/0042654 A1 | 2/2010 | Heller et al. |
| 2010/0042835 A1 | 2/2010 | Lee et al. |
| 2010/0050086 A1 | 2/2010 | Sherrard et al. |
| 2010/0054497 A1 | 3/2010 | Bull et al. |
| 2010/0058231 A1 | 3/2010 | Duarte et al. |
| 2010/0058253 A1 | 3/2010 | Son |
| 2010/0070490 A1 | 3/2010 | Amidon et al. |
| 2010/0075656 A1 | 3/2010 | Howarter et al. |
| 2010/0082481 A1 | 4/2010 | Lin et al. |
| 2010/0094834 A1 | 4/2010 | Svendsen |
| 2010/0106647 A1 | 4/2010 | Raman |
| 2010/0107229 A1 | 4/2010 | Najafi et al. |
| 2010/0109864 A1 | 5/2010 | Haartsen et al. |
| 2010/0121636 A1 | 5/2010 | Burke et al. |
| 2010/0123724 A1 | 5/2010 | Moore et al. |
| 2010/0125785 A1 | 5/2010 | Moore et al. |
| 2010/0125811 A1 | 5/2010 | Moore et al. |
| 2010/0131978 A1 | 5/2010 | Friedlander et al. |
| 2010/0138780 A1 | 6/2010 | Marano et al. |
| 2010/0146384 A1 | 6/2010 | Peev et al. |
| 2010/0146463 A1 | 6/2010 | Cho et al. |
| 2010/0159994 A1 | 6/2010 | Stallings et al. |
| 2010/0159995 A1 | 6/2010 | Stallings et al. |
| 2010/0174644 A1 | 7/2010 | Rosano et al. |
| 2010/0174993 A1 | 7/2010 | Pennington et al. |
| 2010/0178873 A1 | 7/2010 | Lee et al. |
| 2010/0190478 A1 | 7/2010 | Brewer et al. |
| 2010/0205563 A1 | 8/2010 | Haapsaari et al. |
| 2010/0223542 A1 | 9/2010 | Vuong et al. |
| 2010/0235729 A1 | 9/2010 | Kocienda et al. |
| 2010/0248823 A1 | 9/2010 | Smith |
| 2010/0250376 A1 | 9/2010 | Nandiraju |
| 2010/0251304 A1 | 9/2010 | Donoghue et al. |
| 2010/0257466 A1 | 10/2010 | Wroblewski et al. |
| 2010/0257490 A1 | 10/2010 | Lyon et al. |
| 2010/0259482 A1 | 10/2010 | Ball |
| 2010/0269069 A1 | 10/2010 | Paila et al. |
| 2010/0269156 A1 | 10/2010 | Hohlfeld et al. |
| 2010/0272250 A1 | 10/2010 | Yap et al. |
| 2010/0284389 A1 | 11/2010 | Ramsay et al. |
| 2010/0293598 A1 | 11/2010 | Collart et al. |
| 2010/0295803 A1 | 11/2010 | Kim et al. |
| 2010/0296678 A1 | 11/2010 | Kuhn-rahloff et al. |
| 2010/0299436 A1 | 11/2010 | Khalid et al. |
| 2010/0299639 A1 | 11/2010 | Ramsay et al. |
| 2010/0304729 A1 | 12/2010 | Sabotta et al. |
| 2010/0311336 A1 | 12/2010 | Huotari et al. |
| 2010/0318908 A1 | 12/2010 | Neuman et al. |
| 2010/0318917 A1 | 12/2010 | Holladay et al. |
| 2010/0318928 A1 | 12/2010 | Neuman et al. |
| 2010/0318939 A1 | 12/2010 | Moon |
| 2010/0321201 A1 | 12/2010 | Huang et al. |
| 2010/0325239 A1 | 12/2010 | Khedouri et al. |
| 2011/0003587 A1 | 1/2011 | Belz et al. |
| 2011/0010470 A1 | 1/2011 | Hulbert et al. |
| 2011/0016089 A1 | 1/2011 | Freedman et al. |
| 2011/0029750 A1 | 2/2011 | Jang et al. |
| 2011/0029891 A1 | 2/2011 | Kim et al. |
| 2011/0035799 A1 | 2/2011 | Handler |
| 2011/0041102 A1 | 2/2011 | Kim |
| 2011/0054268 A1 | 3/2011 | Fidacaro et al. |
| 2011/0059769 A1 | 3/2011 | Brunolli |
| 2011/0065384 A1 | 3/2011 | Cader et al. |
| 2011/0071656 A1 | 3/2011 | Mckiel, Jr. |
| 2011/0081889 A1 | 4/2011 | Gao et al. |
| 2011/0081923 A1 | 4/2011 | Bednar et al. |
| 2011/0082902 A1 | 4/2011 | Rottler et al. |
| 2011/0087431 A1 | 4/2011 | Gupta et al. |
| 2011/0087970 A1 | 4/2011 | Swink et al. |
| 2011/0088086 A1 | 4/2011 | Swink et al. |
| 2011/0105096 A1 | 5/2011 | Dods et al. |
| 2011/0106671 A1 | 5/2011 | Minnis et al. |
| 2011/0106921 A1* | 5/2011 | Brown .................. H04L 41/084 |
| | | 709/221 |
| 2011/0111735 A1 | 5/2011 | Pietrow |
| 2011/0115945 A1 | 5/2011 | Takano et al. |
| 2011/0126148 A1 | 5/2011 | Krishnaraj et al. |
| 2011/0130168 A1 | 6/2011 | Vendrow et al. |
| 2011/0138166 A1 | 6/2011 | Peszek et al. |
| 2011/0138284 A1 | 6/2011 | Wigdor et al. |
| 2011/0138295 A1 | 6/2011 | Momchilov et al. |
| 2011/0142234 A1 | 6/2011 | Rogers |
| 2011/0149874 A1 | 6/2011 | Reif |
| 2011/0157046 A1 | 6/2011 | Lee et al. |
| 2011/0159469 A1 | 6/2011 | Hwang et al. |
| 2011/0159927 A1 | 6/2011 | Choi |
| 2011/0164269 A1 | 7/2011 | Kamishiro |
| 2011/0167357 A1 | 7/2011 | Benjamin et al. |
| 2011/0178811 A1 | 7/2011 | Sheridan |
| 2011/0179386 A1 | 7/2011 | Shaffer et al. |
| 2011/0183650 A1 | 7/2011 | Mckee |
| 2011/0184768 A1 | 7/2011 | Norton et al. |
| 2011/0187497 A1 | 8/2011 | Chin |
| 2011/0191695 A1 | 8/2011 | Dinka et al. |
| 2011/0214158 A1 | 9/2011 | Pasquero et al. |
| 2011/0215921 A1 | 9/2011 | Ben et al. |

(56) References Cited

U.S. PATENT DOCUMENTS

| | | | |
|---|---|---|---|
| 2011/0225426 A1 | 9/2011 | Agarwal et al. | |
| 2011/0231914 A1 | 9/2011 | Hung | |
| 2011/0242002 A1 | 10/2011 | Kaplan et al. | |
| 2011/0246942 A1 | 10/2011 | Misawa | |
| 2011/0250895 A1 | 10/2011 | Wohlert et al. | |
| 2011/0254683 A1 | 10/2011 | Soldan et al. | |
| 2011/0273526 A1 | 11/2011 | Mehin et al. | |
| 2011/0275358 A1 | 11/2011 | Faenger | |
| 2011/0279852 A1 | 11/2011 | Oda et al. | |
| 2011/0281568 A1 | 11/2011 | Le | |
| 2011/0283334 A1* | 11/2011 | Choi | H04L 67/148 |
| | | | 725/148 |
| 2011/0291971 A1 | 12/2011 | Masaki et al. | |
| 2011/0306393 A1 | 12/2011 | Goldman et al. | |
| 2011/0314398 A1 | 12/2011 | Yano et al. | |
| 2011/0319056 A1 | 12/2011 | Toy et al. | |
| 2011/0320450 A1 | 12/2011 | Liu et al. | |
| 2012/0004920 A1 | 1/2012 | Kelly et al. | |
| 2012/0005708 A1 | 1/2012 | Kelts | |
| 2012/0016678 A1 | 1/2012 | Gruber et al. | |
| 2012/0019610 A1 | 1/2012 | Hornyak et al. | |
| 2012/0024947 A1 | 2/2012 | Naelon et al. | |
| 2012/0033028 A1 | 2/2012 | Murphy et al. | |
| 2012/0036556 A1 | 2/2012 | Lebeau et al. | |
| 2012/0040719 A1 | 2/2012 | Lee et al. | |
| 2012/0044062 A1 | 2/2012 | Jersa et al. | |
| 2012/0050185 A1 | 3/2012 | Davydov et al. | |
| 2012/0051560 A1 | 3/2012 | Sanders | |
| 2012/0054278 A1 | 3/2012 | Taleb et al. | |
| 2012/0059813 A1 | 3/2012 | Sejnoha et al. | |
| 2012/0066632 A1 | 3/2012 | Sundermeyer et al. | |
| 2012/0066731 A1 | 3/2012 | Vasquez et al. | |
| 2012/0079126 A1 | 3/2012 | Evans et al. | |
| 2012/0081375 A1 | 4/2012 | Robert et al. | |
| 2012/0084691 A1 | 4/2012 | Yun | |
| 2012/0088477 A1 | 4/2012 | Cassidy et al. | |
| 2012/0096069 A1 | 4/2012 | Chan | |
| 2012/0096076 A1 | 4/2012 | Chan et al. | |
| 2012/0096386 A1 | 4/2012 | Baumann et al. | |
| 2012/0105358 A1 | 5/2012 | Momeyer et al. | |
| 2012/0110455 A1 | 5/2012 | Sharma et al. | |
| 2012/0115608 A1 | 5/2012 | Pfeifer et al. | |
| 2012/0129496 A1 | 5/2012 | Park et al. | |
| 2012/0136998 A1 | 5/2012 | Hough et al. | |
| 2012/0143694 A1 | 6/2012 | Zargahi et al. | |
| 2012/0178431 A1 | 7/2012 | Gold | |
| 2012/0185542 A1 | 7/2012 | Vyrros et al. | |
| 2012/0197419 A1 | 8/2012 | Dhruv et al. | |
| 2012/0210226 A1 | 8/2012 | Mccoy et al. | |
| 2012/0214458 A1 | 8/2012 | Levien et al. | |
| 2012/0215684 A1 | 8/2012 | Kidron | |
| 2012/0218177 A1 | 8/2012 | Pang et al. | |
| 2012/0222092 A1 | 8/2012 | Rabii | |
| 2012/0223890 A1 | 9/2012 | Borovsky et al. | |
| 2012/0223959 A1 | 9/2012 | Lengeling et al. | |
| 2012/0233239 A1 | 9/2012 | Urim et al. | |
| 2012/0257095 A1 | 10/2012 | Velazquez | |
| 2012/0260169 A1 | 10/2012 | Schwartz et al. | |
| 2012/0269361 A1 | 10/2012 | Bhow et al. | |
| 2012/0272230 A1 | 10/2012 | Lee | |
| 2012/0284185 A1 | 11/2012 | Mettler et al. | |
| 2012/0284256 A1 | 11/2012 | Mahajan et al. | |
| 2012/0284297 A1 | 11/2012 | Aguera-Arcas et al. | |
| 2012/0284673 A1 | 11/2012 | Lamb et al. | |
| 2012/0289217 A1 | 11/2012 | Riemer et al. | |
| 2012/0290653 A1 | 11/2012 | Sharkey | |
| 2012/0290657 A1 | 11/2012 | Parks et al. | |
| 2012/0290943 A1 | 11/2012 | Toney et al. | |
| 2012/0290950 A1 | 11/2012 | Rapaport et al. | |
| 2012/0294118 A1 | 11/2012 | Haulick et al. | |
| 2012/0297017 A1 | 11/2012 | Livshits et al. | |
| 2012/0311444 A1 | 12/2012 | Chaudhri | |
| 2012/0322508 A1 | 12/2012 | Forstall et al. | |
| 2012/0323868 A1 | 12/2012 | Robbin et al. | |
| 2013/0005487 A1 | 1/2013 | Frazzini et al. | |
| 2013/0007203 A1 | 1/2013 | Szu | |
| 2013/0007617 A1 | 1/2013 | Mackenzie et al. | |
| 2013/0007665 A1 | 1/2013 | Chaudhri et al. | |
| 2013/0016818 A1 | 1/2013 | Cohn | |
| 2013/0017846 A1 | 1/2013 | Schoppe | |
| 2013/0022221 A1 | 1/2013 | Kallai et al. | |
| 2013/0024932 A1 | 1/2013 | Toebes et al. | |
| 2013/0026293 A1 | 1/2013 | Schneider et al. | |
| 2013/0027289 A1 | 1/2013 | Choi et al. | |
| 2013/0027341 A1 | 1/2013 | Mastandrea | |
| 2013/0031217 A1 | 1/2013 | Rajapakse | |
| 2013/0041790 A1 | 2/2013 | Murugesan et al. | |
| 2013/0046893 A1 | 2/2013 | Hauser et al. | |
| 2013/0047084 A1 | 2/2013 | Sanders et al. | |
| 2013/0047233 A1 | 2/2013 | Fisk et al. | |
| 2013/0051755 A1 | 2/2013 | Brown et al. | |
| 2013/0053107 A1 | 2/2013 | Kang et al. | |
| 2013/0054697 A1 | 2/2013 | Cha et al. | |
| 2013/0055150 A1 | 2/2013 | Galor | |
| 2013/0060687 A1 | 3/2013 | Bak et al. | |
| 2013/0061155 A1 | 3/2013 | Hon | |
| 2013/0063364 A1 | 3/2013 | Moore | |
| 2013/0073286 A1 | 3/2013 | Bastea-forte et al. | |
| 2013/0073584 A1 | 3/2013 | Kuper et al. | |
| 2013/0073989 A1 | 3/2013 | Harris et al. | |
| 2013/0074194 A1 | 3/2013 | White et al. | |
| 2013/0080177 A1 | 3/2013 | Chen | |
| 2013/0080516 A1 | 3/2013 | Bologh | |
| 2013/0080525 A1 | 3/2013 | Aoki et al. | |
| 2013/0080923 A1 | 3/2013 | Anzures et al. | |
| 2013/0080955 A1 | 3/2013 | Reimann et al. | |
| 2013/0082819 A1 | 4/2013 | Cotterill | |
| 2013/0086637 A1 | 4/2013 | Cotterill et al. | |
| 2013/0091205 A1 | 4/2013 | Kotler et al. | |
| 2013/0091214 A1 | 4/2013 | Kellerman et al. | |
| 2013/0094666 A1 | 4/2013 | Haaff et al. | |
| 2013/0094770 A1 | 4/2013 | Lee et al. | |
| 2013/0102281 A1 | 4/2013 | Kanda et al. | |
| 2013/0102298 A1 | 4/2013 | Goodman et al. | |
| 2013/0103797 A1 | 4/2013 | Park et al. | |
| 2013/0113822 A1 | 5/2013 | Putrevu et al. | |
| 2013/0115932 A1 | 5/2013 | Williams et al. | |
| 2013/0117693 A1 | 5/2013 | Anderson et al. | |
| 2013/0120106 A1 | 5/2013 | Cauwels et al. | |
| 2013/0120254 A1 | 5/2013 | Mun et al. | |
| 2013/0124207 A1 | 5/2013 | Sarin et al. | |
| 2013/0132865 A1 | 5/2013 | Li | |
| 2013/0138272 A1 | 5/2013 | Louise-babando et al. | |
| 2013/0141378 A1 | 6/2013 | Yumiki et al. | |
| 2013/0141514 A1 | 6/2013 | Chao et al. | |
| 2013/0145295 A1 | 6/2013 | Bocking et al. | |
| 2013/0145303 A1 | 6/2013 | Prakash et al. | |
| 2013/0159858 A1 | 6/2013 | Joffray et al. | |
| 2013/0162411 A1 | 6/2013 | Moses et al. | |
| 2013/0166332 A1 | 6/2013 | Hammad | |
| 2013/0173699 A1 | 7/2013 | Parks et al. | |
| 2013/0173794 A1 | 7/2013 | Agerbak et al. | |
| 2013/0174044 A1 | 7/2013 | Hill | |
| 2013/0185650 A1 | 7/2013 | Gutowitz | |
| 2013/0187753 A1 | 7/2013 | Chiriyankandath | |
| 2013/0189963 A1 | 7/2013 | Epp et al. | |
| 2013/0191454 A1 | 7/2013 | Oliver et al. | |
| 2013/0191911 A1 | 7/2013 | Dellinger et al. | |
| 2013/0194476 A1 | 8/2013 | Shimosato | |
| 2013/0205375 A1 | 8/2013 | Woxblom et al. | |
| 2013/0212212 A1 | 8/2013 | Addepalli et al. | |
| 2013/0219332 A1 | 8/2013 | Woley et al. | |
| 2013/0222270 A1 | 8/2013 | Winkler et al. | |
| 2013/0223821 A1 | 8/2013 | Issa et al. | |
| 2013/0230293 A1 | 9/2013 | Boyle et al. | |
| 2013/0231127 A1 | 9/2013 | Kildal et al. | |
| 2013/0234924 A1 | 9/2013 | Janefalkar et al. | |
| 2013/0239202 A1 | 9/2013 | Adams et al. | |
| 2013/0243924 A1 | 9/2013 | Bhandari et al. | |
| 2013/0244615 A1 | 9/2013 | Miller | |
| 2013/0244633 A1 | 9/2013 | Jacobs et al. | |
| 2013/0246522 A1 | 9/2013 | Bilinski et al. | |
| 2013/0246916 A1 | 9/2013 | Reimann et al. | |
| 2013/0254574 A1 | 9/2013 | Zacchio et al. | |

(56) References Cited

U.S. PATENT DOCUMENTS

| | | |
|---|---|---|
| 2013/0256403 A1 | 10/2013 | Mackinnon Keith |
| 2013/0262298 A1 | 10/2013 | Morley et al. |
| 2013/0262857 A1 | 10/2013 | Neuman et al. |
| 2013/0268593 A1 | 10/2013 | Parekh |
| 2013/0275881 A1 | 10/2013 | Hahm et al. |
| 2013/0282180 A1 | 10/2013 | Layton |
| 2013/0283161 A1 | 10/2013 | Reimann et al. |
| 2013/0283199 A1 | 10/2013 | Selig et al. |
| 2013/0283283 A1 | 10/2013 | Wang et al. |
| 2013/0290058 A1 | 10/2013 | Gray et al. |
| 2013/0298024 A1 | 11/2013 | Rhee et al. |
| 2013/0304758 A1 | 11/2013 | Gruber et al. |
| 2013/0305354 A1 | 11/2013 | King et al. |
| 2013/0311597 A1 | 11/2013 | Arrouye et al. |
| 2013/0311986 A1 | 11/2013 | Arrouye et al. |
| 2013/0311997 A1 | 11/2013 | Gruber et al. |
| 2013/0314302 A1 | 11/2013 | Jeung et al. |
| 2013/0318158 A1 | 11/2013 | Teng et al. |
| 2013/0318249 A1 | 11/2013 | Mcdonough et al. |
| 2013/0322634 A1 | 12/2013 | Bennett et al. |
| 2013/0324081 A1 | 12/2013 | Gargi et al. |
| 2013/0325967 A1 | 12/2013 | Parks et al. |
| 2013/0329924 A1 | 12/2013 | Fleizach et al. |
| 2013/0332162 A1 | 12/2013 | Keen |
| 2013/0332560 A1 | 12/2013 | Knight et al. |
| 2013/0332826 A1 | 12/2013 | Karunamuni et al. |
| 2013/0333006 A1 | 12/2013 | Tapling et al. |
| 2013/0346068 A1 | 12/2013 | Solem et al. |
| 2013/0346859 A1 | 12/2013 | Bates et al. |
| 2013/0346882 A1 | 12/2013 | Shiplacoff et al. |
| 2013/0346892 A1* | 12/2013 | Wren ...................... G06F 3/017 |
| | | 715/765 |
| 2013/0346922 A1 | 12/2013 | Shiplacoff et al. |
| 2013/0347022 A1 | 12/2013 | Bates et al. |
| 2014/0003597 A1 | 1/2014 | Lazaridis et al. |
| 2014/0006562 A1 | 1/2014 | Handa et al. |
| 2014/0026188 A1 | 1/2014 | Gubler |
| 2014/0032706 A1 | 1/2014 | Kuscher et al. |
| 2014/0037107 A1 | 2/2014 | Marino et al. |
| 2014/0043424 A1 | 2/2014 | Gava et al. |
| 2014/0045463 A1 | 2/2014 | Hsieh et al. |
| 2014/0046464 A1 | 2/2014 | Reimann |
| 2014/0047020 A1 | 2/2014 | Matus et al. |
| 2014/0047382 A1 | 2/2014 | Kim et al. |
| 2014/0049447 A1 | 2/2014 | Choi |
| 2014/0053281 A1 | 2/2014 | Benoit et al. |
| 2014/0055426 A1 | 2/2014 | Park et al. |
| 2014/0057569 A1 | 2/2014 | Toivanen et al. |
| 2014/0058860 A1 | 2/2014 | Roh et al. |
| 2014/0058941 A1 | 2/2014 | Moon et al. |
| 2014/0064155 A1 | 3/2014 | Evans et al. |
| 2014/0068751 A1 | 3/2014 | Last |
| 2014/0073256 A1 | 3/2014 | Newham et al. |
| 2014/0075130 A1 | 3/2014 | Bansal et al. |
| 2014/0075311 A1 | 3/2014 | Boettcher et al. |
| 2014/0080416 A1 | 3/2014 | Seo et al. |
| 2014/0082136 A1 | 3/2014 | Garcia Puga et al. |
| 2014/0082715 A1 | 3/2014 | Grajek et al. |
| 2014/0089196 A1 | 3/2014 | Paya et al. |
| 2014/0089857 A1 | 3/2014 | Wang et al. |
| 2014/0095965 A1 | 4/2014 | Li |
| 2014/0101768 A1 | 4/2014 | Miller et al. |
| 2014/0104178 A1 | 4/2014 | Jo |
| 2014/0114966 A1 | 4/2014 | Bilinski et al. |
| 2014/0118272 A1 | 5/2014 | Gunn |
| 2014/0122730 A1 | 5/2014 | Burch et al. |
| 2014/0123257 A1 | 5/2014 | Gordon et al. |
| 2014/0136481 A1 | 5/2014 | Quan et al. |
| 2014/0136986 A1 | 5/2014 | Martin et al. |
| 2014/0143737 A1 | 5/2014 | Mistry et al. |
| 2014/0149884 A1 | 5/2014 | Flynn et al. |
| 2014/0155031 A1 | 6/2014 | Lee et al. |
| 2014/0155123 A1 | 6/2014 | Lee et al. |
| 2014/0165012 A1 | 6/2014 | Shen et al. |
| 2014/0168696 A1 | 6/2014 | Matsuhara et al. |
| 2014/0171064 A1 | 6/2014 | Das |
| 2014/0171156 A1 | 6/2014 | Pattikonda et al. |
| 2014/0173447 A1 | 6/2014 | Das et al. |
| 2014/0176298 A1 | 6/2014 | Kumar et al. |
| 2014/0181183 A1 | 6/2014 | Yamamoto et al. |
| 2014/0181202 A1 | 6/2014 | Gossain |
| 2014/0181654 A1 | 6/2014 | Kumar et al. |
| 2014/0181658 A1 | 6/2014 | Kumar et al. |
| 2014/0189524 A1 | 7/2014 | Murarka et al. |
| 2014/0189589 A1 | 7/2014 | Kim et al. |
| 2014/0201527 A1 | 7/2014 | Krivorot |
| 2014/0207707 A1 | 7/2014 | Na et al. |
| 2014/0223490 A1 | 8/2014 | Pan et al. |
| 2014/0233755 A1 | 8/2014 | Kim et al. |
| 2014/0236325 A1 | 8/2014 | Sasaki et al. |
| 2014/0237361 A1 | 8/2014 | Martin et al. |
| 2014/0247229 A1 | 9/2014 | Cho et al. |
| 2014/0258292 A1 | 9/2014 | Thramann et al. |
| 2014/0267002 A1 | 9/2014 | Luna |
| 2014/0267911 A1 | 9/2014 | Grant et al. |
| 2014/0270183 A1 | 9/2014 | Luna |
| 2014/0282084 A1 | 9/2014 | Murarka et al. |
| 2014/0282103 A1 | 9/2014 | Jerry |
| 2014/0282233 A1 | 9/2014 | Sandler et al. |
| 2014/0282240 A1 | 9/2014 | Flynn et al. |
| 2014/0283018 A1 | 9/2014 | Dadu et al. |
| 2014/0298432 A1 | 10/2014 | Brown |
| 2014/0310348 A1 | 10/2014 | Keskitalo et al. |
| 2014/0310643 A1 | 10/2014 | Karmanenko et al. |
| 2014/0319232 A1 | 10/2014 | Gourlay et al. |
| 2014/0320387 A1 | 10/2014 | Eriksson et al. |
| 2014/0320425 A1 | 10/2014 | Jeong et al. |
| 2014/0325447 A1 | 10/2014 | Jin et al. |
| 2014/0334644 A1 | 11/2014 | Selig et al. |
| 2014/0335789 A1 | 11/2014 | Cohen et al. |
| 2014/0335827 A1 | 11/2014 | Tsuda |
| 2014/0337791 A1 | 11/2014 | Agnetta et al. |
| 2014/0337931 A1 | 11/2014 | Cotterill |
| 2014/0344904 A1 | 11/2014 | Venkataramani et al. |
| 2014/0354759 A1 | 12/2014 | Cranfill et al. |
| 2014/0359140 A1 | 12/2014 | Shankarraman |
| 2014/0359454 A1 | 12/2014 | Lee et al. |
| 2014/0359637 A1 | 12/2014 | Yan |
| 2014/0359709 A1 | 12/2014 | Nassar et al. |
| 2014/0362293 A1 | 12/2014 | Bakar et al. |
| 2014/0363024 A1 | 12/2014 | Apodaca |
| 2014/0364056 A1 | 12/2014 | Belk et al. |
| 2014/0365904 A1 | 12/2014 | Kim et al. |
| 2014/0366158 A1 | 12/2014 | Han et al. |
| 2014/0372309 A1 | 12/2014 | Bullard et al. |
| 2014/0375577 A1 | 12/2014 | Yeh et al. |
| 2014/0378099 A1 | 12/2014 | Huang et al. |
| 2014/0380187 A1 | 12/2014 | Gardenfors et al. |
| 2014/0380234 A1 | 12/2014 | Shim et al. |
| 2015/0004945 A1 | 1/2015 | Steeves et al. |
| 2015/0012435 A1 | 1/2015 | Wright et al. |
| 2015/0019944 A1 | 1/2015 | Kalgi |
| 2015/0019966 A1 | 1/2015 | Jeon et al. |
| 2015/0020081 A1 | 1/2015 | Cho et al. |
| 2015/0032812 A1 | 1/2015 | Dudley |
| 2015/0033361 A1 | 1/2015 | Choi et al. |
| 2015/0039494 A1 | 2/2015 | Sinton et al. |
| 2015/0040012 A1 | 2/2015 | Faaborg et al. |
| 2015/0046828 A1 | 2/2015 | Desai et al. |
| 2015/0049591 A1 | 2/2015 | Adams et al. |
| 2015/0051913 A1 | 2/2015 | Choi |
| 2015/0052222 A1 | 2/2015 | Farrell et al. |
| 2015/0067803 A1 | 3/2015 | Alduaiji |
| 2015/0081072 A1 | 3/2015 | Kallai et al. |
| 2015/0082255 A1 | 3/2015 | Devries et al. |
| 2015/0082446 A1 | 3/2015 | Flowers et al. |
| 2015/0085057 A1 | 3/2015 | Ouyang et al. |
| 2015/0086041 A1 | 3/2015 | Reimann |
| 2015/0089359 A1 | 3/2015 | Brisebois |
| 2015/0094120 A1 | 4/2015 | Suh et al. |
| 2015/0094865 A1 | 4/2015 | Choi et al. |
| 2015/0095175 A1 | 4/2015 | Dua |
| 2015/0095804 A1 | 4/2015 | Grossman et al. |
| 2015/0098309 A1 | 4/2015 | Adams et al. |

(56) References Cited

U.S. PATENT DOCUMENTS

| | | |
|---|---|---|
| 2015/0100623 A1 | 4/2015 | Gudell et al. |
| 2015/0109966 A1 | 4/2015 | Hong et al. |
| 2015/0111559 A1 | 4/2015 | Leaver et al. |
| 2015/0113407 A1 | 4/2015 | Hoffert et al. |
| 2015/0116464 A1 | 4/2015 | Tanaka |
| 2015/0120545 A1 | 4/2015 | Fiore et al. |
| 2015/0121267 A1 | 4/2015 | Wu et al. |
| 2015/0121312 A1 | 4/2015 | Li |
| 2015/0130737 A1 | 5/2015 | Im et al. |
| 2015/0135049 A1 | 5/2015 | Murphy |
| 2015/0135282 A1 | 5/2015 | Kong et al. |
| 2015/0138101 A1 | 5/2015 | Park et al. |
| 2015/0143419 A1 | 5/2015 | Bhagwat et al. |
| 2015/0149599 A1 | 5/2015 | Caunter et al. |
| 2015/0154589 A1 | 6/2015 | Li |
| 2015/0154676 A1 | 6/2015 | Matousek et al. |
| 2015/0160832 A1 | 6/2015 | Walkin et al. |
| 2015/0163188 A1 | 6/2015 | Faaborg et al. |
| 2015/0163788 A1 | 6/2015 | Karunakaran |
| 2015/0177914 A1 | 6/2015 | Coyner et al. |
| 2015/0179008 A1 | 6/2015 | Sung et al. |
| 2015/0186892 A1 | 7/2015 | Zhang et al. |
| 2015/0189426 A1 | 7/2015 | Pang |
| 2015/0193069 A1 | 7/2015 | Di Censo et al. |
| 2015/0193130 A1 | 7/2015 | Cho et al. |
| 2015/0193196 A1 | 7/2015 | Lin et al. |
| 2015/0193392 A1 | 7/2015 | Greenblatt et al. |
| 2015/0195133 A1 | 7/2015 | Sheets et al. |
| 2015/0199967 A1 | 7/2015 | Reddy et al. |
| 2015/0200715 A1 | 7/2015 | Oiwa et al. |
| 2015/0205353 A1 | 7/2015 | Feng et al. |
| 2015/0205511 A1 | 7/2015 | Vinna et al. |
| 2015/0205971 A1 | 7/2015 | Sanio et al. |
| 2015/0206529 A1 | 7/2015 | Kwon et al. |
| 2015/0208158 A1 | 7/2015 | Sanders |
| 2015/0212681 A1 | 7/2015 | Shinozaki et al. |
| 2015/0212705 A1 | 7/2015 | Sasaki et al. |
| 2015/0213542 A1 | 7/2015 | Wallaja |
| 2015/0215128 A1 | 7/2015 | Pal |
| 2015/0215382 A1 | 7/2015 | Arora et al. |
| 2015/0215398 A1 | 7/2015 | Murphy et al. |
| 2015/0222615 A1 | 8/2015 | Allain et al. |
| 2015/0222680 A1 | 8/2015 | Grover |
| 2015/0223005 A1 | 8/2015 | Hardman et al. |
| 2015/0229650 A1 | 8/2015 | Grigg et al. |
| 2015/0229750 A1 | 8/2015 | Zhou et al. |
| 2015/0229782 A1 | 8/2015 | Zuidema et al. |
| 2015/0242065 A1 | 8/2015 | Ko et al. |
| 2015/0242073 A1 | 8/2015 | Munoz et al. |
| 2015/0242597 A1 | 8/2015 | Danciu |
| 2015/0242611 A1 | 8/2015 | Cotterill |
| 2015/0242837 A1 | 8/2015 | Yarbrough et al. |
| 2015/0243163 A1 | 8/2015 | Shoemake |
| 2015/0248200 A1 | 9/2015 | Cho et al. |
| 2015/0248268 A1 | 9/2015 | Kumar et al. |
| 2015/0249540 A1 | 9/2015 | Khalil et al. |
| 2015/0253960 A1 | 9/2015 | Lin et al. |
| 2015/0254661 A1 | 9/2015 | Lanc |
| 2015/0256957 A1 | 9/2015 | Kim et al. |
| 2015/0261415 A1 | 9/2015 | Lee et al. |
| 2015/0261493 A1 | 9/2015 | Lemmon et al. |
| 2015/0262183 A1 | 9/2015 | Gervais et al. |
| 2015/0264304 A1 | 9/2015 | Chastney et al. |
| 2015/0271120 A1 | 9/2015 | Langholz |
| 2015/0278799 A1 | 10/2015 | Palanisamy |
| 2015/0286360 A1 | 10/2015 | Wachter |
| 2015/0286694 A1 | 10/2015 | Kaplinger et al. |
| 2015/0286813 A1 | 10/2015 | Jakobsson |
| 2015/0295921 A1 | 10/2015 | Cao |
| 2015/0302856 A1 | 10/2015 | Kim et al. |
| 2015/0304330 A1 | 10/2015 | Soamboonsrup et al. |
| 2015/0309768 A1 | 10/2015 | Van Der Heide |
| 2015/0312299 A1 | 10/2015 | Chen |
| 2015/0319006 A1 | 11/2015 | Plummer et al. |
| 2015/0319046 A1 | 11/2015 | Plummer et al. |
| 2015/0324552 A1 | 11/2015 | Beckhardt |
| 2015/0339466 A1 | 11/2015 | Gao et al. |
| 2015/0347010 A1 | 12/2015 | Yang et al. |
| 2015/0347738 A1 | 12/2015 | Ulrich et al. |
| 2015/0348002 A1 | 12/2015 | Van et al. |
| 2015/0348014 A1 | 12/2015 | Van Os et al. |
| 2015/0350296 A1 | 12/2015 | Yang et al. |
| 2015/0350297 A1 | 12/2015 | Yang et al. |
| 2015/0350448 A1 | 12/2015 | Coffman et al. |
| 2015/0355816 A1 | 12/2015 | Shim |
| 2015/0355818 A1 | 12/2015 | Corbin |
| 2015/0355879 A1 | 12/2015 | Beckhardt et al. |
| 2015/0356278 A1 | 12/2015 | Britt et al. |
| 2015/0358043 A1 | 12/2015 | Jeong et al. |
| 2015/0358304 A1 | 12/2015 | Beckhardt et al. |
| 2015/0365400 A1 | 12/2015 | Cox |
| 2015/0370426 A1 | 12/2015 | Carrigan et al. |
| 2015/0370455 A1 | 12/2015 | Van Os et al. |
| 2015/0373172 A1 | 12/2015 | Boesen |
| 2015/0373178 A1 | 12/2015 | Felt et al. |
| 2015/0378522 A1 | 12/2015 | Butts |
| 2016/0004393 A1 | 1/2016 | Faaborg et al. |
| 2016/0004417 A1 | 1/2016 | Bates |
| 2016/0004499 A1 | 1/2016 | Kim et al. |
| 2016/0005024 A1 | 1/2016 | Harrell |
| 2016/0005189 A1 | 1/2016 | Gray et al. |
| 2016/0006745 A1 | 1/2016 | Furuichi et al. |
| 2016/0011850 A1 | 1/2016 | Sheen et al. |
| 2016/0012417 A1 | 1/2016 | Mizon |
| 2016/0014266 A1 | 1/2016 | Bhatt |
| 2016/0026429 A1 | 1/2016 | Triplett |
| 2016/0026779 A1 | 1/2016 | Grigg et al. |
| 2016/0028869 A1 | 1/2016 | Bhatt |
| 2016/0028875 A1 | 1/2016 | Brown et al. |
| 2016/0029146 A1 | 1/2016 | Tembey et al. |
| 2016/0034887 A1 | 2/2016 | Lee |
| 2016/0036996 A1 | 2/2016 | Midholt et al. |
| 2016/0037345 A1 | 2/2016 | Margadoudakis |
| 2016/0043962 A1 | 2/2016 | Kim et al. |
| 2016/0048316 A1 | 2/2016 | Bae et al. |
| 2016/0048705 A1 | 2/2016 | Yang |
| 2016/0050199 A1 | 2/2016 | Ganesan |
| 2016/0050476 A1 | 2/2016 | Patil |
| 2016/0062487 A1 | 3/2016 | Foss et al. |
| 2016/0062567 A1 | 3/2016 | Yang et al. |
| 2016/0062589 A1 | 3/2016 | Wan et al. |
| 2016/0062606 A1 | 3/2016 | Vega et al. |
| 2016/0062719 A1 | 3/2016 | Romano et al. |
| 2016/0065707 A1 | 3/2016 | Yang et al. |
| 2016/0065708 A1 | 3/2016 | Yang et al. |
| 2016/0066277 A1 | 3/2016 | Yang et al. |
| 2016/0070244 A1 | 3/2016 | Cipollo et al. |
| 2016/0073197 A1 | 3/2016 | Hammer et al. |
| 2016/0073482 A1 | 3/2016 | Fok et al. |
| 2016/0077734 A1 | 3/2016 | Buxton et al. |
| 2016/0086176 A1 | 3/2016 | Henrique et al. |
| 2016/0088039 A1 | 3/2016 | Millington et al. |
| 2016/0092072 A1 | 3/2016 | So et al. |
| 2016/0092665 A1 | 3/2016 | Cowan et al. |
| 2016/0097651 A1 | 4/2016 | Jung et al. |
| 2016/0099901 A1 | 4/2016 | Allen et al. |
| 2016/0110059 A1 | 4/2016 | Li et al. |
| 2016/0124614 A1 | 5/2016 | Bromberg et al. |
| 2016/0127799 A1 | 5/2016 | Alsina et al. |
| 2016/0132132 A1 | 5/2016 | Li |
| 2016/0132864 A1 | 5/2016 | Shah et al. |
| 2016/0134488 A1 | 5/2016 | Straub et al. |
| 2016/0134942 A1 | 5/2016 | Lo |
| 2016/0139752 A1 | 5/2016 | Shim et al. |
| 2016/0142763 A1 | 5/2016 | Kim et al. |
| 2016/0150624 A1 | 5/2016 | Meerbeek et al. |
| 2016/0155443 A1 | 6/2016 | Khan et al. |
| 2016/0156687 A1 | 6/2016 | Leung |
| 2016/0156957 A1 | 6/2016 | Yun |
| 2016/0156992 A1 | 6/2016 | Kuper |
| 2016/0162252 A1 | 6/2016 | Di Censo et al. |
| 2016/0171482 A1 | 6/2016 | Muncey et al. |
| 2016/0173318 A1 | 6/2016 | Ha et al. |
| 2016/0173617 A1 | 6/2016 | Allinson |

(56) References Cited

U.S. PATENT DOCUMENTS

| | | |
|---|---|---|
| 2016/0183046 A1 | 6/2016 | Kwon |
| 2016/0189451 A1 | 6/2016 | Yoo et al. |
| 2016/0196042 A1 | 7/2016 | Laute et al. |
| 2016/0196106 A1 | 7/2016 | Hammer et al. |
| 2016/0202866 A1 | 7/2016 | Zambetti |
| 2016/0209058 A1 | 7/2016 | Golden et al. |
| 2016/0209939 A1 | 7/2016 | Zambetti et al. |
| 2016/0210602 A1 | 7/2016 | Siddique et al. |
| 2016/0210983 A1 | 7/2016 | Amada et al. |
| 2016/0224966 A1 | 8/2016 | Van Os et al. |
| 2016/0231902 A1 | 8/2016 | Sirpal et al. |
| 2016/0239167 A1 | 8/2016 | Reimann et al. |
| 2016/0241543 A1 | 8/2016 | Jung et al. |
| 2016/0241983 A1 | 8/2016 | Lambourne et al. |
| 2016/0246566 A1 | 8/2016 | Fullerton et al. |
| 2016/0253145 A1 | 9/2016 | Lee et al. |
| 2016/0259656 A1 | 9/2016 | Sumner et al. |
| 2016/0259936 A1 | 9/2016 | Mukherjee et al. |
| 2016/0266769 A1 | 9/2016 | Oursbourn et al. |
| 2016/0267319 A1 | 9/2016 | Murillo et al. |
| 2016/0267779 A1 | 9/2016 | Kuang |
| 2016/0277708 A1 | 9/2016 | Rintel et al. |
| 2016/0277903 A1 | 9/2016 | Poosala et al. |
| 2016/0283194 A1 | 9/2016 | Patil et al. |
| 2016/0291824 A1 | 10/2016 | Grossman et al. |
| 2016/0291924 A1 | 10/2016 | Bierbower et al. |
| 2016/0294896 A1 | 10/2016 | O'Driscoll et al. |
| 2016/0295340 A1 | 10/2016 | Baker et al. |
| 2016/0299669 A1 | 10/2016 | Bates |
| 2016/0299736 A1 | 10/2016 | Bates et al. |
| 2016/0314451 A1 | 10/2016 | Martin |
| 2016/0320849 A1 | 11/2016 | Koo |
| 2016/0335041 A1 | 11/2016 | Wachter et al. |
| 2016/0336531 A1 | 11/2016 | Yokoyama |
| 2016/0342141 A1 | 11/2016 | Koumaiha et al. |
| 2016/0342386 A1 | 11/2016 | Kallai et al. |
| 2016/0345039 A1 | 11/2016 | Billmeyer |
| 2016/0345172 A1 | 11/2016 | Cotterill |
| 2016/0350839 A1 | 12/2016 | Avidor et al. |
| 2016/0351191 A1 | 12/2016 | Vilermo et al. |
| 2016/0352661 A1 | 12/2016 | Yang et al. |
| 2016/0357507 A1 | 12/2016 | Decker et al. |
| 2016/0360344 A1 | 12/2016 | Shim et al. |
| 2016/0364600 A1 | 12/2016 | Shah et al. |
| 2016/0366481 A1 | 12/2016 | Lim et al. |
| 2016/0366531 A1 | 12/2016 | Popova |
| 2016/0372113 A1 | 12/2016 | David et al. |
| 2016/0373884 A1 | 12/2016 | Peterson et al. |
| 2016/0378424 A1 | 12/2016 | Kanda et al. |
| 2016/0378961 A1 | 12/2016 | Park |
| 2016/0379205 A1 | 12/2016 | Margadoudakis |
| 2016/0381476 A1 | 12/2016 | Gossain et al. |
| 2017/0003931 A1 | 1/2017 | Dvortsov et al. |
| 2017/0010794 A1 | 1/2017 | Cho et al. |
| 2017/0013562 A1 | 1/2017 | Lim et al. |
| 2017/0017531 A1 | 1/2017 | Choi et al. |
| 2017/0019517 A1 | 1/2017 | Wilder et al. |
| 2017/0025124 A1 | 1/2017 | Mixter et al. |
| 2017/0026686 A1 | 1/2017 | Glazier et al. |
| 2017/0031552 A1 | 2/2017 | Lin |
| 2017/0031648 A1 | 2/2017 | So et al. |
| 2017/0041727 A1 | 2/2017 | Reimann |
| 2017/0046025 A1 | 2/2017 | Dascola et al. |
| 2017/0054731 A1 | 2/2017 | Cotterill |
| 2017/0068402 A1 | 3/2017 | Lochhead et al. |
| 2017/0068507 A1 | 3/2017 | Kim et al. |
| 2017/0070346 A1 | 3/2017 | Lombardi et al. |
| 2017/0078294 A1 | 3/2017 | Medvinsky |
| 2017/0083285 A1 | 3/2017 | Meyers et al. |
| 2017/0083494 A1 | 3/2017 | Kim et al. |
| 2017/0092085 A1 | 3/2017 | Agarwal |
| 2017/0092270 A1 | 3/2017 | Newendorp et al. |
| 2017/0093846 A1 | 3/2017 | Lopez Lecube et al. |
| 2017/0097621 A1 | 4/2017 | Ackmann et al. |
| 2017/0097715 A1 | 4/2017 | Kim et al. |
| 2017/0099270 A1 | 4/2017 | Anson |
| 2017/0115940 A1 | 4/2017 | Byeon |
| 2017/0127145 A1 | 5/2017 | Rajapakse |
| 2017/0134553 A1 | 5/2017 | Jeon et al. |
| 2017/0134567 A1 | 5/2017 | Jeon et al. |
| 2017/0134872 A1 | 5/2017 | Silva et al. |
| 2017/0140372 A1 | 5/2017 | Wang et al. |
| 2017/0142087 A1 | 5/2017 | Maninder et al. |
| 2017/0142584 A1 | 5/2017 | Oh et al. |
| 2017/0147129 A1* | 5/2017 | Kyoun .............. H04N 21/4858 |
| 2017/0148010 A1 | 5/2017 | Bak et al. |
| 2017/0180843 A1 | 6/2017 | Perianu et al. |
| 2017/0185373 A1 | 6/2017 | Kim et al. |
| 2017/0192730 A1 | 7/2017 | Yang et al. |
| 2017/0192743 A1 | 7/2017 | Chun et al. |
| 2017/0193813 A1 | 7/2017 | Carroll et al. |
| 2017/0195772 A1 | 7/2017 | Han et al. |
| 2017/0206779 A1 | 7/2017 | Lee et al. |
| 2017/0212667 A1 | 7/2017 | Miyazaki |
| 2017/0227935 A1 | 8/2017 | Su et al. |
| 2017/0230705 A1 | 8/2017 | Pardue et al. |
| 2017/0235545 A1 | 8/2017 | Millington et al. |
| 2017/0235926 A1 | 8/2017 | Fyke et al. |
| 2017/0235935 A1 | 8/2017 | Song et al. |
| 2017/0242653 A1 | 8/2017 | Lang et al. |
| 2017/0251314 A1 | 8/2017 | Pye et al. |
| 2017/0269556 A1 | 9/2017 | Zhou |
| 2017/0270507 A1 | 9/2017 | Wang et al. |
| 2017/0285788 A1 | 10/2017 | Park et al. |
| 2017/0289249 A1 | 10/2017 | Knight et al. |
| 2017/0322713 A1 | 11/2017 | Hwang et al. |
| 2017/0339151 A1 | 11/2017 | Van Os et al. |
| 2017/0344253 A1 | 11/2017 | Zhang |
| 2017/0357420 A1 | 12/2017 | Dye et al. |
| 2017/0357421 A1 | 12/2017 | Dye et al. |
| 2017/0357425 A1 | 12/2017 | Smith et al. |
| 2017/0357434 A1 | 12/2017 | Coffman et al. |
| 2017/0357439 A1 | 12/2017 | Lemay et al. |
| 2017/0357477 A1 | 12/2017 | Im et al. |
| 2017/0357479 A1 | 12/2017 | Shenoy et al. |
| 2017/0357973 A1 | 12/2017 | Van Os et al. |
| 2017/0359189 A1 | 12/2017 | Smith et al. |
| 2017/0359191 A1 | 12/2017 | Smith et al. |
| 2017/0363436 A1 | 12/2017 | Eronen et al. |
| 2017/0371535 A1* | 12/2017 | Li ...................... G06F 3/04817 |
| 2018/0013815 A1 | 1/2018 | Gold |
| 2018/0020530 A1 | 1/2018 | Scordato et al. |
| 2018/0039916 A1 | 2/2018 | Ravindra |
| 2018/0040324 A1 | 2/2018 | Wilberding |
| 2018/0067712 A1 | 3/2018 | Behzadi et al. |
| 2018/0067904 A1 | 3/2018 | Li |
| 2018/0069957 A1 | 3/2018 | Mushikabe et al. |
| 2018/0070187 A1 | 3/2018 | Drinkwater et al. |
| 2018/0075439 A1 | 3/2018 | Bak et al. |
| 2018/0096064 A1 | 4/2018 | Lennon et al. |
| 2018/0101297 A1 | 4/2018 | Yang et al. |
| 2018/0109629 A1 | 4/2018 | Van Os et al. |
| 2018/0122378 A1 | 5/2018 | Mixter et al. |
| 2018/0124128 A1 | 5/2018 | Faulkner et al. |
| 2018/0131732 A1 | 5/2018 | Aronoff et al. |
| 2018/0139292 A1 | 5/2018 | Koren et al. |
| 2018/0144590 A1 | 5/2018 | Mixter et al. |
| 2018/0165002 A1 | 6/2018 | Yang et al. |
| 2018/0183849 A1 | 6/2018 | Shin et al. |
| 2018/0190279 A1 | 7/2018 | Anderson et al. |
| 2018/0199137 A1 | 7/2018 | Mate et al. |
| 2018/0205797 A1 | 7/2018 | Faulkner |
| 2018/0213396 A1 | 7/2018 | Segal et al. |
| 2018/0217709 A1 | 8/2018 | Hotelling |
| 2018/0227341 A1 | 8/2018 | Rizzi |
| 2018/0228003 A1 | 8/2018 | O'driscoll et al. |
| 2018/0228006 A1 | 8/2018 | Baker et al. |
| 2018/0234549 A1 | 8/2018 | Coffman et al. |
| 2018/0267773 A1 | 9/2018 | Kim et al. |
| 2018/0267774 A1 | 9/2018 | Williams et al. |
| 2018/0286395 A1 | 10/2018 | Li et al. |
| 2018/0288104 A1 | 10/2018 | Padilla et al. |
| 2018/0302790 A1 | 10/2018 | Cotterill |
| 2018/0308480 A1 | 10/2018 | Jang et al. |

(56) References Cited

U.S. PATENT DOCUMENTS

| | | |
|---|---|---|
| 2018/0329585 A1 | 11/2018 | Carrigan et al. |
| 2018/0329586 A1 | 11/2018 | Sundstrom et al. |
| 2018/0332559 A1 | 11/2018 | Gudivada et al. |
| 2018/0335903 A1 | 11/2018 | Coffman et al. |
| 2018/0337924 A1 | 11/2018 | Graham et al. |
| 2018/0338038 A1 | 11/2018 | Ly et al. |
| 2018/0341448 A1 | 11/2018 | Behzadi et al. |
| 2018/0351762 A1 | 12/2018 | Iyengar et al. |
| 2018/0357631 A1 | 12/2018 | Bak et al. |
| 2018/0364665 A1 | 12/2018 | Clymer et al. |
| 2018/0375676 A1 | 12/2018 | Bader-natal et al. |
| 2019/0012069 A1 | 1/2019 | Bates |
| 2019/0012073 A1 | 1/2019 | Hwang |
| 2019/0012966 A1 | 1/2019 | Shi |
| 2019/0018586 A1 | 1/2019 | Yang et al. |
| 2019/0025943 A1 | 1/2019 | Jobs et al. |
| 2019/0028419 A1 | 1/2019 | Sullivan |
| 2019/0056854 A1 | 2/2019 | Azzolin et al. |
| 2019/0056907 A1 | 2/2019 | So et al. |
| 2019/0058777 A1 | 2/2019 | Chen |
| 2019/0074991 A1 | 3/2019 | Peterson et al. |
| 2019/0075200 A1 | 3/2019 | Seo et al. |
| 2019/0076084 A1 | 3/2019 | Kanegae et al. |
| 2019/0102145 A1 | 4/2019 | Wilberding et al. |
| 2019/0124203 A1 | 4/2019 | Coffman et al. |
| 2019/0124510 A1 | 4/2019 | Cotterill |
| 2019/0129661 A1 | 5/2019 | Hirota et al. |
| 2019/0138951 A1 | 5/2019 | Brownhill et al. |
| 2019/0149972 A1 | 5/2019 | Parks et al. |
| 2019/0158645 A1 | 5/2019 | Yang et al. |
| 2019/0199963 A1 | 6/2019 | Ahn et al. |
| 2019/0222775 A1 | 7/2019 | Ahn |
| 2019/0246238 A1 | 8/2019 | Crutchfield et al. |
| 2019/0278900 A1 | 9/2019 | Yang et al. |
| 2019/0279634 A1 | 9/2019 | Tak et al. |
| 2019/0289079 A1 | 9/2019 | Van Os et al. |
| 2019/0294406 A1 | 9/2019 | Bierbower et al. |
| 2019/0297439 A1 | 9/2019 | Maeda |
| 2019/0306607 A1 | 10/2019 | Clayton et al. |
| 2019/0310759 A1 | 10/2019 | Stein et al. |
| 2019/0332400 A1 | 10/2019 | Spoor et al. |
| 2019/0339769 A1 | 11/2019 | Cox et al. |
| 2019/0342519 A1 | 11/2019 | Van Os et al. |
| 2019/0354252 A1 | 11/2019 | Badr |
| 2019/0361575 A1 | 11/2019 | Ni et al. |
| 2019/0361694 A1 | 11/2019 | Gordon et al. |
| 2019/0361729 A1 | 11/2019 | Gruber et al. |
| 2020/0050426 A1 | 2/2020 | Jung et al. |
| 2020/0050502 A1 | 2/2020 | Ghafourifar et al. |
| 2020/0104018 A1 | 4/2020 | Coffman et al. |
| 2020/0120503 A1 | 4/2020 | Cotterill |
| 2020/0127988 A1 | 4/2020 | Bradley et al. |
| 2020/0135191 A1 | 4/2020 | Nourbakhsh |
| 2020/0142667 A1 | 5/2020 | Querze et al. |
| 2020/0152186 A1 | 5/2020 | Koh et al. |
| 2020/0154583 A1 | 5/2020 | Lee et al. |
| 2020/0174734 A1 | 6/2020 | Gomes et al. |
| 2020/0186378 A1 | 6/2020 | Six et al. |
| 2020/0186576 A1 | 6/2020 | Gopal et al. |
| 2020/0192627 A1 | 6/2020 | Jang et al. |
| 2020/0201491 A1 | 6/2020 | Coffman et al. |
| 2020/0201495 A1 | 6/2020 | Coffman et al. |
| 2020/0213437 A1 | 7/2020 | Bhatt |
| 2020/0213530 A1 | 7/2020 | Ahn |
| 2020/0218486 A1 | 7/2020 | Behzadi et al. |
| 2020/0225817 A1 | 7/2020 | Coffman et al. |
| 2020/0226896 A1 | 7/2020 | Robertson et al. |
| 2020/0302913 A1 | 9/2020 | Marcinkiewicz |
| 2020/0304917 A1 | 9/2020 | Ryu |
| 2020/0310748 A1 | 10/2020 | Huang |
| 2020/0312318 A1 | 10/2020 | Olson et al. |
| 2020/0326811 A1* | 10/2020 | Nolan .................... G06F 3/005 |
| 2020/0335187 A1 | 10/2020 | Lefkofsky et al. |
| 2020/0348830 A1 | 11/2020 | Bates |
| 2020/0366742 A1 | 11/2020 | Van Os et al. |
| 2020/0367816 A1 | 11/2020 | Panneer Selvam |
| 2020/0374645 A1 | 11/2020 | Settel |
| 2020/0379711 A1 | 12/2020 | Graham et al. |
| 2020/0379712 A1 | 12/2020 | Carrigan |
| 2020/0379713 A1 | 12/2020 | Carrigan |
| 2020/0379714 A1 | 12/2020 | Graham et al. |
| 2020/0379716 A1 | 12/2020 | Carrigan et al. |
| 2020/0379729 A1 | 12/2020 | Graham et al. |
| 2020/0379730 A1 | 12/2020 | Graham et al. |
| 2020/0382332 A1 | 12/2020 | Carrigan et al. |
| 2020/0383157 A1 | 12/2020 | Lee et al. |
| 2020/0395012 A1 | 12/2020 | Kim et al. |
| 2020/0413197 A1 | 12/2020 | Carrigan et al. |
| 2021/0011588 A1 | 1/2021 | Coffman et al. |
| 2021/0014610 A1 | 1/2021 | Carrigan et al. |
| 2021/0043189 A1 | 2/2021 | Pyun |
| 2021/0064317 A1 | 3/2021 | Juenger et al. |
| 2021/0065134 A1 | 3/2021 | Chhabra et al. |
| 2021/0099829 A1 | 4/2021 | Soto et al. |
| 2021/0158830 A1 | 5/2021 | Boehlke |
| 2021/0173431 A1 | 6/2021 | Yang et al. |
| 2021/0181903 A1 | 6/2021 | Carrigan et al. |
| 2021/0203765 A1 | 7/2021 | Yang et al. |
| 2021/0203878 A1 | 7/2021 | Lee et al. |
| 2021/0255816 A1 | 8/2021 | Behzadi et al. |
| 2021/0255819 A1 | 8/2021 | Graham et al. |
| 2021/0263702 A1 | 8/2021 | Carrigan |
| 2021/0266274 A1 | 8/2021 | Liu et al. |
| 2021/0272118 A1 | 9/2021 | Van Os et al. |
| 2021/0321197 A1 | 10/2021 | Annamraju |
| 2021/0323406 A1 | 10/2021 | So et al. |
| 2021/0349680 A1 | 11/2021 | Kim et al. |
| 2021/0352172 A1 | 11/2021 | Kim et al. |
| 2021/0392223 A1 | 12/2021 | Coffman et al. |
| 2021/0407507 A1 | 12/2021 | Zhou et al. |
| 2022/0004356 A1 | 1/2022 | Kim et al. |
| 2022/0014715 A1 | 1/2022 | Tamura et al. |
| 2022/0043626 A1 | 2/2022 | Carrigan |
| 2022/0058257 A1 | 2/2022 | Cotterill |
| 2022/0100367 A1* | 3/2022 | Carrigan .......... H04M 1/72442 |
| 2022/0100841 A1 | 3/2022 | Yang et al. |
| 2022/0121342 A1* | 4/2022 | Chundi ............... G06F 3/04883 |
| 2022/0163996 A1 | 5/2022 | Yang et al. |
| 2022/0167113 A1 | 5/2022 | Beckhardt |
| 2022/0180862 A1 | 6/2022 | Sharifi et al. |
| 2022/0199267 A1 | 6/2022 | Subramanian et al. |
| 2022/0229524 A1* | 7/2022 | McKenzie ............. G06F 3/038 |
| 2022/0277037 A1 | 9/2022 | Sanders et al. |
| 2022/0279063 A1 | 9/2022 | Coffman et al. |
| 2022/0286549 A1 | 9/2022 | Coffman et al. |
| 2022/0291832 A1 | 9/2022 | Bi |
| 2022/0303383 A1 | 9/2022 | Coffman et al. |
| 2022/0326817 A1 | 10/2022 | Carrigan et al. |
| 2022/0350482 A1 | 11/2022 | Carrigan et al. |
| 2022/0391166 A1 | 12/2022 | Sanders |
| 2023/0041125 A1 | 2/2023 | Kim et al. |
| 2023/0073844 A1 | 3/2023 | Coffman et al. |
| 2023/0084551 A1 | 3/2023 | Coffman et al. |
| 2023/0098814 A1 | 3/2023 | Carrigan et al. |
| 2023/0104819 A1 | 4/2023 | Coffman et al. |
| 2023/0106600 A1 | 4/2023 | Coffman et al. |
| 2023/0106761 A1 | 4/2023 | Coffman et al. |
| 2023/0127384 A1 | 4/2023 | Stout |
| 2023/0179700 A1 | 6/2023 | Bhatt |
| 2023/0224667 A1 | 7/2023 | Rodman et al. |
| 2023/0234444 A1 | 7/2023 | Derichs et al. |
| 2023/0236723 A1 | 7/2023 | Yang et al. |
| 2023/0246857 A1 | 8/2023 | Boucheron et al. |
| 2023/0266866 A1 | 8/2023 | Bates et al. |
| 2023/0291824 A1 | 9/2023 | Yang et al. |
| 2023/0319413 A1 | 10/2023 | Manzari et al. |
| 2023/0370507 A1 | 11/2023 | Chang et al. |
| 2023/0376268 A1 | 11/2023 | Carrigan et al. |
| 2023/0393809 A1 | 12/2023 | Carrigan et al. |
| 2023/0403509 A1 | 12/2023 | Carrigan et al. |
| 2023/0409191 A1 | 12/2023 | Carrigan et al. |
| 2023/0409279 A1 | 12/2023 | Reese et al. |
| 2024/0053953 A1 | 2/2024 | Sanders |
| 2024/0062640 A1 | 2/2024 | Carrigan et al. |

(56) References Cited

U.S. PATENT DOCUMENTS

| | | | |
|---|---|---|---|
| 2024/0111333 A1 | 4/2024 | Yang et al. |
| 2024/0126804 A1 | 4/2024 | Sanders et al. |
| 2024/0205628 A1 | 6/2024 | Sharifi et al. |
| 2024/0211891 A1 | 6/2024 | Kennedy et al. |
| 2024/0220009 A1 | 7/2024 | Dryer et al. |
| 2024/0263956 A1 | 8/2024 | Vashisht |
| 2024/0377922 A1 | 11/2024 | Rajam et al. |
| 2024/0406290 A1 | 12/2024 | Giuliani et al. |
| 2024/0406632 A1 | 12/2024 | Carrigan et al. |
| 2024/0419322 A1 | 12/2024 | Carrigan et al. |
| 2025/0047777 A1 | 2/2025 | Bhatt |
| 2025/0054379 A1 | 2/2025 | Carrigan et al. |
| 2025/0080940 A1 | 3/2025 | White |
| 2025/0097641 A1 | 3/2025 | Maclean et al. |
| 2025/0117110 A1 | 4/2025 | Carrigan et al. |
| 2025/0165216 A1 | 5/2025 | Carrigan et al. |
| 2025/0224859 A1 | 7/2025 | Kim et al. |

FOREIGN PATENT DOCUMENTS

| | | | |
|---|---|---|---|
| AU | 2008100011 A4 | 2/2008 |
| CA | 2532145 A1 | 7/1995 |
| CA | 2798093 A1 | 11/2011 |
| CA | 2876587 A1 | 2/2014 |
| CA | 2917174 A1 | 1/2015 |
| CN | 1452739 A | 10/2003 |
| CN | 1525723 A | 9/2004 |
| CN | 1558690 A | 12/2004 |
| CN | 1620677 A | 5/2005 |
| CN | 1663174 A | 8/2005 |
| CN | 1741104 A | 3/2006 |
| CN | 1813240 A | 8/2006 |
| CN | 1828599 A | 9/2006 |
| CN | 1846221 A | 10/2006 |
| CN | 1863281 A | 11/2006 |
| CN | 1908981 A | 2/2007 |
| CN | 101002167 A | 7/2007 |
| CN | 101022395 A | 8/2007 |
| CN | 101047521 A | 10/2007 |
| CN | 101107668 A | 1/2008 |
| CN | 101188506 A | 5/2008 |
| CN | 101243426 A | 8/2008 |
| CN | 101268470 A | 9/2008 |
| CN | 101299694 A | 11/2008 |
| CN | 101321156 A | 12/2008 |
| CN | 101340274 A | 1/2009 |
| CN | 101341718 A | 1/2009 |
| CN | 101341727 A | 1/2009 |
| CN | 101350938 A | 1/2009 |
| CN | 101409743 A | 4/2009 |
| CN | 101443727 A | 5/2009 |
| CN | 101485128 A | 7/2009 |
| CN | 101488138 A | 7/2009 |
| CN | 101501657 A | 8/2009 |
| CN | 101517563 A | 8/2009 |
| CN | 101567858 A | 10/2009 |
| CN | 101610155 A | 12/2009 |
| CN | 101673207 A | 3/2010 |
| CN | 101673298 A | 3/2010 |
| CN | 101854278 A | 10/2010 |
| CN | 101861562 A | 10/2010 |
| CN | 101873386 A | 10/2010 |
| CN | 101877748 A | 11/2010 |
| CN | 101882409 A | 11/2010 |
| CN | 101931655 A | 12/2010 |
| CN | 101950236 A | 1/2011 |
| CN | 102065148 A | 5/2011 |
| CN | 102077191 A | 5/2011 |
| CN | 102111454 A | 6/2011 |
| CN | 102111505 A | 6/2011 |
| CN | 102164213 A | 8/2011 |
| CN | 201928419 U | 8/2011 |
| CN | 102202192 A | 9/2011 |
| CN | 102209321 A | 10/2011 |
| CN | 102239740 A | 11/2011 |
| CN | 102262506 A | 11/2011 |
| CN | 102281294 A | 12/2011 |
| CN | 102301323 A | 12/2011 |
| CN | 102317887 A | 1/2012 |
| CN | 102388355 A | 3/2012 |
| CN | 102396205 A | 3/2012 |
| CN | 102450040 A | 5/2012 |
| CN | 102695302 A | 9/2012 |
| CN | 102707994 A | 10/2012 |
| CN | 102737313 A | 10/2012 |
| CN | 102740146 A | 10/2012 |
| CN | 102750086 A | 10/2012 |
| CN | 102754071 A | 10/2012 |
| CN | 102769705 A | 11/2012 |
| CN | 102821180 A | 12/2012 |
| CN | 102859480 A | 1/2013 |
| CN | 102866828 A | 1/2013 |
| CN | 102929917 A | 2/2013 |
| CN | 102968267 A | 3/2013 |
| CN | 102982401 A | 3/2013 |
| CN | 103019681 A | 4/2013 |
| CN | 103049274 A | 4/2013 |
| CN | 103067625 A | 4/2013 |
| CN | 103139370 A | 6/2013 |
| CN | 103179283 A | 6/2013 |
| CN | 103235688 A | 8/2013 |
| CN | 103250138 A | 8/2013 |
| CN | 103260079 A | 8/2013 |
| CN | 203311163 U | 11/2013 |
| CN | 103425451 A | 12/2013 |
| CN | 103458215 A | 12/2013 |
| CN | 103558916 A | 2/2014 |
| CN | 103576902 A | 2/2014 |
| CN | 103582873 A | 2/2014 |
| CN | 103593154 A | 2/2014 |
| CN | 103604272 A | 2/2014 |
| CN | 103765385 A | 4/2014 |
| CN | 103793075 A | 5/2014 |
| CN | 103795866 A | 5/2014 |
| CN | 103853328 A | 6/2014 |
| CN | 103853493 A | 6/2014 |
| CN | 103914238 A | 7/2014 |
| CN | 103997366 A | 8/2014 |
| CN | 104035663 A | 9/2014 |
| CN | 104090720 A | 10/2014 |
| CN | 104106036 A | 10/2014 |
| CN | 104169855 A | 11/2014 |
| CN | 203942537 U | 11/2014 |
| CN | 104205785 A | 12/2014 |
| CN | 104317516 A | 1/2015 |
| CN | 104331246 A | 2/2015 |
| CN | 104331796 A | 2/2015 |
| CN | 104335234 A | 2/2015 |
| CN | 104375741 A | 2/2015 |
| CN | 104392352 A | 3/2015 |
| CN | 104503689 A | 4/2015 |
| CN | 104574054 A | 4/2015 |
| CN | 104583998 A | 4/2015 |
| CN | 104584061 A | 4/2015 |
| CN | 104584488 A | 4/2015 |
| CN | 104615430 A | 5/2015 |
| CN | 104867004 A | 8/2015 |
| CN | 104956276 A | 9/2015 |
| CN | 104994106 A | 10/2015 |
| CN | 105051676 A | 11/2015 |
| CN | 105208511 A | 12/2015 |
| CN | 105308634 A | 2/2016 |
| CN | 105373920 A | 3/2016 |
| CN | 105374192 A | 3/2016 |
| CN | 105388998 A | 3/2016 |
| CN | 105431855 A | 3/2016 |
| CN | 105474580 A | 4/2016 |
| CN | 105549947 A | 5/2016 |
| CN | 105654286 A | 6/2016 |
| CN | 105654287 A | 6/2016 |
| CN | 105657465 A | 6/2016 |
| CN | 205267230 U | 6/2016 |
| CN | 105745863 A | 7/2016 |
| CN | 105794231 A | 7/2016 |

(56) References Cited

FOREIGN PATENT DOCUMENTS

| | | | |
|---|---|---|---|
| CN | 105830015 | A | 8/2016 |
| CN | 105900376 | A | 8/2016 |
| CN | 105940678 | A | 9/2016 |
| CN | 106030700 | A | 10/2016 |
| CN | 106062810 | A | 10/2016 |
| CN | 106134209 | A | 11/2016 |
| CN | 106170783 | A | 11/2016 |
| CN | 103914238 | B | 2/2017 |
| CN | 106383645 | A | 2/2017 |
| CN | 106416142 | A | 2/2017 |
| CN | 106716954 | A | 5/2017 |
| CN | 106797415 | A | 5/2017 |
| CN | 107077288 | A | 8/2017 |
| CN | 107250949 | A | 10/2017 |
| CN | 107533368 | A | 1/2018 |
| CN | 107637073 | A | 1/2018 |
| CN | 107683470 | A | 2/2018 |
| CN | 107819928 | A | 3/2018 |
| CN | 107949879 | A | 4/2018 |
| CN | 104012150 | B | 5/2018 |
| CN | 108289239 | A | 7/2018 |
| CN | 108292203 | A | 7/2018 |
| CN | 108683798 | A | 10/2018 |
| CN | 108958608 | A | 12/2018 |
| CN | 109117078 | A | 1/2019 |
| CN | 109196825 | A | 1/2019 |
| CN | 109287140 | A | 1/2019 |
| CN | 109302531 | A | 2/2019 |
| CN | 109314795 | A | 2/2019 |
| CN | 109347581 | A | 2/2019 |
| CN | 109348052 | A | 2/2019 |
| CN | 109461462 | A | 3/2019 |
| CN | 109584879 | A | 4/2019 |
| CN | 109688441 | A | 4/2019 |
| CN | 109688442 | A | 4/2019 |
| CN | 108683798 | B | 4/2021 |
| CN | 109584879 | B | 7/2021 |
| CN | 113835583 | A | 12/2021 |
| CN | 108958608 | B | 7/2022 |
| EP | 1079371 | A1 | 2/2001 |
| EP | 1133119 | A2 | 9/2001 |
| EP | 1215575 | A2 | 6/2002 |
| EP | 1357458 | A2 | 10/2003 |
| EP | 1705883 | A1 | 9/2006 |
| EP | 1708116 | A2 | 10/2006 |
| EP | 1760584 | A1 | 3/2007 |
| EP | 1885109 | A2 | 2/2008 |
| EP | 2018032 | A1 | 1/2009 |
| EP | 2180665 | A1 | 4/2010 |
| EP | 2194698 | A1 | 6/2010 |
| EP | 2219105 | A1 | 8/2010 |
| EP | 2247087 | A1 | 11/2010 |
| EP | 2521080 | A2 | 11/2012 |
| EP | 2523109 | A1 | 11/2012 |
| EP | 2568693 | A2 | 3/2013 |
| EP | 2600584 | A1 | 6/2013 |
| EP | 2629291 | A1 | 8/2013 |
| EP | 2632193 | A2 | 8/2013 |
| EP | 2674889 | A2 | 12/2013 |
| EP | 2725473 | A1 | 4/2014 |
| EP | 2741190 | A2 | 6/2014 |
| EP | 2750062 | A2 | 7/2014 |
| EP | 2770673 | A1 | 8/2014 |
| EP | 2770708 | A1 | 8/2014 |
| EP | 2787465 | A1 | 10/2014 |
| EP | 2891049 | A1 | 7/2015 |
| EP | 2892240 | A1 | 7/2015 |
| EP | 2891049 | A4 | 3/2016 |
| EP | 2993909 | A1 | 3/2016 |
| EP | 2998822 | A2 | 3/2016 |
| EP | 3032537 | A2 | 6/2016 |
| EP | 3038427 | A1 | 6/2016 |
| EP | 2568693 | A3 | 7/2016 |
| EP | 3057342 | A1 | 8/2016 |
| EP | 3073703 | A1 | 9/2016 |
| EP | 3138300 | A1 | 3/2017 |
| EP | 3163495 | A1 | 5/2017 |
| EP | 3276905 | A1 | 1/2018 |
| EP | 3379853 | A1 | 9/2018 |
| EP | 2632193 | B1 | 10/2018 |
| EP | 3410027 | A1 | 12/2018 |
| EP | 3420441 | A1 | 1/2019 |
| EP | 3445058 | A1 | 2/2019 |
| EP | 3038427 | B1 | 12/2019 |
| EP | 3633963 | A1 | 4/2020 |
| EP | 4109891 | A1 | 12/2022 |
| FR | 3069679 | A1 | 2/2019 |
| GB | 2341698 | A | 3/2000 |
| GB | 0412212 | | 7/2004 |
| GB | 2402105 | A | 12/2004 |
| GB | 2466038 | A | 6/2010 |
| GB | 2505476 | A | 3/2014 |
| IN | 1038/MUM/2005 | | 6/2007 |
| JP | 5-266169 | A | 10/1993 |
| JP | 2000-122957 | A | 4/2000 |
| JP | 2000-200092 | A | 7/2000 |
| JP | 2000-259477 | A | 9/2000 |
| JP | 2000-283772 | A | 10/2000 |
| JP | 2000-347921 | A | 12/2000 |
| JP | 2001-67099 | A | 3/2001 |
| JP | 2001-331758 | A | 11/2001 |
| JP | 2002-58082 | A | 2/2002 |
| JP | 2002-288125 | A | 10/2002 |
| JP | 2002-342356 | A | 11/2002 |
| JP | 2002-351768 | A | 12/2002 |
| JP | 2003-30245 | A | 1/2003 |
| JP | 2004-96397 | A | 3/2004 |
| JP | 2004-104813 | A | 4/2004 |
| JP | 2004-356816 | A | 12/2004 |
| JP | 2005-332368 | A | 12/2005 |
| JP | 2006-185154 | A | 7/2006 |
| JP | 2007-41976 | A | 2/2007 |
| JP | 2007-304854 | A | 11/2007 |
| JP | 2007-534009 | A | 11/2007 |
| JP | 2008-99330 | A | 4/2008 |
| JP | 2009-93206 | A | 4/2009 |
| JP | 2009-239867 | A | 10/2009 |
| JP | 2009-296577 | A | 12/2009 |
| JP | 2009-543166 | A | 12/2009 |
| JP | 2009-543228 | A | 12/2009 |
| JP | 2010-503082 | A | 1/2010 |
| JP | 2010-503922 | A | 2/2010 |
| JP | 2010-109789 | A | 5/2010 |
| JP | 3162246 | U | 8/2010 |
| JP | 2010-198341 | A | 9/2010 |
| JP | 2010-245940 | A | 10/2010 |
| JP | 2010-257118 | A | 11/2010 |
| JP | 2010-271779 | A | 12/2010 |
| JP | 2011-60281 | A | 3/2011 |
| JP | 2011-65590 | A | 3/2011 |
| JP | 2011-118662 | A | 6/2011 |
| JP | 2011-209786 | A | 10/2011 |
| JP | 2011-237857 | A | 11/2011 |
| JP | 2012-168966 | A | 9/2012 |
| JP | 2012-215938 | A | 11/2012 |
| JP | 2013-25357 | A | 2/2013 |
| JP | 2013-506225 | A | 2/2013 |
| JP | 2013-74499 | A | 4/2013 |
| JP | 2013-93699 | A | 5/2013 |
| JP | 2013-105468 | A | 5/2013 |
| JP | 2013-530433 | A | 7/2013 |
| JP | 2013-530458 | A | 7/2013 |
| JP | 2013-175188 | A | 9/2013 |
| JP | 2013-191065 | A | 9/2013 |
| JP | 2013-200879 | A | 10/2013 |
| JP | 2014-503861 | A | 2/2014 |
| JP | 2014-44483 | A | 3/2014 |
| JP | 2014-44724 | A | 3/2014 |
| JP | 2014-71835 | A | 4/2014 |
| JP | 2014-87126 | A | 5/2014 |
| JP | 2014-512044 | A | 5/2014 |
| JP | 2014-110638 | A | 6/2014 |
| JP | 2014-128032 | A | 7/2014 |
| JP | 2014-131359 | A | 7/2014 |

(56)                References Cited

FOREIGN PATENT DOCUMENTS

| | | | |
|---|---|---|---|
| JP | 2014-170982 | A | 9/2014 |
| JP | 2015-8001 | A | 1/2015 |
| JP | 2015-14923 | A | 1/2015 |
| JP | 2015-501022 | A | 1/2015 |
| JP | 2015-61318 | A | 3/2015 |
| JP | 2015-520456 | A | 7/2015 |
| JP | 2015-524974 | A | 8/2015 |
| JP | 2015-526776 | A | 9/2015 |
| JP | 2015-533441 | A | 11/2015 |
| JP | 2016-38615 | A | 3/2016 |
| JP | 2016-63531 | A | 4/2016 |
| JP | 2016-157292 | A | 9/2016 |
| JP | 6023162 | B2 | 11/2016 |
| JP | 2017-34563 | A | 2/2017 |
| JP | 2017-41008 | A | 2/2017 |
| JP | 2017-143357 | A | 8/2017 |
| JP | 2017-212096 | A | 11/2017 |
| JP | 2018-7158 | A | 1/2018 |
| JP | 2018-147265 | A | 9/2018 |
| JP | 2018-200624 | A | 12/2018 |
| KR | 10-2007-0086374 | A | 8/2007 |
| KR | 10-2007-0120125 | A | 12/2007 |
| KR | 10-0805341 | B1 | 2/2008 |
| KR | 20-2008-0004775 | U | 10/2008 |
| KR | 10-2009-0089472 | A | 8/2009 |
| KR | 10-2010-0036351 | A | 4/2010 |
| KR | 10-2012-0003323 | A | 1/2012 |
| KR | 20120088746 | A | 8/2012 |
| KR | 10-2012-0100433 | A | 9/2012 |
| KR | 10-1253392 | B1 | 4/2013 |
| KR | 10-2013-0063019 | A | 6/2013 |
| KR | 10-2013-0075783 | A | 7/2013 |
| KR | 10-2013-0082190 | A | 7/2013 |
| KR | 10-2013-0108563 | A | 10/2013 |
| KR | 10-2013-0141688 | A | 12/2013 |
| KR | 10-1342208 | B1 | 12/2013 |
| KR | 10-2014-0016244 | A | 2/2014 |
| KR | 10-2014-0026263 | A | 3/2014 |
| KR | 10-2014-0031283 | A | 3/2014 |
| KR | 10-2014-0043370 | A | 4/2014 |
| KR | 10-2014-0137400 | A | 12/2014 |
| KR | 10-2014-0148289 | A | 12/2014 |
| KR | 10-2015-0031010 | A | 3/2015 |
| KR | 10-2015-0121177 | A | 10/2015 |
| KR | 10-2016-0012008 | A | 2/2016 |
| KR | 10-2016-0045633 | A | 4/2016 |
| KR | 10-2016-0092363 | A | 8/2016 |
| KR | 10-2016-0141847 | A | 12/2016 |
| KR | 10-2017-0008601 | A | 1/2017 |
| KR | 10-2017-0027435 | A | 3/2017 |
| KR | 10-2017-0027999 | A | 3/2017 |
| KR | 10-2017-0082022 | A | 7/2017 |
| KR | 10-2017-0100358 | A | 9/2017 |
| KR | 10-2017-0124954 | A | 11/2017 |
| KR | 10-1820573 | B1 | 1/2018 |
| KR | 10-2018-0034637 | A | 4/2018 |
| KR | 10-2018-0085931 | A | 7/2018 |
| KR | 10-2019-0002658 | A | 1/2019 |
| KR | 10-2019-0014495 | A | 2/2019 |
| KR | 10-2019-0022883 | A | 3/2019 |
| KR | 10-2019-0057414 | A | 5/2019 |
| KR | 10-2011177 | B1 | 8/2019 |
| KR | 10-2020-0039030 | A | 4/2020 |
| MX | 336834 | B | 2/2016 |
| TW | 201131471 | A | 9/2011 |
| TW | 201137722 | A | 11/2011 |
| TW | 201316247 | A | 4/2013 |
| TW | 201324310 | A | 6/2013 |
| TW | 201409345 | A | 3/2014 |
| TW | 201415345 | A | 4/2014 |
| TW | 201416959 | A | 5/2014 |
| WO | 99/44114 | A1 | 9/1999 |
| WO | 01/27783 | A1 | 4/2001 |
| WO | 02/01864 | A1 | 1/2002 |
| WO | 02/11022 | A2 | 2/2002 |
| WO | 03/054832 | A1 | 7/2003 |
| WO | 2004/095414 | A1 | 11/2004 |
| WO | 2004/104813 | A1 | 12/2004 |
| WO | 2005/031608 | A2 | 4/2005 |
| WO | 2005/053225 | A1 | 6/2005 |
| WO | 2005/109829 | A1 | 11/2005 |
| WO | 2006/011139 | A2 | 2/2006 |
| WO | 2006/113834 | A2 | 10/2006 |
| WO | 2006/130234 | A2 | 12/2006 |
| WO | 2007/073422 | A1 | 6/2007 |
| WO | 2007/102110 | A2 | 9/2007 |
| WO | 2007/142703 | A1 | 12/2007 |
| WO | 2007/149731 | A1 | 12/2007 |
| WO | 2008/027924 | A2 | 3/2008 |
| WO | 2008/030976 | A2 | 3/2008 |
| WO | 2008/051472 | A1 | 5/2008 |
| WO | 2008/103853 | A1 | 8/2008 |
| WO | 2008/151229 | A1 | 12/2008 |
| WO | 2009/005563 | A1 | 1/2009 |
| WO | 2009/010827 | A2 | 1/2009 |
| WO | 2009/012820 | A1 | 1/2009 |
| WO | 2009/067670 | A1 | 5/2009 |
| WO | 2009/086599 | A1 | 7/2009 |
| WO | 2010/065752 | A2 | 6/2010 |
| WO | 2010/087988 | A1 | 8/2010 |
| WO | 2010/065752 | A3 | 9/2010 |
| WO | 2010/120972 | A1 | 10/2010 |
| WO | 2010/128442 | A2 | 11/2010 |
| WO | 2011/027964 | A1 | 3/2011 |
| WO | 2011/041427 | A2 | 4/2011 |
| WO | 2011/084857 | A1 | 7/2011 |
| WO | 2011/126502 | A1 | 10/2011 |
| WO | 2011/149231 | A2 | 12/2011 |
| WO | 2012/004288 | A1 | 1/2012 |
| WO | 2012/028773 | A1 | 3/2012 |
| WO | 2012/050927 | A2 | 4/2012 |
| WO | 2012/051052 | A1 | 4/2012 |
| WO | 2012/079530 | A1 | 6/2012 |
| WO | 2012/104288 | A1 | 8/2012 |
| WO | 2012/126078 | A1 | 9/2012 |
| WO | 2012/154748 | A1 | 11/2012 |
| WO | 2012/166352 | A1 | 12/2012 |
| WO | 2012/170446 | A2 | 12/2012 |
| WO | 2012/172164 | A1 | 12/2012 |
| WO | 2013/000150 | A1 | 1/2013 |
| WO | 2013/026023 | A1 | 2/2013 |
| WO | 2013/048880 | A1 | 4/2013 |
| WO | 2013/049346 | A1 | 4/2013 |
| WO | 2013/097882 | A1 | 7/2013 |
| WO | 2013/097895 | A1 | 7/2013 |
| WO | 2013/097896 | A1 | 7/2013 |
| WO | 2013/111239 | A1 | 8/2013 |
| WO | 2013/132144 | A1 | 9/2013 |
| WO | 2013/135270 | A1 | 9/2013 |
| WO | 2013/137503 | A1 | 9/2013 |
| WO | 2013/153405 | A2 | 10/2013 |
| WO | 2013/169842 | A2 | 11/2013 |
| WO | 2013/173504 | A1 | 11/2013 |
| WO | 2013/173838 | A2 | 11/2013 |
| WO | 2013/176847 | A1 | 11/2013 |
| WO | 2014/004180 | A1 | 1/2014 |
| WO | 2014/004182 | A1 | 1/2014 |
| WO | 2014/004524 | A2 | 1/2014 |
| WO | 2014/018242 | A1 | 1/2014 |
| WO | 2014/021967 | A1 | 2/2014 |
| WO | 2014/030320 | A1 | 2/2014 |
| WO | 2014/032461 | A1 | 3/2014 |
| WO | 2014/057795 | A1 | 4/2014 |
| WO | 2014/078965 | A1 | 5/2014 |
| WO | 2014/092980 | A1 | 6/2014 |
| WO | 2014/101527 | A1 | 7/2014 |
| WO | 2014/105274 | A1 | 7/2014 |
| WO | 2014/105276 | A1 | 7/2014 |
| WO | 2014/107469 | A2 | 7/2014 |
| WO | 2014/115605 | A1 | 7/2014 |
| WO | 2014/128800 | A1 | 8/2014 |
| WO | 2014/143776 | A2 | 9/2014 |
| WO | 2014/147297 | A1 | 9/2014 |
| WO | 2014/151089 | A1 | 9/2014 |

(56) References Cited

FOREIGN PATENT DOCUMENTS

| WO | 2014/160327 A1 | 10/2014 |
| WO | 2013/173504 A8 | 12/2014 |
| WO | 2014/197279 A1 | 12/2014 |
| WO | 2014/200730 A1 | 12/2014 |
| WO | 2014/204960 A1 | 12/2014 |
| WO | 2015/008409 A1 | 1/2015 |
| WO | 2015/062410 A1 | 5/2015 |
| WO | 2015/076930 A1 | 5/2015 |
| WO | 2015/102572 A1 | 7/2015 |
| WO | 2015/114690 A1 | 8/2015 |
| WO | 2015/124831 A1 | 8/2015 |
| WO | 2015/134692 A1 | 9/2015 |
| WO | 2015/185123 A1 | 12/2015 |
| WO | 2016/033400 A1 | 3/2016 |
| WO | 2016/036472 A1 | 3/2016 |
| WO | 2016/036541 A2 | 3/2016 |
| WO | 2016/040405 A1 | 3/2016 |
| WO | 2016/040535 A1 | 3/2016 |
| WO | 2016/057117 A1 | 4/2016 |
| WO | 2016/200603 A1 | 12/2016 |
| WO | 2016/204186 A1 | 12/2016 |
| WO | 2017/027526 A1 | 2/2017 |
| WO | 2017/058293 A1 | 4/2017 |
| WO | 2017/058442 A1 | 4/2017 |
| WO | 2017/112003 A1 | 6/2017 |
| WO | 2017/147081 A1 | 8/2017 |
| WO | 2017/173155 A1 | 10/2017 |
| WO | 2017/218143 A1 | 12/2017 |
| WO | 2017/218192 A1 | 12/2017 |
| WO | 2017/218199 A1 | 12/2017 |
| WO | 2018/048510 A1 | 3/2018 |
| WO | 2018/084802 A1 | 5/2018 |
| WO | 2018/098136 A1 | 5/2018 |
| WO | 2018/144339 A2 | 8/2018 |
| WO | 2018/213401 A1 | 11/2018 |
| WO | 2018/213415 A1 | 11/2018 |
| WO | 2018/213844 A1 | 11/2018 |
| WO | 2018/232333 A1 | 12/2018 |
| WO | 2020/063762 A1 | 4/2020 |
| WO | 2020/243691 A1 | 12/2020 |
| WO | 2021/010993 A1 | 1/2021 |

OTHER PUBLICATIONS

Office Action received for Chinese Patent Application No. 202011083486.1, mailed on Aug. 19, 2024, 12 pages (4 pages of English Translation and 8 pages of Official Copy).

Applicant-Initiated Interview Summary received for U.S. Appl. No. 17/970,417, mailed on Nov. 4, 2024, 2 pages.

Decision to Grant received for European Patent Application No. 20719301.2, mailed on Nov. 7, 2024, 3 pages.

Final Office Action received for U.S. Appl. No. 18/067,350, mailed on Oct. 31, 2024, 44 pages.

International Search Report and Written Opinion received for PCT Patent Application No. PCT/US2024/023231, mailed on Oct. 23, 2024, 24 pages.

Invitation to Pay Additional Fees and Partial International Search Report received for PCT Patent Application No. PCT/US2024/023231, mailed on Aug. 29, 2024, 17 pages.

Notice of Acceptance received for Australian Patent Application No. 2023204647, mailed on Oct. 28, 2024, 3 pages.

Applicant-Initiated Interview Summary received for U.S. Appl. No. 18/067,350, mailed on Jul. 29, 2024, 3 pages.

Application-Initiated Interview Summary received for U.S. Appl. No. 18/088,309, mailed on Aug. 27, 2024, 2 pages.

Application-Initiated Interview Summary received for U.S. Appl. No. 18/228,597, mailed on Aug. 8, 2024, 4 pages.

Corrected Notice of Allowance received for U.S. Appl. No. 18/235,291, mailed on Aug. 7, 2024, 2 pages.

Corrected Notice of Allowance received for U.S. Appl. No. 18/235,291, mailed on Jul. 18, 2024, 3 pages.

Decision to Grant received for European Patent Application No. 21166718.3, mailed on Aug. 8, 2024, 2 pages.

Decision to Refuse received for Japanese Patent Application No. 2023-022576, mailed on Jul. 26, 2024, 6 pages (3 pages of English Translation and 3 pages of Official Copy).

Examiner-Initiated Interview Summary received for U.S. Appl. No. 18/234,613, mailed on Aug. 9, 2024, 2 pages.

Final Office Action received for U.S. Appl. No. 18/088,309, mailed on Aug. 1, 2024, 18 pages.

Intention to Grant received for European Patent Application No. 20719301.2, mailed on Jul. 2, 2024, 9 pages.

Intention to Grant received for European Patent Application No. 21197457.1, mailed on Jul. 9, 2024, 12 pages.

Intention to Grant received for European Patent Application No. 23168537.1, mailed on Jul. 25, 2024, 8 pages.

Minutes of the Oral Proceedings received for European Patent Application No. 21197457.1, mailed on Jul. 3, 2024, 9 pages.

Non-Final Office Action received for U.S. Appl. No. 18/228,597, mailed on Jul. 8, 2024, 17 pages.

Notice of Allowance received for Chinese Patent Application No. 202010728711.6, mailed on Jul. 1, 2024, 2 pages (1 page of English Translation and 1 page of Official Copy).

Notice of Allowance received for Chinese Patent Application No. 202211081603.X, mailed on Jul. 29, 2024, 2 pages (1 page of English Translation and 1 page of Official Copy).

Notice of Allowance received for Chinese Patent Application No. 202211110081.1, mailed on Jul. 24, 2024, 2 pages (1 page of English Translation and 1 page of Official Copy).

Notice of Allowance received for Japanese Patent Application No. 2022-149476, mailed on Aug. 2, 2024, 4 pages (1 page of English Translation and 3 pages of Official Copy).

Notice of Allowance received for Korean Patent Application No. 10-2022-0053111, mailed on Jun. 25, 2024, 7 pages (2 pages of English Translation and 5 pages of Official Copy).

Notice of Allowance received for U.S. Appl. No. 17/978,930, mailed on Aug. 19, 2024, 9 pages.

Notice of Allowance received for U.S. Appl. No. 18/229,989, mailed on Jul. 24, 2024, 5 pages.

Office Action received for Australian Patent Application No. 2023204647, mailed on Jul. 5, 2024, 3 pages.

Office Action received for Chinese Patent Application No. 202110894284.3, mailed on Jun. 27, 2024, 10 pages (5 pages of English Translation and 5 pages of Official Copy).

Office Action received for Chinese Patent Application No. 202311305998.1, mailed on May 29, 2024, 13 pages (7 pages of English Translation and 6 pages of Official Copy).

Office Action received for Chinese Patent Application No. 202311321231.8, mailed on Jul. 28, 2024, 9 pages (5 pages of English Translation and 4 pages of Official Copy).

Office Action received for European Patent Application No. 22201007.6, mailed on Jul. 18, 2024. 4 pages.

Office Action received for Japanese Patent Application No. 2023-077990, mailed on Jul. 12, 2024, 8 pages (4 pages of English Translation and 4 pages of Official Copy).

Result of Consultation received for European Patent Application No. 22201007.6, mailed on Aug. 20, 2024, 3 pages.

Supplemental Notice of Allowance received for U.S. Appl. No. 18/229,989, mailed on Aug. 7, 2024, 2 pages,.

Extended European Search Report received for European Patent Application No. 24211972.5, mailed on Jan. 2, 2025, 7 pages.

Notice of Allowance received for Japanese Patent Application No. 2023-022576, mailed on Dec. 24, 2024, 4 pages (1 page of English Translation and 3 pages of Official Copy).

Applicant-Initiated Interview Summary received for U.S. Appl. No. 17/941,961, mailed on Oct. 1, 2024, 5 pages.

Non-Final Office Action received for U.S. Appl. No. 18/535,820, mailed on Sep. 25, 2024, 27 pages.

Office Action received for Australian Patent Application No. 2023204647, mailed on Sep. 19, 2024, 2 pages.

Office Action received for Australian Patent Application No. 2023266353, mailed on Sep. 19, 2024, 2 pages.

(56) References Cited

OTHER PUBLICATIONS

Office Action received for Chinese Patent Application No. 202310794146.7, mailed on Aug. 30, 2024, 18 pages (11 pages of English Translation and 7 pages of Official Copy).

Board Decision received for Chinese Patent Application No. 201810375380.5, mailed on Jul. 6, 2022, 2 pages (1 page of English Translation and 1 page of Official Copy).

CNET, "Android Lollipop Lock-Screen Notification Tips", Available online at: https://www.youtube.com/watch?v=LZTxHBOwzIU, Nov. 13, 2014, 3 pages.

Decision on Appeal received for U.S. Appl. No. 16/136,178, mailed on Jun. 2, 2022, 10 pages.

Decision on Appeal received for U.S. Appl. No. 17/181,089, mailed on Apr. 17, 2025, 19 pages.

Decision to Grant received for Danish Patent Application No. 201570874, mailed on Jan. 26, 2018, 2 pages.

Decision to Grant received for Danish Patent Application No. PA201570865, mailed on Mar. 19, 2018, 2 pages.

Decision to Grant received for Danish Patent Application No. PA201570867, mailed on Mar. 13, 2018, 2 pages.

Decision to Grant received for Danish Patent Application No. PA201570871, mailed on Mar. 19, 2018, 2 pages.

Decision to Grant received for European Patent Application No. 16728165.8, mailed on Sep. 12, 2019, 2 pages.

Decision to Grant received for European Patent Application No. 18196448.7, mailed on Aug. 6, 2020, 2 pages.

Decision to Grant received for European Patent Application No. 20193661.4, mailed on Sep. 7, 2023, 2 pages.

Extended European Search Report received for European Patent Application No. 18196884.7, mailed on Oct. 16, 2018, 9 pages.

Extended European Search Report received for European Patent Application No. 20193661.4, mailed on Feb. 2, 2021, 10 pages.

Extended European Search Report received for European Patent Application No. 25154475.5, mailed on Apr. 28, 2025, 11 pages.

Extended European Search Report received for European Patent Application No. 25166659.0, mailed on Apr. 15, 2025, 9 pages.

Final Office Action received for U.S. Appl. No. 15/835,366, mailed on Apr. 5, 2019, 1 pages.

Final Ofiice Action received for U.S. Appl. No. 15/835,366, mailed on Oct. 21, 2019, 18 pages.

Final Office Action received for U.S. Appl. No. 15/835,382, mailed on Apr. 8, 2019, 20 pages.

Final Office Action received for U.S. Appl. No. 16/136,178, mailed on Jul. 10, 2020, 17 pages.

Final Office Action received for U.S. Appl. No. 18/127,535, mailed on Jul. 19, 2024, 26 pages.

Intention to Grant received for Danish Patent Application No. PA201570865, mailed on Jan. 3, 2018, 2 pages.

Intention to Grant received for Danish Patent Application No. PA201570867, mailed on Sep. 22, 2017, 2 pages.

Intention to Grant received for Danish Patent Application No. PA201570871, mailed on Jan. 15, 2018, 2 pages.

Intention to Grant received for Danish Patent Application No. PA201570874, mailed on Nov. 16, 2017, 2 pages.

Intention to Grant received for Danish Patent Application No. PA201570880, mailed on May 9, 2018, 2 pages.

Intention to Grant received for European Patent Application No. 16728165.8, mailed on Apr. 30, 2019, 7 pages.

Intention to Grant received for European Patent Application No. 18196448.7, mailed on Jun. 19, 2020, 7 pages.

Intention to Grant received for European Patent Application No. 24211972.5, mailed on Apr. 10, 2025, 9 pages.

International Preliminary Report on Patentability received for PCT Patent Application No. PCT/US2016/033528, mailed on Dec. 12, 2017, 30 pages.

International Search Report and Written Opinion received for PCT Patent Application No. PCT/US2016/033528, mailed on Feb. 6, 2017, 43 pages.

Non-Final Office Action received for U.S. Appl. No. 15/835,366, mailed on Feb. 6, 2020, 15 pages.

Non-Final Office Action received for U.S. Appl. No. 15/835,366, mailed on Jun. 26, 2019, 19 pages.

Non-Final Office Action received for U.S. Appl. No. 15/835,382, mailed on Nov. 16, 2018, 14 pages.

Non-Final Office Action received for U.S. Appl. No. 15/835,382, mailed on Nov. 29, 2018, 14 pages.

Non-Final Office Action received for U.S. Appl. No. 16/136,178, mailed on Jan. 6, 2020, 15 pages.

Non-Final Office Action received for U.S. Appl. No. 18/067,350, mailed on Apr. 17, 2025, 49 pages.

Non-Final Office Action received for U.S. Appl. No. 18/127,535, mailed on Dec. 20, 2023, 20 pages.

Notice of Acceptance received for Australian Patent Application No. 2016276028, mailed on Aug. 6, 2019, 3 pages.

Notice of Allowance received for Chinese Patent Application No. 201680026995.6, mailed on Mar. 18, 2020, 2 pages (1 page of English Translation and 1 page of Official Copy).

Notice of Allowance received for Chinese Patent Application No. 201810368058.X, mailed on Jul. 30, 2021, 2 pages (1 page of English Translation and 1 page of Official Copy).

Notice of Allowance received for Chinese Patent Application No. 201810375380.5, mailed on Jul. 25, 2022, 1 pages (1 page of English Translation and 1 page of Official Copy).

Notice of Allowance received for Chinese Patent Application No. 201810760112.5, mailed on Sep. 21, 2020, 4 pages (1 page of English Translation and 3 pages of Official Copy).

Notice of Allowance received for U.S. Appl. No. 15/835,366, mailed on Jul. 23, 2020, 10 pages.

Notice of Allowance received for U.S. Appl. No. 16/136,178, mailed on Dec. 5, 2022, 9 pages.

Notice of Allowance received for U.S. Appl. No. 16/136,178, mailed on Sep. 9, 2022, 8 pages.

Office Action received for Australian Patent Application No. 2016276028, mailed on Aug. 9, 2018, 4 pages.

Office Action received for Australian Patent Application No. 2016276028, mailed on May 13, 2019, 4 pages.

Office Action received for Australian Patent Application No. 2019257353, mailed on Sep. 7, 2020. 4 pages.

Office Action received for Chinese Patent Application No. 201680026995.6, mailed on Oct. 22, 2019, 15 pages (6 pages of English Translation and 9 pages of Official Copy).

Office Action received for Chinese Patent Application No. 201810368058.X, mailed on Mar. 20, 2020, 15 pages (7 pages of English Translation and 8 pages of Official Copy).

Office Action received for Chinese Patent Application No. 201810368058.X, mailed on May 8, 2021, 6 pages (3 pages of English Translation and 3 pages of Official Copy).

Office Action received for Chinese Patent Application No. 201810368058.X, mailed on Nov. 3, 2020, 16 pages (7 pages of English Translation and 9 pages of Official Copy).

Office Action received for Chinese Patent Application No. 201810375380.5, mailed on Apr. 2, 2022, 11 pages (6 pages of English Translation and 5 pages of Official Copy).

Office Action received for Chinese Patent Application No. 201810375380.5, mailed on Jan. 14, 2022, 16 pages (8 pages of English Translation and 8 pages of Official Copy).

Office Action received for Chinese Patent Application No. 201810375380.5, mailed on Mar. 3, 2020, 13 pages (6 pages of English Translation and 7 pages of Official Copy).

Office Action received for Chinese Patent Application No. 201810375380.5, mailed on Nov. 12, 2020, 16 pages (8 pages of English Translation and 8 pages of Official Copy).

Office Action received for Chinese Patent Application No. 201810375380.5, mailed on Sep. 15, 2021, 10 pages (5 pages of English Translation and 5 pages of Official Copy).

Office Action received for Chinese Patent Application No. 201810760112.5, mailed on Feb. 26, 2020, 11 pages (5 pages of English Translation and 5 pages of Official Copy).

Office Action received for Chinese Patent Application No. 201810760112.5, mailed on Jul. 21, 2020, 6 pages (3 pages of English Translation and 3 pages of Official Copy).

Office Action received for Danish Patent Application No. PA201570865, mailed on Mar. 8, 2017, 5 pages.

(56) References Cited

OTHER PUBLICATIONS

Office Action received for Danish Patent Application No. PA201570865, mailed on Oct. 10, 2017, 2 pages.
Office Action received for Danish Patent Application No. PA201570865, mailed on Sep. 2, 2016, 4 pages.
Office Action received for Danish Patent Application No. PA201570867, mailed on Feb. 21, 201, 2 pages.
Office Action received for Danish Patent Application No. PA201570867, mailed on Sep. 7, 2016, 3 pages.
Office Action received for Danish Patent Application No. PA201570871, mailed on Jun. 12, 2017, 3 pages.
Office Action received for Danish Patent Application No. PA201570871, mailed on Oct. 18, 2015, 4 pages.
Office Action received for Danish Patent Application No. PA201570874, mailed on Aug. 31, 2016, 4 pages.
Office Action received for Danish Patent Application No. PA201570874, mailed on May 15, 2017, 4 pages.
Office Action received for Danish Patent Application No. PA201570880, mailed on Feb. 1, 2018, 2 pages.
Office Action received for Danish Patent Application No. PA201570880, mailed on Mar. 31, 2017, 5 pages.
Office Action received for Danish Patent Application No. PA201570880, mailed on Oct. 24, 2017, 4 pages.
Office Action received for Danish Patent Application No. PA201570880, mailed on Sep. 7, 2016, 3 pages.
Office Action received for European Patent Application No. 16728165.8, mailed on Aug. 29, 2018, 4 pages.
Office Action received for European Patent Application No. 18196448.7, mailed on Sep. 16, 2019, 4 pages.
Office Action received for European Patent Application No. 20193661.4, mailed on Sep. 13, 2021, 6 pages.
Schulzrinne H, "Indication of Message Composition for Instant Messaging", Network Working Group, Columbia University, Jan. 2005, 14 pages.
Search Report and Opinion received for Danish Patent Application No. PA201570865, mailed on Mar. 30, 2016, 5 pages.
Search Report and Opinion received for Danish Patent Application No. PA201570867, mailed on Apr. 1, 2016, 5 pages.
Search Report and Opinion received for Danish Patent Application No. PA201570871, mailed on Apr. 12, 2016, 7 pages.
Search Report and Opinion received for Danish Patent Application No. PA201570874, mailed on Mar. 30, 2016, 7 pages.
Search Report and Opinion received for Danish Patent Application No. PA201570880, mailed on Apr. 4, 2016, 6 pages.
Decision to Grant received for European Patent Application No. 24164409.5, mailed on May 22, 2025, 3 pages.
Office Action received for European Patent Application No. 23172038.4, mailed on May 22, 2025, 6 pages.
060465, AR, A1, Cited by the Chinese Patent Office in an Office in an Office Action for related Patent Application No. 201810338040.5 on Mar. 30, 2022.
101022395, CN, A, Cited by the Chinese Patent Office in an Office Action for related Patent Application No. 201811367893.8 on Jun. 21, 2021.
101047521, CN, A, Cited by the Chinese Patent Office in an Office Action for related Patent Application No. 201811379281.0 on Oct. 27, 2022.
101188506, CN, A, Cited by the Chinese Patent Office in an Office Action for related Patent Application No. 201811379281.0 on Oct. 27, 2022.
101321156, CN, A, Cited by the Chinese Patent Office in an Office Action for related Patent Application No. 201680011682.3 on Dec. 2, 2019.
101340274, CN, A, Cited by the Chinese Patent Office in an Office Action for related Patent Application No. 201811377642.8 on Oct. 27, 2022.
101350938, CN, A, Cited by the Chinese Patent Office in an Office Action for related Patent Application No. 201811367893.8 on Jun. 21, 2021.

101610155, CN, A, Cited by the Chinese Patent Office in an Office Action for related Patent Application No. 20180338040.5 on Jun. 3, 2021.
101673207, CN, A, Cited by the Chinese Patent Office in an Office Action for related Patent Application No. 201811367893.8 on Jun. 21, 2021.
101673298, CN, A, Cited by the Chinese Patent Office in an Office Action for related Patent Application No. 201811379281.0 on Oct. 27, 2022.
101882409, CN, A, Cited by the Chinese Patent Office in an Office Action for related Patent Application No. 201811367893.8 on Jun. 21, 2021.
101931655, CN, A, Cited by the Chinese Patent Office in an Office Action for related Patent Application No. 201811367893.8 on Jun. 21, 2021.
103558916, CN, A, Cited by the European Patent Office in an Office Action for related Patent Application No. 19203942.8 on Apr. 1, 2020.
105549947, CN, A, Cited by the Chinese Patent Office in an Office Action for related Patent Application No. 202010125114.4 on Aug. 21, 2020.
108683798, CN, B, Cited by the PCT Patent Office in an Office Action for related Patent Application No. PCT/US2022/031252 on Oct. 7, 2022.
2000-122957, JP, A, Cited by the Japanese Patent Office in an Office Action for related Patent Application No. 2018-080122 on Nov. 27, 2020.
2000-283772, JP, A, Cited by the Japanese Patent Office in an Office Action for related Patent Application No. 2022-116534 on Aug. 28, 2023.
2002-288125, JP, A, Cited by the Japanese Patent Office in an Office Action for related Patent Application No. 2019-124728 on Sep. 18, 2020.
2002-351768, JP, A, Cited by the Japanese Patent Office in an Office Action for related Patent Application No. 2018-080122 on Nov. 27, 2020.
2005-332368, JP, A, Cited by the Japanese Patent Office in an Office Action for related Patent Application No. 2022-116534 on Aug. 28, 2023.
2007-304854, JP, A, Cited by the Japanese Patent Office in an Office Action for related Patent Application No. 2019-116580 on Oct. 2, 2020.
2008-99330, JP, A, Cited by the Japanese Patent Office in an Office Action for related Patent Application No. 2022-125792 on Jan. 27, 2023.
2010-109789, JP, A, Cited by the Japanese Patent Office in an Office Action for related Patent Application No. 2022-116534 on Aug. 28, 2023.
2011-65590, JP, A, Cited by the Japanese Patent Office in an Office Action for related Patent Application No. 2019-116580 on Oct. 2, 2020.
2011-118662, JP, A, Cited by the Japanese Patent Office in an Office Action for related Patent Application No. 2019-124728 on Sep. 18, 2020.
2012-215938, JP, A, Cited by the Japanese Patent Office in an Office Action for related Patent Application No. 2021-074395 on Jun. 27, 2022.
2013-74499, JP, A, Cited by the Japanese Patent Office in an Office Action for related Patent Application No. 2022-116534 on Aug. 28, 2023.
2013-105468, JP, A, Cited by the Japanese Patent Office in an Office Action for related Patent Application No. 2021-074395 on Jun. 27, 2022.
2013-191065, JP, A, Cited by the Japanese Patent Office in an Office Action for related Patent Application No. 2022-116534 on Aug. 28, 2023.
2014-71835, JP, A, Cited by the Japanese Patent Office in an Office Action for related Patent Application No. 2020-159840 on Dec. 10, 2021.
2014-87126, JP, A, Cited by the Japanese Patent Office in an Office Action for related Patent Application No. 2020-159840 on Dec. 10, 2021.

(56) References Cited

OTHER PUBLICATIONS 2014-512044, JP, A, Cited by the Japanese Patent Office in an Office Action for related Patent Application No. 2019-124728 on Sep. 18, 2020.

2014-110638, JP, A, Cited by the Japanese Patent Office in an Office Action for related Patent Application No. 2019-116580 on Oct. 2, 2020.

2014-131359, JP, A, Cited by the Japanese Patent Office in an Office Action for related Patent Application No. 2019-116580 on Oct. 2, 2020.

2014-170982, JP, A, Cited by the Japanese Patent Office in an Office Action for related Patent Application No. 2022-125792 on Jan. 27, 2023.

2015-61318, JP, A, Cited by the Japanese Patent Office in an Office Action for related Patent Application No. 2021-571464 on May 30, 2022.

2017-41008, JP, A, Cited by the Japanese Patent Office in an Office Action for related Patent Application No. 2022-014389 on Jan. 27, 2023.

2018-7158, JP, A, Cited by the Japanese Patent Office in an Office Action for related Patent Application No. 2020-159840 on Dec. 10, 2021.

10-2009-0089472, KR, A, Cited by the Korean Patent Office in an Office Action for related Patent Application No. 10-2021-7020549 on Jul. 13, 2021.

10-1342208, KR, B1, Cited by the Korean Patent Office in an Office Action for related Patent Application No. 10-2020-7017803 on Nov. 5, 2020.

10-2013-0141688, KR, A, Cited by the Japanese Patent Office in an Office Action for related Patent Application No. 2019-124728 on Sep. 18, 2020.

10-2014-0043370, KR, A, Cited by the Korean Patent Office in an Office Action for related Patent Application No. 10-2021-0143923 on Jan. 27, 2022.

10-2016-0092363, KR, A, Cited by the Korean Patent Office in an Office Action for related Patent Application No. 10-2022-7008567 on Jul. 4, 2022.

10-2016-0141847, KR, A, Cited by the Korean Patent Office in an Office Action for related Patent Application No. 10-2021-7035472 on Nov. 23, 2021.

10-2017-0027435, KR, A, Cited by the Korean Patent Office in an Office Action for related Patent Application No. 10-2022-7008567 on Jul. 4, 2022.

10-2017-0027999, KR, A, Cited by the Korean Patent Office in an Office Action for related Patent Application No. 10-2021-7035472 on Nov. 23, 2021.

10-2017-0082022, KR, A, Cited by the Korean Patent Office in an Office Action for related Patent Application No. 10-2022-7008567 on Jul. 4, 2022.

10-2017-0124954, KR, A, Cited by the Korean Patent Office in an Office Action for related Patent Application No. 10-2022-7008567 on Jul. 4, 2022.

10-2018-0085931, KR, A, Cited by the Indian Patent Office in an Office Action for related Patent Application No. 202215025361 on Mar. 29, 2023.

"13 questions and answers about using Apple Pay online", online available at: http://www.it528.com/apple/1356.html, Feb. 18, 2016, 5 pages, Cited by the Chinese Patent Office in an Office Action for related Patent Application No. 201780033899.9 on Sep. 3, 2021.

Issued by the Chinese Patent Office in related Patent Application No. 201620051290.7, on Jun. 22, 2016.

Issued by the Japanese Patent Office in related Patent Application No. 2015-095183, on Apr. 21, 2017.

Issued by the Taiwanese Patent Office in related Patent Application No. 104108223, on Jan. 10, 2017.

Issued by the Taiwanese Patent Office in related Patent Application No. 104114953, on Oct. 17, 2017.

Issued by the Taiwanese Patent Office in related Patent Application No. 104117041, on Feb. 24, 2017.

Issued by the Korean Patent Office in related Patent Application No. 10-2016-7022902, on Sep. 4, 2017.

Issued by the Hong Kong Patent Office in related Patent Application No. 151051633, on Jun. 5, 2015.

Han, Hailing, "Research on Testing Method on Computer Interlocking Software", "Electronic World" vol. 2012 No. 17, Key Laboratory of Optoelectronic Technology and Intelligent Control of Ministry of Education, Lanzhou Jiaotong University, Sep. 2012, 2 pages, Cited by the Chinese Patent Office in an Office Action for related Patent Application No. 201580043701.6 on Sep. 10, 2021.

Kimura, Ryoji, "Keynote presentation practice guide for iPad & iPhone", K.K. Rutles, first edition, Feb. 29, 2012, 4 pages, Cited by the Japanese Patent Office in an Office Action for related Patent Application No. 2015-095183 on Jun. 3, 2016.

Pu, Fang, "Research on Location-aware Service in Pervasive Computing", Issue No. 7, Information Technology Series, China Doctoral Dissertations, Jul. 15, 2008, 140 pages, Cited by the Chinese Patent Office in an Office Action for related Patent Application No. 201810339290.0 on Oct. 18, 2021.

Qiye, Wang, "Design and Implementation of SAN Device Access Control in Unified Storage Platform", Master's Theses, Huazhong University of Science & Technology, Wuhan, Jun. 2008, 63 pages, Cited by the Chinese Patent Office in an Office Action for related Patent Application No. 201810338040.5 on Mar. 30, 2022.

Applicant-Initiated Interview Summary received for U.S. Appl. No. 18/067,350. mailed on Nov. 26, 2024, 3 pages.

Corrected Notice of Allowance received for U.S. Appl. No. 18/234,613, mailed on Nov. 20, 2024, 2 pages.

Intention to Grant received for European Patent Application No. 21197457.1, mailed on Nov. 21, 2024, 12 pages.

Intention to Grant received for European Patent Application No. 21789897.2, mailed on Nov. 12, 2024, 9 pages.

International Preliminary Report on Patentability received for PCT Patent Application No. PCT/US2023/020569, mailed on Nov. 21, 2024, 16 pages.

Lin Wei, "Can Apple Watch Lead the Wearable Market", Financial Economics, Issue 23, Dec. 31, 2014, 1 page (Official Copy Only). {See Communication Under Rule 37 CFR § 1.98(a) (3)}.

Loomba et al., "Energy-aware collaborative sensing for multiple applications in mobile cloud computing", Sustainable Computing: Informatics and Systems, Issue 8, Online Available at: https://www.sciencedirect.com/science/article/abs/pii/S2210537915000384?via%3Dihub, Dec. 31, 2015, pp. 47-59.

Notice of Acceptance received for Australian Patent Application No. 2024200283, mailed on Nov. 13, 2024, 3 pages.

Notice of Allowance received for Chinese Patent Application No. 202210384721.1, mailed on Nov. 8, 2024, 4 pages (1 page of English Translation and 3 pages of Official Copy).

Office Action received for Chinese Patent Application No. 202311305998.1, mailed on Oct. 19, 2024, 6 pages (3 pages of English Translation and 3 pages of Official Copy).

Office Action received for Japanese Patent Application No. 2023-147860, mailed on Nov. 18, 2024, 15 pages (7 pages of English Translation and 8 pages of Official Copy).

Advisory Action received for U.S. Appl. No. 17/970,417, mailed on Dec. 12, 2024, 7 pages.

Applicant-Initiated Interview Summary received for U.S. Appl. No. 17/991,708, mailed on Dec. 16, 2024, 5 pages.

Corrected Notice of Allowance received for U.S. Appl. No. 17/848,845, mailed on Dec. 11, 2024, 3 pages.

Decision to Grant received for European Patent Application No. 20720310.0, mailed on Dec. 5, 2024, 2 pages.

Examiner's Answer to Appeal Brief received for U.S. Appl. No. 18/200,480, mailed on Dec. 13, 2024, 9 pages.

Extended European Search Report received for European Patent Application No. 24197852.7, mailed on Dec. 5, 2024, 11 pages.

Intention to Grant received for European Patent Application No. 23168537.1, mailed on Dec. 2, 2024, 8 pages.

Notice of Allowance received for Japanese Patent Application No. 2023-028786, mailed on Dec. 2, 2024, 4 pages (1 page of English Translation and 3 pages of Official Copy).

(56) References Cited

OTHER PUBLICATIONS

Notice of Allowance received for Korean Patent Application No. 10-2022-7032414, mailed on Nov. 27, 2024, 7 pages (2 pages of English Translation and 5 pages of Official Copy).
Notice of Allowance received for Korean Patent Application No. 10-2024-0112016, mailed on Dec. 2, 2024, 6 pages (2 pages of English Translation and 4 pages of Official Copy).
Notice of Allowance received for U.S. Appl. No. 18/077,891, mailed on Dec. 10, 2024, 9 pages.
Notice of Allowance received for U.S. Appl. No. 18/234,613, mailed on Dec. 12, 2024, 7 pages.
Office Action received for Chinese Patent Application No. 202310794146.7, mailed on Nov. 13, 2024, 17 pages (11 pages of English Translation and 6 pages of Official Copy).
Advisory Action received for U.S. Appl. No. 17/479,974, mailed on May 6, 2024, 4 pages.
Applicant-Initiated Interview Summary received for U.S. Appl. No. 17/941,961, mailed on May 6, 2024, 4 pages.
Applicant-Initiated Interview Summary received for U.S. Appl. No. 17/970,417, mailed on Jun. 26, 2024, 2 pages.
Applicant-Initiated Interview Summary received for U.S. Appl. No. 18/088,309, mailed on Jun. 7, 2024, 2 pages.
Applicant-Initiated Interview Summary received for U.S. Appl. No. 18/229,989, mailed on Jun. 28, 2024, 2 pages.
Applicant-Initiated Interview Summary received for U.S. Appl. No. 18/395,167. mailed on Jun. 28, 2024, 4 pages.
Brief Communication Regarding Oral Proceedings received for European Patent Application No. 21197457.1, mailed on Jun. 19, 2024, 1 page.
Brief Communication Regarding Oral Proceedings received for European Patent Application No. 21197457.1, mailed on May 23, 2024, 5 pages.
"Create Confirmation Dialog Box—Matlab UIconfirm", Online available at: https://www.mathworks.com/help/matlab/ref/uiconfirm. html, 2017, 19 pages.
Extended European Search Report received for European Patent Application No. 24164409.5, mailed on Jun. 14, 2024, 5 pages.
Final Office Action received for U.S. Appl. No. 17/941,961, mailed on Jul. 5, 2024, 21 pages.
Final Office Action received for U.S. Appl. No. 18/200,480, mailed on Jun. 17, 2024, 10 pages.
Intention to Grant received for European Patent Application No. 20720310.0, mailed on Jun. 13, 2024, 13 pages.
Minutes of the Oral Proceedings received for European Patent Application No. 20720310.0, mailed on Jun. 7, 2024, 7 pages.
Non-Final Office Action received for U.S. Appl. No. 17/747,804, mailed on Jun. 4, 2024, 20 pages.
Non-Final Office Action received for U.S. Appl. No. 18/067,350, mailed on May 28, 2024, 43 pages.
Non-Final Office Action received for U.S. Appl. No. 18/200,480, mailed on May 20, 2024, 10 pages.
Non-Final Office Action received for U.S. Appl. No. 18/229,989, mailed on May 31, 2024, 18 pages.
Non-Final Office Action received for U.S. Appl. No. 18/234,613, mailed on Jul. 1, 2024, 19 pages.
Non-Final Office Action received for U.S. Appl. No. 18/395,167, mailed on May 21, 2024, 11 pages.
Notice of Acceptance received for Australian Patent Application No. 2023203357, mailed on May 18, 2024, 3 pages.
Notice of Allowance received for Chinese Patent Application No. 201911128105.4, mailed on May 24, 2024, 2 pages (1 page of English Translation and 1 page of Official Copy).
Notice of Allowance received for Japanese Patent Application No. 2022-116534, mailed on Jun. 24, 2024, 4 pages (1 page of English Translation and 3 pages of Official Copy).
Notice of Allowance received for Japanese Patent Application No. 2022-129377, mailed on Apr. 28, 2024, 4 pages (1 page of English Translation and 3 pages of Official Copy).

Notice of Allowance received for Korean Patent Application No. 10-2023-0001668, mailed on May 22, 2024, 6 pages (2 pages of English Translation and 4 pages of Official Copy).
Notice of Allowance received for U.S. Appl. No. 18/235,291, mailed on Jul. 3, 2024, 18 pages.
Office Action received for Australian Patent Application No. 2023201057, mailed on Jun. 10, 2024, 5 pages.
Office Action received for Chinese Patent Application No. 202011083486.1, mailed on May 22, 2024, 15 pages (5 pages of English Translation and 10 pages of Official Copy).
Office Action received for Chinese Patent Application No. 202210384721.1, mailed on May 23, 2024, 26 pages (14 pages of English Translation and 12 pages of Official Copy).
Office Action received for Chinese Patent Application No. 202211081603.X, mailed on Apr. 29, 2024, 6 pages (3 pages of English Translation and 3 pages of Official Copy).
Office Action received for Chinese Patent Application No. 202211110081.1, mailed on Apr. 28, 2024, 6 pages (3 pages of English Translation and 3 pages of Official Copy).
Office Action received for European Patent Application No. 21207736.6, mailed on May 31, 2024, 4 pages.
Office Action received for European Patent Application No. 21789897.2, mailed on May 23, 2024, 12 pages.
Office Action received for European Patent Application No. 23190753.6, mailed on Jun. 25, 2024. 10 pages.
Result of Consultation received for European Patent Application No. 20720310.0, mailed on Jun. 4, 2024, 3 pages.
weifeng.com, "Install and use Apple Pay on your Apple Watch", Available online at: https://www.mpaypass.com.cn/news/201504/28093555.html, Apr. 28, 2015, 3 pages (Official Copy Only). {See Communication under Rule 37 CFR § 1.98(a) (3)}.
"Window confirm()", Online available at: https://www.w3schools.com/jsref/met_win_confirm.asp, 2014, 5 pages.
Xiaokai,"Apple senior executive", Apple Watch mobile payment is convenient and fast, Available online at: https://it.hebei.com.cn/system/2015/03/09/015101153.shtml, Mar. 9, 2015, 2 pages (Official Copy Only). {See Communication under Rule 37 CFR § 1.98(a) (3)}.
203942537, CN, U, Cited by the Chinese Patent Office in an Office Action for related Patent Application No. 202210384721.1 on May 23, 2024.
104331796, CN, A, Cited by the Chinese Patent Office in an Office Action for related Patent Application No. 202210384721.1 on May 23, 2024.
104574054, CN, A, Cited by the Chinese Patent Office in an Office Action for related Patent Application No. 202210384721.1 on May 23, 2024.
104994106, CN, A, Cited by the Chinese Patent Office in an Office Action for related Patent Application No. 202210384721.1 on May 23, 2024.
105373920, CN, A, Cited by the Chinese Patent Office in an Office Action for related Patent Application No. 202210384721.1 on May 23, 2024.
205267230, CN, U, Cited by the Chinese Patent Office in an Office Action for related Patent Application No. 202210384721.1 on May 23, 2024.
105654286, CN, A, Cited by the Chinese Patent Office in an Office Action for related Patent Application No. 202210384721.1 on May 23, 2024.
105654287, CN, A, Cited by the Chinese Patent Office in an Office Action for related Patent Application No. 202210384721.1 on May 23, 2024.
weifeng.com, "Install and use Apple Pay on your Apple Watch", Available online at: https://www.mpaypass.com.cn/news/201504/28093555.html, Apr. 28, 2015, 3 pages, Cited by the Chinese Patent Office in an Office Action for related Patent Application No. 202210384721.1 on May 23, 2024.
Xiaokai, "Apple senior executive", Apple Watch mobile payment is convenient and fast, Available online at: https://it.hebei.com.cn/system/2015/03/09/015101153.shtml, Mar. 9, 2015, 2 pages, Cited by the Chinese Patent Office in an Office Action for related Patent Application No. 202210384721.1 on May 23, 2024.

(56) References Cited

OTHER PUBLICATIONS

Advisory Action received for U.S. Appl. No. 17/479,974, mailed on Apr. 25, 2024, 4 pages.

Applicant-Initiated Interview Summary received for U.S. Appl. No. 16/259,954, mailed on Mar. 23, 2020, 3 pages.

Applicant-Initiated Interview Summary received for U.S. Appl. No. 17/013,778, mailed on Feb. 28, 2022, 2 pages.

Applicant-Initiated Interview Summary received for U.S. Appl. No. 17/978,930, mailed on Apr. 26, 2024, 4 pages.

Board Decision received for Chinese Patent Application No. 201580046788.2, mailed on Jun. 6, 2022, 17 pages (1 page of English Translation and 16 pages of Official Copy).

Board Decision received for Chinese Patent Application No. 201580046788.2, mailed on Dec. 29, 2021, 10 pages (4 pages of English Translation and 6 pages of Official Copy).

Brief Communication Regarding Oral Proceedings received for European Patent Application No. 15760008.1, mailed on Sep. 13, 2021, 8 pages.

Corrected Notice of Allowance received for U.S. Appl. No. 14/841,614, mailed on Jan. 8, 2019, 3 pages.

Corrected Notice of Allowance received for U.S. Appl. No. 17/013,778, mailed on Mar. 7, 2023, 5 pages.

Decision to Grant received for European Patent Application No. 15760008.1, mailed on Aug. 11, 2022, 2 pages.

Examiner's Answer to Appeal Brief received for U.S. Appl. No. 17/013,778, mailed on Dec. 20, 2022, 9 pages.

Extended European Search Report received for European Patent Application No. 22169639.6, mailed on Jul. 19, 2022, 14 pages.

Extended European Search Report received for European Patent Application No. 23158566.2, mailed on Jun. 14, 2023, 10 pages.

Final Office Action received for U.S. Appl. No. 14/841,614, mailed on May 10, 2018, 13 pages.

Final Office Action received for U.S. Appl. No. 14/841,623, mailed on Sep. 5, 2017, 16 pages.

Final Office Action received for U.S. Appl. No. 17/013,778, mailed on Apr. 1, 2022, 11 pages.

Intention to Grant received for European Patent Application No. 15760008.1, mailed on Apr. 6, 2022, 11 pages.

Intention to Grant received for European Patent Application No. 15760008.1, mailed on Oct. 5, 2021, 11 pages.

International Preliminary Report on Patentability received for PCT Patent Application No. PCT/US2015/046787, mailed on Mar. 16, 2317, 19 pages.

International Search Report and Written Opinion received for PCT Patent Application No. PCT/US2015/046787, mailed on Apr. 1, 2015, 26 pages.

Invitation to Pay Additional Fees received for PCT Patent Application No. PCT/US2015/046787, mailed on Dec. 15, 2015, 8 pages.

IPhone, "User Guide for iOS 7.1 Software", Mar. 2014, 6 pages.

Minutes of the Oral Proceedings received for European Patent Application No. 15760008.1, mailed on Sep. 21, 2021, 6 pages.

Non-Final Office Action received for U.S. Appl. No. 17/013,778, mailed on Aug. 20, 2021, 9 pages.

Non-Final Office Action received for U.S. Appl. No. 14/841,608, mailed on Apr. 12, 2017, 9 pages.

Non-Final Office Action received for U.S. Appl. No. 14/841,614, mailed on Jul. 27, 2017, 13 pages.

Non-Final Office Action received for U.S. Appl. No. 14/841,623, mailed on Feb. 2, 17 pages.

Non-Final Office Action received for U.S. Appl. No. 16/259,954, mailed on Feb. 5, 2020, 10 pages.

Non-Final Office Action received for U.S. Appl. No. 17/013,778, mailed on Dec. 9, 2021, 11 pages.

Non-Final Office received for U.S. Appl. No. 18/200,480, mailed on Feb. 29, 2024, 16 pages.

Non-Final Office Action received for U.S. Appl. No. 18/200,480, mailed on Mar. 6, 2024. 1 pages.

Notice of Acceptance received for Australian Patent Application No. 2023204396, mailed on Apr. 15, 2024, 3 pages.

Notice of Allowance received for Taiwanese Patent Application No. 104128519, mailed on Nov. 20, 2017, 5 pages (2 page of English Translation and 3 pages of Official Copy).

Notice of Allowance received for U.S. Appl. No. 14/841,608, mailed on Nov. 14, 2017, 5 pages.

Notice of Allowance received for U.S. Appl. No. 14/841,614, mailed on Oct. 24, 2018, 10 pages.

Notice of Allowence received for U.S. Appl. No. 14/841,623, mailed on Feb. 23, 2018, 8 pages.

Notice of Allowance received for U.S. Appl. No. 16/259,954, mailed on May 7, 2020, 9 pages.

Notice of Allowance received for U.S. Appl. No. 17/013,778, mailed on Feb. 23, 2023, 8 pages.

Office Action received for Australian Patent Application No. 2022218517, mailed on Apr. 24, 2024, 4 pages.

Office Action received for Chinese Patent Application No. 201580046788.2, mailed on Apr. 15, 2018, 13 pages (6 pages of English Translation and 7 pages of Official Copy).

Office Action received for Chinese Patent Application No. 201580040788.2. mailed on Feb. 25, 2020, 14 pages (7 pages of English Translation and 7 pages of Official Copy).

Office Action received for Chinese Patent Application No. 201580046788.2, mailed on Mar. 25, 2021, 9 pages (4 pages of English Translation and 5 pages of Official Copy).

Office Action received for Chinese Patent Application No. 201580046788.2, mailed on Sep. 22, 2020, 10 pages (5 pages of English Translation and 5 pages of Official Copy).

Office Action received for Chinese Patent Application No. 202080039832.8, mailed on Mar. 23, 2024, 22 pages (12 pages of English Translation and 10 pages of Official Copy).

Office Action received for Chinese Patent Application No. 202211081603.X, mailed on Jan. 10, 2024, 10 pages (5 pages of English Translation and 5 pages of Official Copy).

Office Action received for Chinese Patent Application No. 202211081603.X, mailed on Oct. 20, 2023, 15 pages (7 pages of English Translation and 8 pages of Official Copy).

Office Action received for Chinese Patent Application No. 202211096369.8, mailed on Sep. 29, 2023, 13 pages (6 pages of English Translation and 7 pages of Official Copy).

Office Action received for Chinese Patent Application No. 202211110081.1. mailed on Jan. 8, 2024, 14 pages (6 pages of English Translation and 8 pages of Official Copy).

Office Action received for Chinese Patent Application No. 202111110081.1, mailed on Oct. 13, 2023. 16 pages (7 pages of English Translation and 9 pages of Official Copy).

Office Action received for European Patent Application No. 15760008.1, mailed on Jul. 16, 2019, 9 pages.

Office Action received for European Patent Application No. 23158566.2, mailed on Apr. 9, 2024, 7 pages.

Office Action received for Indian Patent Application No. 202118049678, mailed on Apr. 18, 2024, 8 pages.

Office Action received for Japanese Patent Application No. 2022-149476 mailed on Apr. 22, 2024, 8 pages (4 pages of English Translation and 4 pages of Official Copy).

Office Action received for Taiwanese Patent Application No. 104128519, mailed on Mar. 29, 2017, 16 pages (7 pages of English Translation and 9 pages of Official Copy).

Result of Consultation received for European Patent Application No. 15760008.1, mailed on Sep. 9, 2021, 7 pages.

Result of Consultation received for European Patent Application No. 20720310.0, mailed on Apr. 17, 2024, 9 pages.

Samsung, "SM-G900F User Manual", English (EU). Rev.1.0, Mar. 2014, 249 pages.

Sony, "Sony Smartwatch 3 SWR50", User Guide, Jul. 2014, 31 pages.

Summons to Attend Oral Proceedings received for European Patent Application No. 15760008.1, mailed on Feb. 5, 2021, 11 pages.

Supplemental Notice of Allowance received for U.S. Appl. No. 14/841,608, mailed on Jan. 25, 2018, 2 pages.

Intention to Grant received for European Patent Application No. 20720310.0, mailed on Oct. 7, 2024, 14 pages.

Intention to Grant received for European Patent Application No. 23158566.2, mailed on Sep. 30, 2024, 8 pages.

(56) References Cited

OTHER PUBLICATIONS

Notice of Acceptance received for Australian Patent Application No. 2023266353, mailed on Oct. 1, 2024, 3 pages.

Notice of Allowance received for U.S. Appl. No. 17/848,845, mailed on Oct. 11, 2024, 26 pages.

Notice of Allowance received for U.S. Appl. No. 18/234,613, mailed on Oct. 11, 2024, 10 pages.

Office Action received for Australian Patent Application No. 2024200283, mailed on Oct. 8, 2024, 2 pages.

Szogyenyi Zina, "Improving the usability of multi-selecting from a long list", Available online at: https://medium.com/tripaneer-techblog/improving-the-usability-of-multi-selecting-from-a-long-list-63e1a67aab35, Jun. 13, 2018, 12 pages.

Applicant-Initiated Interview Summary received for U.S. Appl. No. 18/228,597, mailed on Apr. 1, 2025, 5 pages.

Decision to Grant received for European Patent Application No. 23168537.1, mailed on Mar. 20, 2025, 4 pages.

Intention to Grant received for European Patent Application No. 23158566.2, mailed on Mar. 19, 2025, 9 pages.

International Preliminary Report on Patentability received for PCT Patent Application No. PCT/US2023/032084, mailed on Mar. 20, 2025, 7 pages.

Office Action received for European Patent Application No. 22188377.0, mailed on Mar. 17, 2025, 6 pages.

Office Action received for European Patent Application No. 22786636.5, mailed on Mar. 26, 2025, 6 pages.

Office Action received for European Patent Application No. 23191379.9, mailed on Mar. 24, 2025, 6 pages.

Corrected Notice of Allowance received for U.S. Appl. No. 18/234,613, mailed on Oct. 28, 2024, 2 pages.

Examiner's Answer to Appeal Brief received for U.S. Appl. No. 17/479,974, mailed on Oct. 24, 2024, 18 pages.

Intention to Grant received for European Patent Application No. 21197457.1, mailed on Oct. 24, 2024, 12 pages.

International Preliminary Report on Patentability received for PCT Patent Application No. PCT/US2023/017280, mailed on Oct. 17, 2024, 15 pages.

Non-Final Office Action received for U.S. Appl. No. 17/991,708, mailed on Oct. 22, 2024, 20 pages.

Notice of Allowance received for Chinese Patent Application No. 202010728844.3, mailed on Sep. 29, 2024, 2 pages (1 page of English Translation and 1 page of Official Copy).

Office Action received for Australian Patent Application No. 2023201057, mailed on Oct. 24, 2024, 3 pages.

Office Action received for European Patent Application No. 22737681.1, mailed on Oct. 18, 2024, 10 pages.

Prabeesh, RK. , "Android Studio Tutorial—17—Highlight selected item in a ListView", Available Online at: https://www.youtube.com/watch?v=W6bBYmXP0HY, Feb. 24, 2015, 5 pages.

Applicant-Initiated Interview Summary received for U.S. Appl. No. 18/228,597, mailed on Jan. 29, 2025, 4 pages.

Extended European Search Report received for European Patent Application No. 24208135.4, mailed on Jan. 21, 2025, 13 pages.

Intention to Grant received for European Patent Application No. 22201007.6, mailed on Jan. 29, 2025, 9 pages.

Office Action received for Australian Patent Application No. 2023201057, mailed on Jan. 28, 2025, 3 pages.

Office Action received for Australian Patent Application No. 2024278098, mailed on Jan. 22, 2025, 3 pages.

Office Action received for Chinese Patent Application No. 202110894284.3, mailed on Jan. 10, 2025, 9 pages (4 pages of English Translation and 5 pages of Official Copy).

Office Action received for European Patent Application No. 23190753.6, mailed on Jan. 30, 2025, 9 pages.

Corrected Notice of Allowance received for U.S. Appl. No. 18/234,613, mailed on Jan. 10, 2025, 5 pages.

Decision to Grant received for European Patent Application No. 21197457.1, mailed on Jan. 7, 2025, 4 pages.

Final Office Action received for U.S. Appl. No. 18/228,597, mailed on Jan. 8, 2025, 19 pages.

Intention to Grant received for European Patent Application No. 24164409.5, mailed on Jan. 14, 2025, 8 pages.

Notice of Allowance received for Chinese Patent Application No. 202311305998.1, mailed on Jan. 2, 2025, 2 pages (1 page of English Translation and 1 page of Official Copy).

Notice of Allowance received for Chinese Patent Application No. 202311312328.2, mailed on Jan. 3, 2025, 2 pages (1 page of English Translation and 1 page of Official Copy).

Applicant-Initiated Interview Summary received for U.S. Appl. No. 18/383,371, mailed on Jul. 10, 2025, 2 pages.

Decision on Appeal received for U.S. Appl. No. 17/479,974, mailed on Jul. 8, 2025, 14 pages.

Decision to Grant received for European Patent Application No. 22201007.6, mailed on Jul. 17, 2025, 4 pages.

Extended European Search Report received for European Patent Application No. 25174339.9, mailed on Jun. 26, 2025, 9 pages.

Intention to Grant received for European Patent Application No. 22737681.1, mailed on Jul. 9, 2025, 8 pages.

Notice of Allowance received for Japanese Patent Application No. 2023-077990, mailed on Jul. 7, 2025, 4 pages (1 page of English Translation and 3 pages of Official Copy).

Office Action received for Australian Patent Application No. 2024202748, mailed on Jul. 4, 2025, 4 pages.

Office Action received for Chinese Patent Application No. 202411716388.5, mailed on Jun. 8, 2025, 14 pages (7 pages of English Translation and 7 pages of Official Copy).

Record of Oral Hearing received for U.S. Appl. No. 17/479,974, mailed on Jul. 3, 2025, 17 pages.

Intention to Grant received for European Patent Application No. 21789897.2, mailed on Feb. 13, 2025, 8 pages.

Notice of Allowance received for U.S. Appl. No. 17/970,417, mailed on Feb. 5, 2025, 6 pages.

Office Action received for European Patent Application No. 22737681.1, mailed on Feb. 6, 2025. 9 pages.

Megasafetyfirst, "How to pair Bluetooth Headphones to your TV / SmartTV / Television (How to)", XP093245538, Available online at: https://www.youtube.com/watch?v=19VNMySYouY, Feb. 15, 2020, 2 pages.

"13 questions and answers about using Apple Pay online", Online available at: http://www.it528.com/apple/1356.html, Feb. 18, 2016, 5 pages (Official Copy Only) {See Communication Under 37 CFR § 1.98(a) (3)}.

Advisory Action received for U.S. Appl. No. 13/038,217, mailed on Dec. 8, 2014, 3 pages.

Advisory Action received for U.S. Appl. No. 13/587,850, mailed on May 15, 2015, 2 pages.

Advisory Action received for U.S. Appl. No. 14/863,099, mailed on Sep. 8, 2016, 3 pages.

Advisory Action received for U.S. Appl. No. 15/730,610, mailed on Oct. 24, 2019, 5 pages.

Advisory Action received for U.S. Appl. No. 16/422,736, mailed on Mar. 12, 2021, 3 pages.

Advisory Action received for U.S. Appl. No. 16/583,989, mailed on Sep. 22, 2020, 5 pages.

Advisory Action received for U.S. Appl. No. 17/181,089, mailed on Dec. 20, 2022, 4 pages.

Advisory Action received for U.S. Appl. No. 17/747,804, mailed on Jun. 23, 2023, 6 pages.

Advisory Action received for U.S. Appl. No. 15/250,152, mailed on Mar. 25, 2019, 5 pages.

Applicant-Initiated Interview Summary received for U.S. Appl. No. 14/641,304, mailed on Dec. 2, 2019, 5 pages.

Applicant-Initiated Interview Summary received for U.S. Appl. No. 14/641,304, mailed on Jul. 28, 2020, 5 pages.

Applicant-Initiated Interview Summary received for U.S. Appl. No. 15/433,320, mailed on Feb. 11, 2020, 5 pages.

Applicant-Initiated Interview Summary received for U.S. Appl. No. 16/583,989, mailed on Aug. 3, 2020, 6 pages.

Applicant-Initiated Interview Summary received for U.S. Appl. No. 16/583,989, mailed on Mar. 25, 2020, 4 pages.

Applicant-Initiated Interview Summary received for U.S. Appl. No. 16/583,994, mailed on Apr. 3, 2020, 5 pages.

(56) References Cited

OTHER PUBLICATIONS

Applicant-Initiated Interview Summary received for U.S. Appl. No. 16/584,490, mailed on Jul. 28, 2020, 4 pages.

Applicant-Initiated Interview Summary received for U.S. Appl. No. 16/702,968, mailed on Jul. 1, 2020, 5 pages.

Applicant-Initiated Interview Summary received for U.S. Appl. No. 17/176,908, mailed on Jun. 14, 2022, 6 pages.

Applicant-Initiated Interview Summary received for U.S. Appl. No. 17/666,971, mailed on Jun. 9, 2023, 2 pages.

Applicant-Initiated Interview Summary received for U.S. Appl. No. 17/824,510, mailed on Jun. 16, 2023, 4 pages.

Applicant-Initiated Interview Summary received for U.S. Appl. No. 15/433,320, mailed on Nov. 25, 2020, 4 pages.

Applicant-Initiated Interview Summary received for U.S. Appl. No. 15/730,610, mailed on Aug. 25, 2020, 6 pages.

Applicant-Initiated Interview Summary received for U.S. Appl. No. 15/910,263, mailed on Nov. 18, 2020, 6 pages.

Applicant-Initiated Interview Summary received for U.S. Appl. No. 16/422,736, mailed on Feb. 24, 2021, 3 pages.

Applicant-Initiated Interview Summary received for U.S. Appl. No. 16/422,736, mailed on Sep. 28, 2020, 3 pages.

Applicant-Initiated Interview Summary received for U.S. Appl. No. 16/583,981, mailed on Mar. 9, 2020, 5 pages.

Applicant-Initiated Interview Summary received for U.S. Appl. No. 16/583,981, mailed on Sep. 14, 2020, 6 pages.

Applicant-Initiated Interview Summary received for U.S. Appl. No. 16/583,994, mailed on May 28, 2021, 5 pages.

Applicant-Initiated Interview Summary received for U.S. Appl. No. 16/583,994, mailed on Nov. 24, 2020, 4 pages.

Applicant-Initiated Interview Summary received for U.S. Appl. No. 16/584,490, mailed on Jan. 31, 2020, 4 pages.

Applicant-Initiated Interview Summary received for U.S. Appl. No. 16/584,743, mailed on May 1, 2020, 5 pages.

Applicant-Initiated Interview Summary received for U.S. Appl. No. 16/586,002, mailed on Apr. 28, 2020, 5 pages.

Applicant-Initiated Interview Summary received for U.S. Appl. No. 16/670,949, mailed on Apr. 6, 2021, 2 pages.

Applicant-Initiated Interview Summary received for U.S. Appl. No. 16/679,967, mailed on Feb. 10, 2022, 2 pages.

Applicant-Initiated Interview Summary received for U.S. Appl. No. 16/679,967, mailed on Jun. 1, 2022, 2 pages.

Applicant-Initiated Interview Summary received for U.S. Appl. No. 16/679,967, mailed on Oct. 25, 2021, 2 pages.

Applicant-Initiated Interview Summary received for U.S. Appl. No. 16/702,968, mailed on Sep. 28, 2020, 6 pages.

Applicant-Initiated Interview Summary received for U.S. Appl. No. 16/723,583, mailed on Dec. 28, 2020, 6 pages.

Applicant-Initiated Interview Summary received for U.S. Appl. No. 16/803,849, mailed on Aug. 21, 2020, 5 pages.

Applicant-Initiated Interview Summary received for U.S. Appl. No. 16/803,849, mailed on Dec. 21, 2020, 5 pages.

Applicant-Initiated Interview Summary received for U.S. Appl. No. 16/803,849, mailed on Feb. 28, 2022, 9 pages.

Applicant-Initiated Interview Summary received for U.S. Appl. No. 16/803,849, mailed on Oct. 12, 2021, 6 pages.

Applicant-Initiated Interview Summary received for U.S. Appl. No. 16/807,604, mailed on Dec. 21, 2020, 7 pages.

Applicant-Initiated Interview Summary received for U.S. Appl. No. 16/807,604, mailed on Jul. 24, 2020, 5 pages.

Applicant-Initiated Interview Summary received for U.S. Appl. No. 16/836,571, mailed on Jul. 7, 2021, 6 pages.

Applicant-Initiated Interview Summary received for U.S. Appl. No. 16/922,675, mailed on Dec. 16, 2020, 3 pages.

Applicant-Initiated Interview Summary received for U.S. Appl. No. 16/922,675, mailed on Nov. 2, 2020, 3 pages.

Applicant-Initiated Interview Summary received for U.S. Appl. No. 16/922,675, mailed on Nov. 15, 2022, 2 pages.

Applicant-Initiated Interview Summary received for U.S. Appl. No. 16/922,675, mailed on Sep. 3, 2021, 2 pages.

Applicant-Initiated Interview Summary received for U.S. Appl. No. 17/026,818, mailed on Dec. 15, 2020, 7 pages.

Applicant-Initiated Interview Summary received for U.S. Appl. No. 17/026,818, mailed on Mar. 8, 2021, 4 pages.

Applicant-Initiated Interview Summary received for U.S. Appl. No. 17/031,833, mailed on Dec. 21, 2020, 5 pages.

Applicant-Initiated Interview Summary received for U.S. Appl. No. 17/031,833, mailed on May 24, 2021, 6 pages.

Applicant-Initiated Interview Summary received for U.S. Appl. No. 17/168,069, mailed on Nov. 17, 2021, 2 pages.

Applicant-Initiated Interview Summary received for U.S. Appl. No. 17/181,089, mailed on Apr. 7, 2023, 5 pages.

Applicant-Initiated Interview Summary received for U.S. Appl. No. 17/181,089, mailed on May 16, 2023, 4 pages.

Applicant-Initiated Interview Summary received for U.S. Appl. No. 17/181,089, mailed on Nov. 22, 2022, 3 pages.

Applicant-Initiated Interview Summary received for U.S. Appl. No. 17/181,089, mailed on Oct. 7, 2022, 4 pages.

Applicant-Initiated Interview Summary received for U.S. Appl. No. 17/223,794, mailed on Sep. 7, 2021, 3 pages.

Applicant-Initiated Interview Summary received for U.S. Appl. No. 17/306,354, mailed on Jun. 28, 2023, 3 pages.

Applicant-Initiated Interview Summary received for U.S. Appl. No. 17/314,948, mailed on Oct. 21, 2022, 6 pages.

Applicant-Initiated Interview Summary received for U.S. Appl. No. 17/320,900, mailed on Apr. 17, 2023, 4 pages.

Applicant-Initiated Interview Summary received for U.S. Appl. No. 17/461,103, mailed on Jan. 26, 2022, 6 pages.

Applicant-Initiated Interview Summary received for U.S. Appl. No. 17/476,404, mailed on Dec. 20, 2022, 2 pages.

Applicant-Initiated Interview Summary received for U.S. Appl. No. 17/476,404, mailed on Jul. 27, 2022, 6 pages.

Applicant-Initiated Interview Summary received for U.S. Appl. No. 17/476,404, mailed on Jun. 2, 2023, 2 pages.

Applicant-Initiated Interview Summary received for U.S. Appl. No. 17/476,404, mailed on Mar. 18, 2022, 2 pages.

Applicant-Initiated Interview Summary received for U.S. Appl. No. 17/479,974, mailed on Apr. 4, 2023, 2 pages.

Applicant-Initiated Interview Summary received for U.S. Appl. No. 17/479,974, mailed on Jul. 21, 2023, 2 pages.

Applicant-Initiated Interview Summary received for U.S. Appl. No. 17/509,356, mailed on Feb. 3, 2023, 3 pages.

Applicant-Initiated Interview Summary received for U.S. Appl. No. 17/747,804, mailed on Mar. 17, 2023, 4 pages.

Applicant-Initiated Interview Summary received for U.S. Appl. No. 17/747,804, mailed on May 31, 2023, 4 pages.

Applicant-Initiated Interview Summary received for U.S. Appl. No. 17/752,582, mailed on Apr. 17, 2023, 3 pages.

Applicant-Initiated Interview Summary received for U.S. Appl. No. 17/867,317, mailed on May 30, 2023, 4 pages.

Board Decision received for Chinese Patent Application No. 201510288981.9, mailed on May 6, 2021, 31 pages (3 pages of English Translation and 28 pages of Official Copy).

Board Decision received for Chinese Patent Application No. 201580043701.6, mailed on Aug. 19, 2021, 2 pages (1 page of English Translation and 1 page of Official Copy).

Board Decision received for Chinese Patent Application No. 201810338826.7, mailed on May 30, 2022, 20 pages (2 pages of English Translation and 18 pages of Official Copy).

Board Decision received for Chinese Patent Application No. 201811367893.8, mailed on Aug. 25, 2022, 2 pages (1 page of English Translation and 1 page of Official Copy).

Board Opinion received for Chinese Patent Application No. 201510288981.9, mailed on Jan. 4, 2021, 21 pages (9 pages of English Translation and 12 pages of Official Copy).

Board Opinion received for Chinese Patent Application No. 201810338826.7, mailed on Jan. 19, 2022, 18 pages (6 pages of English Translation and 12 pages of Official Copy).

Brief Communication Regarding Oral Proceedings received for European Patent Application No. 17799904.2, mailed on Sep. 13, 2022, 1 page.

(56) References Cited

OTHER PUBLICATIONS

Brief Communication Regarding Oral Proceedings received for European Patent Application No. 17813737.8, mailed on Sep. 19, 2022, 1 page.

Brief Communication Regarding Oral Proceedings received for European Patent Application No. 18197583.0, mailed on Feb. 18, 2021, 2 pages.

Brief Communication Regarding Oral Proceedings received for European Patent Application No. 18728002.9, mailed on Dec. 7, 2022, 1 page.

Brief Communication Regarding Oral Proceedings received for European Patent Application No. 18728002.9, mailed on Nov. 28, 2022, 7 pages.

Brief Communication Regarding Oral Proceedings received for European Patent Application No. 19150528.8, mailed on Sep. 05, 2022, 2 pages.

Brief Communication Regarding Oral Proceedings received for European Patent Application No. 19169980.0, mailed on Jun. 17, 2021, 2 pages.

Brief Communication Regarding Oral Proceedings received for European Patent Application No. 20158824.1, mailed on May 30, 2022, 1 page.

Certificate of Examination received for Australian Patent Application No. 2017100553, mailed on Jan. 17, 2018, 2 pages.

Certificate of Examination received for Australian Patent Application No. 2018101014, mailed on Mar. 20, 2019, 2 pages.

Corrected Notice of Allowance received for U.S. Appl. No. 13/587,850, mailed on Apr. 1, 2020, 2 pages.

Corrected Notice of Allowance received for U.S. Appl. No. 13/587,850, mailed on Mar. 23, 2020, 2 pages.

Corrected Notice of Allowance received for U.S. Appl. No. 14/641,298, mailed on Dec. 9, 2021, 5 pages.

Corrected Notice of Allowance received for U.S. Appl. No. 14/719,217, mailed on Apr. 22, 2019, 2 pages.

Corrected Notice of Allowance received for U.S. Appl. No. 14/719,217, mailed on Mar. 20, 2019, 2 pages.

Corrected Notice of Allowance received for U.S. Appl. No. 15/269,801, mailed on Oct. 3, 2017, 4 pages.

Corrected Notice of Allowance received for U.S. Appl. No. 15/730,610, mailed on Nov. 27, 2020, 3 pages.

Corrected Notice of Allowance received for U.S. Appl. No. 15/845,794, mailed on Feb. 25, 2019, 2 pages.

Corrected Notice of Allowance received for U.S. Appl. No. 15/910,263, mailed on Feb. 10, 2021, 3 pages.

Corrected Notice of Allowance received for U.S. Appl. No. 15/910,263, mailed on Mar. 17, 2021, 3 pages.

Corrected Notice of Allowance received for U.S. Appl. No. 15/910,263, mailed on Mar. 18, 2021, 3 pages.

Corrected Notice of Allowance received for U.S. Appl. No. 15/952,736, mailed on Nov. 19, 2018, 2 pages.

Corrected Notice of Allowance received for U.S. Appl. No. 16/229,959, mailed on Mar. 3, 2020, 3 pages.

Corrected Notice of Allowance received for U.S. Appl. No. 16/422,736, mailed on Jul. 9, 2021, 2 pages.

Corrected Notice of Allowance received for U.S. Appl. No. 16/434,865, mailed on Apr. 28, 2020, 2 pages.

Corrected Notice of Allowance received for U.S. Appl. No. 16/434,865, mailed on Jun. 4, 2020, 2 pages.

Corrected Notice of Allowance received for U.S. Appl. No. 16/583,981, mailed on Apr. 6, 2021, 3 pages.

Corrected Notice of Allowance received for U.S. Appl. No. 16/583,981, mailed on May 17, 2021, 3 pages.

Corrected Notice of Allowance received for U.S. Appl. No. 16/583,994, mailed on Jul. 6, 2021, 3 pages.

Corrected Notice of Allowance received for U.S. Appl. No. 16/584,743, mailed on Dec. 30, 2020, 3 pages.

Corrected Notice of Allowance received for U.S. Appl. No. 16/670,949, mailed on Sep. 8, 2021, 2 pages.

Corrected Notice of Allowance received for U.S. Appl. No. 16/702,968, mailed on Jun. 8, 2021, 3 pages.

Corrected Notice of Allowance received for U.S. Appl. No. 16/702,968, mailed on Jun. 16, 2021, 4 pages.

Corrected Notice of Allowance received for U.S. Appl. No. 16/702,968, mailed on Jun. 28, 2021, 4 pages.

Corrected Notice of Allowance received for U.S. Appl. No. 16/702,968, mailed on May 26, 2021, 4 pages.

Corrected Notice of Allowance received for U.S. Appl. No. 16/702,968, mailed on May 28, 2021, 4 pages.

Corrected Notice of Allowance received for U.S. Appl. No. 16/803,849, mailed on Jul. 7, 2022, 3 pages.

Corrected Notice of Allowance received for U.S. Appl. No. 16/803,849, mailed on Jun. 8, 2022, 3 pages.

Corrected Notice of Allowance received for U.S. Appl. No. 16/807,604, mailed on Jul. 26, 2021, 3 pages.

Corrected Notice of Allowance received for U.S. Appl. No. 16/807,604, mailed on Jun. 28, 2021, 3 pages.

Corrected Notice of Allowance received for U.S. Appl. No. 16/807,604, mailed on May 28, 2021, 3 pages.

Corrected Notice of Allowance received for U.S. Appl. No. 16/807,604, mailed on Oct. 4, 2021, 5 pages.

Corrected Notice of Allowance received for U.S. Appl. No. 16/807,604, mailed on Oct. 14, 2021, 3 pages.

Corrected Notice of Allowance received for U.S. Appl. No. 16/807,604, mailed on Oct. 22, 2021, 3 pages.

Corrected Notice of Allowance received for U.S. Appl. No. 16/836,571, mailed on Dec. 6, 2021, 5 pages.

Corrected Notice of Allowance received for U.S. Appl. No. 16/836,571, mailed on Mar. 25, 2022, 2 pages.

Corrected Notice of Allowance received for U.S. Appl. No. 16/836,571, mailed on Nov. 4, 2021, 4 pages.

Corrected Notice of Allowance received for U.S. Appl. No. 16/836,571, mailed on Nov. 18, 2021, 3 pages.

Corrected Notice of Allowance received for U.S. Appl. No. 16/836,571, mailed on Oct. 12, 2021, 4 pages.

Corrected Notice of Allowance received for U.S. Appl. No. 16/921,551, mailed on Feb. 9, 2022, 2 pages.

Corrected Notice of Allowance received for U.S. Appl. No. 16/921,551, mailed on Jan. 26, 2022, 3 pages.

Corrected Notice of Allowance received for U.S. Appl. No. 16/922,675, mailed on Apr. 14, 2023, 6 pages.

Corrected Notice of Allowance received for U.S. Appl. No. 16/922,675, mailed on Jan. 9, 2023, 3 pages.

Corrected Notice of Allowance received for U.S. Appl. No. 16/922,675, mailed on Jan. 20, 2023, 3 pages.

Corrected Notice of Allowance received for U.S. Appl. No. 16/922,675, mailed on Mar. 4, 2022, 6 pages.

Corrected Notice of Allowance received for U.S. Appl. No. 16/987,003, mailed on Sep. 1, 2021, 3 pages.

Corrected Notice of Allowance received for U.S. Appl. No. 17/019,845, mailed on Aug. 7, 2023, 4 pages.

Corrected Notice of Allowance received for U.S. Appl. No. 17/027,373, mailed on Jul. 12, 2022, 2 pages.

Corrected Notice of Allowance received for U.S. Appl. No. 17/027,373, mailed on Oct. 26, 2022, 2 pages.

Corrected Notice of Allowance received for U.S. Appl. No. 17/031,833, mailed on Aug. 2, 2021, 3 pages.

Corrected Notice of Allowance received for U.S. Appl. No. 17/168,069, mailed on Feb. 9, 2022, 2 pages.

Corrected Notice of Allowance received for U.S. Appl. No. 17/461,103, mailed on Apr. 14, 2022, 2 pages.

Corrected Notice of Allowance received for U.S. Appl. No. 17/461,103, mailed on Aug. 3, 2022, 2 pages.

Corrected Notice of Allowance received for U.S. Appl. No. 17/461,103, mailed on May 10, 2022, 2 pages.

Corrected Notice of Allowance received for U.S. Appl. No. 17/509,356, mailed on Jun. 13, 2023, 2 pages.

Corrected Notice of Allowance received for U.S. Appl. No. 17/509,356, mailed on May 24, 2023, 2 pages.

Corrected Notice of Allowance received for U.S. Appl. No. 17/752,582, mailed on Jul. 17, 2023, 3 pages.

Corrected Notice of Allowance received for U.S. Appl. No. 17/848,845, mailed on Aug. 9, 2023, 4 pages.

(56)                References Cited

OTHER PUBLICATIONS

Corrected Notice of Allowance received for U.S. Appl. No. 17/848,845, mailed on Aug. 28, 2023, 3 pages.
Corrected Notice of Allowance received for U.S. Appl. No. 18/077,905, mailed on Apr. 10, 2023, 2 pages.
Corrected Notice of Allowance received for U.S. Appl. No. 18/077,905, mailed on Apr. 19, 2023, 2 pages.
Corrected Notice of Allowance received for U.S. Appl. No. 18/077,905, mailed on Apr. 26, 2023, 3 pages.
Corrected Notice of Allowance received for U.S. Appl. No. 18/077,905, mailed on May 4, 2023, 2 pages.
"Customize Notifications and Content on Your Galaxy Phone's Lock Screen", Online Available at: https://www.samsung.com/us/support/answer/ANS00062636, Oct. 4, 2017, 5 pages.
Decision on Appeal received for U.S. Appl. No. 13/587,850, mailed on Aug. 28, 2019, 21 pages.
Decision on Appeal received for U.S. Appl. No. 13/587,850, mailed on Oct. 21, 2019, 3 pages.
Decision on Appeal received for U.S. Appl. No. 14/641,298, mailed on Nov. 1, 2021, 9 pages.
Decision on Appeal received for U.S. Appl. No. 14/774,664, mailed on Sep. 12, 2019, 8 pages.
Decision on Appeal received for U.S. Appl. No. 14/863,099, mailed on Aug. 22, 2019, 9 pages.
Decision on Appeal received for U.S. Appl. No. 15/128,952, mailed on Dec. 28, 2020, 23 pages.
Decision on Opposition received for Australian Patent Application No. 2018271366, mailed on Mar. 3, 2023, 3 pages.
Decision to Grant received for Danish Patent Application No. PA201670628, mailed on Nov. 20, 2017, 2 pages.
Decision to Grant received for Danish Patent Application No. PA201770392, mailed on Oct. 24, 2018, 2 pages.
Decision to Grant received for Danish Patent Application No. PA201770401, mailed on Oct. 24, 2018, 2 pages.
Decision to Grant received for Danish Patent Application No. PA201770403, mailed on Oct. 24, 2018, 2 pages.
Decision to Grant received for Danish Patent Application No. PA201770404, mailed on Nov. 11, 2019, 3 pages.
Decision to Grant received for Danish Patent Application No. PA201770406, mailed on May 15, 2020, 2 pages.
Decision to Grant received for Danish Patent Application No. PA201770782, mailed on Oct. 25, 2019, 2 pages.
Decision to Grant received for Danish Patent Application No. PA202070560, mailed on Oct. 21, 2021, 2 pages.
Decision to Grant received for Danish Patent Application No. PA202170320, mailed on Nov. 10, 2022, 2 pages.
Decision to Grant received for Danish Patent Application No. PA202270464, mailed on May 9, 2023, 1 page.
Decision to Grant received for European Patent Application No. 12773460.6, mailed on Jun. 27, 2019, 2 pages.
Decision to Grant received for European Patent Application No. 13171047.7, mailed on Jun. 27, 2019, 2 pages.
Decision to Grant received for European Patent Application No. 15711969.4, mailed on Sep. 26, 2019, 2 pages.
Decision to Grant received for European Patent Application No. 15713062.6, mailed on Apr. 11, 2019, 2 pages.
Decision to Grant received for European Patent Application No. 15719347.5, mailed on Jun. 24, 2021, 2 pages.
Decision to Grant received for European Patent Application No. 15724160.5, mailed on Jun. 14, 2018, 2 pages.
Decision to Grant received for European Patent Application No. 16710590.7, mailed on Oct. 28, 2021, 2 pages.
Decision to Grant received for European Patent Application No. 18197583.0, mailed on Feb. 3, 2022, 3 pages.
Decision to Grant received for European Patent Application No. 18197589.7, mailed on Jun. 10, 2021, 2 pages.
Decision to Grant received for European Patent Application No. 18728002.9, mailed on Aug. 31, 2023, 4 pages.
Decision to Grant received for European Patent Application No. 19207753.5, mailed on Jun. 2, 2022, 3 pages.

Decision to Grant received for European Patent Application No. 20158824.1, mailed on Dec. 15, 2022, 3 pages.
Decision to Grant received for German Patent Application No. 102015208532.5, mailed on Sep. 22, 2020, 10 pages (1 page of English Translation and 9 pages of Official Copy).
Decision to Grant received for Japanese Patent Application No. 2017-075031, mailed on Jul. 1, 2019, 3 pages (1 page of English Translation and 2 pages of Official Copy).
Decision to Grant received for Japanese Patent Application No. 2019-124728, mailed on Apr. 2, 2021, 4 pages (1 page of English Translation and 3 pages of Official Copy).
Decision to Refuse received for European Patent Application No. 12753631.6, mailed on Feb. 20, 2019, 20 pages.
Decision to Refuse received for European Patent Application No. 12770400.5, mailed on Nov. 8, 2018, 12 pages.
Decision to Refuse received for European Patent Application No. 17799904.2, mailed on Sep. 19, 2022, 4 pages.
Decision to Refuse received for European Patent Application No. 17813737.8, mailed on Sep. 30, 2022, 5 pages.
Decision to Refuse received for European Patent Application No. 18208881.5, mailed on Dec. 23, 2022, 12 pages.
Decision to Refuse received for European Patent Application No. 19150528.8, mailed on Sep. 9, 2022, 4 pages.
Decision to Refuse received for European Patent Application No. 19169980.0, mailed on Jul. 15, 2021, 4 pages.
Evaluation Report for Utility Model Patent received for Chinese Patent Application No. 201620051290.7, completed on Sep. 19, 2016, 11 pages (6 pages of English translation and 5 pages of Official Copy).
Examiner-Initiated Interview Summary received for U.S. Appl. No. 17/027,373, mailed on Mar. 31, 2022, 4 pages.
Examiner's Answer to Appeal Brief received for U.S. Appl. No. 14/641,298, mailed on Mar. 22, 2021, 19 pages.
Examiner's Answer to Appeal Brief received for U.S. Appl. No. 14/774,664, mailed on May 31, 2018, 28 pages.
Examiner's Answer to Appeal Brief received for U.S. Appl. No. 14/863,099, mailed on Jul. 28, 2017, 31 pages.
Examiner's Answer to Appeal Brief received for U.S. Appl. No. 15/128,952, mailed on Jan. 8, 2020, 9 pages.
Examiner's Initiated Interview Summary received for U.S. Appl. No. 14/641,298, mailed on Mar. 10, 2020, 4 pages.
Examiner's Pre-Review Report received for Japanese Patent Application No. 2018-080122, mailed on Feb. 25, 2020, 6 pages (3 pages of English Translation and 3 pages of Official Copy).
Extended European Search Report for European Application No. 17813737.8, mailed on Nov. 22, 2019, 9 pages.
Extended European Search Report received for European Patent Application No. 17799904.2, mailed on Jul. 30, 2018, 7 pages.
Extended European Search Report received for European Patent Application No. 18178147.7, mailed on Oct. 4, 2018, 8 pages.
Extended European Search Report received for European Patent Application No. 18197583.0, mailed on Jun. 4, 2019, 20 pages.
Extended European Search Report received for European Patent Application No. 18197589.7, mailed on Jan. 7, 2019, 9 pages.
Extended European Search Report received for European Patent Application No. 18208881.5, mailed on Jan. 8, 2019, 7 pages.
Extended European Search Report received for European Patent Application No. 19150528.8, mailed on May 15, 2019, 9 pages.
Extended European Search Report received for European Patent Application No. 19169980.0, mailed on Jul. 2, 2019, 8 pages.
Extended European Search Report received for European Patent Application No. 19186538.5, mailed on Oct. 9, 2019, 10 pages.
Extended European Search Report received for European Patent Application No. 19203942.8, mailed on Apr. 1, 2020, 10 pages.
Extended European Search Report received for European Patent Application No. 19207753.5, mailed on Dec. 18, 2019, 9 pages.
Extended European Search Report received for European Patent Application No. 20158824.1, mailed on Aug. 10, 2020, 13 pages.
Extended European Search Report received for European Patent Application No. 21160991.2, mailed on Jul. 16, 2021, 14 pages.
Extended European Search Report received for European Patent Application No. 21166718.3, mailed on Jul. 6, 2021, 11 pages.

(56) References Cited

OTHER PUBLICATIONS

Extended European Search Report received for European Patent Application No. 21197457.1, mailed on Nov. 15, 2021, 8 pages.
Extended European Search Report received for European Patent Application No. 21207736.6, mailed on Feb. 22, 2022, 11 pages.
Extended European Search Report received for European Patent Application No. 22188377.0, mailed on Oct. 27, 2022, 8 pages.
Extended European Search Report received for European Patent Application No. 22195584.2, mailed on Jan. 5, 2023, 13 pages.
Extended European Search Report received for European Patent Application No. 22198071.7, mailed on Dec. 5, 2022, 8 pages.
Extended European Search Report received for European Patent Application No. 22201007.6, mailed on Jan. 12, 2023, 7 pages.
Extended European Search Report received for European Patent Application No. 23157906.1, mailed on Apr. 6, 2023, 10 pages.
Extended European Search Report received for European Patent Application No. 23168537.1, mailed on Jul. 25, 2023, 13 pages.
Final Office Action received for U.S. Appl. No. 13/248,882, mailed on Dec. 4, 2013, 22 pages.
Final Office Action received for U.S. Appl. No. 13/489,245, mailed on Mar. 28, 2014, 23 pages.
Final Office Action received for U.S. Appl. No. 13/489,245, mailed on Oct. 16, 2019, 25 pages.
Final Office Action received for U.S. Appl. No. 13/489,245, mailed on Sep. 27, 2018, 25 pages.
Final Office Action received for U.S. Appl. No. 13/587,850, mailed on May 3, 2016, 31 pages.
Final Office Action received for U.S. Appl. No. 14/285,378, mailed on Jul. 23, 2015, 19 pages.
Final Office Action received for U.S. Appl. No. 14/503,327, mailed on May 18, 2017, 10 pages.
Final Office Action received for U.S. Appl. No. 14/641,289, mailed on Jul. 1, 2016. 32 pages.
Final Office Action received for U.S. Appl. No. 14/641,298, mailed on Jun. 26, 2020, 50 pages.
Final Office Action received for U.S. Appl. No. 14/641,298, mailed on May 16, 2019, 50 pages.
Final Office Action received for U.S. Appl. No. 14/641,298, mailed on Oct. 4, 2017, 30 pages.
Final Office Action received for U.S. Appl. No. 14/641,304, mailed on Jul. 24, 2018, 19 pages.
Final Office Action received for U.S. Appl. No. 14/641,304, mailed on Oct. 15, 2019, 21 pages.
Final Office Action received for U.S. Appl. No. 14/719,217, mailed on Feb. 23, 2017, 37 pages.
Final Office Action received for U.S. Appl. No. 14/774,664, mailed on Aug. 25, 2017, 23 pages.
Final Office Action received for U.S. Appl. No. 14/841,455, mailed on Nov. 6, 2018, 14 pages.
Final Office Action received for U.S. Appl. No. 14/863,099, mailed on Apr. 21, 2016, 20 pages.
Final Office Action received for U.S. Appl. No. 15/128,952, mailed on Jul. 18, 2018, 19 pages.
Final Office Action received for U.S. Appl. No. 15/433,320, mailed on Dec. 31, 2019, 30 pages.
Final Office Action received for U.S. Appl. No. 15/730,610, mailed on Aug. 6, 2019, 28 pages.
Final Office Action received for U.S. Appl. No. 15/910,263, mailed on Aug. 28, 2019, 32 pages.
Final Office Action received for U.S. Appl. No. 16/422,736, mailed on Jan. 11, 2021, 39 pages.
Final Office Action received for U.S. Appl. No. 16/583,981, mailed on Apr. 16, 2020, 19 pages.
Final Office Action received for U.S. Appl. No. 16/583,989, mailed on Jul. 10, 2020, 23 pages.
Final Office Action received for U.S. Appl. No. 16/583,994, mailed on Jul. 23, 2020, 16 pages.
Final Office Action received for U.S. Appl. No. 16/584,490, mailed on May 1, 2020, 48 pages.
Final Office Action received for U.S. Appl. No. 16/679,967, mailed on Nov. 10, 2021, 14 pages.
Final Office Action received for U.S. Appl. No. 16/702,968, mailed on Jul. 27, 2020, 21 pages.
Final Office Action received for U.S. Appl. No. 16/723,583, mailed on Feb. 5, 2021, 15 pages.
Final Office Action received for U.S. Appl. No. 16/803,849, mailed on Nov. 2, 2021, 37 pages.
Final Office Action received for U.S. Appl. No. 16/803,849, mailed on Sep. 24, 2020, 29 pages.
Final Office Action received for U.S. Appl. No. 16/807,604, mailed on Aug. 19, 2020, 35 pages.
Final Office Action received for U.S. Appl. No. 16/922,675, mailed on Dec. 3, 2020, 21 pages.
Final Office Action received for U.S. Appl. No. 16/922,675, mailed on Nov. 30, 2020, 12 pages.
Final Office Action received for U.S. Appl. No. 17/026,818, mailed on Jan. 29, 2021, 21 pages.
Final Office Action received for U.S. Appl. No. 17/031,833, mailed on Jan. 26, 2021, 17 pages.
Final Office Action received for U.S. Appl. No. 17/181,089, mailed on Apr. 19, 2023, 13 pages.
Final Office Action received for U.S. Appl. No. 17/181,089, mailed on Oct. 21, 2022, 15 pages.
Final Office Action received for U.S. Appl. No. 17/314,948, mailed on Mar. 7, 2023, 31 pages.
Final Office Action received for U.S. Appl. No. 17/476,404, mailed on May 5, 2022, 30 pages.
Final Office Action received for U.S. Appl. No. 17/479,974, mailed on Jun. 28, 2023, 32 pages.
Final Office Action received for U.S. Appl. No. 17/666,971, mailed on May 12, 2023, 29 pages.
Final Office Action received for U.S. Appl. No. 17/747,804, mailed on Apr. 28, 2023, 17 pages.
Final Office Action received for U.S. Appl. No. 15/250,152, mailed on Aug. 23, 2017, 24 pages.
Final Office Action received for U.S. Appl. No. 15/250,152, mailed on Nov. 16, 2018, 30 pages.
"Firefox Sync—Take Your Bookmarks, Tabs and Personal Information with You", available online at: https://web.archive.org/web/20120601020556/http://support.mozilla.org/en-US/kb/firefox-firefox-sync-take-your-bookmarks-and-tabs-with-you?redirectlocale=en-US&redirectslug=what-firefox-sync, Jun. 1, 2012, 3 pages.
"Free Virtual Classic Analogue Mono Synth", Samsara Cycle Audio Releases DEISK-O, Jan. 2, 2011, 3 pages.
"G Pad, LG's latest Uls that shine even more on the G-Pad", Online available at: http://bungq.com/1014. Nov. 19, 2013, 49 pages (30 pages of English Translation and 19 pages of Official Copy).
"How-To: iTunes in the Cloud", available at <http://y2kemo.com/2011/06/how-to-itunes-in-the-cloud/>, XP55040711, Jun. 9, 2011, 4 pages.
Intention to Grant received for Danish Patent Application No. PA201670628, mailed on Aug. 28, 2017, 2 pages.
Intention to Grant received for Danish Patent Application No. PA201770392, mailed on Aug. 31, 2018, 2 pages.
Intention to Grant received for Danish Patent Application No. PA201770392, mailed on Jul. 2, 2018, 2 pages.
Intention to Grant received for Danish Patent Application No. PA201770401, mailed on Jun. 14, 2018, 2 Pages.
Intention to Grant received for Danish Patent Application No. PA201770401, mailed on Sep. 17, 2018, 2 pages.
Intention to Grant received for Danish Patent Application No. PA201770403, mailed on May 7, 2018, 2 pages.
Intention to Grant received for Danish Patent Application No. PA201770403, mailed on Oct. 3, 2018, 2 pages.
Intention to Grant received for Danish Patent Application No. PA201770404, mailed on Sep. 23, 2019, 3 pages.
Intention to Grant received for Danish Patent Application No. PA201770406, mailed on Feb. 6, 2020, 3 pages.
Intention to Grant received for Danish Patent Application No. PA201770408, mailed on Nov. 30, 2018, 3 pages.
Intention to Grant received for Danish Patent Application No. PA201770782, mailed on Aug. 8, 2019, 2 pages.

(56) References Cited

OTHER PUBLICATIONS

Intention to Grant received for Danish Patent Application No. PA202070560, mailed on Apr. 26, 2021, 2 pages.
Intention to Grant received for Danish Patent Application No. PA202070617, mailed on Nov. 15, 2021, 2 pages.
Intention to Grant received for Danish Patent Application No. PA202170320, mailed on Jul. 27, 2022, 2 pages.
Intention to Grant received for Danish Patent Application No. PA202270464, mailed on Feb. 20, 2023, 2 pages.
Intention to Grant received for European Patent Application No. 12773460.6, mailed on Feb. 4, 2019, 8 pages.
Intention to Grant received for European Patent Application No. 12773460.6, mailed on Jun. 17, 2019, 4 pages.
Intention to Grant received for European Patent Application No. 13171047.7, mailed on Jan. 23, 2019, 8 pages.
Intention to Grant received for European Patent Application No. 15711969.4, mailed on May 29, 2019, 11 pages.
Intention to Grant received for European Patent Application No. 15713062.6, mailed on Mar. 25, 2019, 7 pages.
Intention to Grant received for European Patent Application No. 15713062.6, mailed on Oct. 8, 2018, 8 pages.
Intention to Grant received for European Patent Application No. 15719347.5, mailed on Dec. 8, 2020, 7 pages.
Intention to Grant received for European Patent Application No. 15719347.5, mailed on Jun. 8, 2021, 7 pages.
Intention to Grant received for European Patent Application No. 15719347.5, mailed on May 11, 2021, 8 pages.
Intention to Grant received for European Patent Application No. 15724160.5, mailed on Mar. 7, 2018, 8 pages.
Intention to Grant received for European Patent Application No. 16710590.7, mailed on Jun. 14, 2021, 8 pages.
Intention to Grant received for European Patent Application No. 18197583.0, mailed on Jan. 17, 2022, 9 pages.
Intention to Grant received for European Patent Application No. 18197583.0, mailed on Jul. 23, 2021, 9 pages.
Intention to Grant received for European Patent Application No. 18197589.7, mailed on Jan. 21, 2021, 8 pages.
Intention to Grant received for European Patent Application No. 18728002.9, mailed on Apr. 12, 2023, 9 pages.
Intention to Grant received for European Patent Application No. 19203942.8, mailed on Aug. 1, 2023, 8 pages.
Intention to Grant received for European Patent Application No. 19207753.5, mailed on Jan. 28, 2022, 8 pages.
Intention to Grant received for European Patent Application No. 19207753.5, mailed on Sep. 3, 2021, 8 pages.
Intention to Grant received for European Patent Application No. 20158824.1, mailed on Aug. 11, 2022, 10 pages.
Intention to Grant received for European Patent Application No. 21728781.2, mailed on Jul. 28, 2023, 9 pages.
International Preliminary Report on Patentability received for PCT Patent Application No. PCT/US2012/057319, mailed on Apr. 10, 2014, 6 pages.
International Preliminary Report on Patentability received for PCT Patent Application No. PCT/US2012/057656, mailed on Apr. 10, 2014, 6 pages.
International Preliminary Report on Patentability received for PCT Patent Application No. PCT/US2014/027882, mailed on Sep. 24, 2015, 8 pages.
International Preliminary Report on Patentability Received for PCT Patent Application No. PCT/US2015/019306, mailed on Dec. 15, 2016, 10 pages.
International Preliminary Report on Patentability Received for PCT Patent Application No. PCT/US2015/019309, mailed on Dec. 15, 2016, 10 pages.
International Preliminary Report on Patentability received for PCT Patent Application No. PCT/US2015/019317, mailed on Dec. 15, 2016, 18 pages.
International Preliminary Report on Patentability received for PCT Patent Application No. PCT/US2015/025188, mailed on Mar. 2, 2017, 8 pages.

International Preliminary Report on Patentability received for PCT Patent Application No. PCT/US2015/030199, mailed on Dec. 15, 2016, 7 pages.
International Preliminary Report on Patentability received for PCT Patent Application No. PCT/US2016/021012, mailed on Sep. 21, 2017, 11 pages.
International Preliminary Report on Patentability received for PCT Patent Application No. PCT/US2017/031086, mailed on Dec. 27, 2018, 12 pages.
International Preliminary Report on Patentability received for PCT Patent Application No. PCT/US2017/032240, mailed on Nov. 29, 2018, 29 pages.
International Preliminary Report on Patentability received for PCT Patent Application No. PCT/US2018/032158, mailed on Nov. 21, 2019, 12 pages.
International Preliminary Report on Patentability received for PCT Patent Application No. PCT/US2018/032904, mailed on Nov. 28, 2019, 14 pages.
International Preliminary Report on Patentability received for PCT Patent Application No. PCT/US2020/024390, mailed on Dec. 9, 2021, 20 pages.
International Preliminary Report on Patentability received for PCT Patent Application No. PCT/US2020/026044, mailed on Dec. 9, 2021, 18 pages.
International Preliminary Report on Patentability received for PCT Patent Application No. PCT/US2020/035446, mailed on Dec. 9, 2021, 14 pages.
International Preliminary Report on Patentability received for PCT Patent Application No. PCT/US2020/035488, mailed on Dec. 9, 2021, 16 pages.
International Preliminary Report on Patentability received for PCT Patent Application No. PCT/US2021/031760, mailed on Nov. 24, 2022, 11 pages.
International Preliminary Report on Patentability received for PCT Patent Application No. PCT/US2021/048358, mailed on Apr. 6, 2023, 15 pages.
International Search Report and Written Opinion received for PCT Patent Application No. PCT/US17/31086, mailed on Sep. 8, 2017, 15 pages.
International Search Report and Written Opinion received for PCT Patent Application No. PCT/US2012/057319, mailed on Feb. 25, 2013, 7 pages.
International Search Report and Written Opinion received for PCT Patent Application No. PCT/US2012/057656, mailed on Feb. 25, 2013, 7 pages.
International Search Report and Written Opinion received for PCT Patent Application No. PCT/US2013/032498, mailed on Feb. 10, 2014, 18 pages.
International Search Report and Written Opinion received for PCT Patent Application No. PCT/US2014/027882, mailed on Oct. 10, 2014, 11 pages.
International Search Report and Written Opinion received for PCT Patent Application No. PCT/US2016/021012, mailed on Jun. 2, 2016, 15 pages.
International Search Report and Written Opinion received for PCT Patent Application No. PCT/US2017/032240, mailed on Sep. 21, 2017, 33 pages.
International Search Report and Written Opinion received for PCT Patent Application No. PCT/US2018/032158, mailed on Nov. 2, 2018, 19 pages.
International Search Report and Written Opinion received for PCT Patent Application No. PCT/US2018/032904, mailed on Oct. 1, 2018, 21 pages.
International Search Report and written Opinion received for PCT Patent Application No. PCT/US2020/024390, mailed on Aug. 17, 2020, 22 pages.
International Search Report and Written Opinion received for PCT Patent Application No. PCT/US2020/024390, mailed on Oct. 23, 2020, 26 pages.
International Search Report and Written Opinion received for PCT Patent Application No. PCT/US2020/026044, mailed on Sep. 9, 2020, 26 pages.

(56) References Cited

OTHER PUBLICATIONS

International Search Report and Written Opinion received for PCT Patent Application No. PCT/US2020/035446, mailed on Nov. 10, 2020, 20 pages.
International Search Report and Written Opinion received for PCT Patent Application No. PCT/US2020/035488, mailed on Nov. 17, 2020, 21 pages.
International Search Report and Written Opinion received for PCT Patent Application No. PCT/US2021/031760, mailed on Sep. 16, 2021, 18 pages.
International Search Report and Written Opinion received for PCT Patent Application No. PCT/US2021/048358, mailed on Feb. 24, 2022, 21 pages.
International Search Report and Written Opinion received for PCT Patent Application No. PCT/US2022/031252, mailed on Oct. 7, 2022, 18 pages.
International Search Report and Written Opinion received for PCT Patent Application No. PCT/US2022/043733, mailed on Jan. 3, 2023, 12 pages.
Invitation to Pay Addition Fees and Partial International Search Report received for PCT Patent Application No. PCT/US2018/032904, mailed on Jul. 31, 2018, 18 pages.
Invitation to Pay Additional Fee received for PCT Patent Application No. PCT/US17/31086, mailed on Jul. 14, 2017, 2 pages.
Invitation to Pay Additional Fee received for PCT Patent Application No. PCT/US17/32240, mailed on Jul. 12, 2017, 2 pages.
Invitation to Pay Additional Fees received for PCT Patent Application No. PCT/US2020/024390, mailed on Jun. 26, 2020, 15 pages.
Invitation to Pay Additional Fees received for PCT Patent Application No. PCT/US2014/027882, mailed on Aug. 5, 2014, 2 pages.
Invitation to Pay Additional Fees received for PCT Patent Application No. PCT/US2018/032158, mailed on Sep. 10, 2018, 16 pages.
Invitation to Pay Additional Fees received for PCT Patent Application No. PCT/US2020/026044, mailed on Jun. 25, 2020, 12 pages.
Invitation to Pay Additional Fees received for PCT Patent Application No. PCT/US2020/035446, mailed on Sep. 11, 2020, 12 pages.
Invitation to Pay Additional Fees received for PCT Patent Application No. PCT/US2020/035488, mailed on Sep. 23, 2020, 15 pages.
Invitation to Pay Additional Fees received for PCT Patent Application No. PCT/US2021/048358, mailed on Dec. 23, 2021, 14 pages.
Invitation to Pay Search Fees received for European Patent Application No. 15714698.6, mailed on Dec. 16, 2022, 4 pages.
Invitation to Pay Search Fees received for European Patent Application No. 18728002.9, mailed on Sep. 2, 2020, 8 pages.
Invitation to Pay Search Fees received for European Patent Application No. 18733381.0, mailed on Jun. 30, 2021, 4 pages.
Invitation to Pay Search Fees received for European Patent Application No. 20719301.2, mailed on Dec. 17, 2020, 5 pages.
Invitation to Pay Search Fees received for European Patent Application No. 20760624.5, mailed on Jan. 2, 2023, 3 pages.
Invitation to Pay Search Fees received for European Patent Application No. 21728781.2, mailed on Dec. 2, 2022, 3 pages.
"Kinect Gesture Commands—Kinect Voice Commands, Xbox Wire", Available Online at: <https://hwcdn.libsyn.com/p/4/4/c/44c89c7f273167b4/Xbox_One_Kinect_Voice_Gesture.pdf?c_id=6458139&cs_id=6458139&expiration=1555411736&hwt=fe78eb09654ea677c9fbf836ad2ed82b >, 2013, 2 pages.
"LG G Pad 8.3 Tablet Q Remote User", Available at: <https://mushroomprincess.tistory.com/1320>, Dec. 26, 2013, 37 pages (20 pages of English Translation and 17 pages of Official Copy).
Minutes of Oral Hearing received for German Patent Application No. 102015208532.5, mailed on Dec. 13, 2019, 21 pages (3 pages of English Translation and 18 pages of Official Copy).

Minutes of Oral Proceedings received for European Patent Application No. 18208881.5, mailed on Dec. 22, 2022, 4 pages.
Minutes of Oral Proceedings received for European Patent Application No. 18728002.9, mailed on Dec. 22, 2022, 7 pages.
Minutes of the Oral Proceedings received for European Application No. 12770400.5, mailed on Nov. 6, 2018, 7 pages.
Minutes of the Oral Proceedings received for European Application No. 15711969.4, mailed on May 16, 2019, 7 pages.
Minutes of the Oral Proceedings received for European Patent Application No. 12753631.6, mailed on Feb. 20, 2019, 3 pages.
Minutes of the Oral Proceedings received for European Patent Application No. 18197583.0, mailed on Mar. 9, 2021, 6 pages.
Non-Final Action received for U.S. Appl. No. 15/952,736, mailed on Jun. 1, 2018, 12 pages.
Non-Final Office Action received for U. S. U.S. Appl. No. 14/503,327, mailed on Sep. 12, 2016, 10 pages.
Non-Final Office Action received for U.S. Appl. No. 14/841,455, mailed on Apr. 25, 2018, 13 pages.
Non-Final Office Action received for U.S. Appl. No. 17/699,492, mailed on Jul. 27, 2023, 8 pages.
Non-Final Office Action received for U.S. Appl. No. 16/679,967, mailed on Sep. 2, 2021, 12 pages.
Non-Final Office Action received for U.S. Appl. No. 13/248,872, mailed on May 19, 2014, 6 pages.
Non-Final Office Action received for U.S. Appl. No. 13/248,882, mailed on Jul. 10, 2013, 14 pages.
Non-Final Office Action received for U.S. Appl. No. 13/489,245, mailed on Apr. 8, 2019, 27 pages.
Non-Final Office Action received for U.S. Appl. No. 13/489,245, mailed on Dec. 27, 2017, 22 pages.
Non-Final Office Action received for U.S. Appl. No. 13/489,245, mailed on Nov. 20, 2013, 25 pages.
Non-Final Office Action received for U.S. Appl. No. 14/285,378, mailed on Dec. 21, 2015, 18 pages.
Non-Final Office Action received for U.S. Appl. No. 14/285,378, mailed on Jan. 21, 2015, 19 pages.
Non-Final Office Action received for U.S. Appl. No. 14/641,298, mailed on Mar. 6, 2017, 26 pages.
Non-Final Office Action received for U.S. Appl. No. 14/641,298, mailed on Nov. 29, 2019, 47 pages.
Non-Final Office Action received for U.S. Appl. No. 14/641,298, mailed on Sep. 19, 2018, 41 pages.
Non-Final Office Action received for U.S. Appl. No. 14/641,304, mailed on Feb. 27, 2019, 18 pages.
Non-Final Office Action received for U.S. Appl. No. 14/641,304, mailed on Mar. 4, 2020, 21 pages.
Non-Final Office Action received for U.S. Appl. No. 14/641,304, mailed on Sep. 11, 2017, 18 pages.
Non-Final Office Action received for U.S. Appl. No. 14/642,366, mailed on Aug. 24, 2015, 7 pages.
Non-Final Office Action received for U.S. Appl. No. 14/719,217, mailed on Jul. 26, 2018, 40 pages.
Non-Final Office Action received for U.S. Appl. No. 14/719,217, mailed on Jul. 28, 2016, 28 pages.
Non-Final Office Action received for U.S. Appl. No. 14/774,664, mailed on Mar. 7, 2017, 23 pages.
Non-Final Office Action received for U.S. Appl. No. 14/863,099, mailed on Dec. 2, 2015, 12 pages.
Non-Final Office Action received for U.S. Appl. No. 15/128,952, mailed on Apr. 1, 2019, 20 pages.
Non-Final Office Action received for U.S. Appl. No. 15/128,952, mailed on Dec. 29, 2017, 13 pages.
Non-Final Office Action received for U.S. Appl. No. 15/134,638, mailed on Sep. 20, 2016, 6 pages.
Non-Final Office Action received for U.S. Appl. No. 15/269,801, mailed on Dec. 30, 2016, 17 pages.
Non-Final Office Action received for U.S. Appl. No. 15/433,320, mailed on Jul. 31, 2020, 13 pages.
Non-Final Office Action received for U.S. Appl. No. 15/620,666, mailed on Mar. 28, 2018, 14 pages.
Non-Final Office Action received for U.S. Appl. No. 15/730,610, mailed on Apr. 15, 2020, 36 pages.

(56) References Cited

OTHER PUBLICATIONS

Non-Final Office Action received for U.S. Appl. No. 15/730,610, mailed on Feb. 1, 2019, 22 pages.

Non-Final Office Action received for U.S. Appl. No. 15/845,794, mailed on Oct. 15, 2018, 8 pages.

Non-Final Office Action received for U.S. Appl. No. 15/910,263, mailed on Jun. 15, 2020, 38 pages.

Non-Final Office Action received for U.S. Appl. No. 15/910,263, mailed on Mar. 4, 2019, 26 pages.

Non-Final Office Action received for U.S. Appl. No. 16/229,959, mailed on Oct. 31, 2019, 10 pages.

Non-Final Office Action received for U.S. Appl. No. 16/422,736, mailed on Jun. 23, 2020, 24 pages.

Non-Final Office Action received for U.S. Appl. No. 16/434,865, mailed on Jan. 16, 2020, 9 pages.

Non-Final Office Action received for U.S. Appl. No. 16/583,981, mailed on Dec. 6, 2019, 14 pages.

Non-Final Office Action received for U.S. Appl. No. 16/583,989, mailed on Jan. 24, 2020, 20 pages.

Non-Final Office Action received for U.S. Appl. No. 16/583,994, mailed on Dec. 23, 2020, 17 pages.

Non-Final Office Action received for U.S. Appl. No. 16/583,994, mailed on Dec. 30, 2019, 14 pages.

Non-Final Office Action received for U.S. Appl. No. 16/584,490, mailed on Dec. 10, 2019, 27 pages.

Non-Final Office Action received for U.S. Appl. No. 16/584,743, mailed on Feb. 6, 2020, 15 pages.

Non-Final Office Action received for U.S. Appl. No. 16/586,002, mailed on Feb. 20, 2020, 15 pages.

Non-Final Office Action received for U.S. Appl. No. 16/670,949, mailed on Dec. 9, 2020, 11 pages.

Non-Final Office Action received for U.S. Appl. No. 16/679,967, mailed on Apr. 19, 2022, 13 pages.

Non-Final Office Action received for U.S. Appl. No. 16/702,968, mailed on Apr. 8, 2020, 20 pages.

Non-Final Office Action received for U.S. Appl. No. 16/723,583, mailed on Aug. 13, 2020, 13 pages.

Non-Final Office Action received for U.S. Appl. No. 16/803,849, mailed on Jul. 13, 2020, 23 pages.

Non-Final Office Action received for U.S. Appl. No. 16/803,849, mailed on May 14, 2021, 34 pages.

Non-Final Office Action received for U.S. Appl. No. 16/807,604, mailed on Jun. 2, 2020, 28 pages.

Non-Final Office Action received for U.S. Appl. No. 16/836,571, mailed on Mar. 25, 2021, 28 pages.

Non-Final Office Action received for U.S. Appl. No. 16/921,551, mailed on Sep. 8, 2021, 7 pages.

Non-Final Office Action received for U.S. Appl. No. 16/922,675, mailed on Aug. 13, 2020, 17 pages.

Non-Final Office Action received for U.S. Appl. No. 16/922,675, mailed on Jun. 8, 2022, 21 pages.

Non-Final Office Action received for U.S. Appl. No. 16/922,675, mailed on May 4, 2021, 23 pages.

Non-Final Office Action received for U.S. Appl. No. 16/987,003, mailed on May 10, 2021, 20 pages.

Non-Final Office Action received for U.S. Appl. No. 17/026,818, mailed on Nov. 25, 2020, 20 pages.

Non-Final Office Action received for U.S. Appl. No. 17/027,373, mailed on Feb. 2, 2022, 17 pages.

Non-Final Office Action received for U.S. Appl. No. 17/031,833, mailed on Dec. 7, 2020, 13 pages.

Non-Final Office Action received for U.S. Appl. No. 17/168,069, mailed on Jul. 21, 2021, 17 pages.

Non-Final Office Action received for U.S. Appl. No. 17/176,908, mailed on Feb. 24, 2022, 28 pages.

Non-Final Office Action received for U.S. Appl. No. 17/181,089, mailed on Aug. 4, 2023, 15 pages.

Non-Final Office Action received for U.S. Appl. No. 17/181,089, mailed on Feb. 17, 2023, 14 pages.

Non-Final Office Action received for U.S. Appl. No. 17/181,089, mailed on May 13, 2022, 12 pages.

Non-Final Office Action received for U.S. Appl. No. 17/223,794, mailed on Jun. 16, 2021, 32 pages.

Non-Final Office Action received for U.S. Appl. No. 17/306,354, mailed on Jun. 2, 2023, 21 pages.

Non-Final Office Action received for U.S. Appl. No. 17/314,948, mailed on Aug. 1, 2022, 33 pages.

Non-Final Office Action received for U.S. Appl. No. 17/320,900, mailed on Dec. 22, 2022, 30 pages.

Non-Final Office Action received for U.S. Appl. No. 17/461,103, mailed on Nov. 22, 2021, 15 pages.

Non-Final Office Action received for U.S. Appl. No. 17/476,404, mailed on Feb. 8, 2022, 26 pages.

Non-Final Office Action received for U.S. Appl. No. 17/476,404, mailed on Mar. 30, 2023, 29 pages.

Non-Final Office Action received for U.S. Appl. No. 17/476,404, mailed on Sep. 14, 2022, 31 pages.

Non-Final Office Action received for U.S. Appl. No. 17/479,974, mailed on Feb. 22, 2023, 30 pages.

Non-Final Office Action received for U.S. Appl. No. 17/509,356, mailed on Dec. 22, 2022, 16 pages.

Non-Final Office Action received for U.S. Appl. No. 17/666,971, mailed on Dec. 8, 2022, 26 pages.

Non-Final Office Action received for U.S. Appl. No. 17/747,804, mailed on Mar. 1, 2023, 14 pages.

Non-Final Office Action received for U.S. Appl. No. 17/752,582, mailed on Mar. 6, 2023, 17 pages.

Non-Final Office Action received for U.S. Appl. No. 17/824,510, mailed on May 22, 2023, 15 pages.

Non-Final Office Action received for U.S. Appl. No. 17/835,110, mailed on Apr. 3, 2023, 28 pages.

Non-Final Office Action received for U.S. Appl. No. 17/867,317, mailed on Feb. 28, 2023, 18 pages.

Non-Final Office Action received for U.S. Appl. No. 18/077,971, mailed on Apr. 3, 2023, 24 pages.

Non-Final Office Action received for U.S. Appl. No. 14/841,455, mailed on Apr. 11, 2019, 13 pages.

Non-Final Office Action received for U.S. Appl. No. 15/250,152, mailed on Apr. 6, 2018, 31 pages.

Non-Final Office Action received for U.S. Appl. No. 15/250,152, mailed on Mar. 2, 2017, 26 pages.

Non-Final Office Action received for U.S. Appl. No. 15/433,320, mailed on May 2, 2019, 27 pages.

Non-Final Office Action received for U.S. Appl. No. 15/945,610, mailed on Sep. 20, 2018, 9 pages.

Notice of Acceptance received for Australian Patent Application No. 2015201884, mailed on Oct. 4, 2016, 3 pages.

Notice of Acceptance received for Australian Patent Application No. 2015267671, mailed on Apr. 4, 2018, 3 pages.

Notice of Acceptance received for Australian Patent Application No. 2016201454, mailed on Mar. 1, 2018, 3 pages.

Notice of Acceptance received for Australian Patent Application No. 2016230001, mailed on May 25, 2018, 3 pages.

Notice of Acceptance received for Australian Patent Application No. 2017266867, mailed on Mar. 6, 2019, 3 pages.

Notice of Acceptance received for Australian Patent Application No. 2017284013, mailed on Aug. 26, 2020, 3 pages.

Notice of Acceptance received for Australian Patent Application No. 2018202751, mailed on Sep. 4, 2019, 3 pages.

Notice of Acceptance received for Australian Patent Application No. 2018220115, mailed on Jun. 29, 2020, 3 pages.

Notice of Acceptance received for Australian Patent Application No. 2018223051, mailed on Oct. 30, 2018, 3 pages.

Notice of Acceptance received for Australian Patent Application No. 2018229544, mailed on May 4, 2020, 3 pages.

Notice of Acceptance received for Australian Patent Application No. 2018236872, mailed on Jul. 9, 2019, 3 pages.

Notice of Acceptance received for Australian Patent Application No. 2018271366, mailed on Mar. 31, 2023, 3 pages.

Notice of Acceptance received for Australian Patent Application No. 2019203473, mailed on Nov. 7, 2019, 3 pages.

(56) References Cited

OTHER PUBLICATIONS

Notice of Acceptance received for Australian Patent Application No. 2019268111, mailed on Feb. 18, 2021, 3 pages.

Notice of Acceptance received for Australian Patent Application No. 2020207785, mailed on May 4, 2022, 3 pages.

Notice of Acceptance received for Australian Patent Application No. 2020239711, mailed on Dec. 16, 2021, 3 pages.

Notice of Acceptance received for Australian Patent Application No. 2020257092, mailed on Aug. 27, 2021, 3 pages.

Notice of Acceptance received for Australian Patent Application No. 2020273355, mailed on Jan. 17, 2022, 3 pages.

Notice of Acceptance received for Australian Patent Application No. 2020282362, mailed on Jan. 4, 2022, 3 pages.

Notice of Acceptance received for Australian Patent Application No. 2020285524, mailed on Dec. 17, 2021, 3 pages.

Notice of Acceptance received for Australian Patent Application No. 2021201243, mailed on Feb. 23, 2023, 3 pages.

Notice of Acceptance received for Australian Patent Application No. 2021201403, mailed on Oct. 22, 2021, 3 pages.

Notice of Acceptance received for Australian Patent Application No. 2021203669, mailed on May 25, 2022, 3 pages.

Notice of Acceptance received for Australian Patent Application No. 2021204454, mailed on Feb. 25, 2022, 3 pages.

Notice of Acceptance received for Australian Patent Application No. 2021261941, mailed on Mar. 15, 2023, 3 pages.

Notice of Acceptance received for Australian Patent Application No. 2022200515, mailed on Dec. 21, 2022, 3 pages.

Notice of Acceptance received for Australian Patent Application No. 2022200901, mailed on Mar. 9, 2023, 3 pages.

Notice of Acceptance received for Australian Patent Application No. 2022201369, mailed on Mar. 17, 2022, 3 pages.

Notice of Acceptance received for Australian Patent Application No. 2022201532, mailed on May 22, 2023, 3 pages.

Notice of Acceptance received for Australian Patent Application No. 2022202458, mailed on May 6, 2022, 3 pages.

Notice of Acceptance received for Australian Patent Application No. 2022204555, mailed on May 11, 2023, 3 pages.

Notice of Acceptance received for Australian Patent Application No. 2022235591, mailed on Aug. 18, 2023, 3 pages.

Notice of Allowance received for Brazilian Patent Application No. BR112014003009-0, mailed on Jun. 15, 2021, 3 pages (1 page of English Translation and 2 pages of Official Copy).

Notice of Allowance received for Chinese Patent Application No. 201280040169.9, mailed on Sep. 4, 2018, 3 pages (1 page of English Translation and 2 pages of official copy).

Notice of Allowance received for Chinese Patent Application No. 201280047459.6, mailed on Jan. 31, 2018, 2 pages (1 page of English Translation and 1 page of Official Copy).

Notice of Allowance received for Chinese Patent Application No. 201580028491.3, mailed on Mar. 29, 2019, 2 pages (1 page of English Translation and 1 page of Official Copy).

Notice of Allowance received for Chinese Patent Application No. 201580028505.1, mailed on Sep. 19, 2019, 2 pages (1 page of English Translation and 1 page of Official Copy).

Notice of Allowance received for Chinese Patent Application No. 201580043701.6, mailed on Jan. 26, 2022, 2 pages (1 page of English Translation and 1 page of Official Copy).

Notice of Allowance received for Chinese Patent Application No. 201620051290.7, mailed on Jun. 22, 2016, 2 pages (Official Copy only) {See Communication Under 37 CFR § 1.98(a) (3)}.

Notice of Allowance received for Chinese Patent Application No. 201680011682.3, mailed on Aug. 5, 2020, 2 pages (1 page of English Translation and 1 page of Official Copy).

Notice of Allowance received for Chinese Patent Application No. 201780002398.4, mailed on Jun. 17, 2019, 2 pages (1 page of English Translation and 1 page of Official Copy).

Notice of Allowance received for Chinese Patent Application No. 201780033899.9, mailed on Feb. 8, 2022, 2 pages (1 page of English Translation and 1 page of Official Copy).

Notice of Allowance received for Chinese Patent Application No. 201810338038.8, mailed on Jun. 30, 2020, 2 pages (1 page of English Translation and 1 page of Official Copy).

Notice of Allowance received for Chinese Patent Application No. 201810338040.5, mailed on Mar. 30, 2022, 6 pages (2 pages of English Translation and 4 pages of Official Copy).

Notice of Allowance received for Chinese Patent Application No. 201810339290.0, mailed on Mar. 9, 2022, 2 pages (1 page of English Translation and 1 page of Official Copy).

Notice of Allowance received for Chinese Patent Application No. 201811367893.8, mailed on Sep. 2, 2022, 2 pages (1 page of English Translation and 1 page of Official Copy).

Notice of Allowance received for Chinese Patent Application No. 201811460172.1, mailed on Jan. 11, 2021, 2 pages (1 page of English Translation and 1 page of Official Copy).

Notice of Allowance received for Chinese Patent Application No. 201811539260.0, mailed on Mar. 15, 2021, 2 pages (1 page of English Translation and 1 page of Official Copy).

Notice of Allowance received for Chinese Patent Application No. 201880001436.9, mailed on May 8, 2020, 3 pages (2 pages of English Translation and 1 page of Official Copy).

Notice of Allowance received for Chinese Patent Application No. 201910475434.X, mailed on Mar. 10, 2021, 2 pages (1 page of English Translation and 1 page of Official Copy).

Notice of Allowance received for Chinese Patent Application No. 201911099970.0, mailed on Jun. 25, 2023, 4 pages (1 page of English Translation and 3 pages of Official Copy).

Notice of Allowance received for Chinese Patent Application No. 201911288715.0, mailed on Jul. 12, 2023, 5 pages (1 page of English Translation and 4 pages of Official Copy).

Notice of Allowance received for Chinese Patent Application No. 202010125114.4, mailed on Nov. 24, 2021, 2 pages (1 page of English Translation and 1 page of Official Copy).

Notice of Allowance received for Chinese Patent Application No. 202011450203.2, mailed on Sep. 30, 2022, 4 pages (1 page of English Translation and 3 pages of Official Copy).

Notice of Allowance received for Chinese Patent Application No. 202080039642.6, mailed on Apr. 17, 2023, 6 pages (2 pages of English Translation and 4 pages of Official Copy).

Notice of Allowance received for Chinese Patent Application No. 202111612841.4, mailed on Jan. 5, 2023, 3 pages (2 pages of English Translation & 1 page of Official Copy).

Notice of Allowance received for Danish Patent Application No. PA201770408, mailed on Feb. 8, 2019, 2 pages.

Notice of Allowance received for Japanese Patent Application No. 2015-095183, mailed on Apr. 21, 2017, 3 pages. (Official Copy Only) {See Communication Under 37 CFR § 1.98(a) (3)}.

Notice of Allowance received for Japanese Patent Application No. 2016-022175, mailed on Jan. 12, 2018, 4 pages (1 page of English Translation and 3 pages of Official Copy).

Notice of Allowance received for Japanese Patent Application No. 2016-569669, mailed on Mar. 19, 2018, 4 pages (1 page of English translation and 3 pages of Official Copy).

Notice of Allowance received for Japanese Patent Application No. 2017-101107, mailed on Jun. 3, 2019, 5 pages (1 page of English Translation and 4 pages of Official Copy).

Notice of Allowance received for Japanese Patent Application No. 2017-507413, mailed on Jul. 22, 2019, 4 pages (1 page of English Translation and 3 pages of Official Copy).

Notice of Allowance received for Japanese Patent Application No. 2017-543762, mailed on Mar. 30, 2020, 4 pages (1 page of English Translation and 3 pages of Official Copy).

Notice of Allowance received for Japanese Patent Application No. 2018-080122, mailed on May 7, 2021, 28 pages (1 page of English Translation and 27 pages of Official Copy).

Notice of Allowance received for Japanese Patent Application No. 2018-560107, mailed on Dec. 6, 2019, 4 pages (1 page of English Translation and 3 pages of Official Copy).

Notice of Allowance received for Japanese Patent Application No. 2019-116580, mailed on Oct. 2, 2020, 4 pages (1 page of English Translation and 3 pages of Official Copy).

(56) References Cited

OTHER PUBLICATIONS

Notice of Allowance received for Japanese Patent Application No. 2019-238894, mailed on Oct. 5, 2020, 4 pages (1 page of English Translation and 3 pages of Official Copy).

Notice of Allowance received for Japanese Patent Application No. 2020-159840, mailed on Jul. 8, 2022, 4 pages (1 page of English Translation and 3 pages of Official Copy).

Notice of Allowance received for Japanese Patent Application No. 2020-183773, mailed on Dec. 23, 2021, 4 pages (1 page of English Translation and 3 pages of Official Copy).

Notice of Allowance received for Japanese Patent Application No. 2020-558885, mailed on Jul. 26, 2021, 4 pages (1 page of English Translation and 3 pages of Official Copy).

Notice of Allowance received for Japanese Patent Application No. 2021-026630, mailed on Jan. 7, 2022, 4 pages (1 page of English Translation and 3 pages of Official Copy).

Notice of Allowance received for Japanese Patent Application No. 2021-074395, mailed on Jun. 27, 2022, 4 pages (1 page of English Translation and 3 pages of Official Copy).

Notice of Allowance received for Japanese Patent Application No. 2021-563716, mailed on Mar. 14, 2022, 4 pages (1 page of English Translation and 3 pages of Official Copy).

Notice of Allowance received for Japanese Patent Application No. 2021-571464, mailed on May 30, 2022, 4 pages (1 page of English Translation and 3 pages of Official Copy).

Notice of Allowance received for Japanese Patent Application No. 2022-007217, mailed on Apr. 10, 2023, 4 pages (1 page of English Translation and 3 pages of Official Copy).

Notice of Allowance received for Japanese Patent Application No. 2022-014389, mailed on Jan. 27, 2023, 4 pages (1 page of English Translation and 3 pages of Official Copy).

Notice of Allowance received for Japanese Patent Application No. 2022-079682, mailed on Jul. 15, 2022, 4 pages (1 page of English Translation and 3 pages of Official Copy).

Notice of Allowance received for Japanese Patent Application No. 2022-102840, mailed on Aug. 19, 2022, 4 pages (1 page of English Translation and 3 pages of Official Copy).

Notice of Allowance received for Japanese Patent Application No. 2022-125792, mailed on Jan. 27, 2023, 4 pages (1 page of English Translation and 3 pages of Official Copy).

Notice of Allowance received for Korean Patent Application No. 10-2015-0072162, mailed on Dec. 27, 2017, 4 pages (2 pages of English Translation and 2 pages of Official copy).

Notice of Allowance received for Korean Patent Application No. 10-2016-7032902, mailed on Sep. 7, 2018, 3 pages (1 page of English Translation and 2 pages of Official Copy).

Notice of Allowance received for Korean Patent Application No. 10-2016-7035555, mailed on Sep. 23, 2019, 3 pages (1 page of English Translation and 2 pages of Official Copy).

Notice of Allowance received for Korean Patent Application No. 10-2017-7012145, mailed on Oct. 30, 2019, 3 pages (1 page of English Translation and 2 pages of Official Copy).

Notice of Allowance received for Korean Patent Application No. 10-2017-7022905, mailed on Jul. 31, 2019, 4 pages (2 pages of English Translation and 2 pages of Official Copy).

Notice of Allowance received for Korean Patent Application No. 10-2017-7035057, mailed on May 31, 2018, 4 pages (1 page of English Translation and 3 pages of Official copy).

Notice of Allowance received for Korean Patent Application No. 10-2018-0035949, mailed on Nov. 28, 2019, 3 pages (1 page of English Translation and 2 pages of Official Copy).

Notice of Allowance received for Korean Patent Application No. 10-2018-7033301, mailed on Feb. 20, 2019, 5 pages (2 Pages of English Translation and 3 Pages of Official Copy).

Notice of Allowance received for Korean Patent Application No. 10-2018-7035747, mailed on Dec. 9, 2020, 5 pages (2 pages of English Translation and 3 pages of Official Copy).

Notice of Allowance received for Korean Patent Application No. 10-2019-7014494, mailed on Mar. 19, 2020, 4 pages (1 page of English Translation and 3 pages of Official Copy).

Notice of Allowance received for Korean Patent Application No. 10-2020-0024632, mailed on Jul. 26, 2021, 3 pages (1 page of English Translation and 2 pages of Official Copy).

Notice of Allowance received for Korean Patent Application No. 10-2020-0123805, mailed on Jun. 19, 2022, 5 pages (2 pages of English Translation and 3 pages of Official Copy).

Notice of Allowance received for Korean Patent Application No. 10-2020-7002929, mailed on Nov. 26, 2020, 3 pages (1 page of English Translation and 2 pages of Official Copy).

Notice of Allowance received for Korean Patent Application No. 10-2020-7017803, mailed on Nov. 5, 2020, 6 pages (2 pages of English Translation and 4 pages of Official Copy).

Notice of Allowance received for Korean Patent Application No. 10-2020-7031319, mailed on Apr. 6, 2021, 5 pages (2 pages of English Translation and 3 pages of Official Copy).

Notice of Allowance received for Korean Patent Application No. 10-2021-0143923, mailed on Jan. 27, 2022, 4 pages (1 page of English Translation and 3 pages of Official Copy).

Notice of Allowance received for Korean Patent Application No. 10-2021-7005691, mailed on Mar. 29, 2021, 3 pages (1 page of English Translation and 2 pages of Official Copy).

Notice of Allowance received for Korean Patent Application No. 10-2021-7020549, mailed on Jul. 13, 2021, 3 pages (1 page of English Translation and 2 pages of Official Copy).

Notice of Allowance received for Korean Patent Application No. 10-2021-7021047, mailed on Dec. 6, 2021, 3 pages (1 page of English Translation and 2 pages of Official Copy).

Notice of Allowance received for Korean Patent Application No. 10-2021-7032984, mailed on Jun. 29, 2022, 5 pages (2 pages of English Translation and 3 pages of Official Copy).

Notice of Allowance received for Korean Patent Application No. 10-2021-7035472, mailed on Nov. 23, 2021, 4 pages (2 pages of English Translation and 2 pages of Official Copy).

Notice of Allowance received for Korean Patent Application No. 10-2021-7039234, mailed on Dec. 20, 2021, 4 pages (1 page of English Translation and 3 pages of Official Copy).

Notice of Allowance received for Korean Patent Application No. 10-2022-0091730, mailed on Oct. 4, 2022, 5 pages (2 pages of English Translation and 3 pages of Official Copy).

Notice of Allowance received for Korean Patent Application No. 10-2022-7006175, mailed on Jan. 12, 2023, 7 pages (2 pages of English Translation and 5 pages of Official Copy).

Notice of Allowance received for Korean Patent Application No. 10-2022-7008567, mailed on Jul. 4, 2022, 9 pages (2 pages of English Translation and 7 pages of Official Copy).

Notice of Allowance received for Korean Patent Application No. 10-2014-7008348, mailed on Feb. 21, 2019, 5 pages (2 pages of English Translation and 3 pages of Official Copy).

Notice of Allowance received for Mexican Patent Application No. MX/a/2016/001209, mailed on Mar. 26, 2018, 3 pages (1 pages of English Translation and 2 pages of Official Copy).

Notice of Allowance received for Taiwanese Patent Application No. 104108223, mailed on Jan. 10, 2017, 3 pages (Official Copy Only) {See Communication Under 37 CFR § 1.98(a) (3)}.

Notice of Allowance received for Taiwanese Patent Application No. 104114953, mailed on Oct. 17, 2017, 3 pages (Official Copy only) {See Communication Under 37 CFR § 1.98(a) (3)}.

Notice of Allowance Received for Taiwanese Patent Application No. 104117041, mailed on Feb. 24, 2017, 3 pages. (Official Copy Only) {See Communication Under 37 CFR § 1.98(a) (3)}.

Notice of Allowance received for Taiwanese Patent Application No. 106144804, mailed on Jun. 27, 2018, 6 pages (2 pages of English Translation and 4 pages of Official copy).

Notice of Allowance received for Taiwanese Patent Application No. 104117042, mailed on Nov. 17, 2017, 5 pages (2 pages of English Translation and 3 pages of Official Copy).

Notice of Allowance received for U.S. Appl. No. 16/702,968, mailed on Apr. 21, 2021, 20 pages.

Notice of Allowance received for U.S. Appl. No. 13/248,872, mailed on Dec. 4, 2014, 7 pages.

Notice of Allowance received for U.S. Appl. No. 13/248,882, mailed on Mar. 13, 2014, 16 pages.

(56) References Cited

OTHER PUBLICATIONS

Notice of Allowance received for U.S. Appl. No. 13/492,057, mailed on Jan. 3, 2017, 5 pages.

Notice of Allowance received for U.S. Appl. No. 13/492,057, mailed on May 18, 2017, 3 pages.

Notice of Allowance received for U.S. Appl. No. 13/587,850, mailed on Feb. 27, 2020, 5 pages.

Notice of Allowance received for U.S. Appl. No. 13/587,850, mailed on Nov. 8, 2019, 6 pages.

Notice of Allowance received for U.S. Appl. No. 14/285,378, mailed May 19, 2016, 10 pages.

Notice of Allowance received for U.S. Appl. No. 14/503,327, mailed on Mar. 22, 2018, 5 pages.

Notice of Allowance received for U.S. Appl. No. 14/503,327, mailed on Nov. 30, 2017, 5 pages.

Notice of Allowance received for U.S. Appl. No. 14/641,289, mailed on Aug. 24, 2017, 6 pages.

Notice of Allowance received for U.S. Appl. No. 14/641,289, mailed on Dec. 12, 2017, 5 pages.

Notice of Allowance received for U.S. Appl. No. 14/641,298, mailed on Nov. 29, 2021, 8 pages.

Notice of Allowance received for U.S. Appl. No. 14/641,304, mailed on Sep. 9, 2020, 15 pages.

Notice of Allowance received for U.S. Appl. No. 14/642,366, mailed on Jan. 14, 2016, 8 pages.

Notice of Allowance received for U.S. Appl. No. 14/719,217, mailed on Feb. 13, 2019, 13 pages.

Notice of Allowance received for U.S. Appl. No. 16/583,981, mailed on Apr. 10, 2018, 7 pages.

Notice of Allowance received for U.S. Appl. No. 16/583,981, mailed on Jul. 27, 2018, 7 pages.

Notice of Allowance received for U.S. Appl. No. 16/583,981, mailed on May 1, 2019, 12 pages.

Notice of Allowance received for U.S. Appl. No. 16/583,981, mailed on May 3, 2017, 6 pages.

Notice of Allowance received for U.S. Appl. No. 16/583,981, mailed on Sep. 7, 2017, 5 pages.

Notice of Allowance received for U.S. Appl. No. 16/583,981, mailed on Apr. 1, 2021, 19 pages.

Notice of Allowance received for U.S. Appl. No. 16/583,981, mailed on Oct. 21, 2020, 29 pages.

Notice of Allowance received for U.S. Appl. No. 16/583,981, mailed on Feb. 14, 2019, 6 pages.

Notice of Allowance received for U.S. Appl. No. 16/583,981, mailed on Feb. 18, 2021, 3 pages.

Notice of Allowance received for U.S. Appl. No. 16/583,981, mailed Jan. 22, 2021, 33 pages.

Notice of Allowance received for U.S. Appl. No. 16/583,981, mailed on May 20, 2019, 7 pages.

Notice of Allowance received for U.S. Appl. No. 16/583,981, mailed on Sep. 11, 2018, 16 pages.

Notice of Allowance received for U.S. Appl. No. 16/583,981, mailed on Sep. 6, 2019, 7 pages.

Notice of Allowance received for U.S. Appl. No. 16/583,981, mailed on Dec. 4, 2019, 6 pages.

Notice of Allowance received for U.S. Appl. No. 16/583,981, mailed on Apr. 20, 2021, 12 pages.

Notice of Allowance received for U.S. Appl. No. 16/583,981, mailed on Jun. 15, 2021, 13 pages.

Notice of Allowance received for U.S. Appl. No. 16/583,981, mailed on Apr. 7, 2020, 5 pages.

Notice of Allowance received for U.S. Appl. No. 16/583,981, mailed on Mar. 26, 2021, 10 pages.

Notice of Allowance received for U.S. Appl. No. 16/583,989, mailed on Apr. 1, 2021, 5 pages.

Notice of Allowance received for U.S. Appl. No. 16/583,989, mailed on Dec. 24, 2020, 7 pages.

Notice of Allowance received for U.S. Appl. No. 16/583,994, mailed on Jun. 24, 2021, 10 pages.

Notice of Allowance received for U.S. Appl. No. 16/584,490, mailed on Aug. 27, 2020, 13 pages.

Notice of Allowance received for U.S. Appl. No. 16/584,490, mailed on Mar. 26, 2021, 13 pages.

Notice of Allowance received for U.S. Appl. No. 16/584,743, mailed on Aug. 7, 2020, 8 pages.

Notice of Allowance received for U.S. Appl. No. 16/584,743, mailed on Nov. 16, 2020, 7 pages.

Notice of Allowance received for U.S. Appl. No. 16/586,002, mailed on Jun. 9, 2020, 5 pages.

Notice of Allowance received for U.S. Appl. No. 16/670,949, mailed on May 27, 2021, 7 pages.

Notice of Allowance received for U.S. Appl. No. 16/670,949, mailed on Sep. 14, 2021, 7 pages.

Notice of Allowance received for U.S. Appl. No. 16/679,967, mailed on Jun. 15, 2022, 7 pages.

Notice of Allowance received for U.S. Appl. No. 16/679,967, mailed on Nov. 2, 2022, 7 pages.

Notice of Allowance received for U.S. Appl. No. 16/803,849, mailed on May 17, 2022, 12 pages.

Notice of Allowance received for U.S. Appl. No. 16/807,604, mailed on Apr. 30, 2021, 25 pages.

Notice of Allowance received for U.S. Appl. No. 16/836,571, mailed on Feb. 14, 2022, 31 pages.

Notice of Allowance received for U.S. Appl. No. 16/836,571, mailed on Sep. 8, 2021, 25 pages.

Notice of Allowance received for U.S. Appl. No. 16/888,775, mailed on Feb. 21, 2023, 5 pages.

Notice of Allowance received for U.S. Appl. No. 16/888,775, mailed on Jan. 12, 2022, 5 pages.

Notice of Allowance received for U.S. Appl. No. 16/888,775, mailed on Jul. 26, 2021, 5 pages.

Notice of Allowance received for U.S. Appl. No. 16/888,775, mailed on Jun. 3, 2021, 11 pages.

Notice of Allowance received for U.S. Appl. No. 16/888,775, mailed on Oct. 19, 2022, 6 pages.

Notice of Allowance received for U.S. Appl. No. 16/921,551, mailed on Jan. 13, 2022, 6 pages.

Notice of Allowance received for U.S. Appl. No. 16/922,675, mailed on Dec. 8, 2022, 9 pages.

Notice of Allowance received for U.S. Appl. No. 16/922,675, mailed on Feb. 10, 2022, 8 pages.

Notice of Allowance received for U.S. Appl. No. 16/922,675, mailed on Jan. 21, 2021, 7 pages.

Notice of Allowance received for U.S. Appl. No. 16/922,675, mailed on Jul. 19, 2023, 13 pages.

Notice of Allowance received for U.S. Appl. No. 16/922,675, mailed on Mar. 22, 2023, 8 pages.

Notice of Allowance received for U.S. Appl. No. 16/922,675, mailed on Sep. 27, 2021, 10 pages.

Notice of Allowance received for U.S. Appl. No. 16/987,003, mailed on Aug. 18, 2021, 9 pages.

Notice of Allowance received for U.S. Appl. No. 17/019,845, mailed on Jun. 5, 2023, 10 pages.

Notice of Allowance received for U.S. Appl. No. 17/026,818, mailed on May 13, 2021, 10 pages.

Notice of Allowance received for U.S. Appl. No. 17/027,373, mailed on Aug. 2, 2022, 2 pages.

Notice of Allowance received for U.S. Appl. No. 17/027,373, mailed on Jun. 3, 2022, 8 pages.

Notice of Allowance received for U.S. Appl. No. 17/027,373, mailed on Oct. 3, 2022, 5 pages.

Notice of Allowance received for U.S. Appl. No. 17/031,833, mailed on Jun. 25, 2021, 15 pages.

Notice of Allowance received for U.S. Appl. No. 17/031,833, mailed on Sep. 20, 2021, 6 pages.

Notice of Allowance received for U.S. Appl. No. 17/168,069, mailed on Jan. 19, 2022, 12 pages.

Notice of Allowance received for U.S. Appl. No. 17/168,069, mailed on Mar. 22, 2022, 5 pages.

Notice of Allowance received for U.S. Appl. No. 17/306,354, mailed on Jul. 24, 2023, 7 pages.

(56) References Cited

OTHER PUBLICATIONS

Notice of Allowance received for U.S. Appl. No. 17/320,900, mailed on Aug. 29, 2023, 14 pages.

Notice of Allowance received for U.S. Appl. No. 17/461,103, mailed on Jun. 20, 2022, 6 pages.

Notice of Allowance received for U.S. Appl. No. 17/461,103, mailed on Mar. 17, 2022, 10 pages.

Notice of Allowance received for U.S. Appl. No. 17/509,356, mailed on Apr. 7, 2023, 11 pages.

Notice of Allowance received for U.S. Appl. No. 17/519,025, mailed on Jun. 22, 2023, 7 pages.

Notice of Allowance received for U.S. Appl. No. 17/519,025, mailed on Mar. 2, 2023, 8 pages.

Notice of Allowance received for U.S. Appl. No. 17/666,971, mailed on Aug. 16, 2023, 8 pages.

Notice of Allowance received for U.S. Appl. No. 17/752,582, mailed on Jun. 13, 2023, 18 pages.

Notice of Allowance received for U.S. Appl. No. 17/848,845, mailed on May 24, 2023, 26 pages.

Notice of Allowance received for U.S. Appl. No. 17/867,317, mailed on Aug. 30, 2023, 6 pages.

Notice of Allowance received for U.S. Appl. No. 17/867,317, mailed on Jul. 6, 2023, 11 pages.

Notice of Allowance received for U.S. Appl. No. 18/077,905, mailed on Mar. 24, 2023, 18 pages.

Notice of Allowance received for U.S. Appl. No. 14/841,455, mailed on Oct. 22, 2019, 10 pages.

Notice of Hearing received for Indian Patent Application No. 717/CHENP/2014, mailed on May 5, 2021, 3 pages.

Office Action received for Australian Patent Application No. 2016230001, mailed on Feb. 7, 2018, 3 pages.

Office Action received for European Patent Application No. 15711969.4, mailed on Nov. 17, 2017, 9 pages.

Office Action received for Australian Patent Application No. 2015100490, mailed on Dec. 15, 2016, 2 pages.

Office Action received for Australian Patent Application No. 2015267671, mailed on Apr. 5, 2017, 2 pages.

Office Action received for Australian Patent Application No. 2015302298, mailed on Apr. 4, 2018, 3 pages.

Office Action received for Australian Patent Application No. 2015302298, mailed on Jul. 20, 2018, 3 pages.

Office Action received for Australian Patent Application No. 2015302298, mailed on Sep. 14, 2017, 3 pages.

Office Action received for Australian Patent Application No. 2015302298, mailed on Sep. 4, 2018, 5 pages.

Office Action received for Australian Patent Application No. 2016201454, mailed on Mar. 29, 2017, 3 pages.

Office Action received for Australian Patent Application No. 2016266010, mailed on Aug. 23, 2018, 4 pages.

Office Action received for Australian Patent Application No. 2016266010, mailed on May 4, 2018, 4 pages.

Office Action received for Australian Patent Application No. 2016266010, mailed on Nov. 28, 2018, 5 pages.

Office Action received for Australian Patent Application No. 2016266010, mailed on Nov. 30, 2017, 5 pages.

Office Action received for Australian Patent Application No. 2017100553, mailed on Aug. 4, 2017, 5 pages.

Office Action received for Australian Patent Application No. 2017101563, mailed on Jan. 22, 2018, 2 pages.

Office Action received for Australian Patent Application No. 2017101563, mailed on Jun. 26, 2018, 3 pages.

Office Action received for Australian Patent Application No. 2017266867, mailed on Dec. 6, 2018, 3 pages.

Office Action received for Australian Patent Application No. 2017284013, mailed on Mar. 19, 2020, 3 pages.

Office Action received for Australian Patent Application No. 2018101014, mailed on Jan. 18, 2019, 5 pages.

Office Action received for Australian Patent Application No. 2018101014, mailed on Sep. 19, 2018, 4 pages.

Office Action received for Australian Patent Application No. 2018202751, mailed on Apr. 2, 2019, 4 pages.

Office Action received for Australian Patent Application No. 2018203624, mailed on Feb. 5, 2020, 4 pages.

Office Action received for Australian Patent Application No. 2018203624, mailed on Mar. 11, 2020, 5 pages.

Office Action received for Australian Patent Application No. 2018203624, mailed on Mar. 15, 2019, 6 pages.

Office Action received for Australian Patent Application No. 2018203624, mailed on Oct. 30, 2019, 5 pages.

Office Action received for Australian Patent Application No. 2018220115, mailed on Apr. 21, 2020, 3 pages.

Office Action received for Australian Patent Application No. 2018220115, mailed on Oct. 4, 2019, 3 pages.

Office Action received for Australian Patent Application No. 2018229544, mailed on Nov. 15, 2019, 4 pages.

Office Action received for Australian Patent Application No. 2018236870, mailed on Jul. 29, 2019, 7 pages.

Office Action received for Australian Patent Application No. 2018236870, mailed on Nov. 21, 2018, 10 pages.

Office Action received for Australian Patent Application No. 2018236870, mailed on Oct. 31, 2019, 8 pages.

Office Action received for Australian Patent Application No. 2018236872, mailed on Nov. 23, 2018, 4 pages.

Office Action received for Australian Patent Application No. 2018271366, mailed on Feb. 25, 2020, 5 pages.

Office Action received for Australian Patent Application No. 2018271366, mailed on Jan. 19, 2021, 5 pages.

Office Action received for Australian Patent Application No. 2018271366, mailed on May 17, 2021, 5 pages.

Office Action received for Australian Patent Application No. 2018271366, mailed on Oct. 26, 2020, 5 pages.

Office Action received for Australian Patent Application No. 2019203473, mailed on Oct. 25, 2019, 2 pages.

Office Action received for Australian Patent Application No. 2019268111, mailed on Oct. 27, 2020, 7 pages.

Office Action received for Australian Patent Application No. 2020207785, mailed on Dec. 14, 2021, 5 pages.

Office Action received for Australian Patent Application No. 2020207785, mailed on Jul. 13, 2021, 3 pages.

Office Action received for Australian Patent Application No. 2020239711, mailed on Sep. 13, 2021, 5 pages.

Office Action received for Australian Patent Application No. 2020257092, mailed on Mar. 3, 2021, 7 pages.

Office Action received for Australian Patent Application No. 2020257092, mailed on Nov. 30, 2020, 6 pages.

Office Action received for Australian Patent Application No. 2020273355, mailed on Jul. 6, 2021, 3 pages.

Office Action received for Australian Patent Application No. 2020273355, mailed on Nov. 23, 2021, 6 pages.

Office Action received for Australian Patent Application No. 2020282362, mailed on Nov. 25, 2021, 3 pages.

Office Action received for Australian Patent Application No. 2021201243, mailed on Dec. 12, 2022, 3 pages.

Office Action received for Australian Patent Application No. 2021201243, mailed on Feb. 17, 2022, 4 pages.

Office Action received for Australian Patent Application No. 2021201243, mailed on Jun. 1, 2022, 5 pages.

Office Action received for Australian Patent Application No. 2021201403, mailed on Mar. 16, 2021, 3 pages.

Office Action received for Australian Patent Application No. 2021203669, mailed on Apr. 5, 2022, 3 pages.

Office Action received for Australian Patent Application No. 2021204454, mailed on Aug. 9, 2021, 7 pages.

Office Action received for Australian Patent Application No. 2021261941, mailed on Nov. 3, 2022, 3 pages.

Office Action received for Australian Patent Application No. 2022200515, mailed on Nov. 2, 2022, 2 pages.

Office Action received for Australian Patent Application No. 2022200901, mailed on Dec. 19, 2022, 4 pages.

Office Action received for Australian Patent Application No. 2022201532, mailed on Dec. 19, 2022, 5 pages.

(56)  References Cited

OTHER PUBLICATIONS

Office Action received for Australian Patent Application No. 2022204555, mailed on Feb. 17, 2023, 5 pages.

Office Action received for Australian Patent Application No. 2022218517, mailed on Apr. 27, 2023, 7 pages.

Office Action received for Australian Patent Application No. 2022218517, mailed on Jul. 24, 2023, 6 pages.

Office Action received for Australian Patent Application No. 2022218540, mailed on Aug. 3, 2023, 5 pages.

Office Action received for Australian Patent Application No. 2022235591, mailed on Jun. 6, 2023, 3 pages.

Office Action received for Australian Patent Application No. 2022235591, mailed on Jun. 28, 2023, 3 pages.

Office Action received for Australian Patent Application No. 2022241590, mailed on Aug. 15, 2023, 6 pages.

Office Action received for Australian Patent Application No. 2022241590, mailed on Jun. 7, 2023, 7 pages.

Office Action received for Australian Patent Application No. 2022241590, mailed on Mar. 17, 2023, 5 pages.

Office Action received for Australian Patent Application No. 2022241590, mailed on Nov. 18, 2022, 8 pages.

Office Action received for Brazilian Patent Application No. BR112014003009-0, mailed on Oct. 29, 2019, 6 pages (1 page of English translation and 5 pages of Official Copy).

Office Action received for Chinese Patent Application No. 201280040169.9, mailed on Jun. 1, 2016, 10 pages (3 pages of English Translation and 7 pages of Official Copy).

Office Action received for Chinese Patent Application No. 201280040169.9, mailed on Mar. 31, 2017, 13 pages (7 pages of English Translation and 6 pages of Official Copy).

Office Action received for Chinese Patent Application No. 201280040169.9, mailed on May 14, 2018, 6 pages (3 page of English Translation and 3 pages of Official copy).

Office Action received for Chinese Patent Application No. 201280040169.9, mailed on Sep. 20, 2017, 14 pages (6 pages of English Translation and 8 pages of official copy).

Office Action received for Chinese Patent Application No. 201510288981.9, mailed on Jul. 1, 2019, 16 pages (8 pages of English Translation and 8 pages of Official Copy).

Office Action received for Chinese Patent Application No. 201510288981.9, mailed on Jul. 3, 2018, 19 pages (8 pages of English Translation and 11 pages of official copy).

Office Action received for Chinese Patent Application No. 201510288981.9, mailed on Mar. 6, 2019, 20 pages (10 pages of English Translation and 10 pages of Official Copy).

Office Action received for Chinese Patent Application No. 201580028491.3, mailed on Oct. 8, 2018, 9 pages (3 pages of English Translation and 6 pages of Official Copy).

Office Action received for Chinese Patent Application No. 201580028505.1, mailed on Jan. 16, 2019, 15 pages (5 pages of English Translation and 10 pages of Official Copy).

Office Action received for Chinese Patent Application No. 201580028505.1, mailed on Jun. 20, 2019, 7 pages (3 pages of English Translation and 4 pages of Official Copy).

Office Action received for Chinese Patent Application No. 201580043701.6, mailed on Dec. 24, 2018, 20 pages (5 pages of English Translation and 15 pages of Official copy).

Office Action received for Chinese Patent Application No. 201580043701.6, mailed on May 8, 2021, 10 pages (1 page of English Translation and 9 pages of Official Copy).

Office Action received for Chinese Patent Application No. 201580043701.6, mailed on Nov. 4, 2019, 20 pages (6 pages of English Translation and 14 pages of Official Copy).

Office Action received for Chinese Patent Application No. 201580043701.6, mailed on Oct. 12, 2020, 22 pages (5 pages of English Translation and 17 pages of Official Copy).

Office Action received for Chinese Patent Application No. 201580043701.6, mailed on Sep. 10, 2021, 10 pages (5 pages of English Translation and 5 pages of Official Copy).

Office Action received for Chinese Patent Application No. 201680011682.3, mailed on Dec. 2, 2019, 14 pages (7 pages of English Translation and 7 pages of Official Copy).

Office Action received for Chinese Patent Application No. 201711292804.3, mailed on Aug. 5, 2020, 26 pages (16 pages of English Translation and 10 pages of Official Copy).

Office Action received for Chinese Patent Application No. 201711292804.3, mailed on Feb. 23, 2021, 17 pages (8 pages of English Translation and 9 pages of Official Copy).

Office Action received for Chinese Patent Application No. 201711292804.3, mailed on Sep. 10, 2021, 19 pages (8 pages of English Translation and 11 pages of Official Copy).

Office Action received for Chinese Patent Application No. 201780002398.4, mailed on Feb. 27, 2019, 6 pages (3 pages of English Translation and 3 pages of Official Copy).

Office Action received for Chinese Patent Application No. 201780002398.4, mailed on Sep. 12, 2018, 17 pages (5 pages of English Translation and 12 pages of Official Copy).

Office Action received for Chinese Patent Application No. 201780033899.9, mailed on Sep. 3, 2021, 12 pages (6 pages of English Translation and 6 pages of Official Copy).

Office Action received for Chinese Patent Application No. 201810338038.8, mailed on Jan. 21, 2020, 26 pages (13 pages of English Translation and 13 pages of Official Copy).

Office Action received for Chinese Patent Application No. 201810338038.8, mailed on May 14, 2019, 26 pages (13 pages of English Translation and 13 pages of Official Copy).

Office Action received for Chinese Patent Application No. 201810338040.5, mailed on Jun. 3, 2021, 25 pages (15 pages of English Translation and 10 pages of Official Copy).

Office Action received for Chinese Patent Application No. 201810338040.5, mailed on Oct. 25, 2021, 22 pages (13 pages of English Translation and 9 pages of Official Copy).

Office Action received for Chinese Patent Application No. 201810338826.7, mailed on Apr. 3, 2019, 21 pages (13 pages of English Translation and 8 pages of Official Copy).

Office Action received for Chinese Patent Application No. 201810338826.7, mailed on Jan. 16, 2020, 16 pages (10 pages of English Translation and 6 pages of Official Copy).

Office Action received for Chinese Patent Application No. 201810338826.7, mailed on Oct. 21, 2019, 19 pages (12 pages of English Translation and 7 pages of Official Copy).

Office Action received for Chinese Patent Application No. 201810339290.0, mailed on Jun. 4, 2021, 20 pages (11 pages of English Translation and 9 pages of Official Copy).

Office Action received for Chinese Patent Application No. 201810339290.0, mailed on Oct. 18, 2021, 20 pages (11 pages of English Translation and 9 pages of Official Copy).

Office Action received for Chinese Patent Application No. 201811367893.8, mailed on Apr. 27, 2022, 11 pages (5 pages of English Translation and 6 pages of Official Copy).

Office Action received for Chinese Patent Application No. 201811367893.8, mailed on Feb. 15, 2022, 14 pages (6 pages of English Translation and 8 pages of Official Copy).

Office Action received for Chinese Patent Application No. 201811367893.8, mailed on Jun. 21, 2021, 18 pages (8 pages of English Translation and 10 pages of Official Copy).

Office Action received for Chinese Patent Application No. 201811367893.8, mailed on Nov. 29, 2021, 6 pages (3 pages of English Translation and 3 pages of Official Copy).

Office Action received for Chinese Patent Application No. 201811377642.8, mailed on Jun. 10, 2023, 13 pages (4 pages of English Translation and 9 pages of Official Copy).

Office Action received for Chinese Patent Application No. 201811377642.8, mailed on Oct. 27, 2022, 20 pages (08 pages of English Translation and 12 pages of Official Copy).

Office Action received for Chinese Patent Application No. 201811379281.0, mailed on May 16, 2023, 16 pages (6 pages of English Translation and 10 pages of Official Copy).

Office Action received for Chinese Patent Application No. 201811379281.0, mailed on Oct. 27, 2022, 21 pages (8 pages of English Translation and 13 pages of Official Copy).

(56)     References Cited

OTHER PUBLICATIONS

Office Action received for Chinese Patent Application No. 201811460172.1, mailed on Jan. 21, 2020, 17 pages (8 pages of English Translation and 9 pages of Official Copy).

Office Action received for Chinese Patent Application No. 201811460172.1, mailed on Oct. 14, 2020, 7 pages (4 pages of English Translation and 3 pages of Official Copy).

Office Action received for Chinese Patent Application No. 201811539259.8, mailed on Apr. 3, 2020, 10 pages (6 pages of English Translation and 4 pages of Official Copy).

Office Action received for Chinese Patent Application No. 201811539259.8, mailed on Mar. 13, 2023, 16 pages (8 pages of English Translation and 8 pages of Official Copy).

Office Action received for Chinese Patent Application No. 201811539259.8, mailed on May 24, 2023, 25 pages (5 pages of English Translation and 20 pages of Official Copy).

Office Action received for Chinese Patent Application No. 201811539259.8, mailed on Sep. 3, 2020, 10 pages (6 pages of English Translation and 4 pages of Official Copy).

Office Action received for Chinese Patent Application No. 201811539259.8, mailed on Sep. 18, 2019, 12 pages (6 pages of English Translation and 6 pages of Official Copy).

Office Action received for Chinese Patent Application No. 201811539260.0, mailed on Jun. 3, 2020, 8 pages (5 pages of English Translation and 3 pages of Official Copy).

Office Action received for Chinese Patent Application No. 201811539260.0, mailed on Nov. 4, 2020, 9 pages (5 pages of English Translation and 4 pages of Official Copy).

Office Action received for Chinese Patent Application No. 201811539260.0, mailed on Oct. 8, 2019, 14 pages (7 pages of English Translation and 7 pages of Official Copy).

Office Action received for Chinese Patent Application No. 201880001436.9, mailed on Apr. 28, 2019, 19 pages (11 pages of English Translation and 8 pages of Official copy).

Office Action received for Chinese Patent Application No. 201880001436.9, mailed on Nov. 6, 2019, 24 pages (15 pages of English Translation and 9 pages of Official Copy).

Office Action received for Chinese Patent Application No. 201910475434.X, mailed on Dec. 4, 2019, 14 pages (8 pages of English Translation and 6 pages of Official Copy).

Office Action received for Chinese Patent Application No. 201910475434.X, mailed on Jun. 3, 2020, 9 pages (5 pages of English Translation and 4 pages of Official Copy).

Office Action received for Chinese Patent Application No. 201910475434.X, mailed on Oct. 30, 2020, 9 pages (5 pages of English Translation and 4 pages of Official Copy).

Office Action received for Chinese Patent Application No. 201911099970.0, mailed on Feb. 23, 2023, 15 pages (5 pages of English Translation and 10 pages of Official Copy).

Office Action received for Chinese Patent Application No. 201911128105.4, mailed on Apr. 8, 2021, 10 pages (5 pages of English Translation and 5 pages of Official Copy).

Office Action received for Chinese Patent Application No. 201911128105.4, mailed on Jan. 4, 2021, 14 pages (7 pages of English Translation and 7 pages of Official Copy).

Office Action received for Chinese Patent Application No. 201911128105.4, mailed on Jul. 3, 2020, 18 pages (9 pages of English Translation and 9 pages of Official Copy).

Office Action received for Chinese Patent Application No. 201911288715.0, mailed on Jan. 20, 2023, 23 pages (11 pages of English Translation and 12 pages of Official Copy).

Office Action received for Chinese Patent Application No. 202010125114.4, mailed on Aug. 21, 2020, 16 pages (8 pages of English Translation and 8 pages of Official Copy).

Office Action received for Chinese Patent Application No. 202010125114.4, mailed on Jun. 7, 2021, 7 pages (4 pages of English Translation and 3 pages of Official Copy).

Office Action received for Chinese Patent Application No. 202010125114.4, mailed on Mar. 1, 2021, 15 pages (9 pages of English Translation and 6 pages of Official Copy).

Office Action received for Chinese Patent Application No. 202011450203.2, mailed on Apr. 20, 2022, 9 pages (5 pages of English Translation and 4 pages of Official Copy).

Office Action received for Chinese Patent Application No. 202011450203.2, mailed on Sep. 1, 2021, 12 pages (6 pages of English Translation and 6 pages of Official Copy).

Office Action received for Chinese Patent Application No. 202080039642.6, mailed on Sep. 5, 2022, 12 pages (6 pages of English Translation and 6 pages of Official Copy).

Office Action received for Chinese Patent Application No. 202110235995.X, mailed on Mar. 22, 2022, 17 pages (9 pages of English Translation and 8 pages of Official Copy).

Office Action received for Chinese Patent Application No. 202110235995.X, mailed on Sep. 30, 2022, 13 pages (7 pages of English Translation and 6 pages of Official Copy).

Office Action received for Chinese Patent Application No. 202111612841.4, mailed on Jul. 22, 2022, 13 pages (7 pages of English Translation and 6 pages of Official Copy).

Office Action received for Chinese Patent Application No. 202111652452.4, mailed on Aug. 29, 2022, 23 pages (12 pages of English Translation and 11 pages of Official Copy).

Office Action received for Chinese Patent Application No. 202111652452.4, mailed on Feb. 11, 2023, 28 pages (13 pages of English Translation and 15 pages of Official Copy).

Office Action received for Chinese Patent Application No. 202111652452.4, mailed on May 19, 2023, 15 pages (8 pages of English Translation and 7 pages of Official Copy).

Office Action received for Danish Patent Application No. PA201570256, mailed on Mar. 17, 2016, 5 pages.

Office Action received for Danish Patent Application No. PA201570256, mailed on May 23, 2017, 3 pages.

Office Action received for Danish Patent Application No. PA201570256, mailed on Oct. 10, 2016, 3 pages.

Office Action received for Danish Patent Application No. PA201670622, mailed on Aug. 17, 2018, 4 pages.

Office Action received for Danish Patent Application No. PA201670622, mailed on May 30, 2017, 4 pages.

Office Action received for Danish Patent Application No. PA201670622, mailed on Nov. 1, 2017, 5 pages.

Office Action received for Danish Patent Application No. PA201670622, mailed on Oct. 31, 2016, 11 pages.

Office Action received for Danish Patent Application No. PA201670628, mailed on Jun. 6, 2017, 3 pages.

Office Action received for Danish Patent Application No. PA201670628, mailed on Oct. 26, 2016, 7 pages.

Office Action received for Danish Patent Application No. PA201770392, mailed on Apr. 17, 2018, 2 pages.

Office Action received for Danish Patent Application No. PA201770392, mailed on Dec. 8, 2017, 4 pages.

Office Action received for Danish Patent Application No. PA201770392, mailed on Jun. 20, 2017, 11 pages.

Office Action received for Danish Patent Application No. PA201770401, mailed on Jan. 31, 2018, 3 pages.

Office Action received for Danish Patent Application No. PA201770401, mailed on May 17, 2018, 3 pages.

Office Action received for Danish Patent Application No. PA201770402, mailed on Apr. 16, 2018, 5 pages.

Office Action received for Danish Patent Application No. PA201770402, mailed on Dec. 18, 2017, 6 pages.

Office Action received for Danish Patent Application No. PA201770402, mailed on Jun. 19, 2017, 11 pages.

Office Action received for Danish Patent Application No. PA201770403, mailed on Dec. 12, 2017, 3 pages.

Office Action received for Danish Patent Application No. PA201770403, mailed on Jun. 16, 2017, 8 pages.

Office Action received for Danish Patent Application No. PA201770404, mailed on Aug. 8, 2018, 4 pages.

Office Action received for Danish Patent Application No. PA201770404, mailed on Dec. 1, 2017, 5 pages.

Office Action received for Danish Patent Application No. PA201770404, mailed on Feb. 21, 2019, 2 pages.

Office Action received for Danish Patent Application No. PA201770404, mailed on May 1, 2019, 2 pages.

(56)    References Cited

OTHER PUBLICATIONS

Office Action received for Danish Patent Application No. PA201770406, mailed on Feb. 27, 2018, 7 pages.
Office Action received for Danish Patent Application No. PA201770406, mailed on Jan. 25, 2019, 8 pages.
Office Action received for Danish Patent Application No. PA201770406, mailed on Jun. 22, 2017, 11 pages.
Office Action received for Danish Patent Application No. PA201770406, mailed on Mar. 26, 2019, 3 pages.
Office Action received for Danish Patent Application No. PA201770406, mailed on Nov. 11, 2019, 4 pages.
Office Action received for Danish Patent Application No. PA201770408, mailed on Dec. 21, 2017., 6 pages.
Office Action received for Danish Patent Application No. PA201770408, mailed on Jun. 20, 2017, 9 pages.
Office Action received for Danish Patent Application No. PA201770408, mailed on May 3, 2018, 7 pages.
Office Action received for Danish Patent Application No. PA201770410, mailed on Apr. 9, 2018, 5 pages.
Office Action received for Danish Patent Application No. PA201770410, mailed on Jun. 23, 2017, 9 pages.
Office Action received for Danish Patent Application No. PA201770410, mailed on Nov. 22, 2018, 5 pages.
Office Action received for Danish Patent Application No. PA201770782, mailed on Jan. 26, 2018, 8 pages.
Office Action received for Danish Patent Application No. PA201770782, mailed on Nov. 22, 2018, 3 pages.
Office Action received for Danish Patent Application No. PA201870060, mailed on Jan. 15, 2019, 4 pages.
Office Action received for Danish Patent Application No. PA201870060, mailed on Jul. 25, 2019, 2 pages.
Office Action received for Danish Patent Application No. PA201870419, mailed on Feb. 27, 2020, 8 pages.
Office Action received for Danish Patent Application No. PA201870419, mailed on Sep. 30, 2019, 4 pages.
Office Action received for Danish Patent Application No. PA201870598, mailed on May 1, 2019, 3 pages.
Office Action received for Danish Patent Application No. PA201870598, mailed on Nov. 8, 2019, 4 pages.
Office Action received for Danish Patent Application No. PA201970533, mailed on Apr. 20, 2021, 2 pages.
Office Action received for Danish Patent Application No. PA201970533, mailed on Jul. 17, 2020, 6 pages.
Office Action received for Danish Patent Application No. PA202070560, mailed on Dec. 11, 2020, 7 pages.
Office Action received for Danish Patent Application No. PA202070560, mailed on Mar. 10, 2021, 7 pages.
Office Action received for Danish Patent Application No. PA202070617, mailed on Sep. 24, 2021, 4 pages.
Office Action received for Danish Patent Application No. PA202170320, mailed on May 3, 2022, 3 pages.
Office Action received for Danish Patent Application No. PA202270464, mailed on Dec. 20, 2022, 3 pages.
Office Action received for Danish Patent Application No. PA202270464, mailed on Oct. 25, 2022, 9 pages.
Office Action received for European Patent Application No. 12753631.6, mailed on Jul. 10, 2017, 6 pages.
Office Action received for European Patent Application No. 12770400.5, mailed on Mar. 10, 2015, 5 pages.
Office Action received for European Patent Application No. 12773460.6, mailed on Feb. 19, 2018, 6 pages.
Office Action received for European Patent Application No. 13171047.7, mailed on May 24, 2017, 7 pages.
Office Action received for European Patent Application No. 15713062.6, mailed on Dec. 6, 2017, 7 pages.
Office Action received for European Patent Application No. 15714698.6, mailed on Apr. 18, 2023, 14 pages.
Office Action received for European Patent Application No. 15714698.6, mailed on Oct. 13, 2021, 2 pages.

Office Action received for European Patent Application No. 15719347.5, mailed on Apr. 9, 2020, 4 pages.
Office Action received for European Patent Application No. 15719347.5, mailed on Jun. 17, 2019, 4 pages.
Office Action received for European Patent Application No. 16710590.7, mailed on Mar. 15, 2019, 10 pages.
Office Action received for European Patent Application No. 17799904.2, mailed on Oct. 21, 2020, 6 pages.
Office Action received for European Patent Application No. 17813737.8, mailed on Apr. 16, 2021, 7 pages.
Office Action received for European Patent Application No. 18178147.7, mailed on Mar. 20, 2020, 4 pages.
Office Action received for European Patent Application No. 18197583.0, mailed on Feb. 28, 2020, 8 pages.
Office Action received for European Patent Application No. 18197589.7, mailed on Oct. 1, 2019, 5 pages.
Office Action received for European Patent Application No. 18208881.5, mailed on Jun. 11, 2019, 5 pages.
Office Action received for European Patent Application No. 18208881.5, mailed on May 7, 2021, 6 pages.
Office Action received for European Patent Application No. 18728002.9, mailed on Dec. 14, 2020, 15 pages.
Office Action received for European Patent Application No. 18733381.0, mailed on Oct. 29, 2021, 9 pages.
Office Action received for European Patent Application No. 19150528.8, mailed on Jul. 1, 2020, 6 pages.
Office Action received for European Patent Application No. 19169980.0, mailed on Mar. 4, 2020, 6 pages.
Office Action received for European Patent Application No. 19186538.5, mailed on Oct. 12, 2020, 7 pages.
Office Action received for European Patent Application No. 19186538.5, mailed on Oct. 22, 2021, 7 pages.
Office Action received for European Patent Application No. 19203942.8, mailed on Oct. 29, 2021, 6 pages.
Office Action received for European Patent Application No. 19207753.5, mailed on May 10, 2021, 4 pages.
Office Action received for European Patent Application No. 19207753.5, mailed on Nov. 12, 2020, 5 pages.
Office Action received for European Patent Application No. 20158824.1, mailed on Jun. 13, 2022, 5 pages.
Office Action received for European Patent Application No. 20158824.1, mailed on May 18, 2021, 10 pages.
Office Action received for European Patent Application No. 20719301.2, mailed on Feb. 21, 2022, 9 pages.
Office Action received for European Patent Application No. 20719301.2, mailed on Jan. 24, 2023, 9 pages.
Office Action received for European Patent Application No. 20719301.2, mailed on Jan. 28, 2021, 15 pages.
Office Action received for European Patent Application No. 20720310.0, mailed on Apr. 11, 2023, 8 pages.
Office Action received for European Patent Application No. 20720310.0, mailed on Jul. 25, 2023, 11 pages.
Office Action received for European Patent Application No. 20720310.0, mailed on Oct. 4, 2022, 9 pages.
Office Action received for European Patent Application No. 20760624.5, mailed on Mar. 7, 2023, 13 pages.
Office Action received for European Patent Application No. 21160991.2, mailed on Mar. 24, 2022, 11 pages.
Office Action received for European Patent Application No. 21166718.3, mailed on Feb. 20, 2023, 7 pages.
Office Action received for European Patent Application No. 21197457.1, mailed on May 30, 2023, 8 pages.
Office Action received for European Patent Application No. 21197457.1, mailed on Sep. 2, 2022, 8 pages.
Office Action received for European Patent Application No. 21728781.2, mailed on Mar. 1, 2023, 13 pages.
Office Action received for German Patent Application No. 102015208532.5, mailed on Apr. 1, 2019, 20 pages (10 pages of English Translation and 10 pages of Official Copy).
Office Action received for German Patent Application No. 102015208532.5, mailed on Apr. 21, 2020, 3 pages (1 page of English Translation and 2 pages of Official Copy).

(56) References Cited

OTHER PUBLICATIONS

Office Action received for German Patent Application No. 102015208532.5, mailed on Aug. 21, 2019, 15 pages (5 pages of English Translation and 10 pages of Official Copy).

Office Action received for Indian Patent Application No. 202014041529, mailed on Dec. 6, 2021, 6 pages.

Office Action received for Indian Patent Application No. 202215025360, mailed on Mar. 29, 2023, 6 pages.

Office Action received for Indian Patent Application No. 202215025361, mailed on Mar. 29, 2023, 6 pages.

Office Action received for Indian Patent Application No. 202215025363, mailed on Mar. 29, 2023, 6 pages.

Office Action received for Indian Patent Application No. 202215025364, mailed on Mar. 29, 2023, 6 pages.

Office Action Received for Indian Patent Application No. 717/CHENP/2014, mailed on Feb. 7, 2019, 5 pages.

Office Action received for Japanese Patent Application No. 2015-095183, mailed on Jun. 3, 2016, 13 pages (6 pages of English Translation and 7 pages of Official copy).

Office Action received for Japanese Patent Application No. 2016-022175, mailed on Apr. 10, 2017, 11 pages (5 pages of English Translation and 6 pages of Official Copy).

Office Action received for Japanese Patent Application No. 2017-075031, mailed on Jul. 30, 2018, 16 pages (8 pages of English Translation and 8 pages of Official Copy).

Office Action received for Japanese Patent Application No. 2017-101107, mailed on Sep. 7, 2018, 14 pages (7 pages of English Translation and 7 pages of Official Copy).

Office Action received for Japanese Patent Application No. 2017-507413, mailed on Feb. 22, 2019, 11 pages (5 pages of English Translation and 6 pages of Official Copy).

Office Action received for Japanese Patent Application No. 2017-507413, mailed on May 25, 2018, 14 pages (7 pages of English Translation and 7 pages of Official Copy).

Office Action received for Japanese Patent Application No. 2017-543762, mailed on Apr. 8, 2019, 5 pages (2 pages of English Translation and 3 pages of Official copy).

Office Action received for Japanese Patent Application No. 2017-543762, mailed on Jul. 9, 2018, 8 pages (4 pages of English Translation and 4 pages of Official Copy).

Office Action received for Japanese Patent Application No. 2018-080122, mailed on Aug. 9, 2019, 5 pages (2 pages of English Translation and 3 pages of Official Copy).

Office Action received for Japanese Patent Application No. 2018-080122, mailed on Jan. 28, 2019, 11 pages (6 pages of English Translation and 5 pages of Official Copy).

Office Action received for Japanese Patent Application No. 2018-080122, mailed on Nov. 27, 2020, 16 pages (8 pages of English Translation and 8 pages of Official Copy).

Office Action received for Japanese Patent Application No. 2018-560107, mailed on Jun. 14, 2019, 26 pages (13 pages of English Translation and 13 pages of Official Copy).

Office Action received for Japanese Patent Application No. 2019-124728, mailed on Dec. 14, 2020, 4 pages (2 pages of English Translation and 2 pages of Official Copy).

Office Action received for Japanese Patent Application No. 2019-124728, mailed on Sep. 18, 2020, 6 pages (3 pages of English Translation and 3 pages of Official Copy).

Office Action received for Japanese Patent Application No. 2019-238894, mailed on Mar. 6, 2020, 7 pages (3 pages of English Translation and 4 pages of Official Copy).

Office Action received for Japanese Patent Application No. 2020-159840, mailed on Dec. 10, 2021, 13 pages (7 pages of English Translation and 6 pages of Official Copy).

Office Action received for Japanese Patent Application No. 2020-159840, mailed on Mar. 28, 2022, 6 pages (3 pages of English Translation and 3 pages of Official Copy).

Office Action received for Japanese Patent Application No. 2020-184605, mailed on Dec. 12, 2022, 9 pages (4 pages of English Translation and 5 pages of Official Copy).

Office Action received for Japanese Patent Application No. 2020-184605, mailed on Feb. 14, 2022, 24 pages (11 pages of English Translation and 13 pages of Official Copy).

Office Action received for Japanese Patent Application No. 2020-184605, mailed on Jul. 3, 2023, 6 pages (3 pages of English Translation and 3 pages of Official Copy).

Office Action received for Japanese Patent Application No. 2021-026630, mailed on Aug. 20, 2021, 7 pages (3 pages of English Translation and 4 pages of Official Copy).

Office Action received for Japanese Patent Application No. 2022-116534, mailed on Aug. 28, 2023, 10 pages (5 pages of English Translation and 5 pages of Official Copy).

Office Action received for Korean Patent Application No. 10-2014-7008348, mailed on Jan. 22, 2019, 16 pages (1 page of English Translation and 15 pages of Official Copy).

Office Action received for Korean Patent Application No. 10-2015-0072162, mailed on Feb. 27, 2017, 12 pages (6 pages of English Translation and 6 pages of Official Copy).

Office Action received for Korean Patent Application No. 10-2016-7022902, mailed on Sep. 4, 2017, 3 pages. (Official Copy Only) {See Communication Under 37 CFR § 1.98(a) (3)}.

Office Action received for Korean Patent Application No. 10-2016-7035555, mailed on Dec. 26, 2017, 5 pages (2 pages of English Translation and 3 pages of Official Copy).

Office Action received for Korean Patent Application No. 10-2016-7035555, mailed on Jul. 18, 2019, 9 pages (4 pages of English Translation and 5 pages of Official Copy).

Office Action received for Korean Patent Application No. 10-2016-7035555, mailed on Sep. 18, 2018, 9 pages (4 pages of English Translation and 5 pages of Official Copy).

Office Action received for Korean Patent Application No. 10-2017-7012145, mailed on Jul. 18, 2019, 5 pages (2 pages of English Translation and 3 pages of Official Copy).

Office Action received for Korean Patent Application No. 10-2017-7012145, mailed on Sep. 13, 2018, 6 pages (3 pages of English Translation and 3 pages of Official Copy).

Office Action received for Korean Patent Application No. 10-2017-7022905, mailed on Oct. 22, 2018, 9 pages (4 pages of English Translation and 5 pages of official copy).

Office Action received for Korean Patent Application No. 10-2017-7035057, mailed on Mar. 21, 2018, 10 pages (5 pages of English Translation and 5 pages of Official Copy).

Office Action received for Korean Patent Application No. 10-2018-0035949, mailed on Apr. 24, 2019, 9 pages (4 pages of English Translation and 5 pages of Official Copy).

Office Action received for Korean Patent Application No. 10-2018-0035949, mailed on Dec. 24, 2018, 7 pages (3 pages of English Translation and 4 pages of Official Copy).

Office Action received for Korean Patent Application No. 10-2018-0035949, mailed on Jun. 20, 2018, 9 pages (4 pages of English Translation and 5 pages of Official Copy).

Office Action received for Korean Patent Application No. 10-2018-7033301, mailed on Dec. 14, 2018, 6 pages (2 pages of English Translation and 4 pages of Official Copy).

Office Action received for Korean Patent Application No. 10-2018-7035747, mailed on Apr. 9, 2020, 11 pages (5 pages of English Translation and 6 pages of Official Copy).

Office Action received for Korean Patent Application No. 10-2018-7035747, mailed on Oct. 14, 2020, 6 pages (3 pages of English Translation and 3 pages of Official Copy).

Office Action received for Korean Patent Application No. 10-2019-7014494, mailed on Jun. 14, 2019, 11 pages (5 pages of English Translation and 6 pages of Official Copy).

Office Action received for Korean Patent Application No. 10-2020-0024632, mailed on Dec. 29, 2020, 11 pages (5 pages of English Translation and 6 pages of Official Copy).

Office Action received for Korean Patent Application No. 10-2020-0024632, mailed on May 18, 2020, 11 pages (5 pages of English Translation and 6 pages of Official Copy).

Office Action received for Korean Patent Application No. 10-2020-7002929, mailed on Mar. 22, 2020, 5 pages (2 pages of English Translation and 3 pages of Official Copy).

(56) References Cited

OTHER PUBLICATIONS

Office Action received for Korean Patent Application No. 10-2020-7031319, mailed on Dec. 8, 2020, 14 pages (6 pages of English Translation and 8 pages of Official Copy).

Office Action received for Korean Patent Application No. 10-2021-7021047, mailed on Aug. 13, 2021, 5 pages (2 pages of English Translation and 3 pages of Official Copy).

Office Action received for Korean Patent Application No. 10-2021-7032984, mailed on Feb. 22, 2022, 8 pages (4 pages of English Translation and 4 pages of Official Copy).

Office Action received for Korean Patent Application No. 10-2022-0053111, mailed on Dec. 12, 2022, 9 pages (4 pages of English Translation and 5 pages of Official Copy).

Office Action received for Korean Patent Application No. 10-2022-0053111, mailed on Jun. 29, 2023, 7 pages (3 pages of English Translation and 4 pages of Official Copy).

Office Action received for Korean Patent Application No. 10-2022-7001521, mailed on Dec. 26, 2022, 13 pages (6 pages of English Translation and 7 pages of Official Copy).

Office Action received for Korean Patent Application No. 10-2022-7001521, mailed on Jun. 21, 2023, 10 pages (5 page of English Translation and 5 pages of Official Copy).

Office Action received for Korean Patent Application No. 10-2022-7006175, mailed on May 27, 2022, 7 pages (3 pages of English Translation and 4 pages of Official Copy).

Office Action received for Korean Patent Application No. 10-2022-7008567, mailed on Mar. 28, 2022, 5 pages (2 pages of English Translation and 3 pages of Official Copy).

Office Action received for Korean Patent Application No. 10-2022-7033655, mailed on Jul. 27, 2023, 5 pages (2 pages of English Translation and 3 pages of Official Copy).

Office Action received for Mexican Patent Application No. MX/a/2016/001209, mailed on Apr. 20, 2017, 5 pages (2 pages of English Translation and 3 pages of Official Copy).

Office Action received for Mexican Patent Application No. MX/a/2016/001209, mailed on Aug. 25, 2016, 4 pages (2 pages of English Translation and 2 pages of Official Copy).

Office Action received for Mexican Patent Application No. MX/a/2016/001209, mailed on Sep. 13, 2017, 5 pages (2 pages of English Translation and 3 pages of Official Copy).

Office Action received for Taiwanese Patent Application No. 104108223, mailed on Apr. 25, 2016, 10 pages (5 pages of English Translation and 5 pages of Official copy).

Office Action received for Taiwanese Patent Application No. 104114953, mailed on Feb. 18, 2017, 9 pages (4 pages of English Translation and 5 pages of Official copy).

Office Action received for Taiwanese Patent Application No. 104114953, mailed on Jun. 8, 2016, 11 pages (5 pages of English Translation and 6 pages of Official copy).

Office Action Received for Taiwanese Patent Application No. 104117041, mailed on Aug. 22, 2016, 6 pages (3 pages of English Translation and 3 pages of Official Copy).

Office Action received for Taiwanese Patent Application No. 104117042, mailed on Apr. 20, 2017, 18 pages (7 pages of English Translation and 11 pages of Official Copy).

Partial European Search Report received for European Patent Application No. 20158824.1, mailed on May 8, 2020, 14 pages.

Partial European Search Report received for European Patent Application No. 18197583.0, mailed on Jan. 14, 2019, 18 pages.

Q Pair, When I connected to LG G Pad 8.3 Q pair G Flex. -G Pad 8.3 review, Posting of a blog, Online Available at: <http://www.leaderyou.co.kr/2595>, Dec. 7, 2013, 28 pages (15 page of English Translation and 13 pages of Official Copy).

Q Pair, online available at: http://mongri.net/entry/G-Pad-83-Qpair, Retrieved on Mar. 6, 2017, Dec. 20, 2013, 22 pages (10 pages of English translation and 12 pages of Official Copy).

Record of Oral Hearing received for U.S. Appl. No. 14/641,298, mailed on Oct. 8, 2021, 17 pages.

Result of Consultation received for European Patent Application No. 16710590.7, mailed on Dec. 7, 2020, 4 pages.

Result of Consultation received for European Patent Application No. 18197583.0, mailed on Feb. 24, 2021, 3 pages.

Result of Consultation received for European Patent Application No. 18197589.7, mailed on Dec. 1, 2020, 9 pages.

Result of Consultation received for European Patent Application No. 18197589.7, mailed on Dec. 17, 2020, 6 pages.

Result of Consultation received for European Patent Application No. 18208881.5, mailed on Dec. 6, 2022, 10 pages.

Result of Consultation received for European Patent Application No. 20158824.1, mailed on May 17, 2022, 7 pages.

Search Report and Opinion received for Danish Patent Application No. PA201770401, mailed on Jun. 19, 2017, 6 pages.

Search Report and Opinion received for Danish Patent Application No. PA201870060 mailed on Apr. 30, 2018, 7 pages.

Search Report and Opinion received for Danish Patent Application No. PA201870419, mailed on Aug. 27, 2018, 7 pages.

Search Report and Opinion received for Danish Patent Application No. PA201870419, mailed on Sep. 10, 2018, 9 pages.

Search Report and Opinion received for Danish Patent Application No. PA201870598, mailed on Dec. 5, 2018, 8 pages.

Search Report and Opinion received for Danish Patent Application No. PA201970533, mailed on Oct. 25, 2019, 9 pages.

Search Report and Opinion received for Danish Patent Application No. PA202070617, mailed on Dec. 23, 2020, 8 pages.

Search Report and Opinion received for Danish Patent Application No. PA202170320, mailed on Oct. 6, 2021, 9 pages.

Search Report received for Danish Patent Application No. PA201770404, mailed on Jun. 20, 2017, 8 pages.

Search Report received for Danish Patent Application No. PA201770409, mailed on Jun. 20, 2017, 9 pages.

"Smart Home App—What is the Widget", Online Available at: https://support.vivint.com/s/article/Vivint-Smart-Home-App-What-is-the-Widget, Jan. 26, 2019, 4 pages.

Summons to Attend Oral Proceedings received for European Patent Application 20158824.1, mailed on Dec. 7, 2021, 6 pages.

Summons to Attend Oral Proceedings received for European Patent Application No. 12753631.6, mailed on Jul. 6, 2018, 5 pages.

Summons to Attend Oral Proceedings received for European Patent Application No. 12753631.6, mailed on May 8, 2018, 9 pages.

Summons to Attend Oral Proceedings received for European Patent Application No. 12770400.5, mailed on Mar. 19, 2018, 10 pages.

Summons to Attend Oral Proceedings received for European Patent Application No. 13171047.7, mailed on Jul. 9, 2018, 12 pages.

Summons to Attend Oral Proceedings received for European Patent Application No. 15711969.4, mailed on Oct. 22, 2018, 12 pages.

Summons to Attend Oral Proceedings received for European Patent Application No. 17799904.2, mailed on Dec. 20, 2021, 8 pages.

Summons to Attend Oral Proceedings received for European Patent Application No. 17813737.8, mailed on Jan. 4, 2022, 12 pages.

Summons to Attend Oral Proceedings received for European Patent Application No. 18178147.7, mailed on Jun. 28, 2021, 8 pages.

Summons to Attend Oral Proceedings received for European Patent Application No. 18197583.0, mailed on Aug. 14, 2020, 12 pages.

Summons to attend Oral proceedings received for European Patent Application No. 18197589.7, mailed on Apr. 9, 2020, 7 pages.

Summons to Attend Oral Proceedings received for European Patent Application No. 18208881.5, mailed on Jun. 29, 2022, 9 pages.

Summons to Attend Oral Proceedings received for European Patent Application No. 18728002.9, mailed on Jun. 3, 2022, 15 pages.

Summons to Attend Oral Proceedings received for European Patent Application No. 18733381.0, mailed on Jul. 25, 2023, 7 pages.

Summons to Attend Oral Proceedings received for European Patent Application No. 19150528.8, mailed on Mar. 15, 2022, 7 pages.

Summons to Attend Oral Proceedings received for European Patent Application No. 19169980.0, mailed on Dec. 3, 2020, 8 pages.

Summons to Attend Oral Proceedings received for European Patent Application No. 21160991.2, mailed on Oct. 19, 2022, 10 pages.

Supplemental Notice of Allowance received for U.S. Appl. No. 16/584,490, mailed on Apr. 13, 2021, 2 pages.

Supplemental Notice of Allowance received for U.S. Appl. No. 16/584,743, mailed on Nov. 25, 2020, 2 pages.

Supplemental Notice of Allowance received for U.S. Appl. No. 16/888,775, mailed on Mar. 1, 2023, 2 pages.

(56)          References Cited

OTHER PUBLICATIONS

Supplemental Notice of Allowance received for U.S. Appl. No. 17/168,069, mailed on Apr. 20, 2022, 2 pages.

Supplemental Notice of Allowance received for U.S. Appl. No. 17/168,069, mailed on Feb. 2, 2022, 2 pages.

"The Single Keyboard Piano", available at <http://moocowmusic. com/PianistPro/Manual/ManualSingleKeyboardPiano.html>, Sep. 26, 2010, 4 pages.

Androidcentral, "How do i respond to group messages from notification bar?", Available online at: https://forums.androidcentral .com/ask-question/952030-how-do-i-respond-group-messages-notification-bar.html, Mar. 25, 2019, 3 pages.

Petternitter, "User Restricted Collaborative Playlists—The Spotify Community", Downloaded from: https://community.spotify.com/t5/ Archived-Ideas/User-restricted-collaborative-playlists/idi-p/70721, May 28, 2012, 4 pages.

Notice of Allowance received for Korean Patent Application No. 10-2014-7006538, mailed on May 19, 2016, 3 pages (1 page of English Translation and 2 pages of Official copy).

Office Action received for Korean Patent Application No. 10-2014-7006538, mailed on Jul. 31, 2015, 8 pages (3 pages of English Translation and 5 pages of Official copy).

Office Action received for Korean Patent Application No. 10-2015-0072162, mailed on Apr. 20, 2016, 11 pages (6 pages of English Translation and 5 pages of Official Copy).

Notice of Allowance received for Taiwanese Patent Application No. 102120412, mailed on Oct. 28, 2015, 5 pages (2 pages of English Translation and 3 pages of Official copy).

Office Action received for Taiwanese Patent Application No. 102120412, mailed on Feb. 25, 2015, 15 pages (6 pages of English Translation and 9 pages of Official Copy).

Final Office Action received for U.S. Appl. No. 11/960,674, mailed on May 12, 2011, 10 pages.

Non-Final Office Action received for U.S. Appl. No. 11/960,674, mailed on Oct. 27, 2010, 7 pages.

Notice of Allowance received for U.S. Appl. No. 11/960,674, mailed on Sep. 2, 2011, 7 pages.

Final Office Action received for U.S. Appl. No. 13/038,217, mailed on May 6, 2014, 11 pages.

Non-Final Office Action received for U.S. Appl. No. 13/038,217, mailed on Sep. 13, 2013, 16 pages.

Final Office Action received for U.S. Appl. No. 13/492,057, mailed on Apr. 8, 2016, 29 pages.

Final Office Action received for U.S. Appl. No. 13/492,057, mailed on Mar. 30, 2015, 18 pages.

Non-Final Office Action received for U.S. Appl. No. 13/492,057, mailed on Dec. 17, 2015, 25 pages.

Non-Final Office Action received for U.S. Appl. No. 13/492,057, mailed on Jul. 8, 2014, 14 pages.

Final Office Action received for U.S. Appl. No. 13/587,850, mailed on Nov. 28, 2014, 22 pages.

Non-Final Office Action received for U.S. Appl. No. 13/587,850, mailed on Oct. 8, 2015, 29 pages.

Non-Final Office Action received for U.S. Appl. No. 13/587,850, mailed on Apr. 7, 2014, 18 pages.

Extended European Search Report received for European Patent Application No. 13171047.7, mailed on Oct. 29, 2014, 8 pages.

Non-Final Office Action received for U.S. Appl. No. 14/641,289, mailed on Jul. 16, 2015, 31 pages.

Non-Final Office Action received for U.S. Appl. No. 14/641,289, mailed on Mar. 11, 2016, 26 pages.

Office Action received for Hong Kong Patent Application No. 151051633, mailed on Jun. 5, 2015, 11 pages (Official Copy Only) {See Communication Under 37 CFR § 1.98(a) (3)}.

Office Action received for Australian Patent Application No. 2012296381, mailed on Jan. 21, 2016, 5 pages.

Office Action received for Australian Patent Application No. 2012296381, mailed on Mar. 4, 2016, 4 pages.

Office Action received for Australian Patent Application No. 2012296381, mailed on Mar. 6, 2015, 4 pages.

Notice of Allowance received for Japanese Patent Application No. 2014-526255, mailed on Jan. 7, 2016, 6 pages (3 pages English Translation and 3 pages Official copy).

Office Action received for Japanese Patent Application No. 2014-526255, mailed on Jun. 12, 2015, 5 pages (2 pages of English Translation and 3 pages of Official Copy).

Search Report received For Netherlands Patent Application No. 2014737, mailed on Oct. 29, 2015, 9 pages.

Office Action received for Australian Patent Application No. 2015100490, mailed on Jun. 9, 2015, 6 pages.

Office Action received for Australian Patent Application No. 2015201884, mailed on Oct. 12, 2015, 4 pages.

Notice of Allowance received for Chinese Patent Application No. 201520364847.8, mailed on Nov. 5, 2015, 9 pages (7 page of English Translation and 2 pages of Official Copy).

Office Action received for Danish Patent Application No. PA201570256, mailed on Jul. 7, 2015, 2 pages.

Akhgari, Ehsan, "Don't Leave a Trace: Private Browsing in Firefox", available online at "http://ehsanakhgari.org/blog/2008-11-04/dont-leave-trace-private-browsing-firefox", Nov. 4, 2008, 71 pages.

Akshay, "Control your SmartThings compatible devices on the Gear S2 and S3 with the Smarter Things app", Online available at: https://iotgadgets.com/2017/09/control-smartthings-compatible-devices-gear-s2-s3-smarter-things-app/, Sep. 7, 2017, 4 pages.

Alba, Davey, "Samsung Shape: for $400, Your Music Can Follow You Around the House", Online available at: https://www. popularmechanics.com/technology/audio/a9536/samsung-shape-for-400-your-music-can-follow-you-aroundnd-15997831/, Oct. 3, 2013, 5 pages.

Apple, "Iphone User's Guide", iPhone first generation, Available at: <http://pocketpccentral.net/iphone/products/1 g_iphone.htm>. Jun. 29, 2007, 124 pages.

Beard, Chris, "Mozilla Labs Introducing Weave", available online at <https://blog.mozilla.org/labs/2007/12/introducing-weave/>, Dec. 21, 2007, 57 pages.

Bell, Killian, "Twitter Notifications, iCloud Tabs & Location-Based Reminders Appear in Latest OS X 10.8 Beta", available online at "http://www.cultofmac.com/154522/twitter-notifications-icloud-tabs-location-based-reminders-appear-in-latest-os-x-10-8-beta/", Mar. 19, 2012, 10 pages.

Benjamin, Jeff, "iOS 10: How to use the new Home app to control HomeKit devices [Video]", Available online at: https://9to5mac. com/2016/09/23/ios-10-how-to-use-new-home-app-control-homekit-devices-video, Sep. 23, 2016, 36 pages.

Bennett, Stephen, "ES2: Logic's Most Sophisticated Virtual Analogue Synth", Logic Notes & Techniques, Jun. 2007, 6 pages.

Boxer, David, "Change the permissions of the Google Drive file or folder or Share the file or folder", Blake School Website, Online Available at: https://support.blakeschool.org/hc/en-us/articles/ 231790648-Change-the-permissions-of-the-Google-Drive-file-or-folder-or-Share-the-file-or-folder, Oct. 31, 2016, 2 pages.

Brumberg et al., "The Unlock Project: A Python-based framework for practical brain-computer interface communication "app" development", Conf Proc IEEE Eng Med Biol Soc. 2012, doi: 10.1109/ EMBC.2012.6346473, Institute of Electrical and Electronics Engineers, 2012, 11 pages.

Call Me, "Samsung R3 speaker gives you a delicious 360-degree sound experience—with WiFi and Bluetooth | Call me", 0:24 / 3:22, Available Online at: <https://www.youtube.com/watch?v=4Uv_ sOhrlro>, Sep. 22, 2016, 3 pages.

Chan, Christine, "Handoff Your Browser to Your iPhone or iPad! Plus a Chance to Win a Copy!", Apr. 12, 2011, 2 pages.

Cipriani, Jason, ""How to use Spotify's Offline mode on iPhone"", XP055533907, Available online at: https://www.cnet.com/how-to/ how-to-use-spotifys-offline-mode-on-iphone/, Aug. 1, 2011, 5 pages.

Cohn, Emily, "Sonos Just Fixed the Most Annoying Thing About Its iPhone App", online available at https://www.businessinsider.com/ sonos-mobile-app-works-on-lock-screen-2016-6. Jun. 27, 2016, 2 pages.

Computeradv, "Sonos App Navigation & Menu on iPhone", Available online at: https://www.youtube.com/watch?v=Jhz9XvWQ204, Aug. 4, 2015, 1 page.

(56) References Cited

OTHER PUBLICATIONS

Crutnacker, "Amazon Echo Tips and Tricks: Playing Music Demonstration", Available Online at: https://www.youtube.com/watch?v=W_bqq2ynUll, Nov. 4, 2015, 1 page.

Detroitborg, ""Apple Music: Walkthrough"", YouTube Video, online available at: "https://www.youtube.com/watch?v=NLgjodiAtbQ", Jun. 30, 2015, 1 page.

Dharmasena, Anusha, "iMessage-send as text message Option", YouTube, Available online at: <https://www.youtube.com/watch?v=hXG-MdlW6FA>, Feb. 18, 2013, 1 page.

Dybwad, Barb, "Google Chrome Gets Bookmark Syncing", available online at "http://mashable.com/2009/11/02/chrome-bookmark-sync/", Nov. 3, 2009, 6 pages.

Farmboyreef, "Apple watch controlling your tv", Available online at: https://www.youtube.com/watch?v=xaJPG0Wm3Tg, Jun. 23, 2015, 3 pages.

Fingas, Jon, "Sonos Puts Speaker Controls on Your iPhone's Lock Screen", online available at https://www.engadget.com/2016-06-21-sonos-ios-lock-screen-controls.html, Jun. 21, 2016, 3 pages.

Finkelstein, Ellen, "Temporarily Override Object Snap Settings", AutoCAD Tips Blog, Apr. 9, 2007, 4 pages.

"Review: Samsung Radiant R3 Wireless Speakers", Available Online at: <https://www.youtube.com/watch?v=ZBICVE1WdKE>, Jan. 19, 2016, 3 pages.

Frakes, Dan, "How to Get Started with Airplay", available at: https://www.macworld.com/article/2039770/how-to-get-started-with-airplay.html, Macworld, May 27, 2013, 8 pages.

Gil, Lory, "How to control Apple TV with your Apple Watch", Available online at: https://www.imore.com/how-control-your-apple-tv-remote-app%ADapple-watch], Jun. 6, 2016, 24 pages.

Google, "Google Home Help, Listen to music", Datasheet [online], Available Online at: <https://web.archive.org/web/20170326051235/https://support.google.com/googlehome/answer/7030379?hl=en&ref_topic=7030084>, Mar. 26, 2017, 3 pages.

Google, Labs, "Google Browser Sync", available online at "https://web.archive.org/web/20120518050142/http://www.google.com/tools/firefox/brows ersync/faq.html", May 18, 2012, 5 pages.

Gookin, Dan, "Lock Screen Settings on Your Android Phone", Online Available at: https://www.dummies.com/consumer-electronics/smartphones/droid/lock-screen-settings-on-your-android-phone/, Sep. 23, 2015, 6 pages.

Han, Hailing, "Research on Testing Method on Computer Interlocking Software", "Electronic World" vol. 2012 No. 17, Key Laboratory of Optoelectronic Technology and Intelligent Control of Ministry of Education, Lanzhou Jiaotong University, Sep. 2012, 2 pages (Official Copy only) {See Communication Under 37 CFR § 1.98(a) (3)}.

Hein, Buster, "iOS 5 Allows Users to Delete Music Directly From iPhone/iPad", Online available at: https://www.cultofmac.com/99990/ios-5-allows-users-to-delete-music-directly-from-iphoneipad/, Jun. 9, 2011, 7 pages.

Hobbyistsoftwareltd,"VLC Remote", Online available at: https://watchaware.com/watch-apps/297244048, 2016, 7 pages.

Hoffberger, Chase, "Spotify's Collaborative Playlists Let Friends Listen Together", Evolver.fm, available online at http://www.evolver.fm/2011/08/22/spotify-collaborative-playlists/, Aug. 22, 2011, 4 pages.

Howcast, "How to Create and Edit Playlists on iPhone", YouTube, Available online at: https://www.youtube.com/watch?v=YPOnKUvcso4, Mar. 13, 2014, 3 pages.

Hughes, Neil, "Apple Explores Merging Cloud Content with Locally Stored Media Library", Available at <http://appleinsider.com/articles/11/02/10/apple_explores_merging_cloud_content_with_locally_stored_media_library.html>, XP55040717, Feb. 10, 2011, 2 pages.

Itjungles, "iPhone 6: How to Pair with Another Bluetooth Device", Available Online at: https://www.youtube.com/watch?v=9setanYtHAk, Aug. 5, 2015, 3 pages.

Jarvie, "Alexa plays me music", Available online at: https://www.youtube.com/watch?v=bR2ZC8Sy8YQ, Feb. 23, 2015, 1 page.

Kanter, David, "Start Download Automatically Sync Your (New) Music, Apps, and iBooks Across Your iDevices with iCloud", Available online at: https://appadvice.com/appnn/2011/06/automatically-sync-music-apps-ibooks-idevices-icloud, Jun. 8, 2011, 6 pages.

Kazmucha, Allyson, "Sonos Controller App for iPhone and iPad Review", online available at https://www.imore.com/sonos-controller-app-iphone-and-ipad-review, Mar. 1, 2018, 4 pages.

Kim et al., "An Energy Efficient Transmission Scheme for Real-Time Data in Wireless Sensor Networks", Sensors, vol. 15, in Sensors 2015, May 20, 2015, 25 pages.

Kimura, Ryoji, "Keynote presentation practice guide for iPad & iPhone", K.K. Rutles, first edition, Feb. 29, 2012, 4 pages (Official Copy Only) {See Communication Under 37 CFR § 1.98(a) (3)}.

Klein, Matt, "How to Add, Remove, and Rearrange Apps on the Apple Watch's Dock", Available online at: https://www.howtogeek.com/279796/how-to-add-remove-and-rearrange-apps-on-the-apple-watch%E2%80%99s-dock/, Nov. 18, 2016, 10 pages.

Locklear, Mallory, "Samsung to bring SmartThings control to its Gear smartwatches", Online available at: https://www.engadget.com/2018-01-08-samsung-smartthings-app-gear-smartwatches.html, Jan. 8, 2018, 12 pages.

Low, Cherlynn, "So you bought a smartwatch. Now what?", Online available at: https://www.engadget.com/2018-02-06-how-to-set-up-your-smartwatch.html, Feb. 6, 2018, 19 pages.

Mac, Fan, "Chapter 4: The True Character of Apple's Genuine Cloud—Your Personal Data Always Exist in There, Regardless of Your Location", Mainichi Communications Inc., vol. 19, No. 8, Aug. 1, 2011, 8 pages.

Mackie, Simon, "Emulate Safari's Reader Mode in Other Browsers with Readability", available online at "https://gigaom.com/2010/06/21/emulate-safaris-reader-mode-in-other-browsers-with-readability/", Jun. 21, 2010, 5 pages.

McElhearn, Kirk, "iTunes 10.3 Offers Automatic Downloads and Access to Purchases", Available at <http://web.archive.org/web/20110613084837/http://www.tidbits.com/article/12235>, Jun. 8, 2011, 5 pages.

Mitroff, Sarah, "8 things you should know about Apple Music for Android", CNET website, downloaded from https://www.cnet.com/tech/services-and-software/apple-music-for-android-what-to-know/, Nov. 11, 2015, 4 pages.

Mozilla, Services, "Firefox Sync Terms of Service (for versions prior to Firefox 29)", available online at <https://services.mozilla.com/tos/>, Aug. 19, 2010, 4 pages.

Notice of Allowance received for Mexican Patent Application No. MX/a/2014/001761, mailed on Sep. 11, 2015, 3 pages (2 pages of English translation and 1 page of Official copy).

NBC News, "NBC News—YouTube Democratic Debate (full)", Online available at:—https://www.youtube.com/watch?v=ti2Nokoq1J4, Jan. 17, 2016, 1 page.

Nikolov, Anton, "Design principle: Consistency", Available online at: https://uxdesign.cc/design-principle-consistency-6b0cf7e7339f, Apr. 8, 2017, 9 pages.

Noriega, Josh, "How to Store and Listen to Music Directly from Your Android Wear Smartwatch", Guiding Tech, Available online at: https://www.guidingtech.com/55254/listen-music-android-wear-smartwatch, Jan. 15, 2016, 16 pages.

Ochs, Susie, "Getting Started with Apple Music: 12 Things to Do First", Macworld website, downloaded from https://www.macworld.com/article/225812/getting-started-with-apple-music-12-things-to-do-first.html, Jun. 30, 2015, 12 pages.

Ojeda-Zapata, Julio, "Five Apps That Play Podcasts Directly from Your Apple Watch", Available online at: https://tidbits.com/2018/04/09/five-apps-that-play-podcasts-directly-from-your-apple-watch/, Apr. 9, 2018, 12 pages.

International Preliminary Report on Patentability received for PCT Patent Application No. PCT/US2007/088914, mailed on Jul. 7, 2009, 8 pages.

International Search Report and Written Opinion received for PCT Patent Application No. PCT/US2007/088914, mailed on Jun. 23, 2008, 10 pages.

International Preliminary Report on Patentability received for PCT Patent Application No. PCT/US2012/025314, mailed on Sep. 12, 2013, 8 pages.

(56) References Cited

OTHER PUBLICATIONS

International Search Report and Written Opinion received for PCT Patent Application No. PCT/US2012/025314, mailed on May 14, 2012, 10 pages.

International Preliminary Report on Patentability received for PCT Patent Application No. PCT/US2012/051432, mailed on Feb. 27, 2014, 10 pages.

International Search Report and Written Opinion received for PCT Patent Application No. PCT/US2012/051432, mailed on Oct. 29, 2012, 12 pages.

International Preliminary Report on Patentability received for PCT Patent Application No. PCT/US2013/044710, mailed on Dec. 18, 2014, 11 pages.

International Search Report and Written Opinion received for PCT Patent Application No. PCT/US2013/044710, mailed on Aug. 15, 2013, 11 pages.

International Search Report and Written Opinion received for PCT Patent Application No. PCT/US2015/019306, mailed on Jun. 17, 2015, 15 pages.

International Search Report and Written Opinion received for PCT Application No. PCT/US2015/019309, mailed on Jun. 25, 2015, 15 pages.

International Search Report and Written Opinion received for PCT Patent Application No. PCT/US2015/019317, mailed on Aug. 25, 2015, 24 pages.

Invitation to Pay Additional Fees received for PCT Patent Application No. PCT/US2015/019317, mailed on May 22, 2015, 7 pages.

International Search Report and Written Opinion received for PCT Patent Application No. PCT/US2015/025188, mailed on Jun. 23, 2015, 11 pages.

International Search Report and Written Opinion received for PCT Patent Application No. PCT/US2015/030199, mailed on Aug. 14, 2015, 11 pages.

Philips Support Website, "How to switch to preferred audio language in Philips TV from a broadcast with multiple languages audio stream?", Available Online at: https://www.usa.philips.com/c-f/XC000010105/how-to-switch-to-preferred-audio-language-in-philips-tv-from-a-broadcast-with-multiple-languages-audio-stream, Dec. 29, 2016, 5 pages.

Plaisant et al., "Touchscreen Toggle Switches: Push or slide? Design Issues and Usability Study", Technical Report CAR-TR-521, CS-TR-2557, Nov. 1990, pp. 1-10.

Planet Quark, ""See Everything Your Mac Printed"", XP055533938, retrieved from the Internet: URL: https://www.planetquark.com/2011/05/19/see-everything-your-mac-printed/#.XjkfQsgzZGM, May 19, 2011, 7 pages.

Pu, Fang, "Research on Location-aware Service in Pervasive Computing", Issue No. 7, Information Technology Series, China Doctoral Dissertations, Jul. 15, 2008, 140 pages (Official Copy only) {See Communication Under 37 CFR § 1.98(a) (3)}.

Punchkick, Interactive, "Punchkick hands-on review: Fitbit Surge", URL: https://www.youtube.com/watch?v=K2G7aebUYcA, Mar. 25, 2015, 3 pages.

Qiye, Wang, "Design and Implementation of SAN Device Access Control in Unified Storage Platform", Master's Theses, Huazhong University of Science & Technology, Wuhan, Jun. 2008, 63 pages (Official Copy only) {See Communication Under 37 CFR § 1.98(a) (3)}.

Richards, "Tn Audio Mixer and Master Volume Control with Automatic Configuration", Technical Disclosure Bulletin, vol. 37, No. 01, Jan. 1, 1994, pp. 485-486.

Ricker, Thomas, "iTunes (in the Cloud) 10.3 beta available for download, we go hands-on", retrieved from the internet: https://www.engadget.com/2011/06/07/itunes-in-the-cloud-10-3-beta-available-for-download-we-go-ha/, 2011, 12 pages.

Rossignol, Joe, "iOS 10 Concept Simplifies Lock Screen with Collapsed Notifications", Available online at: https://www.macrumors.com/2016/06/16/ios-10-collapsed-notifications-concept/, Jun. 16, 2016, 10 pages.

Samsung, "Control an individual smart device on your watch", Online Available at: https://www.samsung.com/us/support/troubleshooting/TSG01003208/, Nov. 9, 2018, 1 page.

Samsung, "Problems with SmartThings on your Samsung Smartwatch", Online Available at: https://www.samsung.com/us/support/troubleshooting/TSG01003169/#smartthings-error-on-samsung-smartwatch, Nov. 9, 2018, 10 pages.

Samsung, "Samsung—User manual—Galaxy Watch", Online available at: https://content.abt.com/documents/90234/SM-R810NZDAXAR-use.pdf, Aug. 24, 2018, 102 pages.

Samsung, "Samsung R3 Wireless 360° Smart Speaker (Black)", User Manual ver. 1.0 (English), User manual [online], Available Online at: <https://www.samsung.com/uk/support/model/WAM3500/XU/>, Dec. 16, 2016, 3 pages.

Sandrahoutz, "How Do I Delete a Playlist from a Synced Ipod but Not Remove it From the Library in itunes", Apple Communities Website, Available online at: https://discussions.apple.com/thread/7503609, Mar. 23, 2016, 2 pages.

PartyShare—turn your Xperia into a jukebox, Available at: https://forum.xda-developers.com/crossdevice-dev/sony/app-partyshare-xperia-jukebox-t2877807, Sep. 15, 2014, 5 pages.

Seifert, Dan, "Google Home review: Home is where the smart is", The Verge, Available Online at: <https://www.theverge.com/2016/11/3/13504658/google-home-review-speaker-assistant-amazon-echo-competitor>, Nov. 3, 2016, 11 pages.

Seifi, Joe, "Pianist Pro Review", available at <http://www.appsafari.com/productivity/11529/pianist-pro/>, Apr. 24, 2010, 9 pages.

Senicar et al., "User-Centered Design and Development of an Intelligent Light Switch for Sensor Systems", Technical Gazette, vol. 26, No. 2, available online at: https://hrcak.srce.hr/file/320403, 2019, pp. 339-345.

"Pairing Your Apple Watch with Your AppleTV", Available online at: https://www.youtube.com/watch?v=C4t8YFSJ-UY, Apr. 27, 2015, 3 pages.

Shankland, Stephen, "Chrome OS Gets 'OK Google' Voice Search Control", available online at <http://www.cnet.com/news/chrome-os-gets-ok-google-voice-search-control/>, May 21, 2014, 4 pages.

Sharepoint at Rackspace, "SharePoint 2013: How to Edit a List or Library Using Quick Edit", Available online at: https://www.youtube.com/watch?v=foZXcFC1k80, Oct. 10, 2014, 1 page.

Singh, Ajit, "Mytunz: Free Iphone Media Player App With Sleep Timer, Gesture Control", Available online at: https://www.ilovefreesoftware.com/01/iphone/mytunz-free-iphone-media-player-app.html, Jul. 1, 2014, 6 pages.

Smarttricks, "Top 3 Music Player for Android", Available online at: <https://www.youtube.com/watch?v=He7RTn4CL34>, Feb. 22, 2017, 4 pages.

Smith, Eddie, "The expert's guide to Instapaper", available online at "http://www.macworld.com/article/1166898/the_experts_guide_to_instapaper.html", May 23, 2012, 8 pages.

Sonos, "Sonos Controller App for iPad Product Guide", Available online at: https://www.sonos.com/documents/productguides/en/iPadGuide_EN.pdf, Nov. 2014, 47 pages.

Stroud, Forrest, "Screen Lock Meaning & Definition", Online Available at: https://www.webopedia.com/definitions/screen-lock, Jan. 30, 2014, 3 pages.

Supertunetv, "Ipod Nano 6G—Sync Selected Playlist iTunes", YouTube, Available online at: https://www.youtube.com/watch?v=xU 3rYRabt_I, Sep. 10, 2012, 3 pages.

Tedeschi, Bob, "Stoking a Music Fan's Fancy with Apps That Rock", available at <http://www.nytimes.com/2010/05/20/technology/personaltech/20smart.html>, May 19, 2010, 3 pages.

Vanhemert, Kyle, "Why Siri Could Be the Killer App for Smartwatches", XP002798416, Retrieved from the Internet: URL: https://www.wired.com/2013/12/what-can-a-smartwatch-really-do/, Dec. 19, 2013, 14 pages.

Whitney, Lance, "How to Listen to Music on Your Apple Watch", Available Online at: https://medium.com/pcmag-access/how-to-listen-to-music-on-your-apple-watch-f48a6c20dd52#:~:text=On%20your%20iPhone%2C%20go%20to,.%E2%80%9D%20Tap%20on%20Add%20Music., Mar. 2, 2018, 13 pages.

(56)         References Cited

OTHER PUBLICATIONS

Whitwam, Ryan, "How to Sync and Play Music on Your Android Wear Watch", Available online at: https://www .greenbot.com/article/2997520/how-to-sync-and-play-music-on-your-android-wear-watch.html, Nov. 2, 2015, 4 pages.

Wikipedia, "QR code", Available online at: https://en.wikipedia.org/w/index.php?title=OR_code&oldid=452939488, Sep. 28, 2011, pp. 1-9.

Woolsey, Amanda, "Apple Watch Tips—How to Add and Play Music", Available online at: <https://www.youtube.com/watch?v=E0QEuqMaoi8>, Apr. 26, 2015, 3 pages.

Corrected Notice of Allowance received for U.S. Appl. No. 17/970,417, mailed on Feb. 20, 2025, 2 pages.

Examiner's Answer to Appeal Brief received for U.S. Appl. No. 17/747,804, mailed on Mar. 5, 2025, 23 pages.

Final Office Action received for U.S. Appl. No. 18/535,820, mailed on Feb. 27, 2025, 35 pages.

Non-Final Office Action received for U.S. Appl. No. 18/228,597, mailed on Mar. 6, 2025, 20 pages.

Notice of Allowance received for Japanese Patent Application No. 2023-147860, mailed on Feb. 25, 2025, 4 pages (1 page of English Translation and 3 pages of Official Copy).

Office Action received for Australian Patent Application No. 2024278098, mailed on Mar. 6, 2025, 3 pages.

2014-44483, JP, A, Cited by Japanese Patent Office in an Office Action for related Patent Application No. 2024-081986 on May 9, 2025.

10-2007-0086374, KR, A, Cited by Korean Patent Office in an Office Action for related Patent Application No. 10-2024-7006601 on Apr. 29, 2025.

Advisory Action received for U.S. Appl. No. 18/228,597, mailed on Jul. 7, 2025, 3 pages.

Applicant-Initiated Interview Summary received for U.S. Appl. No. 18/077,154, mailed on Jul. 2, 2025, 2 pages.

Corrected Notice of Allowance received for U.S. Appl. No. 17/181,089, mailed on Jul. 15, 2025, 3 pages.

Notice of Allowance received for U.S. Appl. No. 17/181,089, mailed on Jul. 3, 2025, 12 pages.

Notice of Allowance received for U.S. Appl. No. 18/077,154, mailed on Jul. 28, 2025, 14 pages.

Applicant-Initiated Interview Summary received for U.S. Appl. No. 18/228,597, mailed on Jun. 23, 2025, 4 pages.

Examiner-Initiated Interview Summary received for U.S. Appl. No. 18/067,350, mailed on Jun. 26, 2025, 4 pages.

Intention to Grant received for European Patent Application No. 23190753.6, mailed on Jun. 18, 2025, 9 pages.

Intention to Grant received for European Patent Application No. 24211972.5, mailed on Jun. 16, 2025, 9 pages.

Office Action received for Chinese Patent Application No. 202411713875.6, mailed on May 10, 2025, 17 pages (9 pages of English Translation and 8 pages of Official Copy).

Office Action received for Chinese Patent Application No. 202411715424.6, mailed on May 17, 2025, 16 pages (8 pages of English Translation and 8 pages of Official Copy).

1828599, CN, A, Cited by Chinese Patent Office in an Office Action for related Patent Application No. 201811379281.0 on Aug. 17, 2023.

113835583, CN, A, Cited by the WIPO Patent Office in an Office Action for related Patent Application No. PCT/US2023/032084 on Nov. 27, 2023.

2006-185154, JP, A, Cited by Japanese Patent Office in an Office Action for related Patent Application No. 2022-129377 on Nov. 10, 2023.

2011-60281, JP, A, Cited by Japanese Patent Office in an Office Action for related Patent Application No. 2022-129377 on Nov. 10, 2023.

2015-533441, JP, A, Cited by Japanese Patent Office in an Office Action for related Patent Application No. 2022-129377 on Nov. 10, 2023.

2017-34563, JP, A, Cited by the Japanese Patent Office in an Office Action for related Patent Application No. 2022-149476 on Nov. 2, 2023.

2018-147265, JP, A, Cited by the Japanese Patent Office in an Office Action for related Patent Application No. 2022-149476 on Nov. 2, 2023.

Office Action received for Japanese Patent Application No. 2023-028786, mailed on Aug. 23, 2024, 10 pages (5 pages of English Translation and 5 pages of Official Copy).

Decision to Grant received for European Patent Application No. 21789897.2, mailed on Jun. 5, 2025, 3 pages.

Intention to Grant received for European Patent Application No. 21207736.6, mailed on May 30, 2025, 8 pages.

Non-Final Office Action received for U.S. Appl. No. 17/941,961, mailed on Jun. 11, 2025, 22 pages.

Non-Final Office Action received for U.S. Appl. No. 18/383,371, mailed on Jun. 12, 2025, 9 pages.

1558690, CN, A, Cited by Chinese Patent Office in an Office Action for related Patent Application No. 202211081603.X on Oct. 20, 2023.

101873386, CN, A, Cited by Chinese Patent Office in an Office Action for related Patent Application No. 201580046788.2 on Apr. 15, 2019.

203311163, CN, A, Cited by Chinese Patent Office in an Office Action for related Patent Application No. 202211096369.8 on Sep. 29, 2023.

103604272, CN, A, Cited by Chinese Patent Office in an Office Action for related Patent Application No. 202211096369.8 on Sep. 29, 2023.

103793075, CN, A, Cited by Chinese Patent Office in an Office Action for related Patent Application No. 201580046788.2 on Feb. 25, 2020.

103914238, CN, A, Cited by Chinese Patent Office in an Office Action for related Patent Application No. 202080039832.8 on Mar. 23, 2024.

108958608, CN, A, Cited by Chinese Patent Office in an Office Action for related Patent Application No. 202080039832.8 on Mar. 23, 2024.

3162246, JP, U, Cited by Chinese Patent Office in an Office Action for related Patent Application No. 202211096369.8 on Sep. 29, 2023.

20-2008-0004775, KR, U, Cited by Chinese Patent Office in an Office Action for related Patent Application No. 202211096369.8 on Sep. 29, 2023.

Final Office Action received for U.S. Appl. No. 18/228,597, mailed on May 9, 2025, 22 pages.

Intention to Grant received for European Patent Application No. 22737681.1, mailed on May 14, 2025, 8 pages.

Notice of Allowance received for Chinese Patent Application No. 202110894284.3, mailed on May 13, 2025, 4 pages (1 page of English Translation and 3 pages of Official Copy).

Notice of Allowance received for Korean Patent Application No. 10-2024-7006601, mailed on Apr. 29, 2025, 6 pages (2 pages of English Translation and 4 pages of Official Copy).

Office Action received for Chinese Patent Application No. 202310794146.7, mailed on Apr. 10, 2025, 11 pages (6 pages of English Translation and 5 pages of Official Copy).

Office Action received for Japanese Patent Application No. 2024-081986, mailed on May 9, 2025, 6 pages (3 pages of English Translation and 3 pages of Official Copy).

Advisory Action received for U.S. Appl. No. 17/181,089, mailed on Dec. 08. 2023, 3 pages.

Applicant-Initiated Interview Summary received for U.S. Appl. No. 17/181,089, mailed on Nov. 28, 2023, 3 pages.

Applicant-Initiated Interview Summary received for U.S. Appl. No. 17/181,089, mailed on Sep. 18, 2023, 3 pages.

Applicant-Initiated Interview Summary received for U.S. Appl. No. 17/476,404, mailed on Oct. 31, 2023, 4 pages.

Applicant-Initiated Interview Summary received for U.S. Appl. No. 17/479,974, mailed on Nov. 1, 2023, 2 pages.

Applicant-Initiated Summary received for U.S. Appl. No. 17/699,492, mailed on Oct. 25, 2023, 3 pages.

(56)        References Cited

OTHER PUBLICATIONS

Applicant-Initiated Summary received for U.S. Appl. No. 18/067,350, mailed on Sep. 11, 2023, 4 pages.

Applicant-Initiated Summary received for U.S. Appl. No. 18/088,309, mailed on Oct. 27, 2023, 2 pages.

Corrected Notice of Allowance received for U.S. Appl. No. 17/320,900, mailed on Sep. 18, 2023, 5 pages.

Corrected Notice of Allowance received for U.S. Appl. No. 17/666,971, mailed on Sep. 29, 2023, 2 pages.

Decision to Grant received for European Patent Application No. 19203942.8, mailed on Nov. 16, 2023, 2 pages.

Extended European Search Report received for European Patent Application No. 23172038.4, mailed on Oct. 11, 2023, 10 pages.

Extended European Search Report received for European Patent Application No. 23190753.6, mailed on Nov. 22, 2023, 13 pages.

Extended European Search Report received for European patent Application No. 23191379.9, mailed on Sep. 18, 2323, 8 pages.

Final Office Action received for U.S. Appl. No. 17/181,089, mailed on Oct. 13, 2023, 15 pages.

Final Office Action received for U.S. Appl. No. 17/476,404, mailed on Sep. 12, 2023, 30 pages.

Final Office Action received for U.S. Appl. No. 18/067,350, mailed on Dec. 13, 2023, 44 pages.

Final Office Action received for U.S. Appl. No. 18/088,309, mailed on Jan. 9, 2024, pages.

Intention to Grant received for European Patent Application No. 15714698.6, mailed on Dec. 8, 2023, 9 pages.

Intention to Grant received for European Patent Application No. 21728781.2, mailed on Dec. 12, 2023, 9 pages.

International Preliminary Report on Patentability received for PCT Patent Application No. PCT/US2022/031252, mailed on Dec. 21, 2023, 13 pages.

International Search Report and Written Opinion received for PCT Patent Application No. PCT/US2023/017280, mailed on Jun. 26, 2023, 20 pages.

International Search Report and Written Opinion received for PCT Patent Application No. PCT/US2023/020569, mailed on Nov. 13, 2023, 23 pages.

International Search Report and Written Opinion received for PCT Patent Application No. PCT/US2023/032084, mailed on Nov. 27, 2023, 10 pages.

Invitation to Pay Additional Fees and Partial International Search Report received for PCT Patent Appiication No. PCT/US2023/ 020569, mailed on Sep. 21, 2023, 14 pages.

Non-Final Office Action received for U.S. Appl. No. 17/479,974, mailed on Oct. 10, 2023, 20 pages.

Non-Final Office Action received for U.S. Appl. No. 18/067,350, mailed on Aug. 3, 2023, 41 pages.

Non-Final Office Action received for U.S. Appl. No. 18/088,309, mailed on Sep. 21, 2023, 11 pages.

Notice of Acceptance received for Australian Patent Application No. 2022218540, mailed on Oct. 16, 2023, 3 pages.

Notice of Acceptance received for Australian Patent Application No. 2022241590, mailed on Nov. 14, 2023, 3 pages.

Notice of Allowance received for Chinese Patent Application No. 202111483033.2, mailed on Oct. 7, 2023, 4 pages (1 page of English Translation and 3 pages of Official Copy).

Notice of Allowance received for Japanese Patent Application No. 2020-184605, mailed on Oct. 10, 2023, 4 pages (1 page or English Translation and 3 pages of Official Copy).

Notice of Allowance received for Korean Patent Application No. 10-2022-703365.5, mailed on Nov. 29, 2023, 8 pages (2 pages of English Translation and 4 pages of Official Copy).

Notice of Allowance received for U.S. Appl. No. 17/320,900, mailed on Nov. 6, 2023, 9 pages.

Notice of Allowance received for U.S. Appl. No. 17/666,971, mailed on Dec. 15, 2023, 8 pages.

Notice of Allowance received for U.S. Appl. No. 17/699,492, mailed on Nov. 29, 2023, 5 pages.

Notice of Allowance received for U.S. Appl. No. 18/077,891, mailed on Oct. 19, 2023, 18 pages.

Office Action received for Australian Patent Application No. 2022218517, mailed on Dec. 21, 2023, 5 pages.

Office Action received for Chinese Patent Application No. 201811379281.0, mailed on Aug. 17, 2023, 16 pages (5 pages of English Translation 11 pages of Official Copy).

Office Action received for European Patent Application No. 20719301.2. mailed on Oct. 20, 2023, 11 pages.

Office Action received for European Patent Application No. 20746429.8. mailed on Sep. 20, 2023, 10 pages.

Office Action received for European Patent Application No. 22201007.6, mailed on Oct. 9, 2023, 5 pages.

Office Action received for Japanese Patent Application No. 2022-129377, mailed on Nov. 10, 2023, 6 pages (3 pages of English Translation and 3 pages of Official Copy).

Office Action received for Japanese Patent Application No. 2022-149476, mailed on Nov. 2, 2023, 9 pages (4 pages of English Translation and 5 pages of Official Copy).

Office Action received for Korean Patent Application No. 10-2022-0053111, mailed on Oct. 23, 2023, 10 pages (5 pages of English Translation and 5 pages of Official Copy).

Office Action received for Korean Patent Application No. 10-2022-7001521, mailed on Dec. 19, 2023, 7 pages (3 pages of English Translation and 4 pages of Official Copy).

Office Action received for Korean Patent Application No. 10-2023-0001668, mailed on Nov. 3, 2023, 5 pages (2 pages of English Translation and 3 pages of Official Copy).

Office Action received for Korean Patent Application No. 10-2023-7008877, mailed on Nov. 29, 2023, 7 pages (3 pages of English Translation and 4 pages of Official Copy).

Result of Consultation received for European Patent Application No. 21207736.6, mailed on Nov. 23, 2023, 5 pages.

Summons to Attend Oral Proceedings received for European Patent Application No. 20720310.0, mailed on Jan. 3, 2024, 12 pages.

Summons to Attend Oral Proceedings received for European Patent Application No. 21197457.1, mailed on Nov. 23, 2023, 12 pages.

Decision to Grant received for European Patent Application No. 24211972.5, mailed on Jul. 31, 2025, 2 pages.

Intention to Grant received for European Patent Application No. 23158566.2, mailed on Jul. 30, 2025, 9 pages.

Notice of Allowance received for U.S. Appl. No. 18/383,371, mailed on Jul. 30, 2025, 8 pages.

Office Action received for Australian Patent Application No. 2024205162, mailed on Jul. 31, 2025, 6 pages.

Office Action received for Chinese Patent Application No. 202310585927.5, mailed on Jun. 27, 2025, 17 pages (9 pages of English Translation and 8 pages of Official Copy).

Office Action received for European Patent Application No. 23203414.0, mailed on Jul. 29, 2025, 6 pages.

Office Action received for Japanese Patent Application No. 2024-147808, mailed on Aug. 1, 2025, 10 pages (5 pages of English Translation and 5 pages of Official Copy).

Office Action received for Korean Patent Application No. 10-2024-7011347, mailed on Jul. 31, 2025, 7 pages (3 pages of English Translation and 4 pages of Official Copy).

Applicant-Initiated Interview Summary received for U.S. Appl. No. 17/479,974, mailed on Mar. 14, 2024, 2 pages.

Applicant-Initiated Interview Summary received for U.S. Appl. No. 17/978,930. mailed on Mar. 13, 2024, 3 pages.

Applicant-Initiated Interview Summary received for U.S. Appl. No. 18/067,350, mailed on Mar. 13, 2024, 4 pages.

Interview Summary received for U.S. Appl. No. 18/088,309, mailed on Feb. 28, 2024, 2 pages.

Corrected Notice of Allowance received for U.S. Appl. No. 17/666,971, mailed on Jan. 16, 2024, 2 pages.

Decision to Grant received for European Patent Application No. 15714698.6, mailed on Apr. 5, 2024, 2 pages.

Decision to Grant received for European Patent Application No. 21728781.2, mailed on Feb. 8, 2024, 3 pages.

Decision to Refuse received for Japanese Patent Application No. 2022-116534, mailed on Jan. 29, 2024, 5 pages (2 pages of English Translation and 3 pages of Official Copy).

(56) References Cited

OTHER PUBLICATIONS

Examiner's Answer to Appeal Brief received for U.S. Appl. No. 17/181,089, mailed on Apr. 15, 2024, 11 pages.

Extended European Search Report received for European Patent Application No. 23203414.0, mailed on Jan. 26, 2024, 10 pages.

Final Office Action received for U.S. Appl. No. 17/479,974, mailed on Jan. 19, 2024, 16 pages.

Final Office Action received for U.S. Appl. No. 17/978,930, mailed on Apr. 05. 2024, 28 pages.

Intention to Grant received for European Patent Application No. 21166718.3, mailed on Mar. 25, 2024, 8 pages.

International Preliminary Report on Patentability received for PCT Patent Application No. PCT/US2022/043733, mailed on Apr. 4, 2024, 9 pages.

Invitation to Pay Search Fees received for European Patent Application No. 21789897.2, mailed on Mar. 14, 2024, 3 pages.

Non-Final Office Action received for U.S. Appl. No. 17/941,961, mailed on Apr. 10, 2024, 20 pages.

Non-Final Office Action received for U.S. Appl. No. 17/970,417, mailed on Apr. 10, 2024, 16 pages.

Non-Final Office Action received for U.S. Appl. No. 17/978,930, mailed on Feb. 12, 2024, 25 pages.

Non-Final Office Action received for U.S. Appl. No. 18/088,309, mailed on Apr. 9, 2024, 14 pages.

Notice of Allowance received for Chinese Patent Application No. 202211558100.7, mailed on Mar. 29, 2024, 3 pages (2 pages of English Translation and 1 page of Official Copy).

Notice of Allowance received for Korean Patent Application No. 10-2022-7001521, mailed on Mar. 22, 2024, 7 pages (2 pages of English Translation and 5 pages of Official Copy).

Notice of Allowance received for Korean Patent Application No. 10-2023-7008877, mailed on Feb. 20, 2024, 7 pages (2 pages of English Translation and 5 pages of Official Copy).

Office Action received for Australian Patent Application No. 2023201057, mailed on Jan. 25, 2024, 6 pages.

Office Action received for Australian Patent Application No. 2023203357, mailed on Feb. 14, 2024, 3 pages.

Office Action received for Austraiian Patent Application No. 2023204396, mailed on Jan. 8, 2024, 5 pages.

Office Action received for Chinese Patent Application No. 201880031407.7, mailed on Jan. 12, 2024, 15 pages (7 pages of English Translation and 8 pages of Official Copy).

Office Action received for Chinese Patent Application No. 201911128105.4, mailed on Mar. 16, 2024, 7 pages (4 pages of English Translation and 3 pages of Official Copy).

Office Action received for Chinese Patent Application No. 201911128105.4, mailed on Mar. 19, 2024, 16 pages (8 pages of English Translation and 8 pages of Officiai Copy).

Office Action received for Chinese Patent Application No. 202010728711.6, mailed on Feb. 1, 2024, 30 pages (18 pages of English Translation and 12 pages of Officiai Copy).

Office Action received for Chinese Patent Application No. 202010728844.3, mailed on Jan. 27, 2024, 16 pages (8 pages of English Translation and 8 pages of Official Copy).

Office Action received for Chinese Patent Application No. 202011083486.1, mailed on Jan. 16, 2024, 21 pages (7 pages of English Translation and 14 pages of Official Copy).

Office Action received for Chinese Patent Application No. 202211558100.7, mailed on Jan. 8, 2024, 12 pages (6 pages of English Translation and 6 pages of Official Copy).

Office Action received for Chinese Patent Application No. 202311321231.8, mailed on Mar. 10, 2024, 15 pages (9 pages of English Translation and 6 pages of Official Copy).

Office Action received for European Patent Application No. 22188377. 0, mailed on Mar. 7, 2024, 7 pages.

Office Action received for European Patent Application No. 22198071. 7, mailed on Feb. 13, 2024, 4 pages.

Office Action received for European Patent Application No. 22201007. 6, mailed on Mar. 13, 2024, 4 pages.

Office Action received for Indian Patent Application No. 202117048581, mailed on Feb. 1, 2024, 6 pages.

Office Action received for Japanese Patent Application No. 2023-022576, mailed on Feb. 26, 2024, 10 pages (5 pages of English Translation and 5 pages of Official Copy).

Office Action received for Japanese Patent Application No. 2023-028786, mailed on Mar. 22, 2024, 10 pages (5 pages of English Translation and 5 pages of Official Copy).

Office Action received for Korean Patent Application No. 10-2022-7032414, mailed on Mar. 26, 2024, 11 pages (5 pages of English Translation and 6 pages of Official Copy).

Decision to Refuse received for Japanese Patent Application No. 2023-077990, mailed on Dec. 13, 2024, 6 pages (3 pages of English Translation and 3 pages of Official Copy).

Final Office Action received for U.S. Appl. No. 17/991,708, mailed on Dec. 30, 2024, 22 pages.

Office Action received for Australian Patent Application No. 2023201057, mailed on Dec. 19, 2024, 4 pages.

Intention to Grant received for European Patent Application No. 22201007.6, mailed on Apr. 4, 2025, 8 pages.

Non-Final Office Action received for U.S. Appl. No. 18/077,154, mailed on Apr. 10, 2025. 27 pages.

Record of Oral Hearing received for U.S. Appl. No. 17/181,089, mailed on Mar. 27, 2025, 15 pages.

Applicant-Initiated Interview Summary received for U.S. Appl. No. 17/941,961, mailed on Sep. 12, 2025, 5 pages.

Corrected Notice of Allowance received for U.S. Appl. No. 18/228,597, mailed on Sep. 17, 2025, 2 pages.

Corrected Notice of Allowance received for U.S. Appl. No. 18/535,820, mailed on Sep. 3, 2025, 2 pages.

Decision on Appeal received for U.S. Appl. No. 17/747,804, mailed on Sep. 26, 2025, 11 pages.

Decision on Appeal received for U.S. Appl. No. 18/200,480, mailed on Sep. 26, 2025, 14 pages.

Notice of Allowance received for Korean Patent Application No. 10-2025-0026405, mailed on Jul. 22, 2025, 7 pages (2 pages of English Translation and 5 pages of Official Copy).

Notice of Allowance received for U.S. Appl. No. 18/228,597, mailed on Sep. 10, 2025, 10 pages.

Notice of Allowance received for U.S. Appl. No. 18/535,820, mailed on Aug. 20, 2025, 9 pages.

Office Action received for Chinese Patent Application No. 202411704616.7, mailed on Jul. 30, 2025, 14 pages (7 pages of English Translation and 7 pages of Official Copy).

Office Action received for European Patent Application No. 23157906. 1, mailed on Sep. 10, 2025, 4 pages.

Office Action received for Japanese Patent Application No. 2024-175208, mailed on Sep. 1, 2025, 11 pages (5 pages of English Translation and 6 pages of Official Copy).

Decision to Grant received for European Patent Application No. 21207736.6, mailed on Oct. 9, 2025, 2 pages.

Notice of Allowance received for Chinese Patent Application No. 202310794146.7, mailed on Sep. 29, 2025, 4 pages (1 page of English Translation and 3 pages of Official Copy).

Notice of Allowance received for Japanese Patent Application No. 2024-081986, mailed on Oct. 6, 2025, 4 pages (1 page of English Translation and 3 pages of Official Copy).

Office Action received for Australian Patent Application No. 2024202748, mailed on Oct. 1, 2025, 3 pages.

Office Action received for Korean Patent Application No. 10-2024-7015715, mailed on Sep. 23, 2025, 9 pages (4 pages of English Translation and 5 pages of Official Copy).

Decision to Grant received for European Patent Application No. 22737681.1, mailed on Oct. 23, 2025, 2 pages.

Final Office Action received for U.S. Appl. No. 18/067,350, mailed on Oct. 16, 2025, 55 pages.

Notice of Allowance received for Chinese Patent Application No. 202411713875.6, mailed on Oct. 13, 2025, 4 pages (1 page of English Translation and 3 pages of Official Copy).

Office Action received for European Patent Application No. 22198071. 7, mailed on Oct. 17, 2025, 4 pages.

Record of Oral Hearing received for U.S. Appl. No. 17/747,804, mailed on Oct. 14, 2025, 10 pages.

(56) References Cited

OTHER PUBLICATIONS

Record of Oral Hearing received for U.S. Appl. No. 18/200,480,
mailed on Oct. 14, 2025, 15 pages.

* cited by examiner

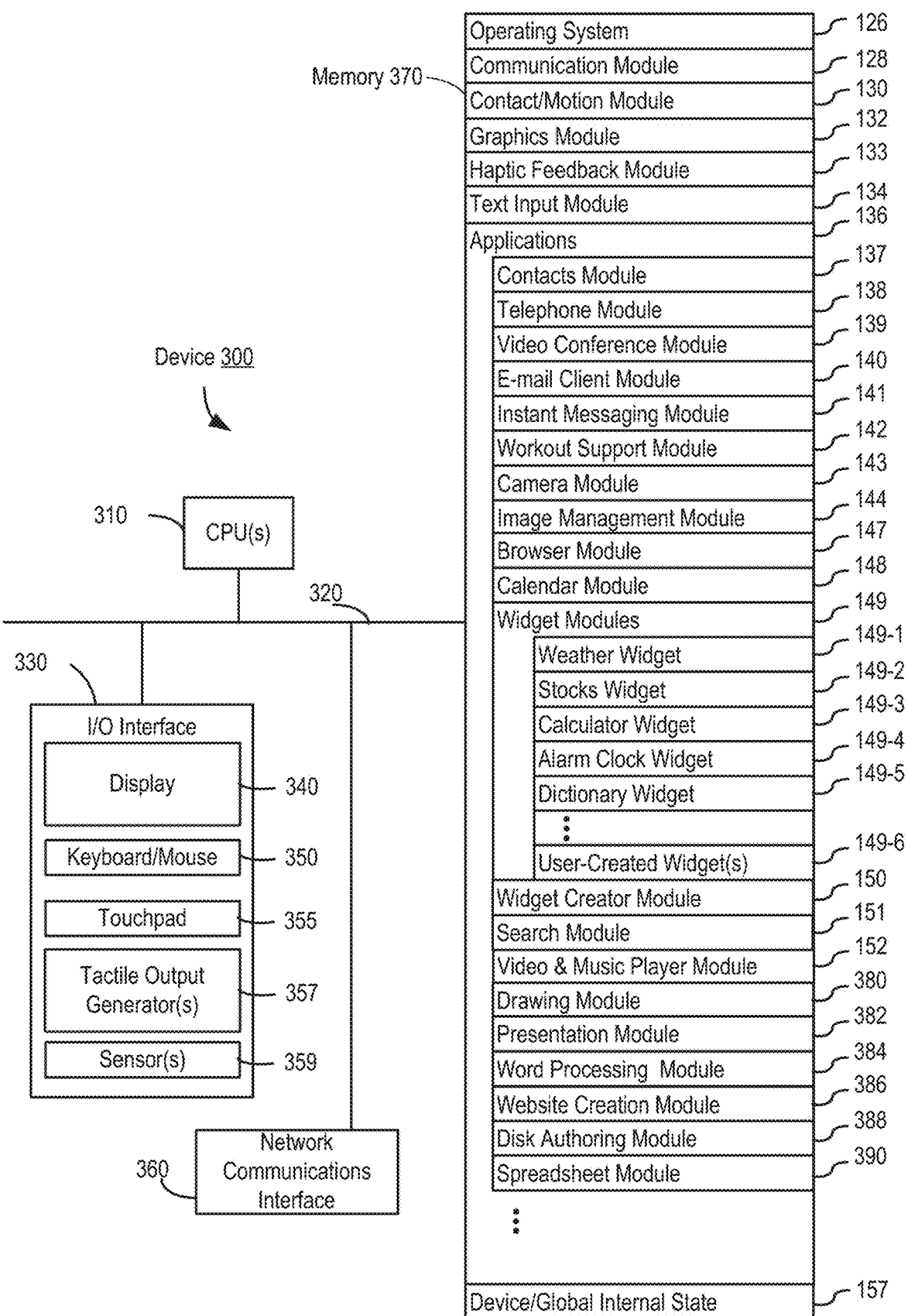

Memory 370

| | |
|---|---|
| Operating System | 126 |
| Communication Module | 128 |
| Contact/Motion Module | 130 |
| Graphics Module | 132 |
| Haptic Feedback Module | 133 |
| Text Input Module | 134 |
| Applications | 136 |
| Contacts Module | 137 |
| Telephone Module | 138 |
| Video Conference Module | 139 |
| E-mail Client Module | 140 |
| Instant Messaging Module | 141 |
| Workout Support Module | 142 |
| Camera Module | 143 |
| Image Management Module | 144 |
| Browser Module | 147 |
| Calendar Module | 148 |
| Widget Modules | 149 |
| Weather Widget | 149-1 |
| Stocks Widget | 149-2 |
| Calculator Widget | 149-3 |
| Alarm Clock Widget | 149-4 |
| Dictionary Widget | 149-5 |
| ⋮ | |
| User-Created Widget(s) | 149-6 |
| Widget Creator Module | 150 |
| Search Module | 151 |
| Video & Music Player Module | 152 |
| Drawing Module | 380 |
| Presentation Module | 382 |
| Word Processing  Module | 384 |
| Website Creation Module | 386 |
| Disk Authoring Module | 388 |
| Spreadsheet Module | 390 |
| ⋮ | |
| Device/Global Internal State | 157 |

Device 300

310 — CPU(s)

320

330 — I/O Interface
- Display — 340
- Keyboard/Mouse — 350
- Touchpad — 355
- Tactile Output Generator(s) — 357
- Sensor(s) — 359

360 — Network Communications Interface

*FIG. 3*

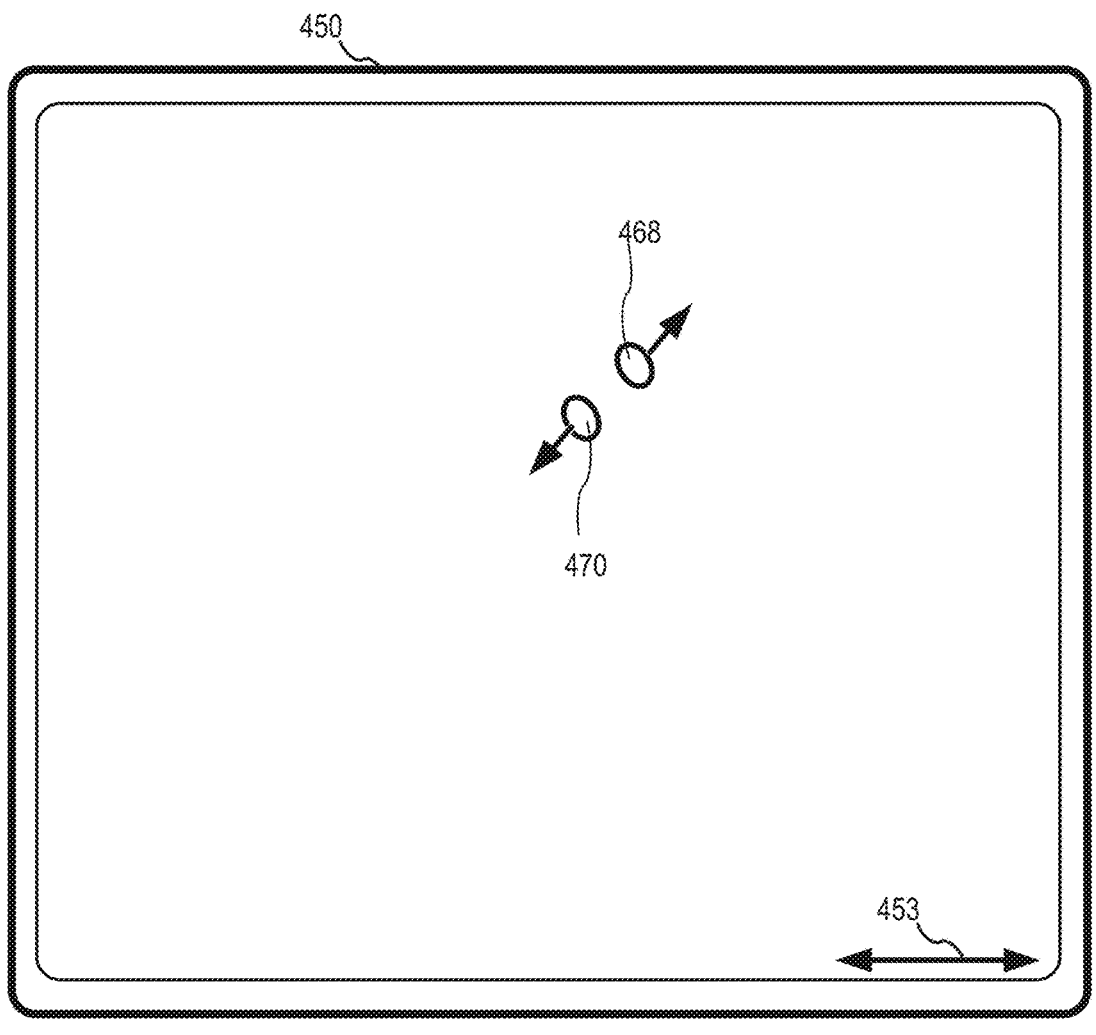
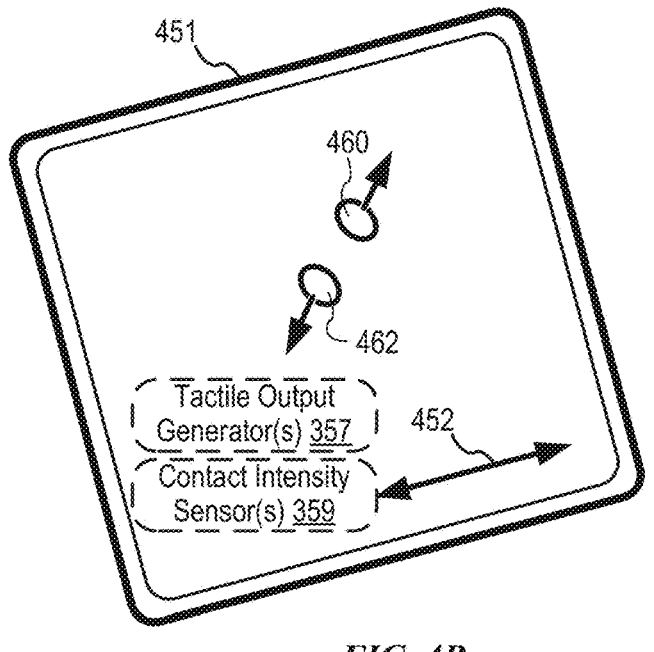
*FIG. 4B*

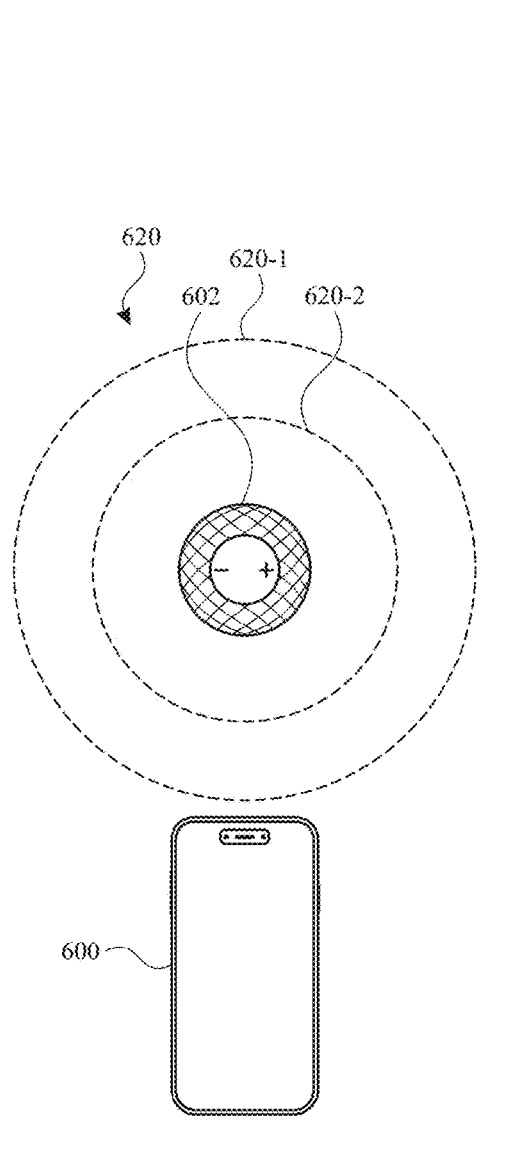
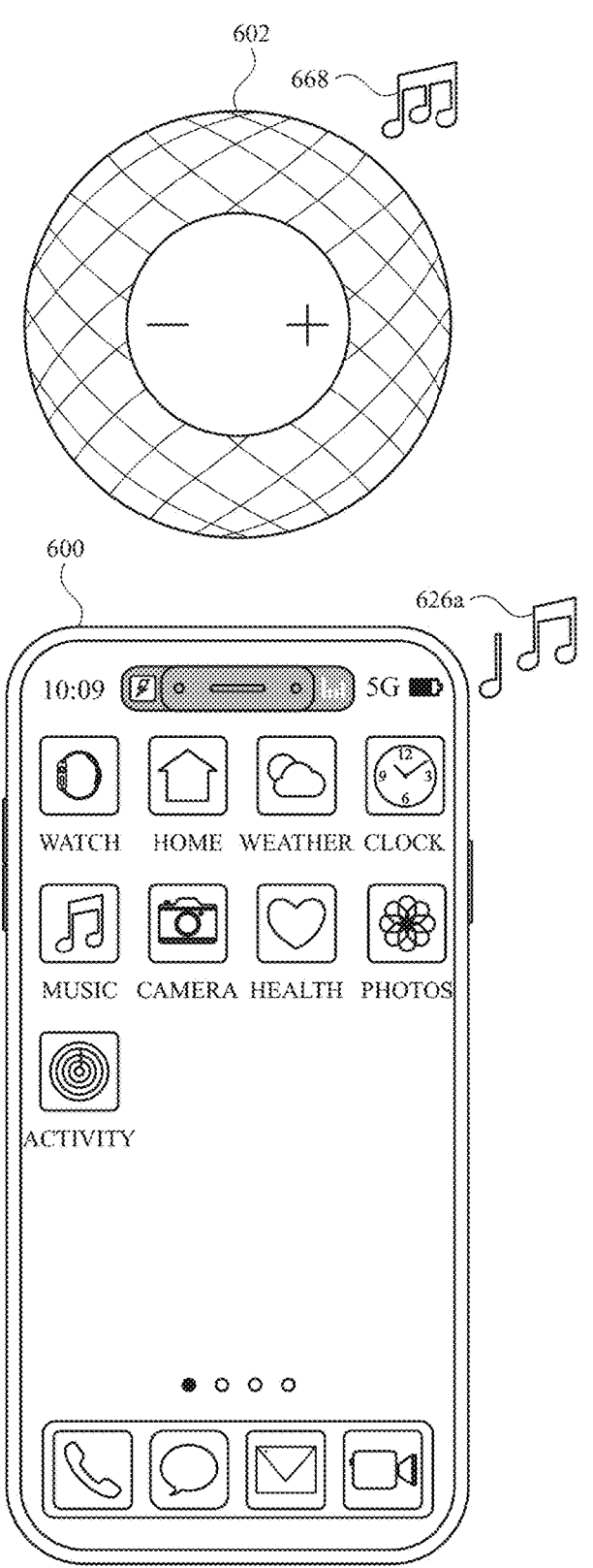
*FIG. 6K*

700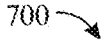

<div style="border:1px solid black; padding:10px">

702
Display, via the display generation component, a user interface element

</div>

↓

<div style="border:1px solid black; padding:10px">

704
While displaying the user interface element, detect a first change in distance between the computer system and the external device </div>

↓

<div style="border:1px solid black; padding:10px">

706
In response to detecting the first change in distance:

<div style="border:1px solid black; padding:10px">

708
In accordance with a determination that a distance between the computer system and the external device is greater than a first threshold distance, display the user interface element at a first predetermined size </div>

<div style="border:1px solid black; padding:10px">

710
In accordance with a determination that the distance between the computer system and the external device is less than the first threshold distance and greater than a second threshold distance, display the user interface element at a variable size that is based on the distance between the computer system and the external device </div>

<div style="border:1px solid black; padding:10px">

712
In accordance with a determination that the distance between the computer system and the external device is less than the second threshold distance, display the user interface element at a second predetermined size </div>

</div>

*FIG. 7*

INTERFACES FOR DEVICE INTERACTIONS

CROSS-REFERENCE TO RELATED APPLICATIONS

This application claims priority to U.S. Provisional Application No. 63/404,175, entitled "INTERFACES FOR DEVICE INTERACTIONS," filed on Sep. 6, 2022, the content of which is hereby incorporated by reference in its entirety.

FIELD

The present disclosure relates generally to computer user interfaces, and more specifically to techniques for managing interactions between devices.

BACKGROUND

Users of electronic devices, such as smart phones and other computing systems, often operate multiple devices (e.g., a smart phone and a smart speaker), which can interact with each other, often in a coordinated manner. For example, a user can use a set of devices to manage and enable media playback, including transferring playback from one device to the other.

BRIEF SUMMARY

Some techniques for managing interactions between devices using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing interactions between devices. Such methods and interfaces optionally complement or replace other methods for managing interactions between devices. Such methods and interfaces reduce the cognitive burden on a user and produce a more efficient human-machine interface. For battery-operated computing devices, such methods and interfaces conserve power and increase the time between battery charges.

In accordance with some embodiments, a method performed at a computer system that is in communication with a display generation component and an external device is described. The method comprises: displaying, via the display generation component, a user interface element; while displaying the user interface element, detecting a first change in distance between the computer system and the external device; and in response to detecting the first change in distance: in accordance with a determination that a distance between the computer system and the external device is greater than a first threshold distance, displaying the user interface element at a first predetermined size; in accordance with a determination that the distance between the computer system and the external device is less than the first threshold distance and greater than a second threshold distance, displaying the user interface element at a variable size that is based on the distance between the computer system and the external device; and in accordance with a determination that the distance between the computer system and the external device is less than the second threshold distance, displaying the user interface element at a second predetermined size.

In accordance with some embodiments a non-transitory computer readable storage is described. The non-transitory computer-readable storage medium storing one or more programs configured to be executed by one or more processors of a computer system, wherein the computer system is in communication with a display generation component and an external device, the one or more programs including instructions for: displaying, via the display generation component, a user interface element; while displaying the user interface element, detecting a first change in distance between the computer system and the external device; and in response to detecting the first change in distance: in accordance with a determination that a distance between the computer system and the external device is greater than a first threshold distance, displaying the user interface element at a first predetermined size; in accordance with a determination that the distance between the computer system and the external device is less than the first threshold distance and greater than a second threshold distance, displaying the user interface element at a variable size that is based on the distance between the computer system and the external device; and in accordance with a determination that the distance between the computer system and the external device is less than the second threshold distance, displaying the user interface element at a second predetermined size.

In accordance with some embodiments a transitory computer readable storage is described. The transitory computer-readable storage medium storing one or more programs configured to be executed by one or more processors of a computer system, wherein the computer system is in communication with a display generation component and an external device, the one or more programs including instructions for: displaying, via the display generation component, a user interface element; while displaying the user interface element, detecting a first change in distance between the computer system and the external device; and in response to detecting the first change in distance: in accordance with a determination that a distance between the computer system and the external device is greater than a first threshold distance, displaying the user interface element at a first predetermined size; in accordance with a determination that the distance between the computer system and the external device is less than the first threshold distance and greater than a second threshold distance, displaying the user interface element at a variable size that is based on the distance between the computer system and the external device; and in accordance with a determination that the distance between the computer system and the external device is less than the second threshold distance, displaying the user interface element at a second predetermined size.

In accordance with some embodiments, a computer system is described. The computer system comprises one or more processors, wherein the computer system is in communication with a display generation component and an external device; and memory storing one or more programs configured to be executed by the one or more processors, the one or more programs including instructions for: displaying, via the display generation component, a user interface element; while displaying the user interface element, detecting a first change in distance between the computer system and the external device; and in response to detecting the first change in distance: in accordance with a determination that a distance between the computer system and the external device is greater than a first threshold distance, displaying the user interface element at a first predetermined size; in accordance with a determination that the distance between the computer system and the external device is less than the first threshold distance and greater than a second threshold distance, displaying the user interface element at a variable size that is based on the distance between the computer system and the external device; and in accordance with a determination that the distance between the computer system and the external device is less than the second threshold distance, displaying the user interface element at a second predetermined size.

In accordance with some embodiments, a computer system is described. The computer system, comprises: one or more processors, wherein the computer system is in communication with a display generation component and an external device; memory storing one or more programs configured to be executed by the one or more processors; means for displaying, via the display generation component, a user interface element; means for while displaying the user interface element detecting a first change in distance between the computer system and the external device; and means, responsive to detecting the first change in distance, for: in accordance with a determination that a distance between the computer system and the external device is greater than a first threshold distance, displaying the user interface element at a first predetermined size; in accordance with a determination that the distance between the computer system and the external device is less than the first threshold distance and greater than a second threshold distance, displaying the user interface element at a variable size that is based on the distance between the computer system and the external device; and in accordance with a determination that the distance between the computer system and the external device is less than the second threshold distance, displaying the user interface element at a second predetermined size.

In accordance with some embodiments, a computer program product is described. The computer program product comprising one or more programs configured to be executed by one or more processors of a computer system that is in communication with a display generation component and an external device, the one or more programs including instructions for: displaying, via the display generation component, a user interface element; while displaying the user interface element, detecting a first change in distance between the computer system and the external device; and in response to detecting the first change in distance: in accordance with a determination that a distance between the computer system and the external device is greater than a first threshold distance, displaying the user interface element at a first predetermined size; in accordance with a determination that the distance between the computer system and the external device is less than the first threshold distance and greater than a second threshold distance, displaying the user interface element at a variable size that is based on the distance between the computer system and the external device; and in accordance with a determination that the distance between the computer system and the external device is less than the second threshold distance, displaying the user interface element at a second predetermined size.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing interactions between devices, thereby increasing the effectiveness, efficiency, and user satisfaction with such devices. Such methods and interfaces may complement or replace other methods for managing interactions between devices.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 3 is a block diagram of an exemplary multifunction device with a display and a touch-sensitive surface in accordance with some embodiments.

FIG. 4B illustrates an exemplary user interface for a multifunction device with a touch-sensitive surface that is separate from the display in accordance with some embodiments.

FIG. 7 is a flow diagram illustrating a method for managing interactions between devices s, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing interactions between devices. For example, there is a need for computer systems that allow a user the ability to easily transfer the playback of media items between computer systems. Such techniques can reduce the cognitive burden on a user who manages the playback of media on computer systems, thereby enhancing productivity. Further, such techniques can reduce processor and battery power otherwise wasted on redundant user inputs.

Below, FIGS. 1A-1B, 2, 3, 4A-4B, and 5A-5D provide a description of exemplary devices for performing the techniques for managing interactions between devices. FIGS.

Figure 6A:
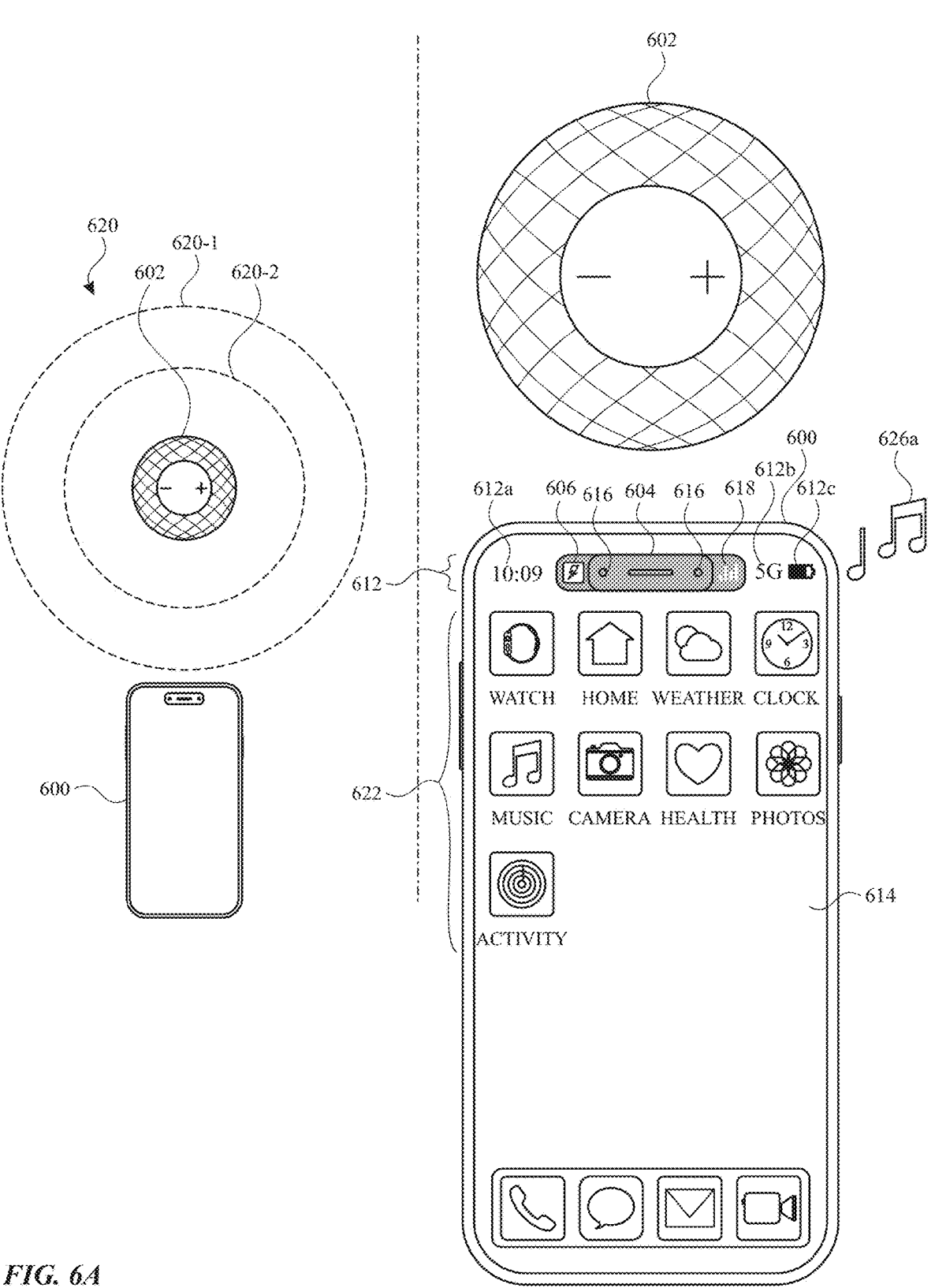
FIGS. 6A-6O illustrate exemplary user interfaces for managing interactions between devices, in accordance with some embodiments.

6A-6O illustrate exemplary user interfaces for managing interactions between devices. FIG. 7 is a flow diagram illustrating methods of managing interactions between devices in accordance with some embodiments. The user interfaces in FIGS. 6A-6O are used to illustrate the processes described below, including the processes in FIG. 7.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
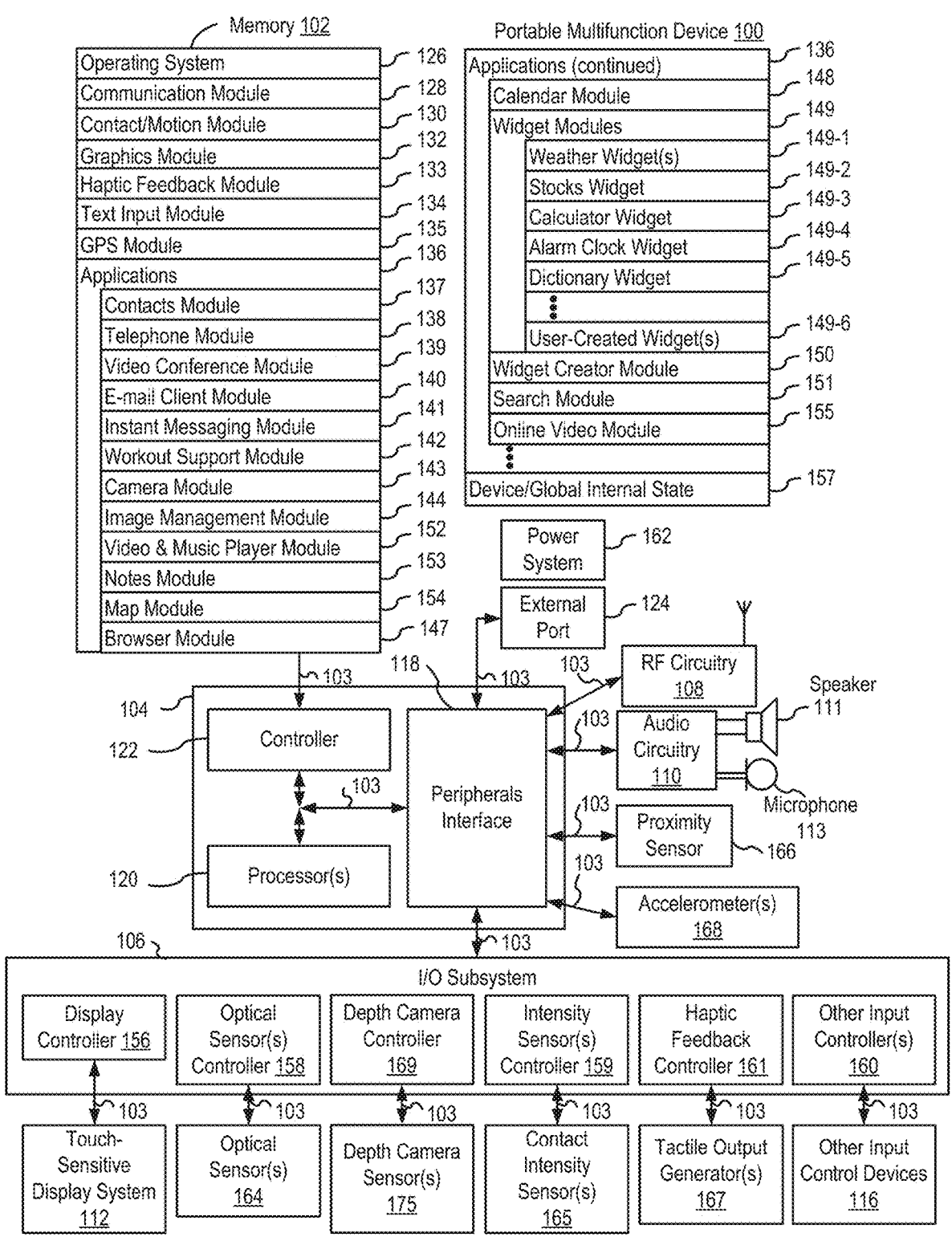
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.1 lac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user.

Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
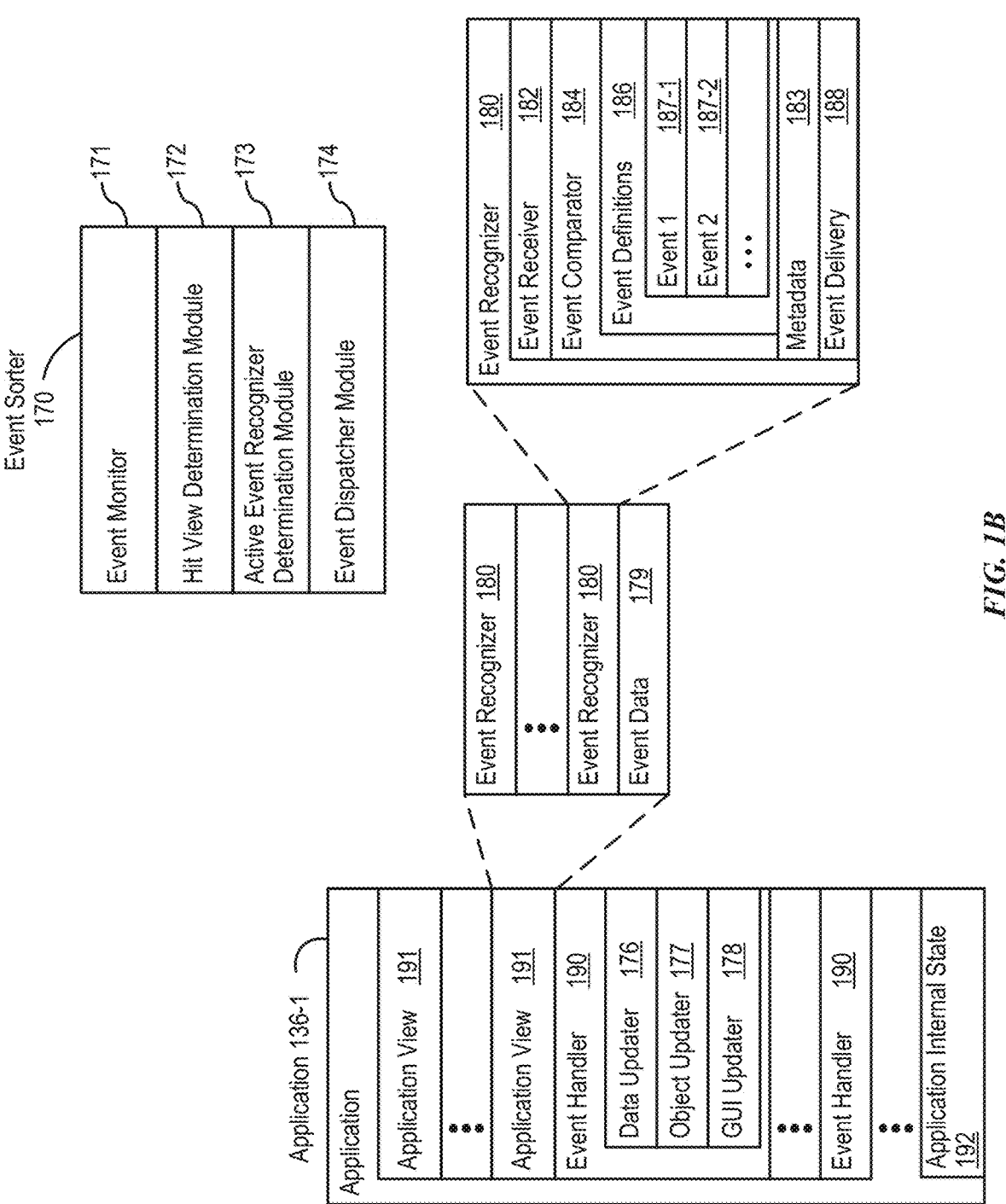
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
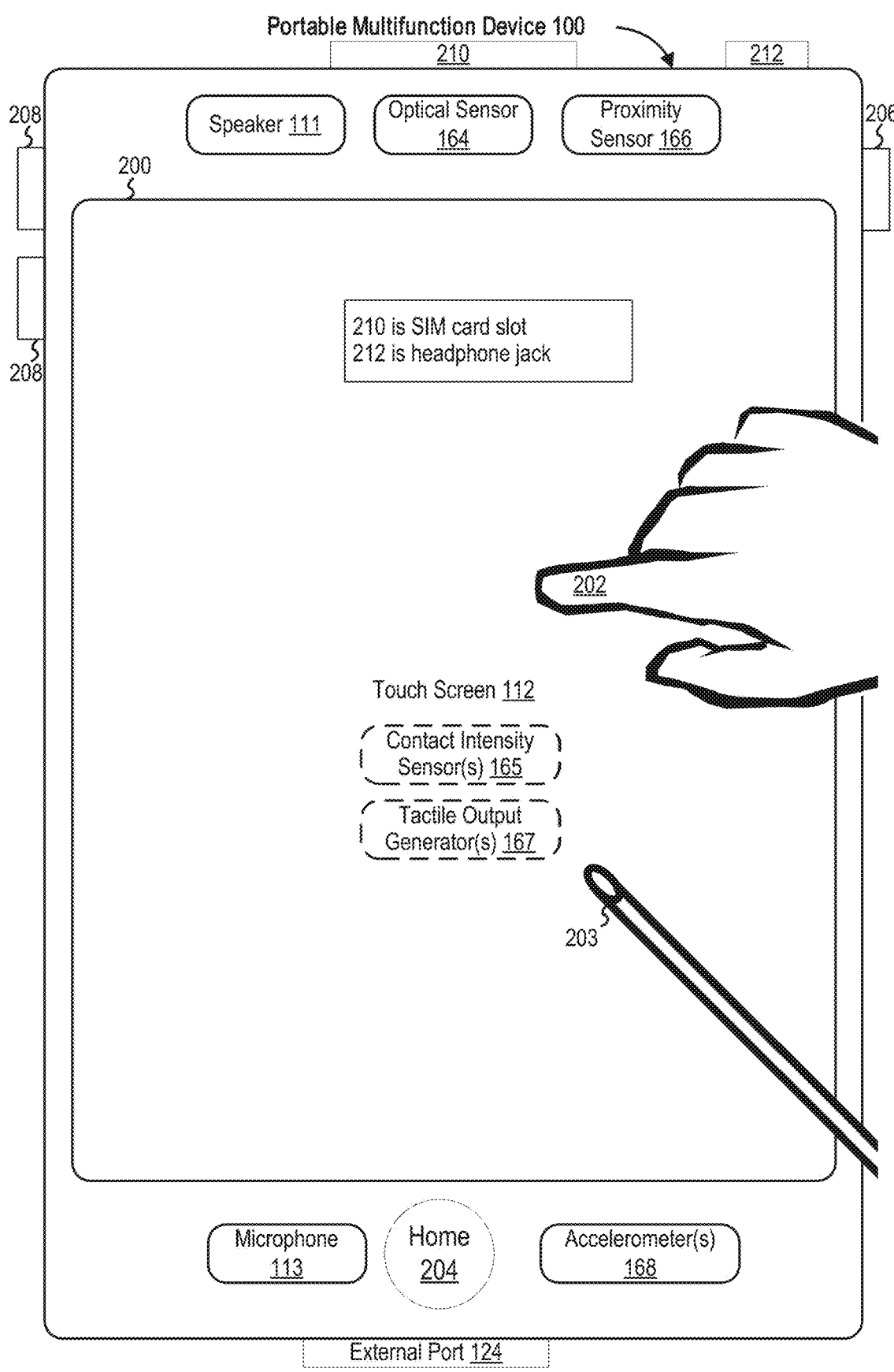
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
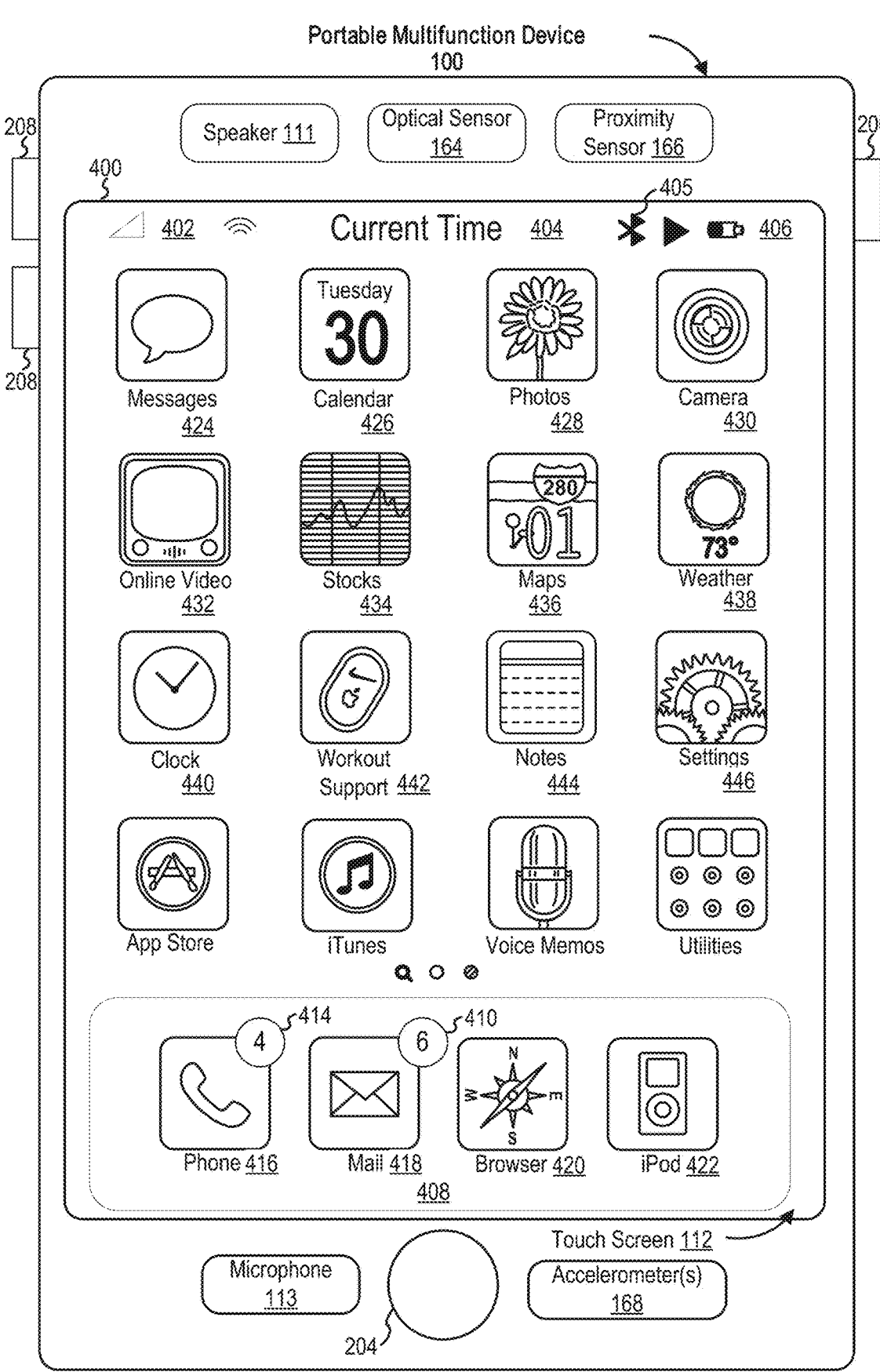
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
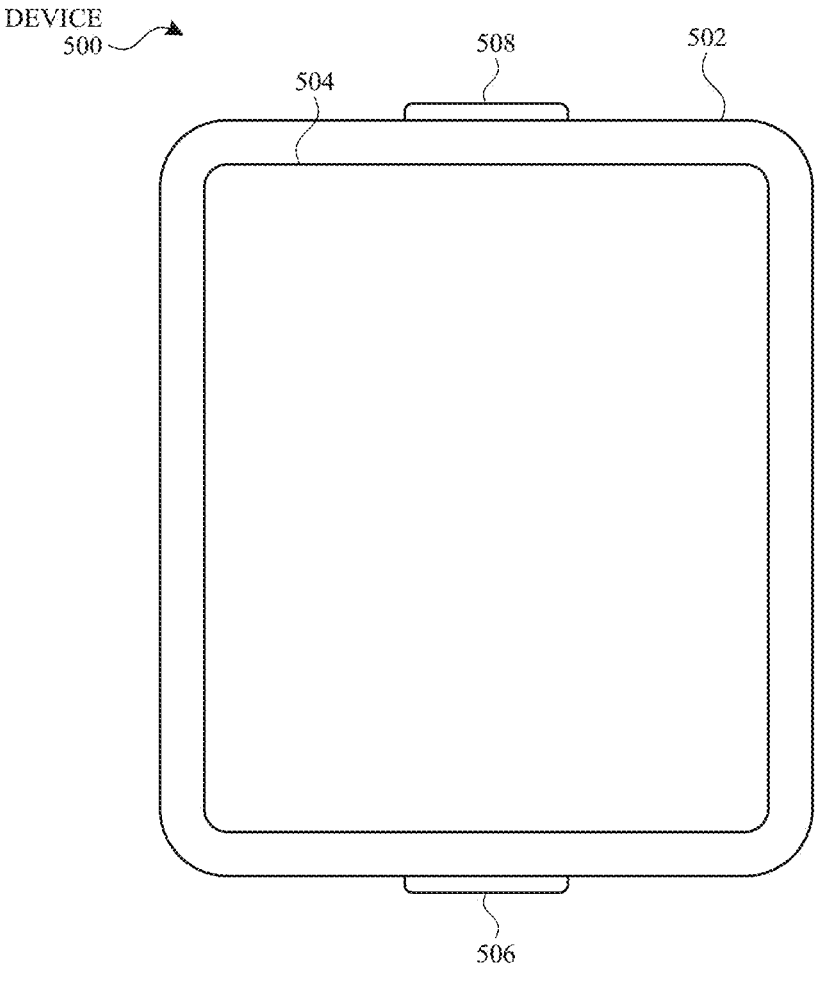
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
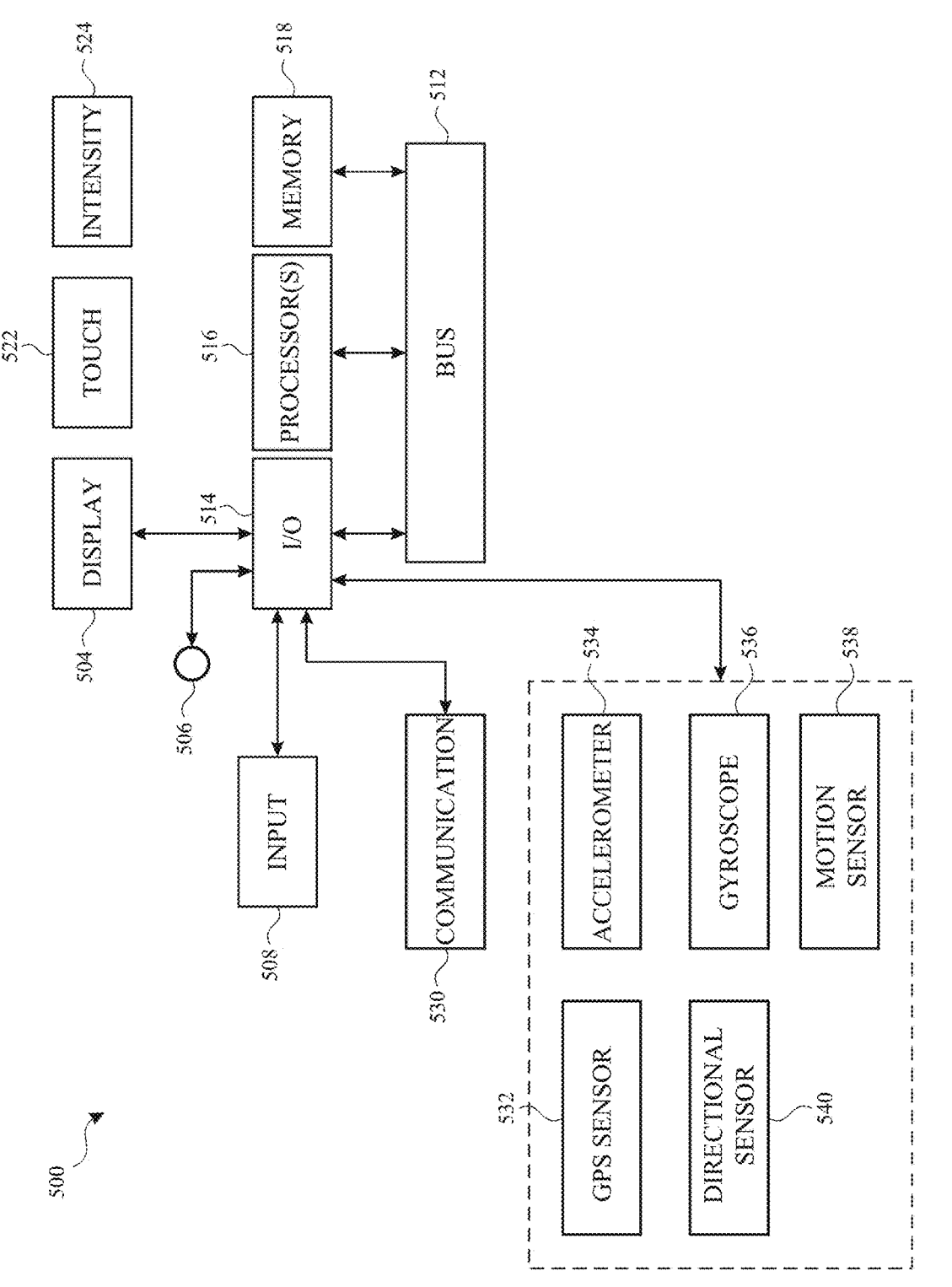
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
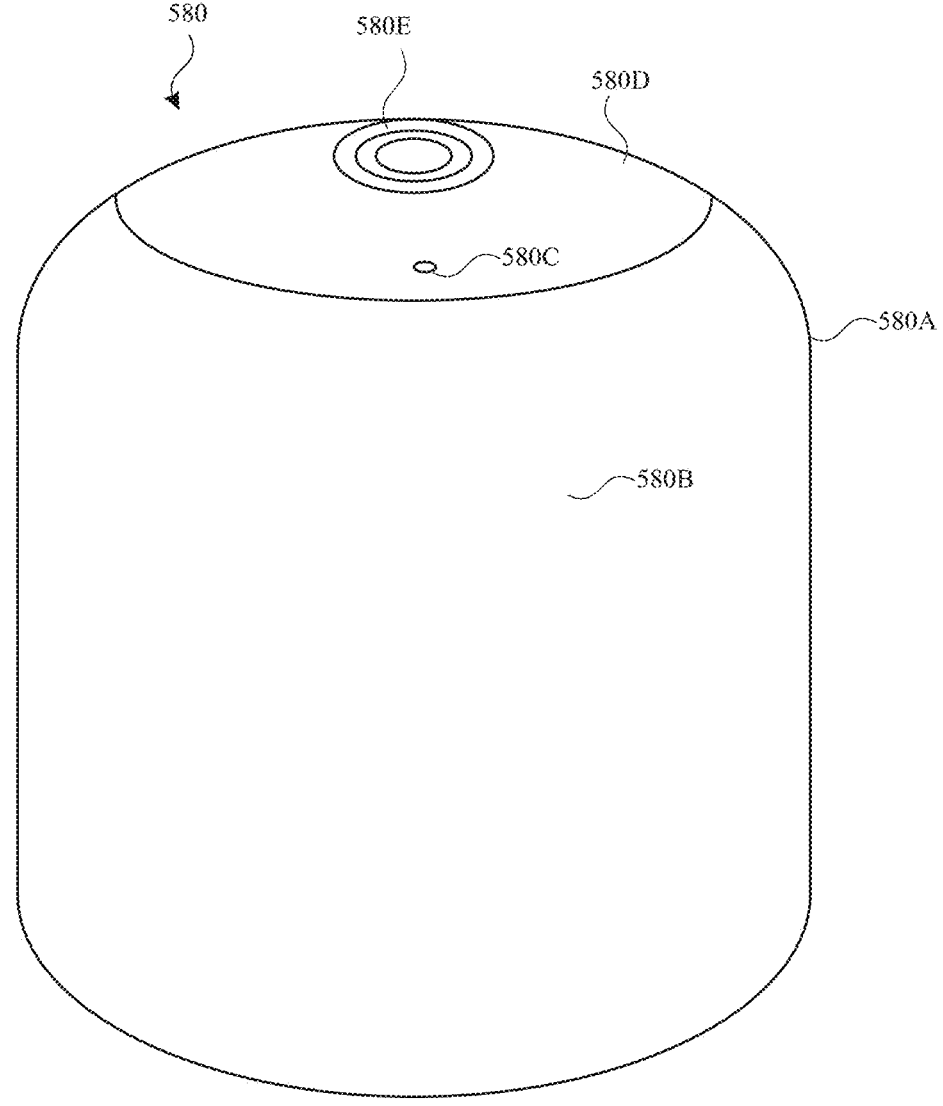
FIG. 5C illustrates an electronic device in accordance with some embodiments.

FIG. 5C illustrates exemplary electronic device 580. Device 580 includes body 580A. In some embodiments, device 580 can include some or all of the features described with respect to devices 100, 300, and 500 (e.g., FIGS. 1A-5B). In some embodiments, device 580 has one or more speakers 580B (concealed in body 580A), one or more microphones 580C, one or more touch-sensitive surfaces 580D, and one or more displays 580E. Alternatively, or in addition to a display and touch-sensitive surface 580D, the device has a touch-sensitive display (also referred to as a touchscreen). As with devices 100, 300, and 500, in some embodiments, touch-sensitive surface 580D (or the touch screen) optionally includes one or more intensity sensors for detecting intensity of contacts (e.g., touches) being applied. The one or more intensity sensors of touch-sensitive surface 580D (or the touchscreen) can provide output data that represents the intensity of touches. The user interface of device 580 can respond to touches based on their intensity, meaning that touches of different intensities can invoke different user interface operations on device 580. In some embodiments, the one or more displays 580E are one or more light-emitting diodes (LEDs). For example, a display can be a single LED, an LED cluster (e.g., a red, a green, and a blue LED), a plurality of discrete LEDs, a plurality of discrete LED clusters, or other arrangement of one or more LEDs. For example, the display 580E can be an array of nine discrete LED clusters arranged in a circular shape (e.g., a ring). In some examples, the one or more displays are comprised of one or more of another type of light-emitting elements.

Figure 5D:
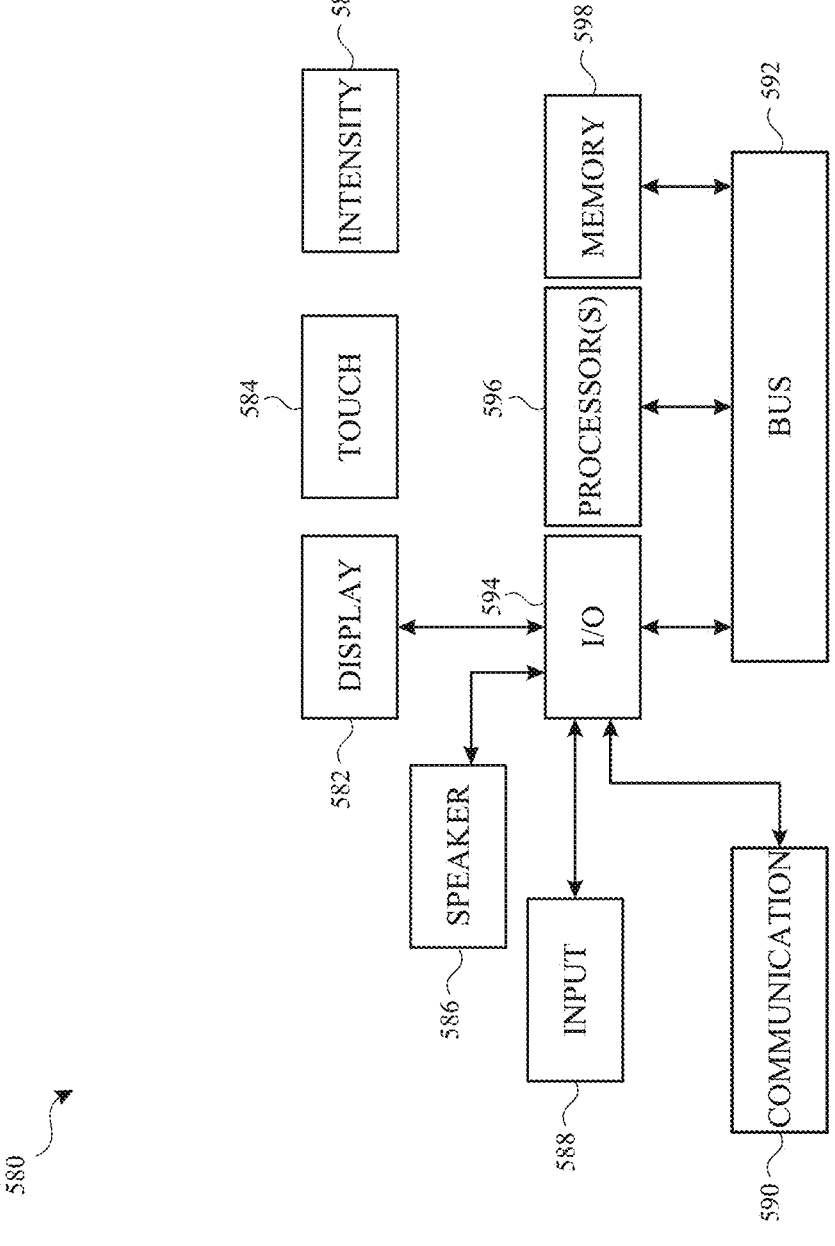
FIG. 5D is a block diagram illustrating an electronic device in accordance with some embodiments.

FIG. 5D depicts exemplary personal electronic device 580. In some embodiments, device 580 can include some or all of the components described with respect to FIGS. 1A, 1B, 3, and 5A-5B. Device 580 has bus 592 that operatively couples I/O section 594 with one or more computer processors 596 and memory 598. I/O section 594 can be connected to display 582, which can have touch-sensitive component 584 and, optionally, intensity sensor 585 (e.g., contact intensity sensor). In some embodiments, touch-sensitive component 584 is a separate component than display 582. In addition, I/O section 594 can be connected with communication unit 590 for receiving application and operating system data, using Wi-Fi, Bluetooth, near field communication (NFC), cellular, and/or other wireless communication techniques. Device 580 can include input mechanisms 588. Input mechanism 588 is, optionally, a button, in some examples. Input mechanism 588 is, optionally, a microphone, in some examples. Input mechanism 588 is, optionally, a plurality of microphones (e.g., a microphone array).

Electronic device 580 includes speaker 586 for outputting audio. Device 580 can include audio circuitry (e.g., in I/O section 594) that receives audio data, converts the audio data to an electrical signal, and transmits the electrical signal to speaker 586. Speaker 586 converts the electrical signal to human-audible sound waves. The audio circuitry (e.g., in I/O section 594) also receives electrical signals converted by a microphone (e.g., input mechanism 588) from sound waves. The audio circuitry (e.g., in I/O section 594) converts the electrical signal to audio data. Audio data is, optionally, retrieved from and/or transmitted to memory 598 and/or RF circuitry (e.g., in communication unit 590) by I/O section 594.

Memory 598 of personal electronic device 580 can include one or more non-transitory computer-readable storage mediums, for storing computer-executable instructions, which, when executed by one or more computer processors 596, for example, can cause the computer processors to perform the techniques described below, including process 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 580 is not limited to the components and configuration of FIG. 5D, but can include other or additional components in multiple configurations.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6O illustrate exemplary user interfaces for managing interactions between devices, in accordance with some embodiments. The user interfaces in these figures are used to illustrate the processes described below, including the processes in FIG. 7.

At FIG. 6A, diagram 620 depicts the positioning of computer system 600 relative to computer system 602. Diagram 620 includes outer threshold distance 620-1 and inner threshold distance 620-2, both of which are provided for illustrative purposes only and do not form a part of user interface(s) displayed by device 600. Outer threshold distance 620-1 corresponds to a first predetermined distance (e.g., 4 inches, 8 inches, 12 inches, or 16 inches) from computer system 602. Inner threshold distance 620-2 corresponds to a second predetermined distance (e.g., 2 inches, 4 inches, 6 inches, or 8 inches) from computer system 602. As explained in greater detail below, both computer system 600 and computer system 602 perform various operations based on the distance between computer system 600 and computer system 602. As illustrated in FIG. 6A, computer system 600 is positioned outside of outer threshold distance 620-1.

FIG. 6A also includes a detailed depiction of computer system 600 and computer system 602 (e.g., the right half of FIG. 6A). At FIG. 6A, computer system 602 is depicted as a smart speaker and computer system 600 is depicted as a smart phone. While computer system 602 is depicted as a smart speaker, it should be recognized that this is merely an example and techniques described herein can work with other types of computer systems, such as a thermostat, a light control, a personal gaming system, and/or a desktop computer. Further, while computer system 600 is depicted as a smart phone, it should be recognized that this is merely an example and techniques described herein can work with other types of computer systems such as a smart watch, a smart speaker, and/or a tablet. In some embodiments, device 600 includes one or more features of devices 100, 300, and/or 500. In some embodiments, device 602 includes one or more features of device 580.

As illustrated in FIG. 6A, computer system 600 displays home screen user interface 614 that includes application icons 622. Each icon in application icons 622 corresponds to a respective application that is installed on computer system 600. Further, as illustrated in FIG. 6A, computer system 600 displays media user interface object 604 while computer system 600 displays home screen user interface 614. Media user interface object 604 includes equalizer bars 618 and album art 606. Equalizer bars 618 animate (e.g., move up and down, side to side, and/or in a diagonal direction) to indicate that a targeted computer system (e.g., computer system 600 or computer system 602) is currently playing back a media item. Album art 606 is a graphical representation of the media item that is being played back on the targeted computer system. As explained in greater detail below, computer system 600 displays media user interface object 604 at various sizes depending on the distance between computer system 600 and computer system 602. In some embodiments, media user interface object 604 includes a textual representation of the media item that is being played back on the targeted computer system. In some embodiments, media user interface object 604 includes an indication (e.g., a graphical and/or textual indication) of the device that is playing back the media represented by album art 606.

Computer system 600 includes one or more sensors 616 (e.g., infrared sensors and/or optical sensors) (e.g., one or more sensors 616 are integrated into computer system 600). As illustrated in FIG. 6A, media user interface object 604 is displayed around (e.g., encompassing) one or more sensors 616 of computer system 600.

At FIG. 6A, as indicated by music symbols 626a, computer system 600 is playing back a first media item (e.g., a song, a podcast, and/or a voice memo). At FIG. 6A, there are no music symbols in close proximity of computer system 602. Accordingly, at FIG. 6A, computer system 602 is not currently playing a respective media item. Throughout FIGS. 6A-6O, the size of music symbols 626a correspond to the playback volume of computer system 600 and/or computer system 602. The larger music symbols 626a are, the higher the playback volume of computer system 600 and/or computer system 602.

As illustrated in FIG. 6A, home screen user interface 614 includes status bar 612. Status bar 612 includes time user interface element 612a, signal status user interface element 612b, and battery status user interface element 612c. Time user interface element 612a indicates the current time. Signal status user interface element 612b indicates whether computer system 600 is connected to a wireless cellular signal. Battery status user interface element 612c indicates the current battery life of computer system 600. In some embodiments, status bar 612 includes additional user interface elements that indicate a respective status of computer system 600.

Various media transfer processes are described throughout FIGS. 6A-6O. In FIGS. 6A-6O, the various media transfer processes involve repositioning computer system 600 relative to computer system 602. However, it should be noted that in some embodiments, the various media transfer processes described below can be performed by moving computer system 602 closer to computer system 600 and/or moving both computer system 600 and computer system 602 such that the distance between computer system 600 and computer system 602 is decreased.

FIGS. 6A-6F illustrate an exemplary media transfer process where computer system 600 is initially playing back the first media item and computer system 602 is not playing back a respective media item. During the media transfer process illustrated in FIGS. 6B-6F, playback of the first media item is transferred from computer system 600 to computer system 602.

At FIG. 6A, computer system 600 detects that the distance between computer system 600 and computer 602 has decreased. In some embodiments, computer system 600 detects that the distance between computer system 600 and computer system 602 has decreased using one or more distance detection techniques such as detecting a change of a signal strength (e.g., wireless signal strength (e.g., Wi-Fi wireless signal, Bluetooth wireless signal, and/or ultrawideband wireless signal)) that is exchanged between the computer system 600 and computer system 602. In some embodiments, computer system 602 detects that the distance between computer system 600 and computer 602 has decreased using one or more distance detection techniques such as detecting a change of a signal strength (e.g., wireless signal strength (e.g., Wi-Fi wireless signal, Bluetooth wireless signal, and/or ultra-wideband wireless signal)) that is exchanged between the computer system 600 and computer system 602, and then transmits data to computer system 600 indicating the detected change in distance.

Throughout the discussion of FIGS. 6A-6O, various references are made with respect to determinations being made regarding the distance between computer system 600 and computer system 602. In some embodiments, computer system 600 makes the determination regarding the distance between computer system 600 and computer system 602 using one or more distance detection techniques (e.g., detecting a change in a signal strength that is exchanged between computer system 600 and computer system 602). In some embodiments, computer system 602 makes the determination regarding the distance between computer system 600 and computer system 602 using one or more distance detection techniques (e.g., detecting a change in a signal strength that is exchanged between computer system 600 and computer system 602). In such embodiments, computer system 602 can transmit data to computer 600 indicating the detected change in distance such that computer 600 can be said to detect and/or determine the change in distance, based on the received data.

Figure 6B:
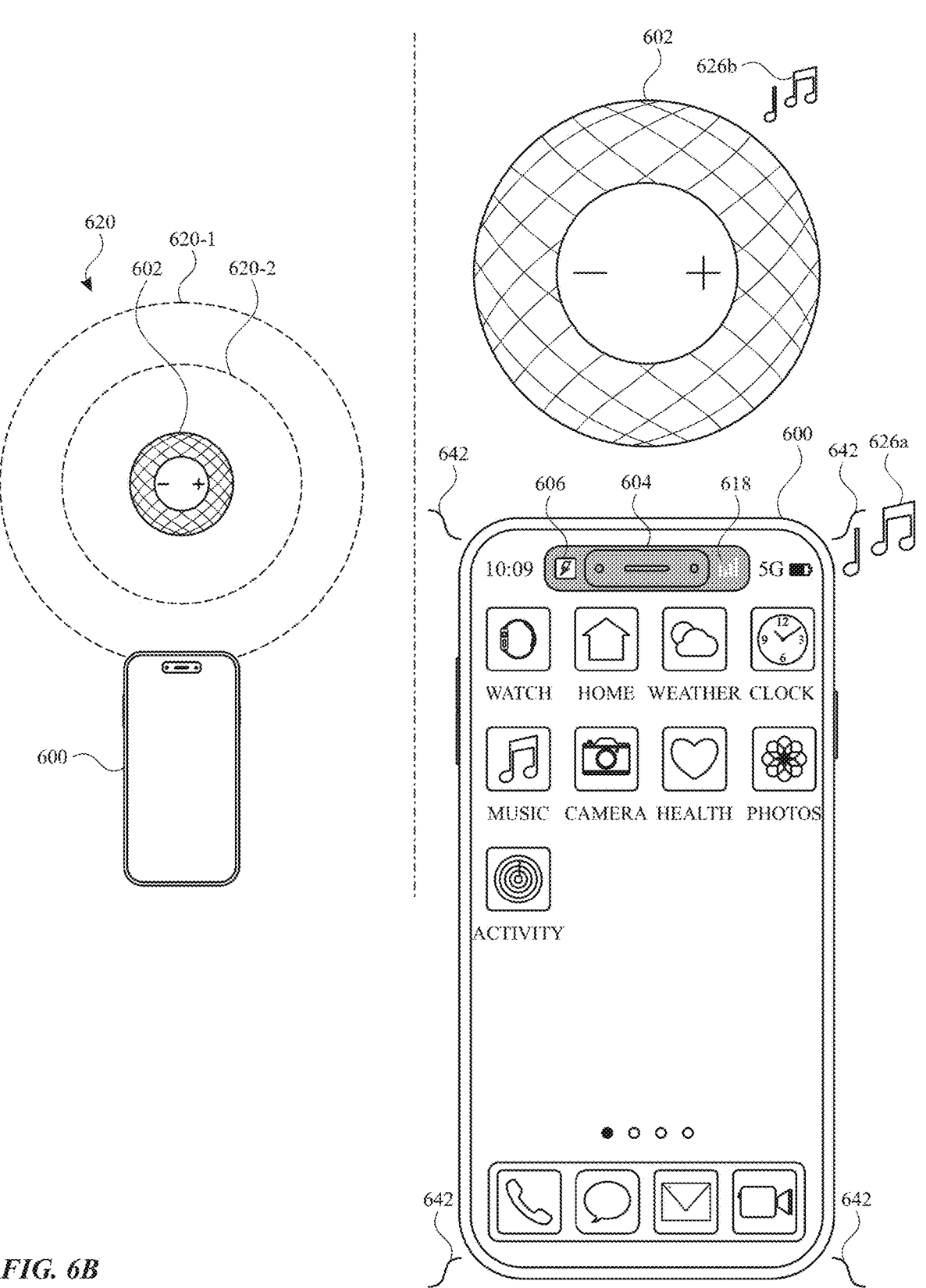

At FIG. 6B, a determination is made that computer system 600 reaches outer threshold distance 620-1 (e.g., as indicated by the positioning of computer system 600 relative to outer threshold distance 620-1 in diagram 620). The positioning of computer system 600 is considered to have reached outer threshold distance 620-1 when the position of any portion of computer system 600 transitions from being outside of outer threshold distance 620-1 to being at or within outer threshold distance 620-1. In some embodiments, the positioning of computer system 600 is considered to have reached outer threshold distance 620-1 when the positioning of the entirety of computer system 600 is at or within outer threshold distance 620-1.

At FIG. 6B, because a determination is made that computer system 600 reaches outer threshold distance 620-1, computer system 600 outputs discrete haptic feedback 642 (e.g., a single vibration). Discrete haptic feedback 642 indicates computer system 600 has reached outer threshold distance 620-1. In some embodiments, computer system 600 outputs a series of discrete haptic alerts (e.g., two or more haptic feedbacks) in response to a determination being made that computer system 600 has reached outer threshold distance 620-1.

Further, at FIG. 6B, because a determination is made that computer system 600 has reached outer threshold distance 620-1, computer system 600 transmits instructions to computer system 602 that cause the initiation of the playback of the first media item on computer system 602. Accordingly, at FIG. 6B, both computer system 600 and computer system 602 are concurrently playing back the first media item. At FIG. 6B, playback of the first media item on computer system 600 and computer system 602 is synchronized (e.g., playback at computer system 602 is initiated at the same playback time as currently being played on computer system 600). The playback of the first media item on computer system 602 is represented by music symbols 626b shown in close proximity to computer system 602. Similar to music symbols 626a, the size of music symbols 626b corresponds to the volume level of computer system 602. As illustrated in FIG. 6B, the size of music symbols 626a are larger than the size of music symbols 626b. Accordingly, at FIG. 6B, the volume level of computer system 600 is greater than the volume level of computer system 602. Further, the size of music symbols 626a at FIG. 6B is smaller than the size of music symbols 626a at FIG. 6A. Accordingly, at FIG. 6B, the playback volume of computer system 600 is lower than the playback volume of computer system 602 at FIG. 6A. In some embodiments, playback of the first media item on computer system 602 ceases in accordance with a determination that computer system 600 is moved outside of outer threshold distance 620-1. In some embodiments, computer system 602 initiates the playback of the first media item from the beginning of the first media item (e.g., the playback of the first media item on computer system 600 and computer system 602 is not synchronized).

At FIG. 6B, because a determination is made that the positioning of computer system 600 has reached outer threshold distance 620-1, a transfer of the playback of the first media item is initiated. At FIG. 6B, computer system 600 is the dominant playback computer system (e.g., the playback of the first media item is louder on computer system 600 than computer system 602). However, computer system 602 progressively becomes the dominant playback computer system as computer system moves closer to inner threshold distance 620-1.

At FIG. 6B, because a determination is made that the positioning of computer system 600 has reached outer threshold distance 620-1, computer system 600 increases the size of the display of media user interface object 604 (e.g., in comparison to the size of media user interface object 604 at FIG. 6A). At FIG. 6B, computer system 600 is repositioned closer to computer system 602. In some embodiments, album art 606 computer system 600 increases the size of album art 606 and equalizer bars 618 as a part of increasing the size of media user interface object 604.

Further, the size of media user interface object 604 and the size of time user interface element 612a, signal status user interface element 612b, and battery status user interface element 612c have an inverse relationship. As the size of media user interface object 604 increases, the size of time user interface element 612a, signal status user interface element 612b, and battery status user interface element 612c decrease and vice versa. Accordingly, at FIG. 6B, because the size of media user interface object 604 increases, the size of time user interface element 612a, signal status user interface element 612*b*, and battery status user interface element 612*c* decreases (e.g., in comparison to the size of time user interface element 612*a*, signal status user interface element 612*b*, and battery status user interface element 612*c* at FIG. 6A). In some embodiments, the size of equalizer bars 618 and album art 606 increase as the size of media user interface object 604 increases. In some embodiments, the size of time user interface element 612*a*, signal status user interface element 612*b*, and battery status user interface element 612*c* decreases in response to media user interface object 604 growing to a size that impinges (e.g., encroaches)) on the display of one or more of time user interface element 612*a*, signal status user interface element 612*b*, and battery status user interface element 612*c*

Figure 6C:
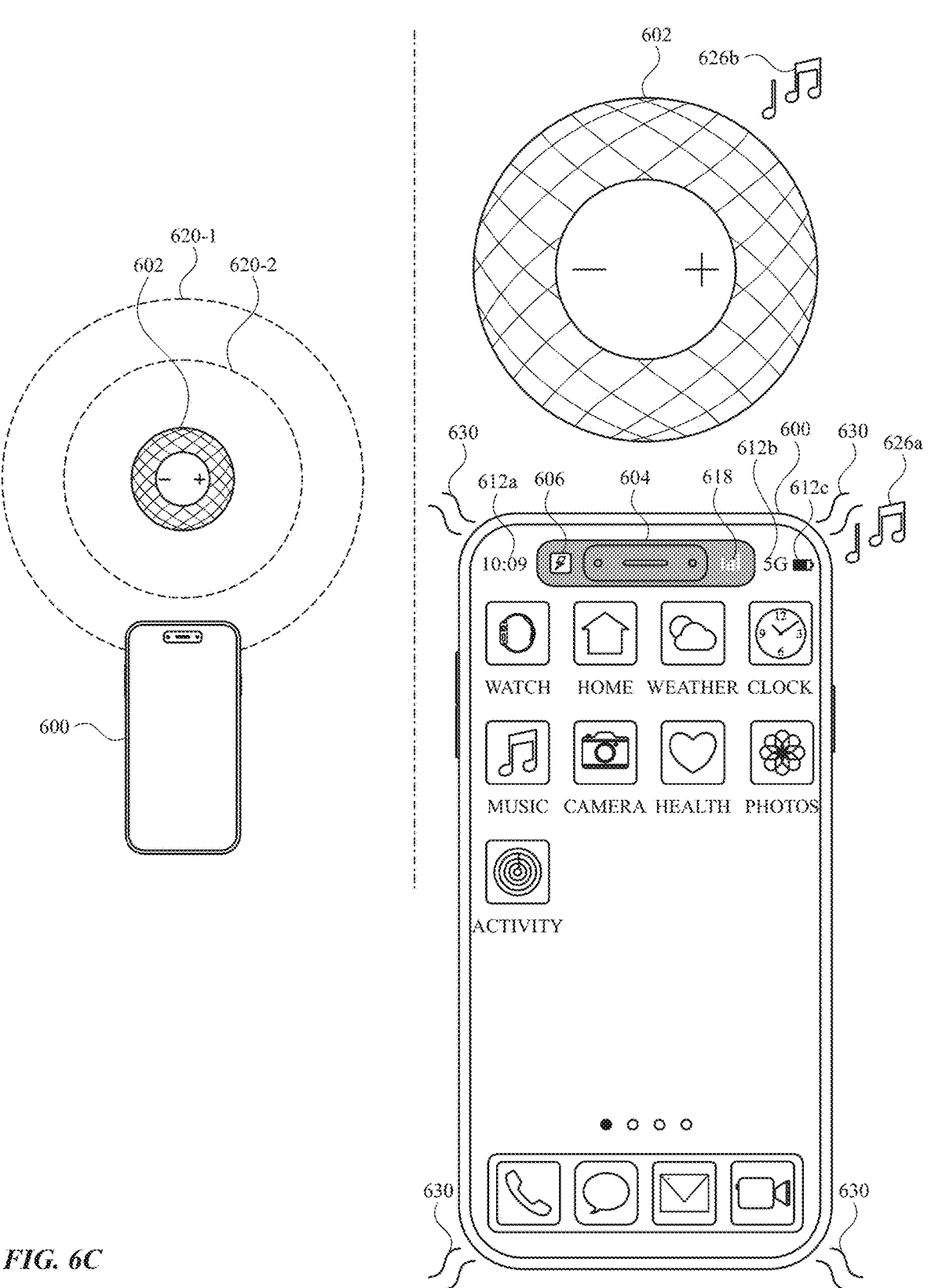

At FIG. 6C, a determination is made that the distance between computer system 600 and computer system 602 has decreased (e.g., in comparison to the distance between computer system 600 and computer system 602 at FIG. 6B). Further, at FIG. 6C, a determination is made that computer system 600 is between outer threshold distance 620-1 and inner threshold distance 620-2. Because determinations are made that the distance between computer system 600 and computer system 602 has decreased and that computer system 600 is between outer threshold distance 620-1 and inner threshold distance 620-2, computer system 600 increases the size of media user interface object 604 (e.g., in comparison to the size of media user interface object 604 at 6B).

The size of media user interface object 604 has an inverse relationship with the distance between computer system 600 and computer system 602 while computer system 600 is between outer threshold distance 620-1 and inner threshold distance 620-2. Accordingly, while computer system 600 is between outer threshold distance 620-1 and inner threshold distance 620-2, as the distance between computer system 600 and computer system 602 decreases the size of media user interface object 604 increases and as the distance between computer system 600 and computer system 602 increases the size of media user interface object 604 decreases.

Further, at FIG. 6C, because the size of media user interface object 604 is increased, the size of time user interface element 612*a*, signal status user interface element 612*b*, and battery status user interface element 612*c* decrease (e.g., in comparison to the size of time user interface element 612*a*, signal status user interface element 612*b*, and battery status user interface element 612*c* FIG. 6B).

In the media transfer process that is embodied in FIGS. 6A-6F (e.g., when computer system 600 is initially playing back a first media item and computer system 602 is not initially playing back a respective media item) the playback of the first media item scales between computer system 600 and computer system 602 based on the distance between computer system 600 and computer system 602 while computer system 600 is between outer threshold distance 620-1 and inner threshold distance 620-2. That is, the volume of the playback of the first media item on computer system 600 progressively decreases as computer system 600 moves closer to inner threshold distance 620-2 and the volume of the playback of the first media item on computer system 602 progressively increases as computer system 600 moves closer to inner threshold distance 620-2. Further, the volume of the playback of the first media item on computer system 600 progressively increases as computer system 600 moves further from inner threshold distance 620-2 and the volume of the playback of the first media item on computer system

602 progressively decreases as computer system 600 moves further from inner threshold distance 620-2.

Accordingly, at FIG. 6C, because a determination is made that the distance between computer system 600 and computer system 602 has decreased, the playback volume of the first media item on computer system 602 increases while the playback volume of the first media item on computer system 600 decreases. The change of the playback volume on each respective computer system can be noted by the change of the size of both music symbols 626*a* and 626*b* (e.g., at FIG. 6C, the size of music symbol 626*a* has decreased in comparison to the size of music symbols 626*a* at FIG. 6B and the size of music symbols 626*b* has increased in comparison to the size of music symbols 626*b* at FIG. 6B). In some embodiments, the change in volume on both computer system 600 and computer system 602 is the same.

Further, at FIG. 6C, because a determination is made that computer system 600 is between outer threshold distance 620-1 and inner threshold distance 620-2, computer system 600 outputs continuous haptic feedback 630. Computer system 600 outputs continuous haptic feedback 630 while computer system 600 is between outer threshold distance 620-1 and inner threshold distance 620-2. At FIG. 6C, computer system 600 is repositioned closer to computer system 602. In some embodiments, while computer system 600 is positioned between outer threshold distance 620-1 and inner threshold distance 620-2, the intensity of continuous haptic feedback 630 has an inverse relationship with the distance between computer system 600 and computer system 602 (e.g., the intensity of continuous haptic feedback 630 increases as the distance between computer system 600 and computer system 602 decreases and the intensity of continuous haptic feedback 630 decreases when the distance between computer system 600 and computer system 602 increases).

Figure 6D:
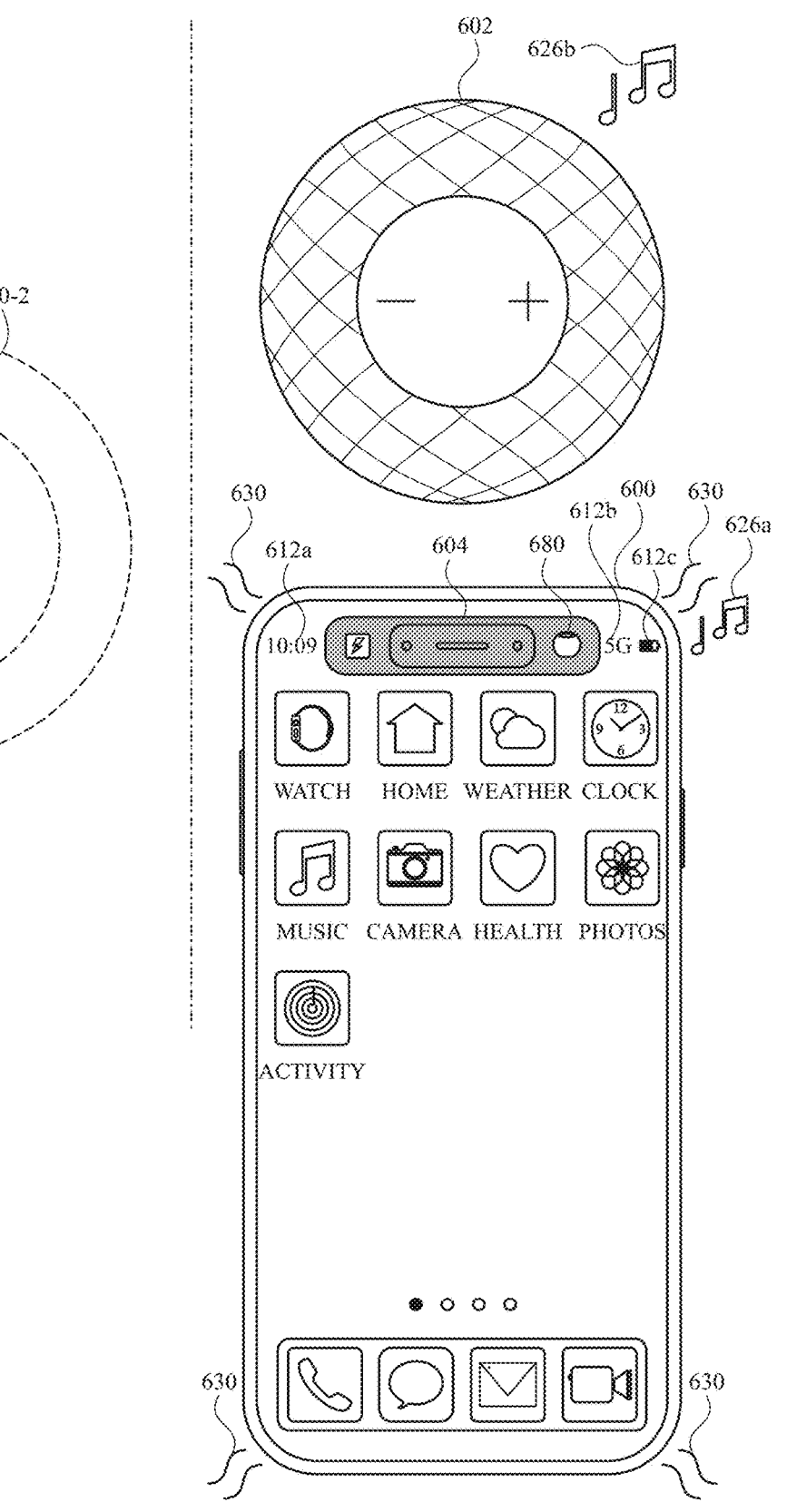

At FIG. 6D, a determination is made that the distance between computer system 600 and computer system 602 has decreased. Further, at FIG. 6D, a determination is made that computer system 600 is between outer threshold distance 620-1 and inner threshold distance 620-2. Because determinations are made that the distance between computer system 602 and computer system 600 has decreased and computer system 600 is positioned between outer threshold distance 620-1 and inner threshold distance 620-2, computer system 600 increases the size of media user interface object 604 (e.g., in comparison to the size of media user interface object 604 at FIG. 6C). At FIG. 6D, the size of time user interface element 612*a*, signal status user interface element 612*b*, and battery status user interface element 612*c* decrease (e.g., in comparison to the size of time user interface element 612*a*, signal status user interface element 612*b*, and battery status user interface element 612*c* at FIG. 6C) as a result of the size of media user interface object 604 increasing. In some embodiments, the size of media user interface object 604 increases by a first factor and the size of time user interface element 612*a*, signal status user interface element 612*b*, and battery status user interface element 612*c* decrease by the first factor.

At FIG. 6D, media user interface object 604 is displayed at its largest possible size. At FIG. 6D, because media user interface object 604 is displayed at its largest possible size, computer system 600 replaces the display of equalizer bars 618 (e.g., as shown in FIGS. 6A-6C) within media user interface object 604 with the display of playback device user interface element 680. Playback device user interface element 680 is a graphical representation of computer system 602. In some embodiments, computer system 600 replaces the display of equalizer bars 618 (e.g., as shown in FIGS. 6A-6C) within media user interface object 604 with the display of playback device user interface element 680 in accordance with a determination that computer system 600 is between outer threshold distance 620-1 and inner threshold distance 620-2.

At FIG. 6D, because a determination is made that computer system 600 is between outer threshold distance 620-1 and inner threshold distance 620-2, computer system 600 continues to output continuous haptic feedback 630. Further, at FIG. 6D, because a determination is made that the distance between computer system 600 and computer system 602 decreases, the volume of the playback of the first media item on computer system 602 increases and the volume of the playback of the first media item on computer system 600 decreases. At FIG. 6D, computer system 602 is the dominant playback computer system (e.g., the volume of the playback of the first media item on computer system 602 is greater than the volume of the playback of the first media item on computer system 600). Computer system 602 is the dominant playback computer system because computer system 600 is closer to inner threshold distance 620-2 than outer threshold distance 520-1. Accordingly, as illustrated in FIG. 6D, music symbols 626*b* are larger than music symbols 626*a*. At FIG. 6D, computer system 600 is repositioned closer to computer system 602. In some embodiments, computer system 600 progressively displays controls for an external device (e.g., a third party device) (e.g., a thermostat and/or fan) based on distance between computer system 600 and the external device.

Figure 6E:
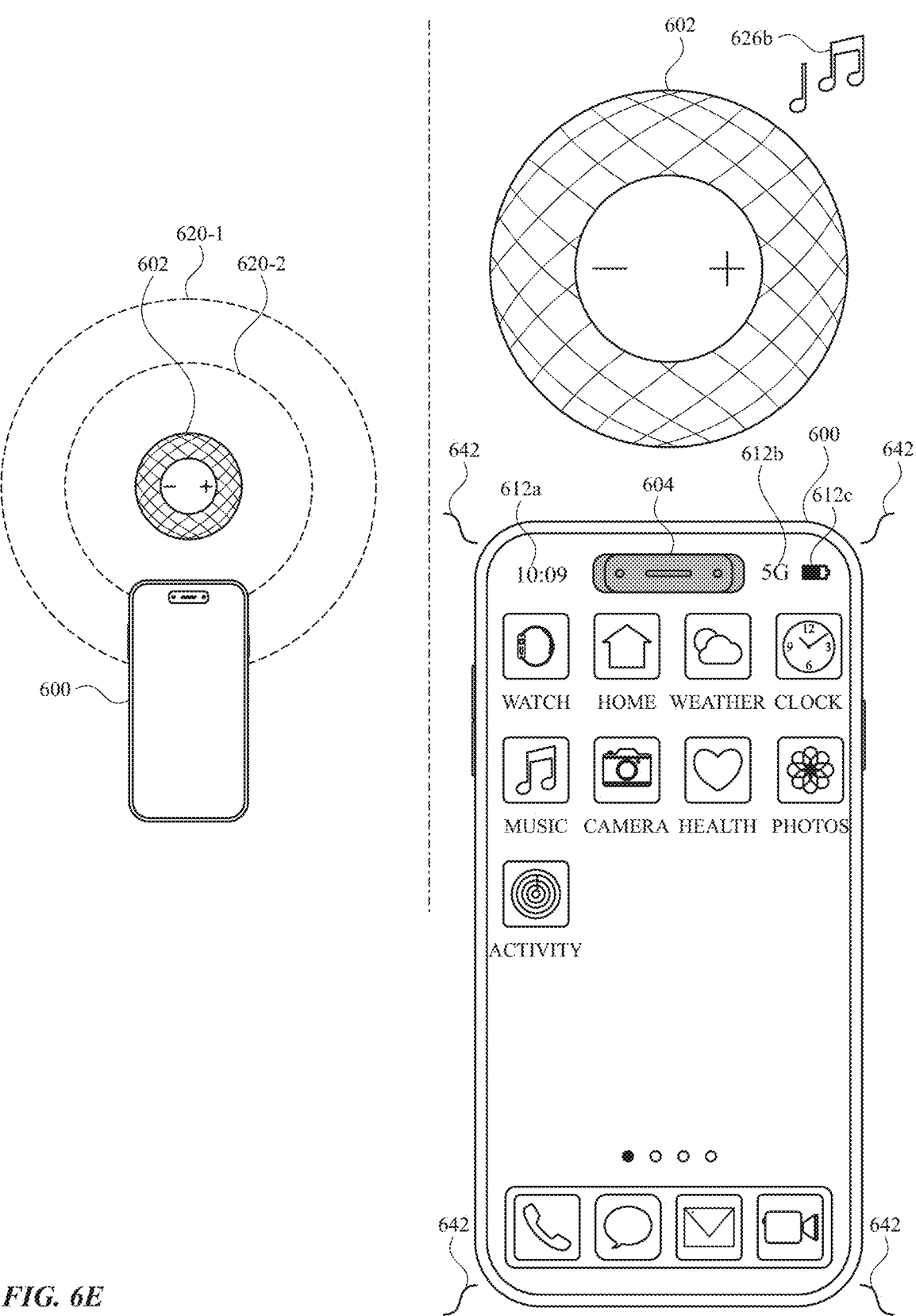

At FIG. 6E, a determination is made that the positioning of computer system 600 reaches inner threshold distance 620-2. The positioning of computer system 600 is considered to have reached inner threshold distance 620-2 when the position of any portion of computer system 600 transitions from being outside of inner threshold distance 620-2 to being equal to or within inner threshold distance 620-2. Because a determination is made that computer system 600 reaches inner threshold distance 620-2, computer system 600 outputs discrete haptic feedback 642. Discrete haptic feedback 642 indicates that computer system 600 has reached inner threshold distance 620-2. In some embodiments, computer system 600 transmits instructions to computer system 602 that cause one or more light sources that are integrated into computer system 602 to output a light animation in accordance with a determination that the positioning of computer system 600 reaches inner threshold distance 620-2.

At FIG. 6E, because a determination is made computer system 600 reaches inner threshold distance 620-2, computer system 600 displays media user interface object 604 as performing a flex animation. During the flex animation, computer system 600 displays media user interface object 604 with a reduced size (e.g., in comparison to the size of media user interface object 604 at FIG. 6D) and then displays media user interface object 604 at its initial size (e.g., the size of media user interface object 604 at FIG. 6A). At FIG. 6E, because the size of media user interface object 604 is reduced, the size of time user interface element 612*a*, signal status user interface element 612*b*, and battery status user interface element 612*c* increase (e.g., in comparison to the size of time user interface element 612*a*, signal status user interface element 612*b*, and battery status user interface element 612*c* FIG. 6D). At FIG. 6E, computer system 600 ceases to display playback device user interface element 680 and album art 606 within media user interface object 604 as a part of displaying the flex animation. In some embodiments, computer system 600 maintains the display of playback device user interface element 680 and album art 606 within media user interface object 604 while displaying the flex animation.

At FIG. 6E, because a determination is made that the distance between computer system 600 has reached inner threshold distance 620-2, computer system 600 ceases playback of the first media item. When the distance between computer system 600 and computer system 602 is equal to less than the inner threshold distance 620-2, the playback transfer process is complete and computer system 602 plays back the first media item and computer system 600 does not playback the first media item.

Figure 6F:
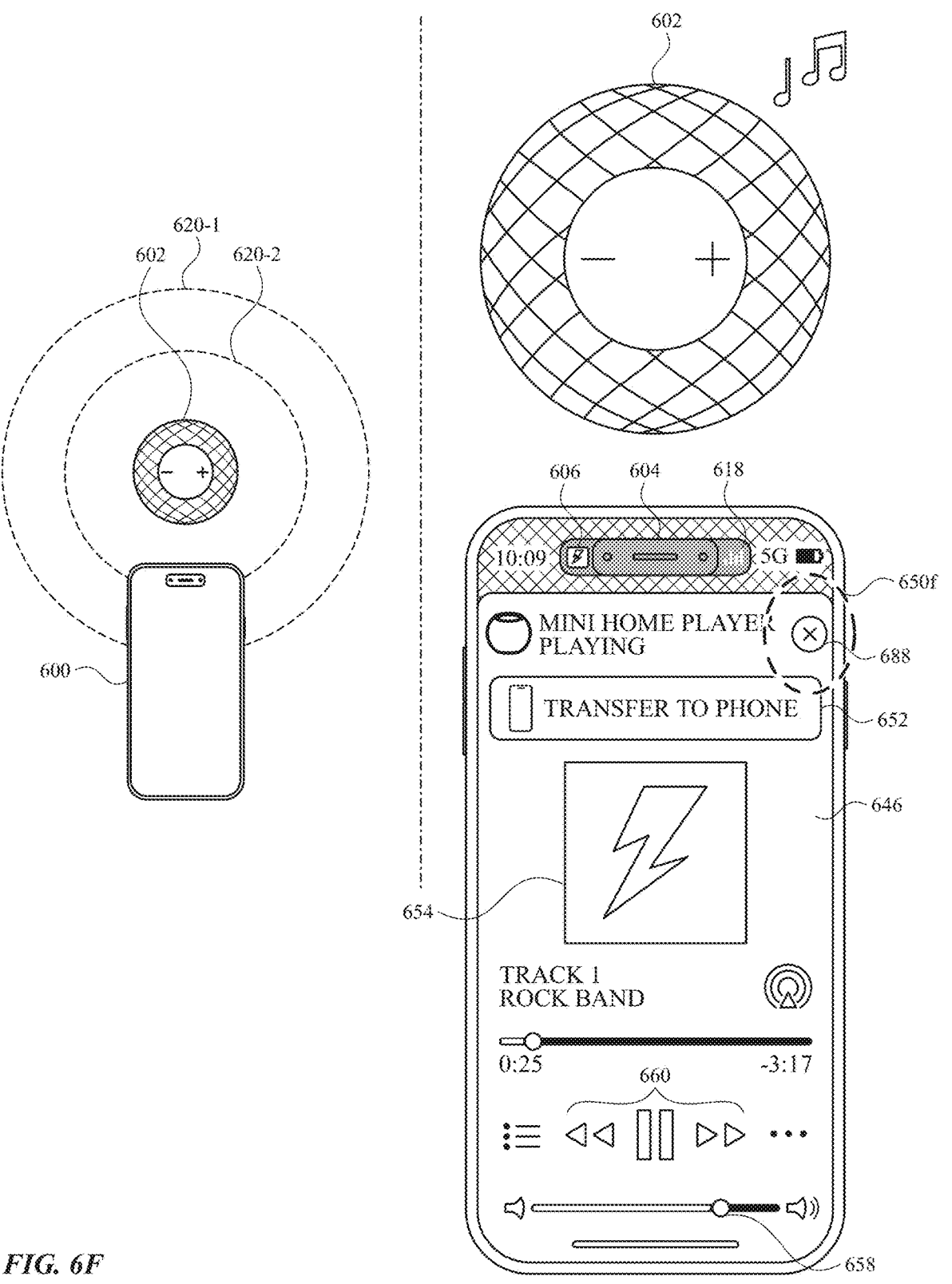

At FIG. 6F, media user interface object 604 is no longer performing the flex animation. As illustrated in FIG. 6F, computer system 600 displays media user interface object 604 with its initial appearance (e.g., the appearance of media user interface object 604 at FIG. 6A) at the conclusion of the flex animation. Accordingly, as illustrated in FIG. 6F, media user interface includes equalizer bars 618 and album art 606. As explained above, album art 606 is representative of the first media item. Accordingly, at FIG. 6F, album art 606 is representative of the first media that is being played back on computer system 602. In some embodiments, computer system 600 ceases to playback the first media item after media user interface object 604 has completed the flex animation. In some embodiments, computer system 600 ceases to playback the first media item before media user interface object 604 begins the flex animation. In some embodiments, computer system 600 ceases to playback the first media item while media user interface object 604 is performing the flex animation.

As illustrated in FIG. 6F, computer system 600 displays now playing user interface 646. Computer system 600 displays now playing user interface 646 in accordance with a determination that computer system 600 has reached inner threshold distance 620-2. At FIG. 6F, a determination is made that computer system 602 is playing back a respective media item and computer system 600 is not playing back a respective media item. As illustrated in FIG. 6F, because a determination is made that computer system 602 is playing back a respective media item and computer system 600 is not playing back a respective media item, now playing user interface 646 includes transfer to user interface object 652. In some embodiments, computer system 600 ceases to display now playing user interface 646 in response to detecting a swipe down gesture on now playing user interface 646. In some embodiments, computer system 600 displays now playing user interface 646 while computer system 600 displays media user interface object 604 as performing the flex animation. In some embodiments, computer system 600 displays now playing user interface 646 before computer system 600 displays media user interface object as performing the flex animation.

As illustrated in FIG. 6F, now playing user interface 646 includes enlarged album art 654, playback controls 660, and volume control 658. Similar to album art 606, enlarged album art 654 is a representation of the media item that computer system 602 is currently playing back. Computer system 600 transmits instructions to computer system 602 that modifies the playback status of computer system 602 in response to detecting selection of a respective user interface object in playback controls 660 (e.g., pause the playback of a respective media item, initiate playback of a respective media item, advance to a subsequent media item in a queue, and/or restart the playback of the first media item). Further, computer system 600 transmits instructions to computer system 602 that modifies the playback volume of computer system 602 (e.g., increase or decrease the volume level) in response to detecting of a selection of volume control 658. In some embodiments, enlarged album art 654 is representative of a media item that is being played back by computer system 600. In some embodiments, selection of a respective playback control in playback controls 660 controls playback of a media item on computer system 600. In some embodiments, selection of volume control 658 changes the volume level on computer system 600.

As illustrated in FIG. 6F, now playing user interface 646 includes exit user interface object 688. At FIG. 6F, computer system 600 detects tap input 650*f* that corresponds to selection of exit user interface object 688. Further, at FIG. 6F, computer system 600 is repositioned further away from computer system 602.

Figure 6G:
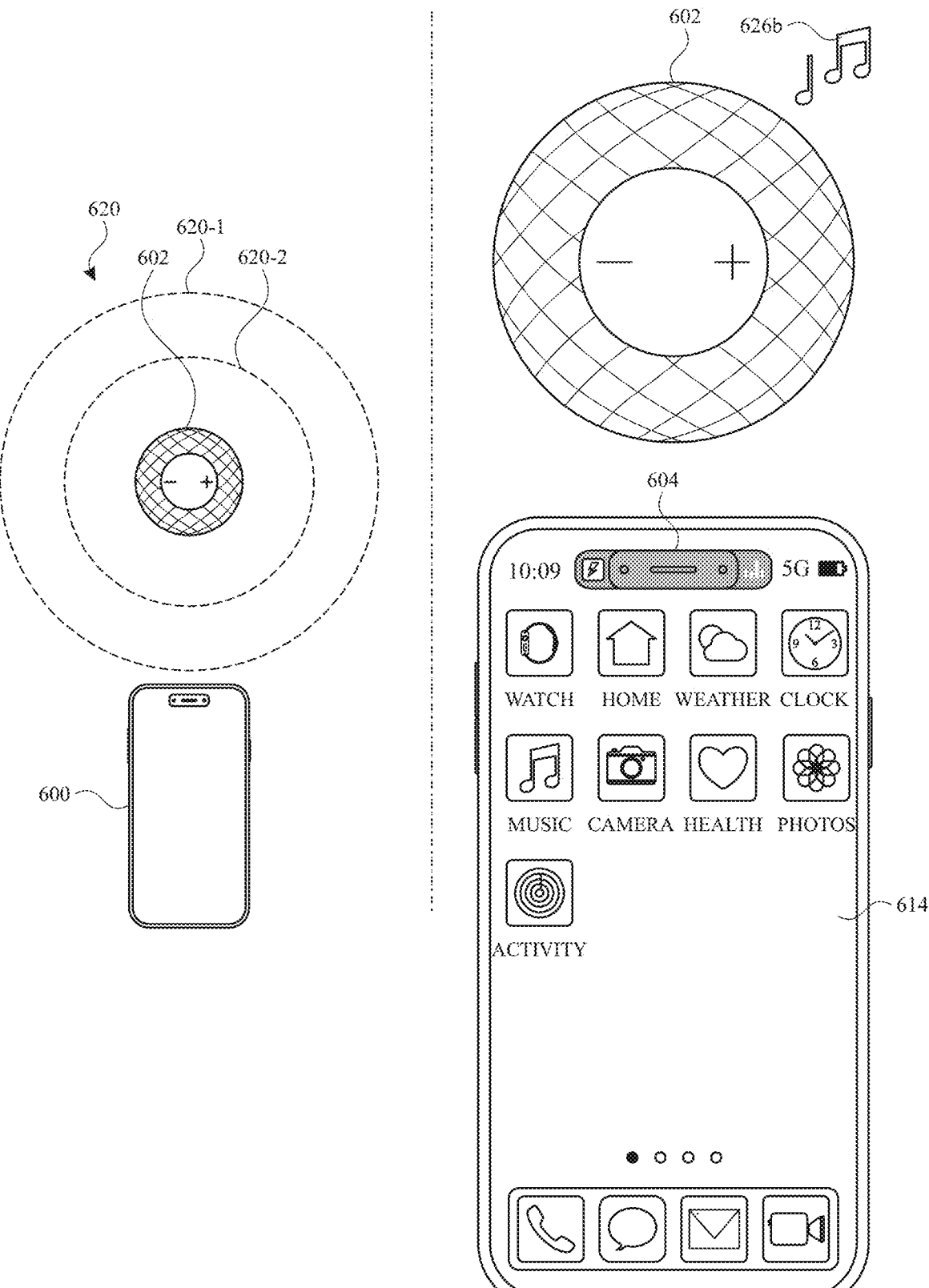
Figure 6H:
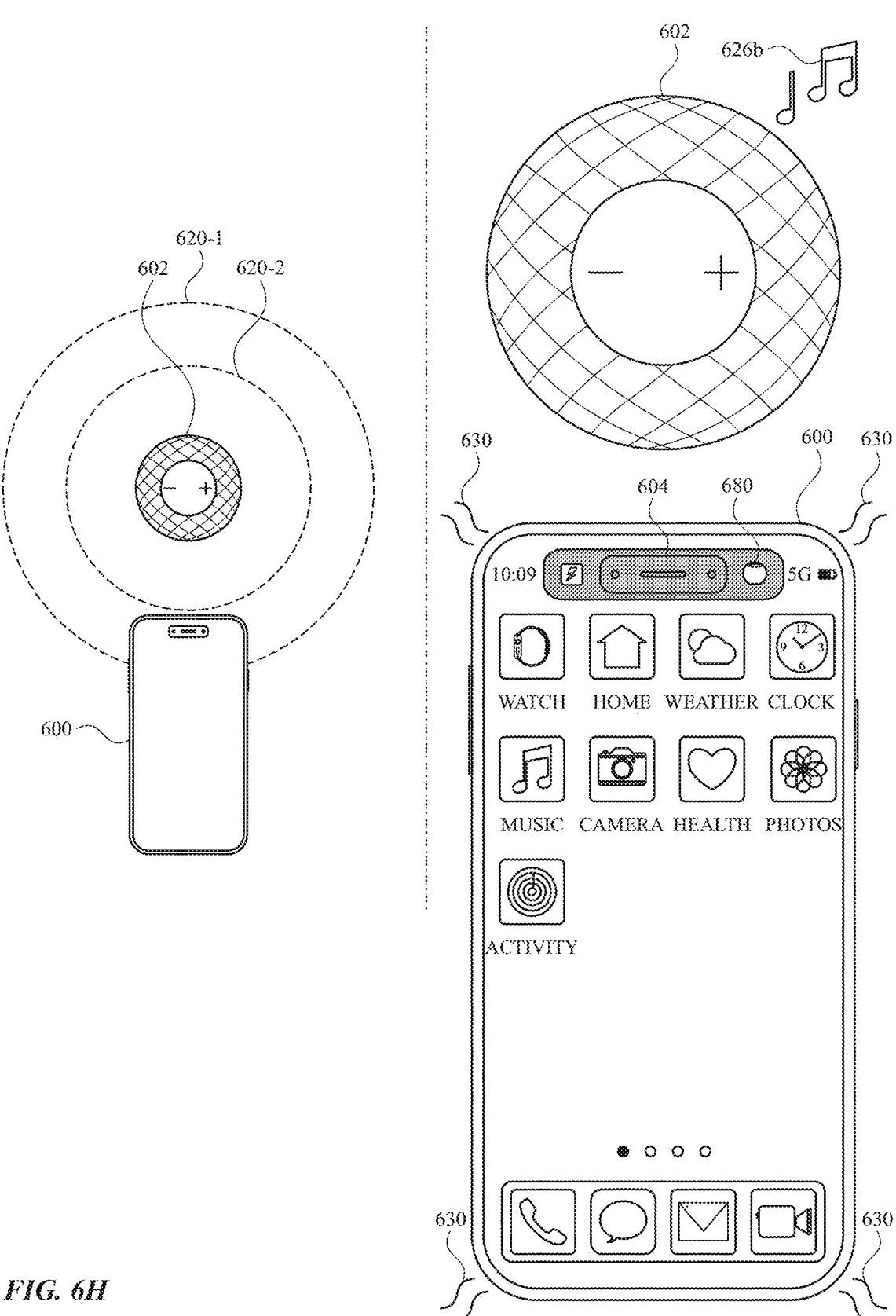
Figure 6I:
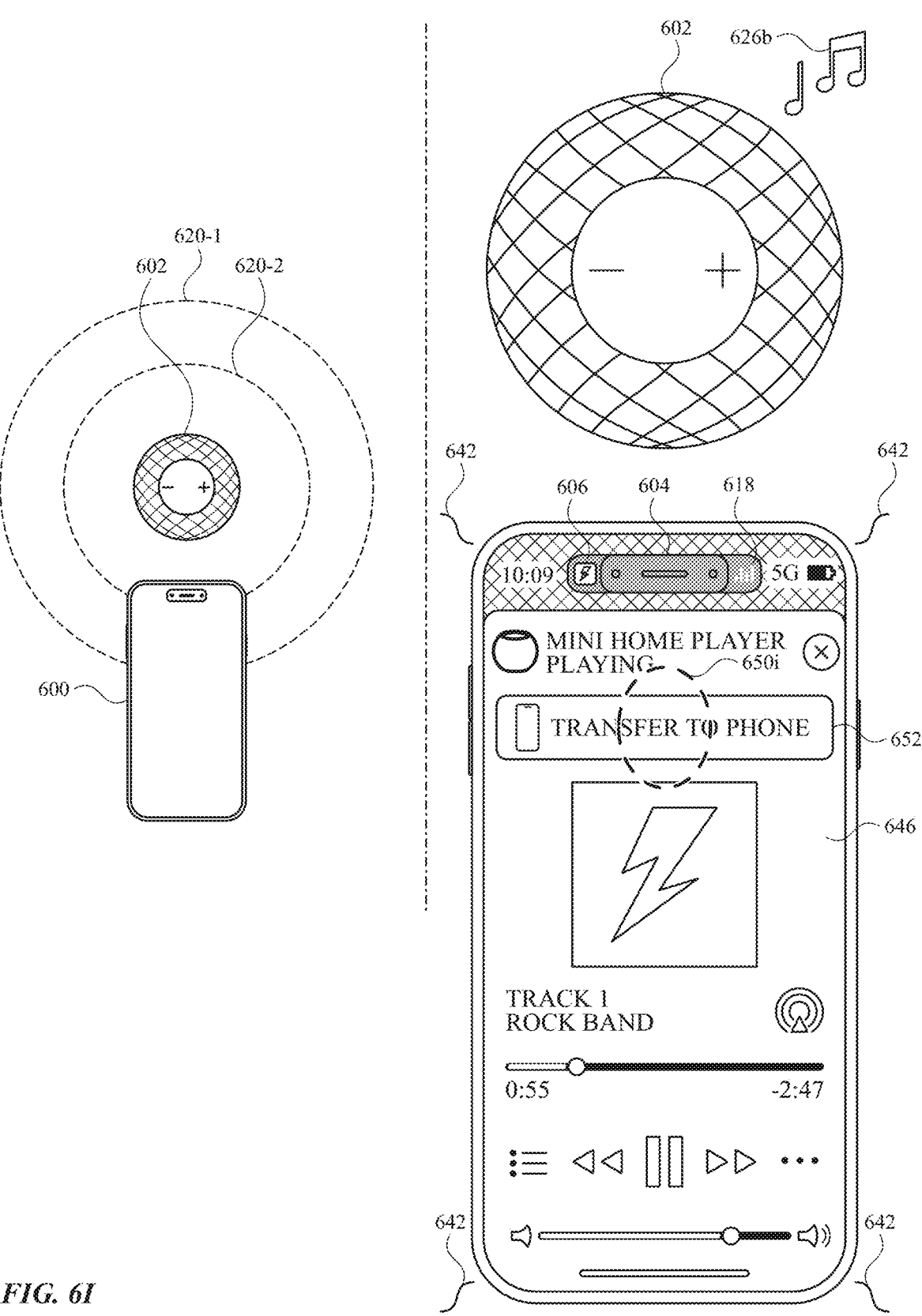

FIGS. 6G-6I illustrate an exemplary media transfer process where computer system 600 is initially not playing back a respective media item and computer system 602 is playing back the first media item. During the media transfer process illustrated in FIGS. 6G-6I, playback of the first media item is transferred from computer system 602 to computer system 600.

At FIG. 6G, in response to detecting tap input 650*f*, computer system 600 ceases the display of now playing user interface 646 and displays home screen user interface 614. At FIG. 6G, because computer system 600 is repositioned further away from computer system 602, computer system 600 is positioned outside of outer threshold distance 620-1 (e.g., as illustrated by diagram 620). As illustrated in FIG. 6G, though computer system 600 is positioned outside of outer threshold distance 620-1, computer system 600 maintains the display of media user interface object 604. In some embodiments, computer system 600 ceases the display of media user interface object 604 in response to detecting that computer system 600 is repositioned outside of outer threshold distance 620-1. At FIG. 6G, computer system 600 is repositioned closer to computer system 602.

At FIG. 6H, a determination is made that the positioning of computer system 600 is between outer threshold distance 620-1 and inner threshold distance 620-2. Because a determination is made that computer system 600 is between outer threshold distance 620-1 and inner threshold distance 620-2, computer system 600 performs the various operations that are described above in FIGS. 6C-6D. The various operations include, but are not limited to, computer system 600 outputting continuous haptic feedback 630, computer system 600 displaying media user interface object 604 with a size dependent on the distance between computer system, and computer system 600 displaying playback device user interface element 680 within media user interface object 604.

At FIG. 6H, a determination is made that computer system 600 is not currently playing back a media item (e.g., as indicated by the absence of music notes in close proximity to computer system 600) and computer system 602 is playing back the first media item (e.g., as indicated by the presence of music symbols 626*b* in close proximity to computer system 602). Because a determination is made that computer system 600 is not currently playing back a media item and computer system 602 is playing back the first media item, though computer system 600 is between outer threshold distance 620-1 and inner threshold distance 620-2, the playback of the first media item does not scale between computer system 600 and computer system 602 as described above in relation to FIGS. 6C and 6D. That is, a respective media item does not scale between computer system 600 and computer system 602 when computer system 602 is playing back a media item and computer system 600 is not playing back a media item. At FIG. 6H, computer system 600 is repositioned closer to computer system 602.

At FIG. 6I, a determination is made that computer system 600 and computer system reaches inner threshold distance 620-2. Because a determination is made that computer system 600 reaches inner threshold distance 620-2, computer system 600 performs the various operations that are described above in FIG. 6E. The various operations include, but are not limited to, displaying now playing user interface 646, displaying media user interface object 604 performing the flex animation, and outputting discrete haptic feedback 642.

At FIG. 6I, a determination is made that computer system 600 is not currently playing back a media item (e.g., as indicated by the absence of music notes in close proximity to computer system 600) and computer system 602 is playing back the first media item (e.g., as indicated by the presence of music symbols 626*b* in close proximity to computer system 602). Because a determination is made that computer system 600 is not currently playing back a respective media item and computer system 602 is playing back the first media item, though computer system 600 reaches inner threshold distance 620-2, the playback of the first media item does not automatically transfer between computer system 600 and computer system 602 as described above in relation to FIG. 6E. That is, the transfer of a media item is not automatic upon detection that computer system 600 reaches inner threshold distance 620-2 when computer system 602 is playing back a respective media item and computer system 600 is not playing back a respective media item. At FIG. 6I, computer system 600 detects tap input 650*i* that corresponds to selection of transfer to user interface object 652.

Figure 6J:
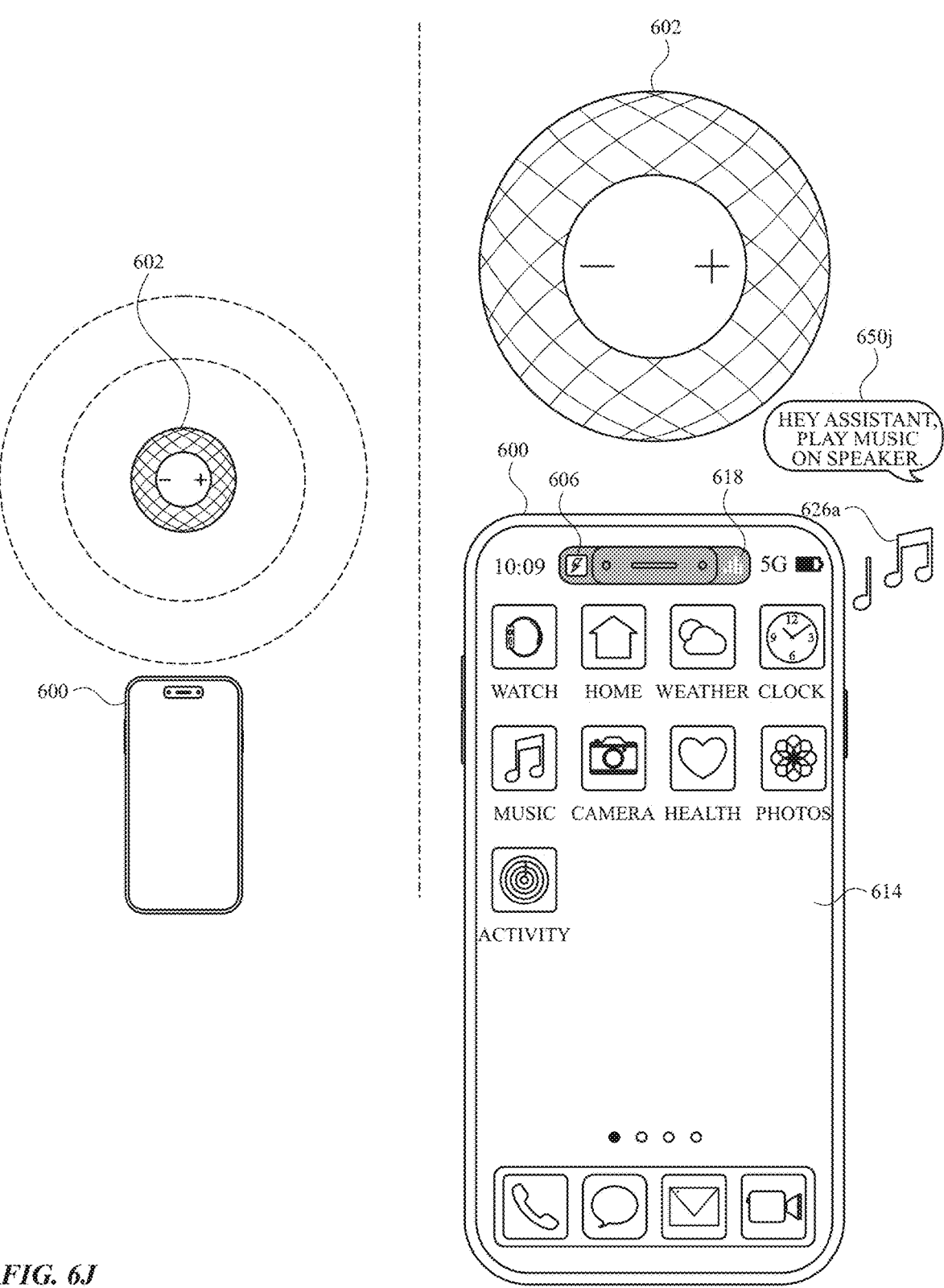

At FIG. 6J, in response to detecting tap input 650*i*, computer system 600 initiates playback of the first media item (e.g., as indicated by the presence of music symbols 626*a* in close proximity to computer system 600) and computer system 600 transmits instructions to computer system 602 that causes computer system 602 to cease the playback of the first media item (e.g., as indicated by the absence of music symbols in close proximity to computer system 602). Computer system 602 ceases playback of the first media item at a first point of the first media item and computer system 600 initiates playback at the first point of the first media item (e.g., computer system 600 picks up playback of the media item where computer system 602 ceased playback of the media item). In some embodiments, in response to detecting tap input 650*i* that corresponds to selection of transfer to user interface object 652, computer system 600 initiates the playback of the first media item while computer system 602 maintains the playback of the first media item. In some embodiments, computer system 600 initiates playback of the first media item from the beginning of the first media item.

At FIG. 6J, in response to detecting tap input 650*i* that corresponds to selection of transfer to user interface object 652, computer system 600 ceases the display of now playing user interface 646 and displays home screen user interface 614. As illustrated in FIG. 6J, home screen user interface 614 includes media user interface object 604. At FIG. 6J, album art 606 and equalizer bars 618 within media user interface object 604 are representative of the first media item that is being played back on computer system 600. At FIG. 6J, computer system 600 detects voice command 650*j* that corresponds to a request to play a second media item on computer system 602.

FIGS. 6K-6N illustrate an exemplary media transfer process where computer system 600 is initially playing back a first respective media item and computer system 602 is initially playing back a second respective media item. During the media transfer process illustrated in FIGS. 6K-6N, playback of the first respective media item is transferred from computer system 600 to computer system 602.

At FIG. 6K, in response to detecting voice command 650*j*, computer system 600 transmits instructions to computer system 602 that cause computer system 602 to initiate the playback of a second media item (e.g., a song, podcast, and/or voice memo) that is different than the first media item. Music notes 668 are shown in close proximity to computer system 602 to represent the playback of the second media item on computer system 602. Accordingly, at FIG. 6K, computer system 600 is playing back the first media item while computer system 602 is playing back the second media item. At FIG. 6K, as indicated by diagram 620, computer system 600 is positioned outside of outer threshold distance 620-1. At FIG. 6K, computer system 600 is repositioned closer to computer system 602.

Figure 6L:
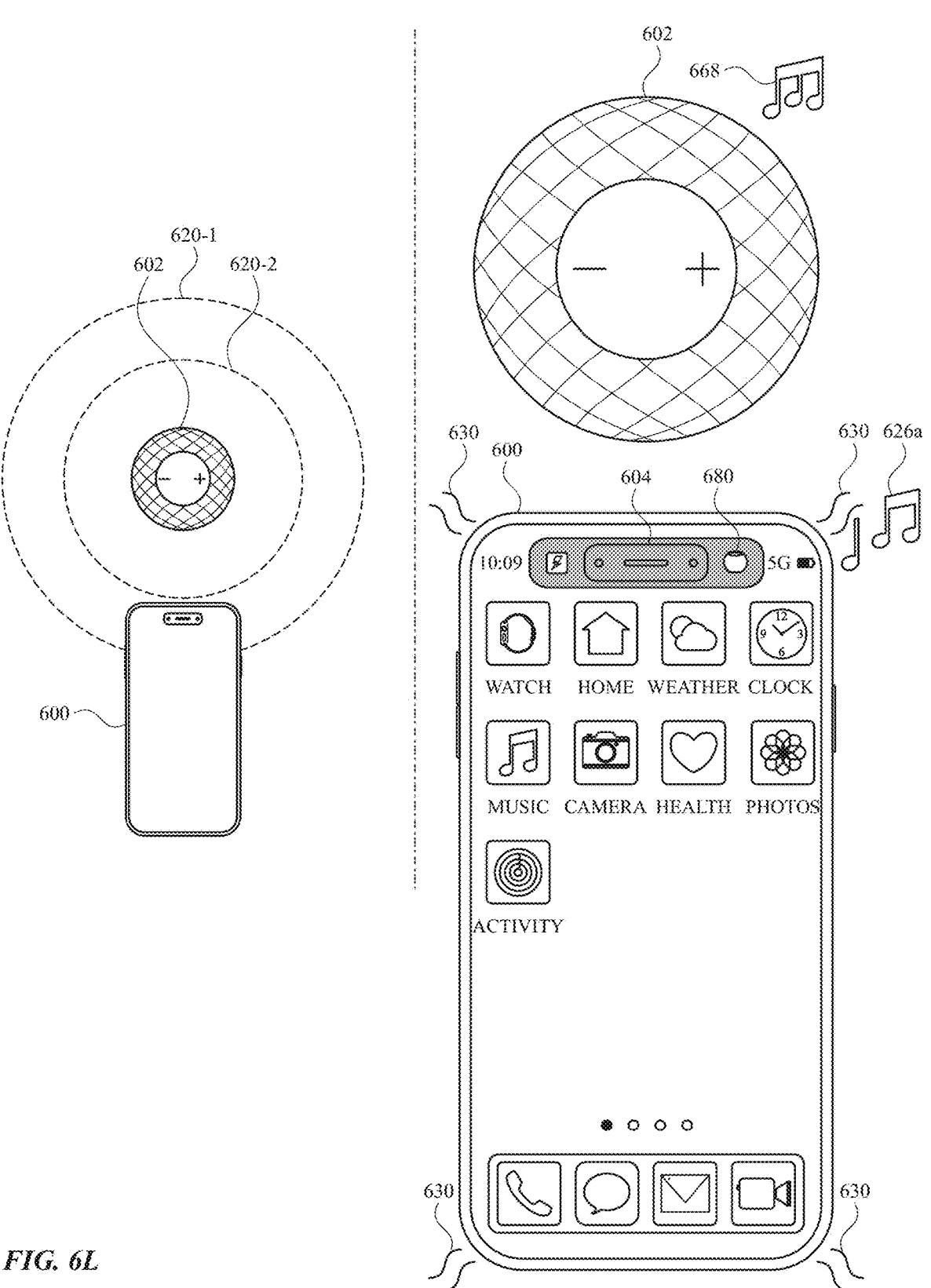

At FIG. 6L, a determination is made that computer system 600 is positioned between outer threshold distance 620-1 and inner threshold distance 620-2. Because a determination is made that computer system 600 is positioned between outer threshold distance 620-1 and inner threshold distance 620-2, computer system 600 performs the various operations that are described above in FIGS. 6C-6D. The various operations include, but are not limited to, computer system 600 outputting continuous haptic feedback 630, computer system 600 displaying media user interface object 604 with a size that depends on the distance between computer system 600 and computer system 602, and computer system 600 displaying playback device user interface element 680 within media user interface object 604.

At FIG. 6L, a determination is made that computer system 600 is playing back the first media item (e.g., as indicated by the presence of music symbols 626*a* in close proximity of computer system 600) and computer system 602 is playing back the second media item (e.g., as indicated by the presence of music notes 668 in close proximity to computer system 602). Because a determination is made that that computer system 600 is currently playing back the first media item and computer system 602 is playing back the second media item, though the computer system 600 is positioned between outer threshold distance 620-1 and inner threshold distance 620-2, the playback of the first media item and/or the second media item does not scale between computer system 600 and computer system 602 as described above in relation to FIGS. 6C and 6D. At FIG. 6L, computer system 600 is repositioned closer to computer system 602.

Figure 6M:
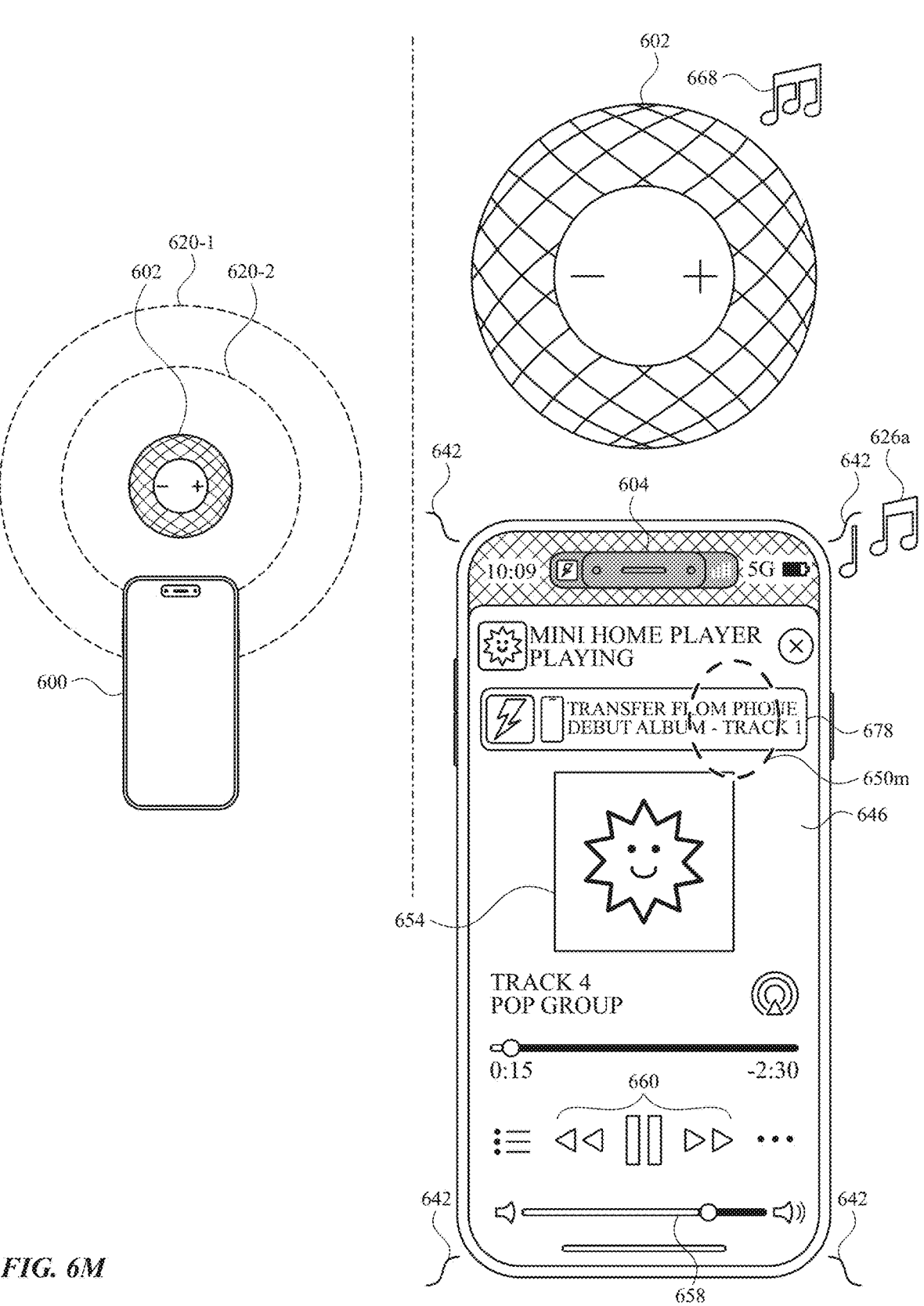

At FIG. 6M, a determination is made that computer system 600 reaches inner threshold distance 620-2. Because a determination is made that computer system 600 reaches inner threshold distance 620-2, computer system 600 performs the various operations that are described above in FIG. 6E. The various operations include, but are not limited to, displaying now playing user interface 646, displaying media user interface object 604 as performing the flex animation, and outputting discrete haptic feedback 642.

At FIG. 6M, now playing user interface 646 corresponds to the second media item that is being played by computer system 602. Accordingly, at FIG. 6M, enlarged album art 654 included in now playing user interface 646 is representative of the second media item that is being played back by computer system 602. Further, as illustrated in FIG. 6M, now playing user interface 646 includes playback controls 660 and volume control 658. Selection of a respective playback control in playback controls 660 and/or selection of volume controls 658 modify the playback status of the second media item (e.g., as described above in relation to FIG. 6F) on computer system 602.

At FIG. 6M, a determination is made that computer system 600 is currently playing back the first media item and computer system 602 is playing back the second media item. Because a determination is made that computer system 600 is currently playing back the first media item and computer system 602 is playing back the second media item, though computer system 600 reaches inner threshold distance 620-2, the playback of the first media item and/or the second media item does not transfer between computer system 600 and computer system 602 as described above in relation to FIG. 6F.

Additionally, as illustrated in FIG. 6M, because a determination is made that computer system 600 is currently playing back the first media item and computer system 602 is playing back the second media item, now playing user interface 646 includes transfer from user interface object 678 (e.g., and now playing user interface 646 does not include transfer to user interface object 652). At FIG. 6M, computer system 600 detects tap input 650*m* that corresponds to selection of transfer from user interface object 678.

Figure 6N:
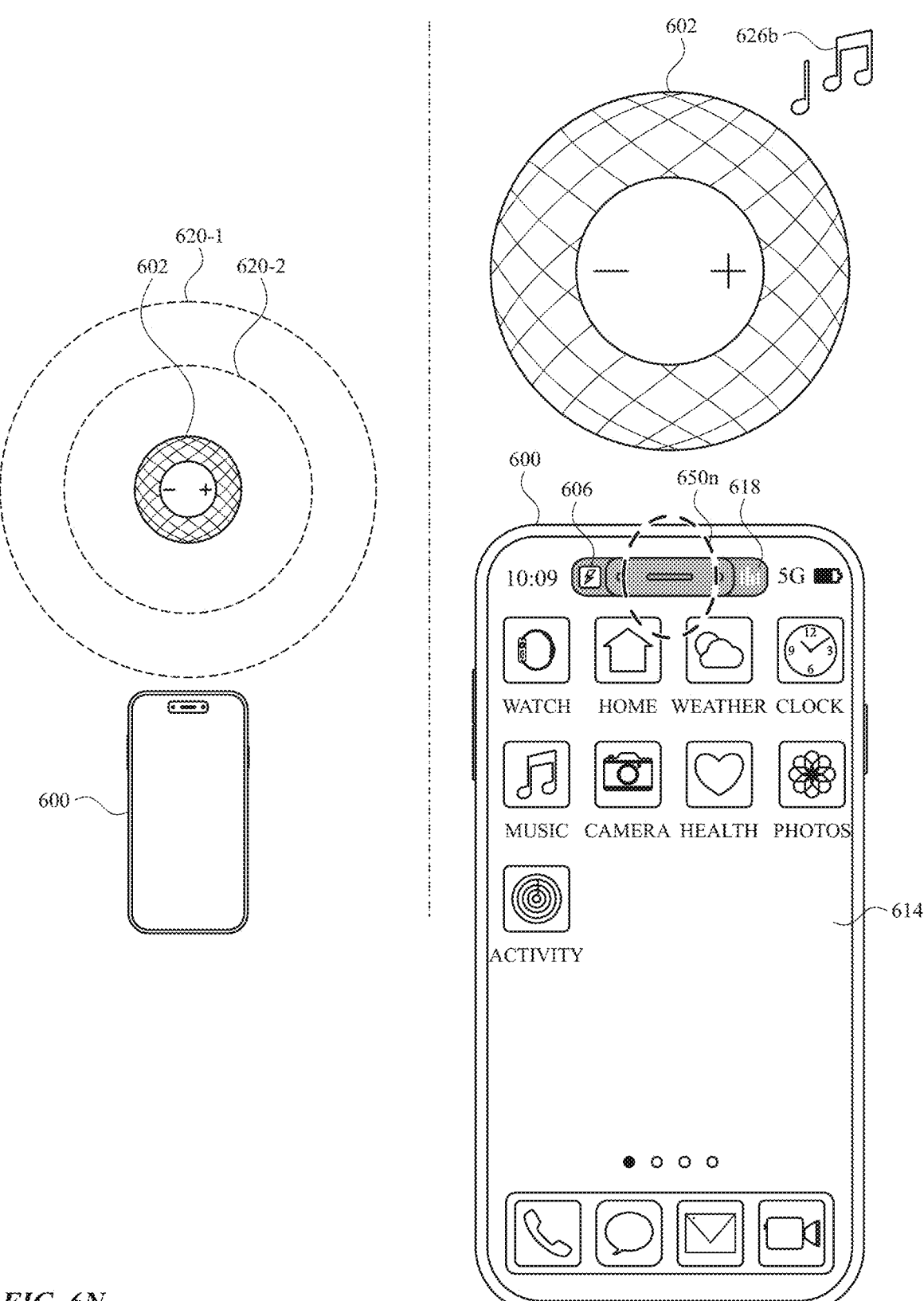
Figure 60:
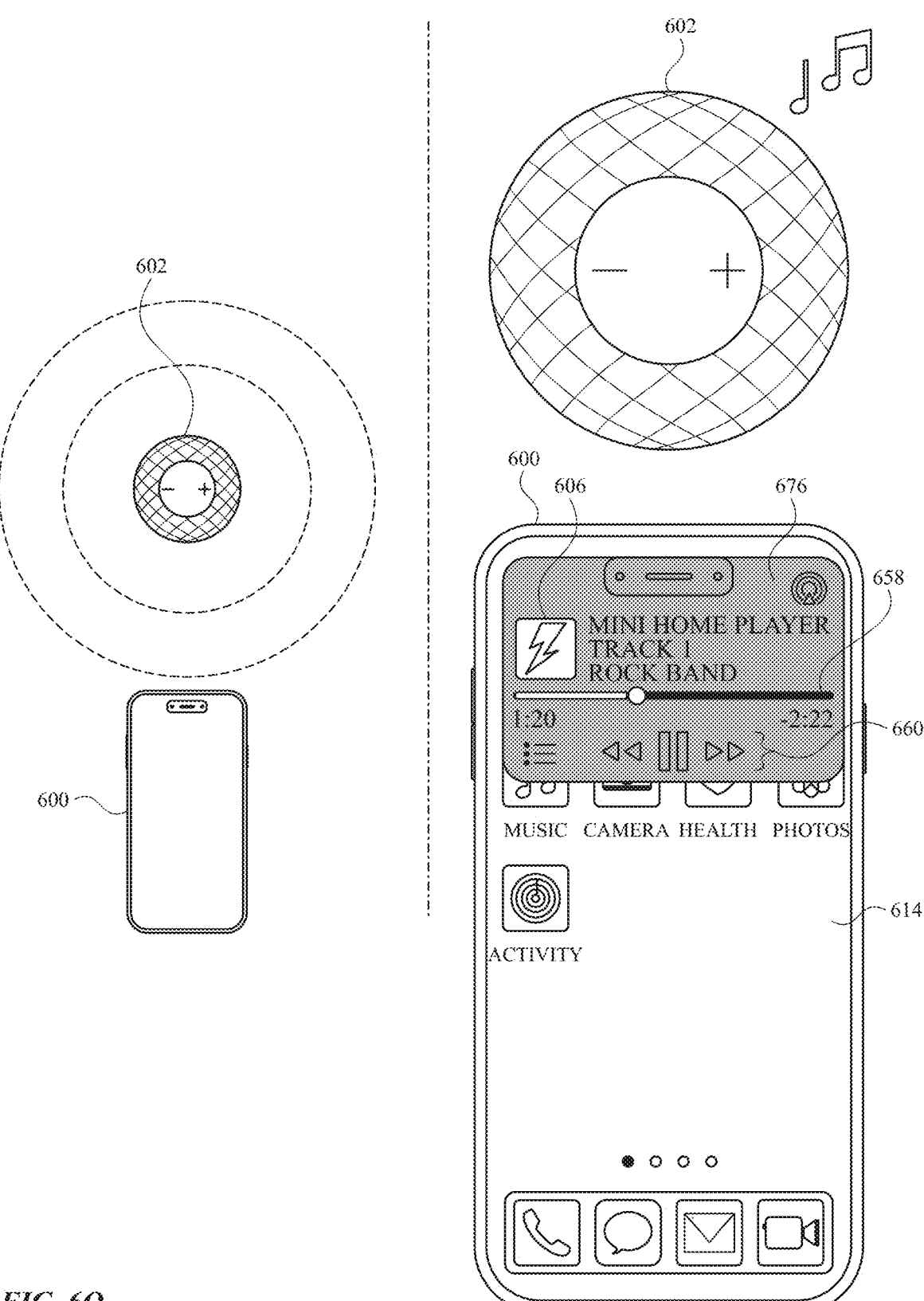

At FIG. 6N, in response to detecting tap input 650*m*, computer system 600 ceases the playback of the first media item. Further, in response to detecting tap input 650*m*, computer system 600 transmits instructions to computer system 602 that causes computer system 602 to cease playback of the second media item and initiate playback of the first media item (e.g., as indicated by music symbols 626*b* in close proximity to computer system 602). Computer system 600 ceases playback of the first media item at a first point of the first media item and computer system 602 initiates playback at the first point of the first media item (e.g., computer system 602 picks up playback of the media item where computer system 600 ceased playback of the media item). In some embodiments, computer system 602 initiates playback of the first media item from the beginning of the first media item. In some embodiments, in response to detecting tap input 650*m*, computer system 600 maintains the playback of the first media item while computer system 602 initiates playback of the first media item.

Additionally, in response to detecting tap input 650*m*, computer system 600 ceases to display now playing user interface 646 and displays home screen user interface 614. As illustrated in FIG. 6N, home screen user interface 614 includes media user interface object 604 that includes album art 606 and equalizers bars 618 that correspond to the playback of the first media item on computer system 602. As illustrated in FIG. 6N, computer system 600 maintains the display of media user interface object 604 though computer system 600 is positioned outside of outer threshold distance 620-1. At FIG. 6N, computer system 600 detects long press input 650*n* (e.g., a tap and hold) on media user interface object 604.

As illustrated in FIG. 6O, in response to detecting long press input 650*n*, computer system 600 displays condensed now playing user interface element 676. Condensed now playing user interface element 676 includes playback controls 660 (e.g., as described above in relation to FIG. 6F) and album art 606 that corresponds to the first media item that is being played back on computer system 602. Computer system 600 transmits instructions to computer system 602 that modifies the playback status of computer system 602 when computer system 600 detects selection of a respective playback control in playback controls. As illustrated in FIG. 6O, computer system 600 displays condensed now playing user interface element 676 as overlaid on top of home screen user interface 614. In some embodiments, condensed now playing user interface element 676 includes volume control 658 (e.g., as discussed above in relation to FIG. 6F). In some embodiments, computer system 600 ceases to display home screen user interface as a part of displaying condensed now playing user interface element 676. In some embodiments, condensed now playing user interface 676 includes album art 606 that is representative of a media item computer system 600 is playing back. In some embodiments, condensed now playing user interface 676 includes playback controls 660 for modifying the playback status of computer system 600.

FIG. 7 is a flow diagram illustrating a method for managing interactions between devices in accordance with some embodiments. Method 700 is performed at a computer system (e.g., 100, 300, 500, 600) (e.g., smartphone, desktop computer, a laptop, a tablet, and/or smartwatch) that is in communication with a display generation component (e.g., a display controller and/or a touch-sensitive display system) and an external device (e.g., 580, 602) (e.g., a smart speaker, a smartphone, a smart watch, desktop computer, and/or a smart device that is manufactured by a third party manufacturer (e.g., a manufacturer that is different from the manufacturer of the computer system)). Some operations in method 700 are, optionally, combined, the orders of some operations are, optionally, changed, and some operations are, optionally, omitted.

As described below, method 700 provides an intuitive way for managing interactions between devices. The method reduces the cognitive burden on a user for managing interactions between devices, thereby creating a more efficient human-machine interface. For battery-operated computing devices, enabling a user to manage interactions between devices faster and more efficiently conserves power and increases the time between battery charges.

The computer system displays (702), via the display generation component, a user interface element (e.g., 604). In some embodiments, the user interface element is displayed around (e.g., encompassing) one or more sensors that are integrated into the computer system).

While displaying the user interface element (e.g., 604), the computer system (e.g., 600) detects (704) a first change in distance between the computer system and the external device (e.g., 602) (e.g., as described above in relation to FIGS. 6A, 6B, 6C, and 6D). In some embodiments, the change in distance is detected based on a change in signal strength (e.g., wireless signal strength (e.g., Wi-Fi wireless signal, Bluetooth wireless signal, and/or ultra-wideband wireless signal)) exchanged between the computer system and the external device. In some embodiments, the change in distance is detected via one or more sensors (e.g., infrared sensors; optical sensors) integrated into the computer system and/or the external device. In some embodiments, the change in distance is detected via data transmitted to the computer system from a Wi-Fi positioning system, from GPS, and/or from the external device.

In response to (706) detecting the first change in distance and in accordance with a determination that a distance (e.g., a current distance after the first change in distance has occurred) between the computer system and the external device is greater than a first threshold distance (e.g., 620-1) (e.g., 12 inches), the computer system (e.g., 600) displays (708) the user interface element (e.g., 604) at a first predetermined size (e.g., 604 at FIG. 6A) (e.g., a size that is not proportional to the distance between the computer system and the external device) and in accordance with a determination that the distance between the computer system and the external device is less than the first threshold distance (e.g., 15 inches, 12 inches, or 10 inches) and greater than a second threshold distance (e.g., 620-2) (e.g., 6 inches, 4 inches, or 2 inches) (e.g., the distance between the computer system and the external device is less than the upper boundary of a range of distances and greater than the lower boundary of the range of distances) (e.g., the second threshold distance is different (e.g., smaller than) the first threshold distance), the computer system displays (710) the user interface element at a variable size (e.g., 604 at FIGS. 6C and 6D) (e.g., the size of the user interface element is dynamic (e.g., the size of the user interface element changes (e.g., gets larger or smaller) as the distance between the computer system and the external device changes)) that is based on (e.g., inversely proportional to or proportional to) the distance between the computer system and the external device (e.g., as the distance between the computer system and the external device decreases the size of the user interface element increases and vice versa) and in accordance with a determination that the distance between the computer system and the external device is less than the second threshold distance (e.g., and less than the first threshold distance), the computer system displays (712) the user interface element at a second predetermined size (e.g., 604 at FIG. 6F) (e.g., a size that is the same as or different from the first predetermined size). In some embodiments, size of the content included within the user interface element depends on the distance between the computer system and the external device when the distance between the computer system and the external device is less than the first threshold distance and greater than the second threshold distance. In some embodiments, the user interface element is displayed in response to the detection of the initiation of the playback of media (e.g., music, podcast, radio program and/or video) on the computer system. In some embodiments, the user interface element is displayed at the first predetermined size prior to detecting the change in distance and displaying the user interface element includes maintaining the user interface element at the same first predetermined size. In some embodiments, the user interface element is displayed in response to the detection of the initiation of the playback of media on the external device. In some embodiments, the computer system maintains the display of the user interface element while the computer system performs various functions unrelated to the display of the user interface element (e.g., the computer system displays various user interfaces that correspond to various applications that are installed on the computer system). In some embodiments, the user interface element includes an indication of a media item that the computer system and/or the external device is configured to playback (e.g., the computer system and/or the external device is not currently playing back the media item). In some embodiments, the computer system is in communication with one or more input devices (e.g., a touch-sensitive surface). In some embodiments, detecting a change in distance between the computer system and the external device includes detecting that the computer system is moved and the external device is static. In some embodiments, detecting a change in distance between the computer system and the external device includes detecting that the computer system is static and detecting that the external device is moved. In some embodiments, detecting a change in distance between the computer system and the external device includes detecting that both the computer system and the external device moving (e.g., in the same direction or in opposite directions). Displaying the user interface element at a respective size when a set of conditions are met (e.g., the distance between the computer system and the external device is at a threshold distance) automatically allows the computer system to perform a display operation that indicates to a user the relative positioning of the computer system and the external device, which performs an operation when a set of conditions has been met without requiring further user input. Displaying the user interface element at a respective size that is based on the distance between the computer system and the external device in response to detecting a change in distance between the computer system and the external device provides the user with visual feedback regarding the state of the computer system (e.g., the computer system has detected the change in distance between the computer system and the external device), which provides improved visual feedback.

In some embodiments, prior to detecting the first change in distance between the computer system and the external device (e.g., as described above in reference to FIG. 6A), the user interface element (e.g., 604) is displayed at the first predetermined size (e.g., 604 at FIG. 6A). In some embodiments, in response to detecting the first change in distance and in accordance with a determination that the distance between the computer system (e.g., 600) and the external device (e.g., 602) transitions from being greater than the first threshold distance (e.g., 620-1) (e.g., the relative positioning of computer system 600 and external device 602 at FIG. 6A) to less than the first threshold distance and greater than the second threshold distance (e.g., 620-2) (e.g., the relative positioning of computer system 600 and external device 602 at FIGS. 6C and 6D) (e.g., the computer system transitions from being greater than the first threshold distance to between the first threshold distance and second threshold distance), the computer system changes the user interface element (e.g., 604) from being displayed with the first predetermined size to being displayed with the variable size (e.g., 604 at FIGS. 6C and 6D) (e.g., the variable size is larger than the first predetermined size). In some embodiments, the computer system displays an animation (e.g., a snapping animation) of the user interface element changing from the first predetermined size to the variable size. In some embodiments, the size of the user interface element changes from the variable size to the first predetermined size in response to the computer system detecting that the distance between the computer system and the external device transitions from being less than the first threshold distance and greater than the second threshold to being greater than the first threshold distance. In some embodiments, size of the user interface element changes from the variable size to the second predetermined size in response to the computer system detecting that the distance between the computer system and the external device transitions from being less than the first threshold distance and greater than the second threshold distance to less than the second threshold distance. Changing the user interface element from being displayed with the first predetermined size to being displayed with the variable size when a set of conditions are met (e.g., the distance between the computer system and the external device crosses a distance threshold) allows the computer system to automatically perform a display operation that indicates to a user the distance between the computer system and the external device, which performs an operation when a set of conditions has been met without requiring further user input. Changing the user interface element from being displayed with the first predetermined size to being displayed with the variable size in response to detecting the first change in distance provides the user with visual feedback regarding the positioning of the computer system relative to the external device, which provides improved visual feedback.

In some embodiments, while the distance between the computer system (e.g., 600) and the external device (e.g., 602) is less than the first threshold distance (e.g., 620-1) and greater than the second threshold distance (e.g., 620-2) (e.g., the relative positioning of computer system 600 and external device 602 at FIGS. 6C and 6D), the computer system detects a second change in distance between the computer system and the external device (e.g., as described above in FIGS. 6A, 6B, 6C, and 6D). In some embodiments, in response to detecting the second change in distance (e.g., the second change is distance is detected after the first change in distance) and in accordance with a determination that a second distance (e.g., a current distance after the second change in distance has occurred) between the computer system and the external device has transitioned to being greater than the first threshold distance, the computer system displays a first user interface element snapping animation (e.g., as described above in FIG. 6E) of the user interface element (e.g., 604) transitioning from being displayed with the variable size (e.g., 604 at FIGS. 6C and 6D) to being displayed with the first predetermined size (e.g., 604 at FIGS. 6A and 6F) (e.g., the user interface element goes from the variable size to the first predetermined size as a part of the snapping animation) (e.g., the user interface element animation is displayed upon a detection by the computer system that the distance between any portion of the computer system and the external device is greater than the first threshold distance) and in accordance with a determination that the second distance between the computer system and the external device has transitioned to being less than the second threshold distance, the computer system displays a second user interface element snapping animation (e.g., as described above in FIG. 6E) of the user interface element transitioning from being displayed with the variable size to being displayed with the second predetermined size (e.g., 604 at FIGS. 6A and 6F) (e.g., the user interface element animation is displayed upon a detection by the computer system that the distance between any portion of the computer system and the external device is less than the second threshold distance). In some embodiments, the computer system forgoes displaying the user interface element snapping animation in response to detecting the second change in distance and in accordance with a determination that the distance between the computer system and the external device remains as less than the first threshold distance and greater than the second threshold distance. Displaying a first user interface element snapping animation or a second user interface element snapping animation when prescribed conditions are met (e.g., the distance between the computer system and the external device transitions across a respective distance threshold) allows the computer system to automatically perform a resizing operation that indicates to the user the positioning of the computer system relative the external device, which performs an operation when a set of conditions has been met without requiring further user input.

In some embodiments, displaying the second user interface element snapping animation (e.g., as described above in FIG. 6E) includes displaying a sequence (e.g., a sequence of transitions) (e.g., an uninterrupted sequence) of the user interface element (e.g., 604) transitioning from the variable size (e.g., 604 at FIGS. 6C and 6D) to a third predetermined size (e.g., 604 at FIG. 6E) that is smaller than the variable size (e.g., and smaller than the first and second predetermined sizes) and transitioning from the third predetermined size to the second predetermined size (e.g., 604 at FIGS. 6A and 6F), wherein the second predetermined size is larger than the third predetermined size (e.g., the computer system displays an album art graphic and equalizer bars within the user interface element when the computer system displays the user interface element with the variable size and/or the second predetermined size and the computer system does not display the album art graphic and equalizer bars within the user interface element when the computer system displays the user interface element at the third predetermined size). In some embodiments, the computer system displays a first set of content within the user interface element when the computer system displays the user interface element with the variable size and/or the second predetermined size and the computer system displays a second set of content, that is different than the first set of content, within the user interface element when the computer system displays the user interface at the third predetermined size. In some embodiments, the computer system changes the content that is displayed within the user interface element as part of displaying the snapping animation. Displaying a sequence of the user interface element transitioning to various sizes in response to detecting the second change in distance and in accordance with a determination that the second distance between the computer system and the external device has transitioned across a distance threshold provides the user with visual feedback regarding the positioning of the computer system relative to the external device, which provides improved visual feedback.

In some embodiments, the first predetermined size (e.g., 604 at FIGS. 6A and 6F) and the second predetermined size (e.g., 604 at FIGS. 6A and 6F) are the same (e.g., both the first predetermined size and the second predetermined size are equal to 0.25 inches, 0.5 inches or 0.75 inches).

In some embodiments, the computer system (e.g., 600) is playing back a first media item (e.g., 626*a*) (e.g., 600 at FIG. 6B) (e.g., music media item, podcast, and/or video media item) while the first change in distance between the computer system and the external device (e.g., 602) is detected (e.g., as described above at FIG. 6D). In some embodiments, in accordance with a determination that a first set of criteria is satisfied, the computer system transfers (e.g., ceasing playback at the computer system and initiating playback at the external device) the playback of the first media item from the computer system to the external device (e.g., 602) (e.g., as described above at FIG. 6E). In some embodiments, the computer system ceases playback of the first media item at a first point of the first media item and the external device initiates playback of the first media item at the first point in the first media item). In some embodiments, the external device begins playback of the first media item from the beginning of the first media item. In some embodiments, the computer system maintains playback of the first media item after transferring the playback of the first media item to the external device (e.g., both the computer system and the external device concurrently playback the first media item in sync). In some embodiments, the playback of the first media item is transferred automatically (e.g., without intervening user input). Transferring the playback of the first media item from the computer system to the external device when a set of prescribed conditions are met (e.g., the first set of criteria) allows the computer system to automatically control the playback status of both the computer system and the external device, which performs an operation when a set of conditions has been met without requiring further user input.

In some embodiments, the external device (e.g., 602) is playing back a second media item (e.g., 668) (e.g., music media item, podcast, and/or video media item) (e.g., while the computer system plays back the first media item) (e.g., that is different than the first media item) while the first change in distance between the computer system (e.g., 600) and the external device (e.g., 602) is detected (e.g., as described above in reference to FIG. 6L), and wherein the first set of criteria includes a criterion that is satisfied when the computer system detects a first input (e.g., 650*m*) (e.g., a press and hold input, a tap input, an activation of a hardware button that is coupled to the computer system and/or a swipe gesture) that corresponds to selection of a first transfer selectable user interface object (e.g., 678) (e.g., an affordance). In some embodiments, the external device ceases playback of the second media item as a part of transferring the first media item from the computer system to the external device). In some embodiments, the computer system ceases to display the first transfer selectable user interface object in response to detecting the first input. In some embodiments, the computer system outputs haptic feedback in response to detecting the first input. In some embodiments, the computer system maintains the display of the first transfer selectable user interface object in response to detecting the first input. In some embodiments, the computer system displays a representation of the second media item prior to detecting the first input and the computer system ceases to display the representation of the second media item and displays a representation of the first media item in response to detecting the first input. Transferring the playback of the first media item from the computer system to the external device in response to detecting a first input that corresponds to selection of the first transfer selectable user interface object provides the user with auditory feedback regarding the state of the computer system (e.g., the computer system has detected the first input), which provides improved auditory feedback.

In some embodiments, the external device (e.g., 602) is not playing back media (e.g., any audio media) (e.g., 602 at FIG. 6A) when the first change in distance between the computer system and the external device is detected, and wherein the first set of criteria includes a criterion that is satisfied when the distance between the computer system (e.g., 600) and the external device transitions from being less than the first threshold distance (e.g., 620) and greater than the second threshold distance (e.g., the relative positioning of computer system 600 and external device 602 at FIGS. 6C and 6D) (e.g., 620-2) to being less than the second threshold distance (e.g., as described above in reference to FIG. 6E) (e.g., the relative positioning of computer system 600 and external device 602 at FIG. 6E) (e.g., the playback of the first media item is automatically transferred (e.g., without intervening user input) from the computer system to the external device in accordance with a determination that the distance between the computer system and the external device is equal the second threshold distance). In some embodiments, the external device maintains playback of the first media item when the distance between the computer system and the external device is not equal to the second threshold distance. Transferring the playback of the first media item from the computer system to the external device when the distance between the computer system and the external device transitions across a distance threshold allows the user to control the playback status of both the computer system and the external device without displaying additional controls, which provides additional control options without cluttering the user interface.

In some embodiments, the external device (e.g., 602) is playing back a third media item (e.g., 626b at FIG. 6I) while the first change in distance between the computer system (e.g., 600) and the external device is detected (e.g., as described above in reference to FIG. 6H). In some embodiments, in accordance with a determination that a second set of criteria is satisfied, the computer system transfers the playback of the third media item from the external device to the computer system (e.g., as described above in reference to FIG. 6J) (e.g., the external devices ceases playback of the third media item at a first point of the third media item and the computer system initiates playback of the third media item at the first point in the third media item). In some embodiments, the computer system plays back the third media item from the beginning of the third media item. In some embodiments, the playback of the third media item is automatically transferred (e.g., without intervening user input). In some embodiments, the external device continues to play back the third media item after the third media item is transferred from the external device to the computer system (e.g., the external device and the computer system concurrently playback the third media item in sync). Transferring the playback of the first media item from the computer system to the external device when prescribed conditions are met (e.g., the second set of criteria is met) allows the computer system to automatically control the playback status of both the computer system and the external device, which performs an operation when a set of conditions has been met without requiring further user input.

In some embodiments, the computer system (e.g., 600) is not playing back media (e.g., 600 at FIGS. 6H and 6I) (e.g., any audio media) while detecting the first change in distance between the computer system and the external device (e.g., 602) (e.g., as described above in reference to FIG. 6H), and wherein the second set of criteria includes a criterion that is satisfied when the computer system detects a second input (e.g., 650i) (e.g., a press and hold input, a tap input, activation of a hardware button that is coupled to the computer system) and/or a swipe input) that corresponds to the selection of a second transfer selectable user interface object (e.g., 652) (e.g., affordance). In some embodiments, the computer system ceases to display the second transfer selectable user interface object in response to detecting the second input. In some embodiments, the computer system outputs haptic feedback in response to detecting the second input. In some embodiments, the computer system maintains the display of the second transfer selectable user interface object in response to detecting the second input. In some embodiments, the computer system displays a representation (e.g., textual and/or graphical representation) of the third media item before and after detection of the second input. Transferring the playback of the third media item from the external device to the computer system in response to detecting a second input that corresponds to the second transfer selectable object provides the user with auditory feedback regarding the state of the computer system (e.g., the computer system has detected the first input), which provides improved auditory feedback.

In some embodiments, while the distance between the computer system (e.g., 600) and the external device (e.g., 602) is less than the first threshold distance (e.g., 620-1) (e.g., and while the external device and/or the computer system is playing back a media item) and greater than the second threshold distance (e.g., 620-2) (e.g., the relative positioning of computer system 600 and external device 602 at FIG. 6D), the computer system detects a third change in distance between the computer system and the external device (e.g., as described above in reference to FIG. 6D) (e.g., the computer system detects the third change in distance between the computer system and the external device after detecting the first change in distance between the computer system and the external device). In some embodiments, in response to detecting the third change in distance between the computer system and the external device and in accordance with a determination that a third distance between the computer system and the external device, that results from the third change in distance, is less than the second threshold distance (e.g., the relative positioning of computer system 600 and external device at FIG. 6F), the computer system displays, via the display generation component, a now playing user interface (e.g., 646) (e.g., the now playing user interface animates in from the bottom of the display of the computer system) (e.g., the now playing user interface screen includes playback controls for controlling media that is currently being played back on the computer system or the external device) (e.g., the now playing user interface and the user interface element includes the same graphical representation of a media item that is playing back on the computer system or the external device). In some embodiments, the computer system forgoes displaying the now playing user interface in response to detecting the third change in distance between the computer system and the external device and in accordance with a determination that the distance between the computer system and the external device is greater than the first distance threshold. In some embodiments, the computer system does not display the user interface element while the computer system displays the now playing user interface. In some embodiments, detecting the third change in distance between the computer system and the external device includes detecting that the computer system is moved, and the external device is static. In some embodiments, detecting the third change in distance between the computer system and the external device includes detecting that the computer system is static and detecting that the external device is moved. In some embodiments, detecting the third change in distance between the computer system and the external device includes detecting that both the computer system and the external device moving (e.g., in the same direction or in opposite directions). In some embodiments, the computer system ceases to display the now playing user interface in response to detecting a swipe gesture (e.g., a swipe down and/or a swipe up). Displaying a now playing user interface in response to detecting the third change in distance between the computer system and the external device allows the user to control the display of the now playing user interface without displaying additional controls, which provides additional controls options without cluttering the user interface. Displaying a now playing user interface in response to detecting the third change in distance between the computer system and the external device and in accordance with a determination that the distance between the computer system and the external device crosses a respective distance threshold provides the user with visual feedback regarding the distance between the computer system and the external device, which provides improved visual feedback.

In some embodiments, in response to detecting the third change in distance (e.g., as described above in reference to FIG. 6H) and in accordance with a determination that the computer system (e.g., 600) was not playing media (e.g., any audio media) (e.g., 600 at FIG. 6H) and the external device (e.g., 602) was playing back a fourth media item (e.g., 626*b* at FIG. 6H) (e.g., 602 at FIG. 6H) when the third change in distance occurred, the computer system displays, within the now playing user interface (e.g., 646 at FIG. 6I), a transfer to computer system selectable user interface object (e.g., 652) that, when selected, causes playback of the fourth media to be transferred from the external device to the computer system. In some embodiments, the transfer to computer system selectable user interface object includes a representation (e.g., graphical and/or textual representation) of the fourth media item being played back on the external device. In some embodiments, both the now playing user interface and the transfer to computer system selectable user interface object include a representation (e.g., graphical and/or textual representation) (e.g., the same representation) of the fourth media item that is being played back by the external device. In some embodiments, the computer system outputs a haptic alert in response to detecting selection of the transfer to computer system selectable user interface object. Displaying a transfer to computer system selectable user interface object in response to detecting the third change in distance between the computer system and the external device allows the user to control the display of the transfer to computer system selectable user interface object without displaying additional controls, which provides additional controls options without cluttering the user interface. Displaying a transfer to computer system selectable user interface object when a set of prescribed conditions are satisfied (e.g., when the computer system is not playing media and the external device is playing back a fourth media item) allows the computer system to automatically perform a display operation that indicates to the user the playback status of both the computer system and the external device, which performs an operation when a set of conditions has been met without requiring further user input.

In some embodiments, in response to detecting the third change in distance (e.g., as described above in reference to FIG. 6L) and in accordance with a determination that the computer system (e.g., 600) was playing back a fifth media item (e.g., 626*a*) when the third change in distance occurred and the external device (e.g., 602) was playing back a sixth media item (e.g., 668) when the third change in distance occurred (e.g., that is different than the fifth media item), the computer system displays, within the now playing user interface (e.g., 646 at FIG. 6M), a transfer from computer system selectable user interface object (e.g., 678), that, when selected causes playback of the fifth media item to be transferred from the computer system to the external device (e.g., selection of the transfer from computer system user interface object cause the external system to cease playback of the sixth media item). In some embodiments, the computer system concurrently displays the transfer from computer system selectable user interface object and the transfer to computer system selectable user interface object. In some embodiments, the transfer from computer system selectable user interface object includes a representation (e.g., a graphical and/or textual) of the sixth media item. In some embodiments, both the transfer from computer system selectable user interface object and the now playing user interface includes a representation (e.g., the same representation) of the sixth media item. Displaying a transfer from computer system selectable user interface object in response to detecting the third change in distance between the computer system and the external device allows the user to control when the transfer from computer system selectable user interface object is displayed without displaying additional controls, which provides additional controls options without cluttering the user interface. Displaying a transfer from computer system selectable user interface object when a set of prescribed conditions are satisfied (e.g., when the computer system is playing media and the external device is playing back a sixth media item) allows the computer system to automatically perform a display operation that indicates to the user the playback status of both the computer system and the external device, which performs an operation when a set of conditions has been met without requiring further user input.

In some embodiments, in response to detecting the first change in distance (e.g., as described above in relation to FIG. 6B) and in accordance with a determination that the distance between the computer system (e.g., 600) and the external device (e.g., 602) is less than the first threshold distance (e.g., 620-1) and greater than the second threshold distance (e.g., 620-2) (e.g., the relative positioning of computer system 600 and external device 602 at FIGS. 6C and 6D), the computer system outputs continuous (e.g., ongoing while the distance between the computer system and the external device remains between the two threshold distances) haptic feedback (e.g., 630). In some embodiments, the intensity of the continuous haptic feedback is based on the distance between the external device and the computer system while the distance between the computer system and the external device is less than the first threshold distance and greater than the second threshold distance (e.g., the intensity of the continuous haptic feedback increases as the distance between the computer system and external device decreases). In some embodiments, the computer system ceases to output the continuous haptic feedback in response to detecting that the distance between the computer system and the external device has transitioned from being less than the first threshold distance and greater than the second threshold distance to being greater than the first threshold distance or less than the second threshold distance. Outputting continuous haptics when a set of prescribed conditions are met (e.g., the distance between the computer system and the external device is between two distance thresholds) allows the computer system to automatically alert the user to that the distance between the computer system and the external device is between two distance thresholds, which performs an operation when a set of conditions has been met without requiring further user input.

In some embodiments, in response to detecting the first change in distance (e.g., as described above in reference to FIG. 6A) and in accordance with a determination that the distance between the external device (e.g., 602) and the computer system (e.g., 600) transitions from being greater than the first threshold distance (e.g., 620-1) (e.g., the relative positioning of computer system 600 and external device 602 at FIG. 6A) to being less than the first threshold distance and greater than the second threshold distance (e.g., 620-2) (e.g., the relative positioning of computer system 600 and external device at FIGS. 6C and 6D), the computer system outputs a first discrete haptic alert (e.g., 642 at FIG. 6B) (e.g., a single haptic feedback) and in accordance with a determination that the distance between the external device and the computer system transitions from being less than the first threshold distance and greater than the second threshold distance (e.g., the relative positioning of computer system 600 and external device 602 at FIG. 6E) to being less than the second threshold distance, the computer system outputs a second discrete haptic alert (e.g., 642 at FIG. 6E) (e.g., a single haptic feedback) (e.g., the intensity of the first discrete haptic alert and the second discreet haptic alert are the same). In some embodiments, the computer system outputs a discrete haptic alert in response to detecting that the distance between the computer system and the external device is has transitioned from being less than the first threshold distance and greater than the second threshold distance to greater than the first threshold distance. In some embodiments, the computer system outputs a discrete haptic in response to detecting that the distance between the computer system and the external device has transitioned from being less than the second threshold distance to being greater than the second threshold distance and less than the first threshold distance. In some embodiments, the computer system outputs the first/second discrete haptic alert concurrently with the transfer of the playback of media. Outputting a discrete haptic alert when a set of prescribed conditions are met (e.g., the distance between the computer system and the external device transitions across an upper distance boundary or a lower distance boundary) allows the computer system to automatically alert the user that the distance between the computer system and the external device is decreasing, which performs an operation when a set of conditions has been met without requiring further user input.

In some embodiments, the computer system (e.g., 600) is playing back a seventh media item (e.g., 626a) at a first variable volume level (e.g., as described above in reference to FIGS. 6C and 6D) and the external device (e.g., 602) is playing back the seventh media item (e.g., 626b) at a second variable volume level (e.g., as described above in reference to FIGS. 6C and 6D) different from the first volume level (e.g., the first volume level is louder or quieter than the second volume level) (e.g., both the computer system and the external device are playing the same media item at different volumes). In some embodiments, while the distance between the computer system and the external device is less than the first threshold distance (e.g., 620-1) and greater than the second threshold distance (e.g., 620-2), the computer system detects a fourth change in distance between the computer system and the external device (e.g., as described above in reference to FIG. 6C). In some embodiments, in response to detecting the fourth change in distance and in accordance with a determination that the distance between the computer system and the external device has decreased the computer system decreases the first variable volume level by a first amount that is based on the fourth change in distance (e.g., as described above in reference to FIGS. 6C and 6D) (e.g., the first variable volume level has an inverse relationship with the distance between the external device and the computer system) (e.g., the first volume level dependent upon the distance between the computer system and the external device decreases) and the computer system transmits a first set of instructions that causes the external device to increase the second variable volume level by a second amount that is based on the fourth change in distance (e.g., as described above in reference to FIGS. 6C and 6D) (e.g., the second variable volume level has an direct relationship with the distance between the external device and the computer system (e.g., the second variable volume level is dependent upon the distance between the computer system and the external device) (e.g., the first variable volume level is decreased concurrently with the increase of the second variable volume level). In some embodiments, in response to detecting the fourth change in distance and in accordance with a determination that the distance between the computer system and the external device has increased the computer system increases the first variable volume level by a third amount (e.g., different than the first amount) that is based on the fourth change in distance (e.g., as described above in reference to FIGS. 6C and 6D) and transmits a second set of instructions that causes the external device to decrease the second variable volume level by a fourth amount that is based on the fourth change in distance (e.g., as described above in reference to FIGS. 6C and 6D) (e.g., the first variable volume level is increased concurrently with the decrease of the second variable volume level). In some embodiments, the first variable volume level is equal to the second variable volume level. In some embodiments, the first and second amounts are the same. Scaling the playback volume of both the computer system and the external device when a set of conditions are met allows the computer system to automatically control the playback status of both the computer system and the external device in such a way that indicates to a user that the device responsible for playback of a respective media item will change as the distance between the computer system and the external device changes, which performs an operation when a set of conditions has been met without requiring further user input. Scaling the playback volume of both the computer system and the external device in response to the detection of a fourth change in distance allows the user to simultaneously control the playback volume of both the computer system and the external device without displaying additional controls, which provides additional control options without cluttering the user interface.

In some embodiments, the user interface element (e.g., 604) includes a representation (e.g., 606) (e.g., a textual and/or graphical representation) (e.g., album art) of media that is being played back by the computer system (e.g., 600) and/or the external device (e.g., 602). Displaying a representation of media that is being played back by the computer system and/or the external device provides the user with a visual indication of the current playback status of the computer system and/or the external device at a point in time where the playback status of the computer system and/or the external device is of heightened interest to the user, which enhances the operability of the computer system and makes the user-system interface more efficient (by making important information readily available to the user) which, additionally, reduces power usage and improves battery life of the computer system by enabling the user to use the system more quickly and efficiently.

In some embodiments, the user interface element (e.g., 604) is displayed around one or more sensors (e.g., as described above in reference to FIG. 6A) (e.g., proximity sensor, ambient light sensor, an IR and/or optical camera) e.g., the user interface element encompasses the one or more sensors) (e.g., the user interface element does not visually obstruct the one or more sensors) that are integrated into the computer system (e.g., 600). In some embodiments, the user interface element surrounds the one or more sensors.

In some embodiments, a first targeted device (e.g., 600 or 602) (e.g., the computer system, the external device and/or a second external device that is in communication (e.g., wireless and/or wired communication) with the computer system) is playing back an eighth media item (e.g., 626a, 626b, or 668). In some embodiments, while displaying the user interface element (e.g., 604) (e.g., while the user interface element is displayed at the first predetermined size or the second predetermined size), the computer system detects a third input (e.g., 650n) (e.g., a press and hold input, a tap input, a swipe input, and/or an activation of a hardware control) that corresponds to selection of the user interface element. In some embodiments, in response to detecting the third input, the computer system displays one or more controls (e.g., 660) (e.g., a next track selectable user interface object (e.g., that when selected causes the initiation of the playback of a subsequent media item in a playlist), a previous track selectable user interface object (e.g., that when selected causes the initiation of the playback of a previous media item in a play list), a pause selectable user interface object (e.g., that when selected pauses the playback of a currently playing media item), and/or a play selectable user interface object (that when selected causes the initiation of the playback of a media item)) for controlling the playback of the eighth media item on the first targeted device. In some embodiments, the computer system ceases the display of one or more controls in response to detecting a swipe gesture (e.g., an upward swipe gesture or a downward swipe gesture). Displaying one or more controls in response to detecting a third input provides the user with visual feedback regarding the state of the computer system (e.g., the computer system has detected the third input), which provides improved visual feedback.

In some embodiments, the external device (e.g., 602) is in communication with one or more light sources (e.g., the one or more light sources are integrated into the external device). In some embodiments, in response to detecting the first change in distance (e.g., as described above in reference to FIG. 6D) and in accordance with a determination that the distance between the computer system and the external device transitions from being less than the first distance threshold (e.g., 620-1) and greater than the second distance threshold (e.g., 620-2) (e.g., the relative positioning of computer system 600 and external device 602 at FIG. 6D) to being less than the second distance threshold (e.g., the relative positioning of computer system 600 and external device 602 at FIG. 6E), the computer system transmits a third set of instructions to the external device that causes the one or more light sources to output a light animation (e.g., as described above in reference to FIG. 6E). In some embodiments, the light animation is output prior to media being transferred between the external device and the computer system. In some embodiments, the light animation is output after media is transferred between the external device and the computer system. In some embodiments, the light animation is output concurrently with the transfer of media between the external device and the computer system. In some embodiments, two or more lights are illuminated at the same time as part of the light animation. Transmitting a third set of instructions that causes the external device to output a light animation when a set of conditions are met (e.g., the distance between the computer system and the external device transitions to being between two distance threshold), allows the computer system to automatically control a light operation of the external device, which performs an operation when a set of conditions has been met without requiring further user input. Transmitting a third set of instructions that causes the external device to output a light animation in response to the distance between the computer system and the external device crossing a respective distance threshold allows the user to control a light operation of the external device without displaying additional controls, which provides additional control options without cluttering the user interface.

In some embodiments, the user interface element (e.g., 604) includes one or more user interface objects (e.g., 618) (e.g., equalizer bars) that indicate (e.g., the equalizer bars animate (e.g., move up and down and/or side to side)) that a second targeted device (e.g., 600 or 602) (e.g., the computer system, the external device, and/or a second external device (e.g., smart speaker, smart phone, desktop computer and/or a smart device that is manufactured by a third party manufacturer)) is actively playing back (e.g., playback is not paused) a ninth media item (e.g., 626a, 626b, or 668). Displaying the user interface element with one or more user interface objects that indicate that a targeted device is actively playing back a media item allows a user to easily and quickly ascertain the playback status of the targeted device which enhances the operability of the computer system and makes the user-system interface more efficient (by making important information readily available to the user) which, additionally, reduces power usage and improves battery life of the computer system by enabling the user to use the system more quickly and efficiently.

In some embodiments, one or more status bar user interface elements (612a, 612b, and 612c) (e.g., a time user interface element that indicates the current time, a battery user interface element that indicates the current time and/or a cellular signal user interface element that indicates the strength of a cellular signal that the computer system has) are displayed while the user interface element (e.g., 604) is displayed (e.g., the one or more status bar user interface elements are displayed on one or both sides of the user interface element), and wherein, while the distance between the computer system (e.g., 600) and the external device (e.g., 602) is less than the first threshold distance (e.g., 620-1) and greater than the second threshold distance (620-2) (e.g., the relative positioning of computer system 600 and external device 602 at FIGS. 6C and 6D), the one or more status bar user interface elements are displayed at a variable size that is based on the distance between the computer system and the external device (e.g., as described above in relation to FIGS. 6C and 6D) (e.g., the size of the one or more status bar user interface elements has an direct relationship with the distance between the computer system and the external device (e.g., size of the one or more status bar user interface elements decreases as the distance between the computer system and the external system decreases and the size of the one or more status bar user interface elements increases as the distance between the computer system and the external device increases). Displaying the one or more status bar user interface elements at a variable size that is based on the distance between the computer system and the external device while the distance between the computer system and the external device is between two distance thresholds provides the user with a visual indication regarding the positioning of the computer system relative to the external device when the relative positioning of the computer system relative to the external device is of heightened interest to the user which enhances the operability of the computer system and makes the user-system interface more efficient which, additionally, reduces power usage and improves battery life of the computer system by enabling the user to use the system more quickly and efficiently.

In some embodiments, while the distance between the computer system (e.g., 600) and the external device (e.g., 602) is less than the first threshold distance (e.g., 620-1) and greater than the second threshold distance (620-2) (e.g., the relative positioning of computer system 600 and external device 602 at FIGS. 6C and 6D), the size of the user interface element (e.g., 604) has an inverse relationship with the distance between the computer system and the external device (e.g., as described above in relation to FIGS. 6C and 6D) (e.g., the size of the user interface element increases as the distance between the computer system and the external device decreases and the size of the user interface element decrease when the distance between the computer system and the external device increases). In some embodiments, the size of the user interface element has a direct relationship with the distance between the computer system and the external device (e.g., the size of the user interface element decreases as the distance between the computer system and the external device decreases and the size of the user interface element increases as the distance between the computer system and the external device increases).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve a user's experience while listening to media. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted media that is of greater interest to the user. Accordingly, use of such personal information data enables users to have better tailored media suggestions to generate a personalized playlist for the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of media streaming services, the present technology can be configured to allow users to select to "opt in" or "opt out" of participation in the collection of personal information data during registration for services or anytime thereafter. In another example, users can select not to provide media preference data for targeted media suggestions. In yet another example, users can select to limit the length of time media preference data is maintained or entirely prohibit the development of a baseline media preference profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, media can be selected and delivered to users by inferring preferences based on non-personal information data or a bare minimum amount of personal information, such as the content being requested by the device associated with a user, other non-personal information available to the media streaming services, or publicly available information.

What is claimed is:

1. A computer system configured to communicate with a display generation component and an external device, the computer system comprising:

one or more processors; and memory storing one or more programs configured to be executed by the one or more processors, the one or more programs including instructions for:

displaying, via the display generation component, a user interface element;

while displaying the user interface element, detecting a first change in distance between the computer system and the external device; and in response to detecting the first change in distance:

in accordance with a determination that a distance between the computer system and the external device is greater than a first threshold distance, continuing to display the user interface element, wherein continuing to display the user interface element in accordance with the determination that the distance between the computer system and the external device is greater than the first threshold distance includes displaying the user interface element at a first predetermined size;

in accordance with a determination that the distance between the computer system and the external device is less than the first threshold distance and greater than a second threshold distance, continuing to display the user interface element, wherein continuing to display the user interface element in accordance with the determination that the distance between the computer system and the external device is less than the first threshold distance and greater than the second threshold distance includes displaying the user interface element at a variable size that is based on the distance between the computer system and the external device; and in accordance with a determination that the distance between the computer system and the external device is less than the second threshold distance, continuing to display the user interface element, wherein continuing to display the user interface element in accordance with the determination that the distance between the computer system and the external device is less than the second threshold distance includes displaying the user interface element at a second predetermined size.

2. The computer system of claim 1, wherein, prior to detecting the first change in distance between the computer system and the external device, the user interface element is displayed at the first predetermined size, and wherein the one or more programs further include instructions for:

in response to detecting the first change in distance and in accordance with a determination that the distance between the computer system and the external device transitions from being greater than the first threshold distance to less than the first threshold distance and greater than the second threshold distance, changing the user interface element from being displayed with the first predetermined size to being displayed with the variable size.

3. The computer system of claim 1, wherein the one or more programs further include instructions for:

while the distance between the computer system and the external device is less than the first threshold distance and greater than the second threshold distance, detecting a second change in distance between the computer system and the external device; and in response to detecting the second change in distance:

in accordance with a determination that a second distance between the computer system and the external device has transitioned to being greater than the first threshold distance, displaying a first user interface element snapping animation of the user interface element transitioning from being displayed with the variable size to being displayed with the first predetermined size; and in accordance with a determination that the second distance between the computer system and the external device has transitioned to being less than the second threshold distance, displaying a second user interface element snapping animation of the user interface element transitioning from being displayed with the variable size to being displayed with the second predetermined size.

4. The computer system of claim 3, wherein displaying the second user interface element snapping animation includes displaying a sequence of the user interface element transitioning from the variable size to a third predetermined size that is smaller than the variable size and transitioning from the third predetermined size to the second predetermined size, wherein the second predetermined size is larger than the third predetermined size.

5. The computer system of claim 1, wherein the first predetermined size and the second predetermined size are the same.

6. The computer system of claim 1, wherein the computer system is playing back a first media item while the first change in distance between the computer system and the external device is detected, and wherein the one or more programs further include instructions for:

in accordance with a determination that a first set of criteria is satisfied, transferring the playback of the first media item from the computer system to the external device.

7. The computer system of claim 6, wherein the external device is playing back a second media item while the first change in distance between the computer system and the external device is detected, and wherein the first set of criteria includes a criterion that is satisfied when the computer system detects a first input that corresponds to selection of a first transfer selectable user interface object.

8. The computer system of claim 6, wherein the external device is not playing back media when the first change in distance between the computer system and the external device is detected, and wherein the first set of criteria includes a criterion that is satisfied when the distance between the computer system and the external device transitions from being less than the first threshold distance and greater than the second threshold distance to being less than the second threshold distance.

9. The computer system of claim 1, wherein the external device is playing back a third media item while the first change in distance between the computer system and the external device is detected, and wherein the one or more programs further include instructions for:

in accordance with a determination that a second set of criteria is satisfied, transferring the playback of the third media item from the external device to the computer system.

10. The computer system of claim 9, wherein the computer system is not playing back media while detecting the first change in distance between the computer system and the external device, and wherein the second set of criteria includes a criterion that is satisfied when the computer system detects a second input that corresponds to the selection of a second transfer selectable user interface object.

11. The computer system of claim 1, wherein the one or more programs further include instructions for:

while the distance between the computer system and the external device is less than the first threshold distance and greater than the second threshold distance, detecting a third change in distance between the computer system and the external device; and in response to detecting the third change in distance between the computer system and the external device and in accordance with a determination that a third distance between the computer system and the external device, that results from the third change in distance, is less than the second threshold distance, displaying, via the display generation component, a now playing user interface.

12. The computer system of claim 11, wherein the one or more programs further include instructions for:

in response to detecting the third change in distance and in accordance with a determination that the computer system was not playing media and the external device was playing back a fourth media item when the third change in distance occurred, displaying, within the now playing user interface, a transfer to computer system selectable user interface object that, when selected, causes playback of the fourth media to be transferred from the external device to the computer system.

13. The computer system of claim 11, wherein the one or more programs further include instructions for:

in response to detecting the third change in distance and in accordance with a determination that the computer system was playing back a fifth media item when the third change in distance occurred and the external device was playing back a sixth media item when the third change in distance occurred, displaying, within the now playing user interface, a transfer from computer system selectable user interface object, that, when selected causes playback of the fifth media item to be transferred from the computer system to the external device.

14. The computer system of claim 1, wherein the one or more programs further include instructions for:

in response to detecting the first change in distance and in accordance with the determination that the distance between the computer system and the external device is less than the first threshold distance and greater than the second threshold distance, outputting continuous haptic feedback.

15. The computer system of claim 1, wherein the one or more programs further include instructions for:

in response to detecting the first change in distance:

in accordance with a determination that the distance between the external device and the computer system transitions from being greater than the first threshold distance to being less than the first threshold distance and greater than the second threshold distance, outputting a first discrete haptic alert; and in accordance with a determination that the distance between the external device and the computer system transitions from being less than the first threshold distance and greater than the second threshold distance to being less than the second threshold distance, outputting a second discrete haptic alert.

16. The computer system of claim 1, wherein the computer system is playing back a seventh media item at a first variable volume level and the external device is playing back the seventh media item at a second variable volume level different from the first variable volume level, and wherein the one or more programs further include instructions for:

while the distance between the computer system and the external device is less than the first threshold distance and greater than the second threshold distance:

detecting a fourth change in distance between the computer system and the external device; and in response to detecting the fourth change in distance:

in accordance with a determination that the distance between the computer system and the external device has decreased:

decreasing the first variable volume level by a first amount that is based on the fourth change in distance; and transmitting a first set of instructions that causes the external device to increase the second variable volume level by a second amount that is based on the fourth change in distance; and in accordance with a determination that the distance between the computer system and the external device has increased:

increasing the first variable volume level volume level by a third amount that is based on the fourth change in distance; and transmitting a second set of instructions that causes the external device to decrease the second variable volume level by a fourth amount that is based on the fourth change in distance.

17. The computer system of claim 1, wherein the user interface element includes a representation of media that is being played back by the computer system and/or the external device.

18. The computer system of claim 1, wherein the user interface element is displayed around one or more sensors that are integrated into the computer system.

19. The computer system of claim 1, wherein a first targeted device is playing back an eighth media item, and wherein the one or more programs further include instructions for:

while displaying the user interface element, detecting a third input that corresponds to selection of the user interface element; and in response to detecting the third input, displaying one or more controls for controlling the playback of the eighth media item on the first targeted device.

20. The computer system of claim 1, wherein the external device is in communication with one or more light sources, and wherein the one or more programs further include instructions for:

in response to detecting the first change in distance and in accordance with a determination that the distance between the computer system and the external device transitions from being less than the first threshold distance and greater than the second threshold distance to being less than the second threshold distance, transmitting a third set of instructions to the external device that causes the one or more light sources to output a light animation.

21. The computer system of claim 1, wherein the user interface element includes one or more user interface objects that indicate that a second targeted device is actively playing back a ninth media item.

22. The computer system of claim 1, wherein one or more status bar user interface elements are displayed while the user interface element is displayed, and wherein, while the distance between the computer system and the external device is less than the first threshold distance and greater than the second threshold distance, the one or more status bar user interface elements are displayed at a variable size that is based on the distance between the computer system and the external device.

23. The computer system of claim 1, wherein, while the distance between the computer system and the external device is less than the first threshold distance and greater than the second threshold distance, the size of the user interface element has an inverse relationship with the distance between the computer system and the external device.

24. A method, comprising:

at a computer system that is in communication with a display generation component and an external device:

displaying, via the display generation component, a user interface element;

while displaying the user interface element, detecting a first change in distance between the computer system and the external device; and in response to detecting the first change in distance:

in accordance with a determination that a distance between the computer system and the external device is greater than a first threshold distance, continuing to display the user interface element, wherein continuing to display the user interface element in accordance with the determination that the distance between the computer system and the external device is greater than the first threshold distance includes displaying the user interface element at a first predetermined size;

in accordance with a determination that the distance between the computer system and the external device is less than the first threshold distance and greater than a second threshold distance, continuing to display the user interface element, wherein continuing to display the user interface element in accordance with the determination that the distance between the computer system and the external device is less than the first threshold distance and greater than the second threshold distance includes displaying the user interface element at a variable size that is based on the distance between the computer system and the external device; and in accordance with a determination that the distance between the computer system and the external device is less than the second threshold distance, continuing to display the user interface element, wherein continuing to display the user interface element in accordance with the determination that the distance between the computer system and the external device is less than the second threshold distance includes displaying the user interface element at a second predetermined size.

25. A non-transitory computer-readable storage medium storing one or more programs configured to be executed by one or more processors of a computer system that is in communication with a display generation component and an external device, the one or more programs including instructions for:

displaying, via the display generation component, a user interface element;

while displaying the user interface element, detecting a first change in distance between the computer system and the external device; and in response to detecting the first change in distance:

in accordance with a determination that a distance between the computer system and the external device is greater than a first threshold distance, continuing to display the user interface element, wherein continuing to display the user interface element in accordance with the determination that the distance between the computer system and the external device is greater than the first threshold distance includes displaying the user interface element at a first predetermined size;

in accordance with a determination that the distance between the computer system and the external device is less than the first threshold distance and greater than a second threshold distance, continuing to display the user interface element, wherein continuing to display the user interface element in accordance with the determination that the distance between the computer system and the external device is less than the first threshold distance and greater than the second threshold distance includes displaying the user interface element at a variable size that is based on the distance between the computer system and the external device; and in accordance with a determination that the distance between the computer system and the external device is less than the second threshold distance, continuing to display the user interface element, wherein continuing to display the user interface element in accordance with the determination that the distance between the computer system and the external device is less than the second threshold distance includes displaying the user interface element at a second predetermined size.

26. The computer system of claim 1, wherein:

the first predetermined size does not depend on the distance between the computer system and the external device; and the second predetermined size does not depend on the distance between the computer system and the external device.

27. The method of claim 24, wherein, prior to detecting the first change in distance between the computer system and the external device, the user interface element is displayed at the first predetermined size, the method further comprising:

in response to detecting the first change in distance and in accordance with a determination that the distance between the computer system and the external device transitions from being greater than the first threshold distance to less than the first threshold distance and greater than the second threshold distance, changing the user interface element from being displayed with the first predetermined size to being displayed with the variable size.

28. The method of claim 24, further comprising:

while the distance between the computer system and the external device is less than the first threshold distance and greater than the second threshold distance, detecting a second change in distance between the computer system and the external device; and in response to detecting the second change in distance:

in accordance with a determination that a second distance between the computer system and the external device has transitioned to being greater than the first threshold distance, displaying a first user interface element snapping animation of the user interface element transitioning from being displayed with the variable size to being displayed with the first predetermined size; and in accordance with a determination that the second distance between the computer system and the external device has transitioned to being less than the second threshold distance, displaying a second user interface element snapping animation of the user interface element transitioning from being displayed with the variable size to being displayed with the second predetermined size.

29. The method of claim 24, wherein the computer system is playing back a first media item while the first change in distance between the computer system and the external device is detected, the method further comprising:

in accordance with a determination that a first set of criteria is satisfied, transferring the playback of the first media item from the computer system to the external device.

30. The method of claim 24, wherein the external device is playing back a third media item while the first change in distance between the computer system and the external device is detected, the method further comprising:

in accordance with a determination that a second set of criteria is satisfied, transferring the playback of the third media item from the external device to the computer system.

31. The method of claim 24, further comprising:

while the distance between the computer system and the external device is less than the first threshold distance and greater than the second threshold distance, detecting a third change in distance between the computer system and the external device; and in response to detecting the third change in distance between the computer system and the external device and in accordance with a determination that a third distance between the computer system and the external device, that results from the third change in distance, is less than the second threshold distance, displaying, via the display generation component, a now playing user interface.

32. The method of claim 24, wherein the user interface element includes a representation of media that is being played back by the computer system and/or the external device.

33. The method of claim 24, wherein the user interface element is displayed around one or more sensors that are integrated into the computer system.

34. The method of claim 24, wherein a first targeted device is playing back an eighth media item, the method further comprising:

while displaying the user interface element, detecting a third input that corresponds to selection of the user interface element; and in response to detecting the third input, displaying one or more controls for controlling the playback of the eighth media item on the first targeted device.

35. The method of claim 24, wherein the external device is in communication with one or more light sources, the method further comprising:

in response to detecting the first change in distance and in accordance with a determination that the distance between the computer system and the external device transitions from being less than the first threshold distance and greater than the second threshold distance to being less than the second threshold distance, transmitting a third set of instructions to the external device that causes the one or more light sources to output a light animation.

36. The method of claim 24, wherein, while the distance between the computer system and the external device is less than the first threshold distance and greater than the second threshold distance, the size of the user interface element has an inverse relationship with the distance between the computer system and the external device.

37. The non-transitory computer-readable storage medium of claim 25, wherein, prior to detecting the first change in distance between the computer system and the external device, the user interface element is displayed at the first predetermined size, and wherein the one or more programs further include instructions for:

in response to detecting the first change in distance and in accordance with a determination that the distance between the computer system and the external device transitions from being greater than the first threshold distance to less than the first threshold distance and greater than the second threshold distance, changing the user interface element from being displayed with the first predetermined size to being displayed with the variable size.

38. The non-transitory computer-readable storage medium of claim 25, wherein the one or more programs further include instructions for:

while the distance between the computer system and the external device is less than the first threshold distance and greater than the second threshold distance, detecting a second change in distance between the computer system and the external device; and in response to detecting the second change in distance:

in accordance with a determination that a second distance between the computer system and the external device has transitioned to being greater than the first threshold distance, displaying a first user interface element snapping animation of the user interface element transitioning from being displayed with the variable size to being displayed with the first predetermined size; and in accordance with a determination that the second distance between the computer system and the external device has transitioned to being less than the second threshold distance, displaying a second user interface element snapping animation of the user interface element transitioning from being displayed with the variable size to being displayed with the second predetermined size.

39. The non-transitory computer-readable storage medium of claim 25, wherein the computer system is playing back a first media item while the first change in distance between the computer system and the external device is detected, and wherein the one or more programs further include instructions for:

in accordance with a determination that a first set of criteria is satisfied, transferring the playback of the first media item from the computer system to the external device.

40. The non-transitory computer-readable storage medium of claim 25, wherein the external device is playing back a third media item while the first change in distance between the computer system and the external device is detected, and wherein the one or more programs further include instructions for:

in accordance with a determination that a second set of criteria is satisfied, transferring the playback of the third media item from the external device to the computer system.

41. The non-transitory computer-readable storage medium of claim 25, wherein the one or more programs further include instructions for:

while the distance between the computer system and the external device is less than the first threshold distance and greater than the second threshold distance, detecting a third change in distance between the computer system and the external device; and in response to detecting the third change in distance between the computer system and the external device and in accordance with a determination that a third distance between the computer system and the external device, that results from the third change in distance, is less than the second threshold distance, displaying, via the display generation component, a now playing user interface.

42. The non-transitory computer-readable storage medium of claim 25, wherein the user interface element includes a representation of media that is being played back by the computer system and/or the external device.

43. The non-transitory computer-readable storage medium of claim 25, wherein the user interface element is displayed around one or more sensors that are integrated into the computer system.

44. The non-transitory computer-readable storage medium of claim 25, wherein a first targeted device is playing back an eighth media item, and wherein the one or more programs further include instructions for:

while displaying the user interface element, detecting a third input that corresponds to selection of the user interface element; and in response to detecting the third input, displaying one or more controls for controlling the playback of the eighth media item on the first targeted device.

45. The non-transitory computer-readable storage medium of claim 25, wherein the external device is in communication with one or more light sources, and wherein the one or more programs further include instructions for:

in response to detecting the first change in distance and in accordance with a determination that the distance between the computer system and the external device transitions from being less than the first threshold distance and greater than the second threshold distance to being less than the second threshold distance, transmitting a third set of instructions to the external device that causes the one or more light sources to output a light animation.

46. The non-transitory computer-readable storage medium of claim 25, wherein, while the distance between the computer system and the external device is less than the first threshold distance and greater than the second threshold distance, the size of the user interface element has an inverse relationship with the distance between the computer system and the external device.

\* \* \* \* \*